US012688660B2

(12) United States Patent
Hylak et al.

(10) Patent No.: US 12,688,660 B2
(45) Date of Patent: Jul. 21, 2026

(54) METHODS FOR DEPTH CONFLICT MITIGATION IN A THREE-DIMENSIONAL ENVIRONMENT

(71) Applicant: Apple Inc., Cupertino, CA (US)

(72) Inventors: Benjamin Hylak, San Francisco, CA (US); William A. Sorrentino, III, Mill Valley, CA (US); Christopher D. McKenzie, Burlingame, CA (US); James J. Owen, San Francisco, CA (US); Zoey C. Taylor, San Francisco, CA (US); Miquel Estany Rodriguez, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 92 days.

(21) Appl. No.: 18/467,523

(22) Filed: Sep. 14, 2023

(65) Prior Publication Data

US 2024/0087256 A1     Mar. 14, 2024

Related U.S. Application Data

(60) Provisional application No. 63/505,030, filed on May 30, 2023, provisional application No. 63/375,614, filed on Sep. 14, 2022.

(51) Int. Cl.
*G06T 19/00*        (2011.01)
*G06T 19/20*        (2011.01)
*G06V 10/60*        (2022.01)

(52) U.S. Cl.
CPC ............ *G06T 19/006* (2013.01); *G06T 19/20* (2013.01); *G06V 10/60* (2022.01); *G06T 2219/2004* (2013.01)

(58) Field of Classification Search
None
See application file for complete search history.

(56) References Cited

U.S. PATENT DOCUMENTS 1,173,824 A      2/1916  Mckee
5,015,188 A      5/1991  Pellosie et al.
                 (Continued)

FOREIGN PATENT DOCUMENTS

AU       2022348895 A1      4/2024
CA        3033344 A1        2/2018
                 (Continued)

OTHER PUBLICATIONS

Corrected Notice of Allowability received for U.S. Appl. No. 17/932,999, mailed on Feb. 20, 2025, 2 pages.
                 (Continued)

*Primary Examiner* — Ryan M Gray
(74) *Attorney, Agent, or Firm* — Kubota & Basol LLP

(57) ABSTRACT

In some embodiments, a computer system facilitates depth conflict mitigation for a virtual object that is in contact with one or more physical objects in a three-dimensional environment by changing visual properties of one or more portions of the virtual object. In some embodiments, a computer system facilitates depth conflict mitigation for a virtual object that is in contact with one or more physical objects in a three-dimensional environment by displaying the virtual object in a virtual environment within the three-dimensional environment. In some embodiments, a computer system facilitates depth conflict mitigation for a virtual object that is in contact with one or more physical objects in a three-dimensional environment by variably changing visual properties of one or more portions of the virtual object and/or by variably displaying the virtual object in a virtual environment based on one or more characteristics of the depth conflict.

69 Claims, 60 Drawing Sheets

(56) References Cited

U.S. PATENT DOCUMENTS

| 5,422,812 A | 6/1995 | Knoll et al. |
| 5,515,488 A | 5/1996 | Hoppe et al. |
| 5,524,195 A | 6/1996 | Clanton et al. |
| 5,610,828 A | 3/1997 | Kodosky et al. |
| 5,731,805 A | 3/1998 | Tognazzini et al. |
| 5,737,553 A | 4/1998 | Bartok |
| 5,740,440 A | 4/1998 | West |
| 5,751,287 A | 5/1998 | Hahn et al. |
| 5,758,122 A | 5/1998 | Corda et al. |
| 5,794,178 A | 8/1998 | Caid et al. |
| 5,809,267 A | 9/1998 | Moran et al. |
| 5,877,766 A | 3/1999 | Bates et al. |
| 5,900,849 A | 5/1999 | Gallery |
| 5,933,143 A | 8/1999 | Kobayashi |
| 5,990,886 A | 11/1999 | Serdy et al. |
| 6,061,060 A | 5/2000 | Berry et al. |
| 6,078,310 A | 6/2000 | Tognazzini |
| 6,108,004 A | 8/2000 | Medl |
| 6,112,015 A | 8/2000 | Planas et al. |
| 6,154,559 A | 11/2000 | Beardsley |
| 6,167,433 A | 12/2000 | Maples et al. |
| 6,295,069 B1 | 9/2001 | Shirur |
| 6,323,846 B1 | 11/2001 | Westerman et al. |
| 6,426,745 B1 | 7/2002 | Isaacs et al. |
| 6,456,296 B1 | 9/2002 | Cataudella et al. |
| 6,570,557 B1 | 5/2003 | Westerman et al. |
| 6,584,465 B1 | 6/2003 | Zhu et al. |
| 6,677,932 B1 | 1/2004 | Westerman |
| 6,714,201 B1 | 3/2004 | Grinstein et al. |
| 6,750,873 B1 | 6/2004 | Bernardini et al. |
| 6,756,997 B1 | 6/2004 | Ward et al. |
| 6,968,511 B1 | 11/2005 | Robertson et al. |
| 7,035,903 B1 | 4/2006 | Baldonado |
| 7,096,120 B2 | 8/2006 | Hull |
| 7,134,130 B1 | 11/2006 | Thomas |
| 7,137,074 B1 | 11/2006 | Newton et al. |
| 7,230,629 B2 | 6/2007 | Reynolds et al. |
| 7,298,370 B1 | 11/2007 | Middler et al. |
| 7,580,576 B2 | 8/2009 | Wang et al. |
| 7,614,008 B2 | 11/2009 | Ording |
| 7,633,076 B2 | 12/2009 | Huppi et al. |
| 7,634,718 B2 | 12/2009 | Nakajima |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,706,579 B2 | 4/2010 | Oijer |
| 7,721,226 B2 | 5/2010 | Barabe et al. |
| 7,844,914 B2 | 11/2010 | Andre et al. |
| 7,957,762 B2 | 6/2011 | Herz et al. |
| 8,006,002 B2 | 8/2011 | Kalayjian et al. |
| 8,122,341 B1 | 2/2012 | Dayan et al. |
| 8,239,784 B2 | 8/2012 | Hotelling et al. |
| 8,279,180 B2 | 10/2012 | Hotelling et al. |
| 8,341,541 B2 | 12/2012 | Holecek et al. |
| 8,381,135 B2 | 2/2013 | Hotelling et al. |
| 8,436,872 B2 | 5/2013 | Wright et al. |
| 8,479,122 B2 | 7/2013 | Hotelling et al. |
| 8,593,558 B2 | 11/2013 | Gardiner et al. |
| 8,724,856 B1 | 5/2014 | King |
| 8,730,156 B2 | 5/2014 | Weising et al. |
| 8,767,045 B2 | 7/2014 | Kitazato et al. |
| 8,793,620 B2 | 7/2014 | Stafford |
| 8,793,729 B2 | 7/2014 | Adimatyam et al. |
| 8,803,873 B2 | 8/2014 | Yoo et al. |
| 8,866,880 B2 | 10/2014 | Tan et al. |
| 8,896,632 B2 | 11/2014 | Macdougall et al. |
| 8,947,323 B1 | 2/2015 | Raffle et al. |
| 8,970,478 B2 | 3/2015 | Johansson |
| 8,970,629 B2 | 3/2015 | Kim et al. |
| 8,994,718 B2 | 3/2015 | Latta et al. |
| 9,007,301 B1 | 4/2015 | Raffle et al. |
| 9,108,109 B2 | 8/2015 | Pare et al. |
| 9,158,115 B1 | 10/2015 | Worley et al. |
| 9,164,975 B2 | 10/2015 | Milewski et al. |
| 9,183,672 B1 | 11/2015 | Hickman et al. |
| 9,185,062 B1 | 11/2015 | Yang et al. |
| 9,189,611 B2 | 11/2015 | Wssingbo |
| 9,196,072 B2 | 11/2015 | Oh et al. |
| 9,201,500 B2 | 12/2015 | Srinivasan et al. |
| 9,214,137 B2 | 12/2015 | Bala et al. |
| 9,222,787 B2 | 12/2015 | Blumenberg et al. |
| 9,230,368 B2 | 1/2016 | Keane et al. |
| 9,237,334 B2 | 1/2016 | Cheng et al. |
| 9,241,149 B2 | 1/2016 | Redmann |
| 9,245,388 B2 | 1/2016 | Poulos et al. |
| 9,256,785 B2 | 2/2016 | Qvarfordt |
| 9,293,118 B2 | 3/2016 | Matsui |
| 9,294,757 B1 | 3/2016 | Lewis et al. |
| 9,298,334 B1 | 3/2016 | Zimmerman et al. |
| 9,316,827 B2 | 4/2016 | Lindley et al. |
| 9,348,458 B2 | 5/2016 | Hotelling et al. |
| 9,383,189 B2 | 7/2016 | Bridges et al. |
| 9,384,594 B2 | 7/2016 | Maciocci et al. |
| 9,396,580 B1 | 7/2016 | Nowrouzezahrai et al. |
| 9,400,559 B2 | 7/2016 | Latta et al. |
| 9,426,193 B2 | 8/2016 | Goodman |
| 9,436,357 B2 | 9/2016 | Pallakoff et al. |
| 9,437,047 B2 | 9/2016 | Chang et al. |
| 9,448,635 B2 | 9/2016 | Macdougall et al. |
| 9,448,687 B1 | 9/2016 | Mckenzie et al. |
| 9,465,479 B2 | 10/2016 | Cho et al. |
| 9,519,371 B2 | 12/2016 | Nishida |
| 9,526,127 B1 | 12/2016 | Taubman et al. |
| 9,544,257 B2 | 1/2017 | Ogundokun et al. |
| 9,563,331 B2 | 2/2017 | Poulos et al. |
| 9,575,559 B2 | 2/2017 | Andrysco |
| 9,588,651 B1 | 3/2017 | Buchanan et al. |
| 9,612,722 B2 | 4/2017 | Miller et al. |
| 9,619,105 B1 | 4/2017 | Dal Mutto |
| 9,619,519 B1 | 4/2017 | Dorner |
| 9,672,588 B1 | 6/2017 | Doucette et al. |
| 9,681,112 B2 | 6/2017 | Son |
| 9,684,372 B2 | 6/2017 | Xun et al. |
| 9,704,230 B2 | 7/2017 | Hofmann et al. |
| 9,734,402 B2 | 8/2017 | Jang et al. |
| 9,778,814 B2 | 10/2017 | Ambrus et al. |
| 9,779,512 B2 | 10/2017 | Tomlin et al. |
| 9,829,708 B1 | 11/2017 | Asada |
| 9,851,866 B2 | 12/2017 | Goossens et al. |
| 9,864,498 B2 | 1/2018 | Olsson et al. |
| 9,870,130 B2 | 1/2018 | Schubert et al. |
| 9,886,087 B1 | 2/2018 | Wald et al. |
| 9,911,232 B2 | 3/2018 | Shapira et al. |
| 9,933,833 B2 | 4/2018 | Tu et al. |
| 9,933,937 B2 | 4/2018 | Lemay et al. |
| 9,934,614 B2 | 4/2018 | Ramsby et al. |
| 9,952,042 B2 | 4/2018 | Abovitz et al. |
| 10,026,209 B1 | 7/2018 | Dagley et al. |
| 10,049,460 B2 | 8/2018 | Romano et al. |
| 10,101,803 B2 | 10/2018 | Faaborg et al. |
| 10,139,985 B2 | 11/2018 | Mildrew et al. |
| 10,163,198 B2 | 12/2018 | Rochford et al. |
| 10,175,483 B2 | 1/2019 | Salter et al. |
| 10,186,086 B2 | 1/2019 | Giraldi et al. |
| 10,192,347 B2 | 1/2019 | Bui et al. |
| 10,203,764 B2 | 2/2019 | Katz et al. |
| 10,210,664 B1 | 2/2019 | Chaturvedi |
| 10,303,427 B2 | 5/2019 | Shintani et al. |
| 10,307,671 B2 | 6/2019 | Barney et al. |
| 10,318,034 B1 | 6/2019 | Hauenstein et al. |
| 10,331,205 B2 | 6/2019 | Kim et al. |
| 10,339,721 B1 | 7/2019 | Dascola et al. |
| 10,353,532 B1 | 7/2019 | Holz et al. |
| 10,373,381 B2 | 8/2019 | Nuernberger et al. |
| 10,394,320 B2 | 8/2019 | George-svahn et al. |
| 10,401,958 B2 | 9/2019 | Peana et al. |
| 10,402,081 B1 | 9/2019 | Andersen et al. |
| 10,424,124 B2 | 9/2019 | Takahashi |
| 10,448,189 B2 | 10/2019 | Link |
| 10,484,641 B2 | 11/2019 | Zhou et al. |
| 10,488,941 B2 | 11/2019 | Lam et al. |
| 10,499,044 B1 | 12/2019 | Giokaris et al. |
| 10,534,439 B2 | 1/2020 | Raffa et al. |
| 10,540,005 B2 | 1/2020 | Yoon et al. |

(56) References Cited

U.S. PATENT DOCUMENTS

| | | |
|---|---|---|
| 10,545,584 B2 | 1/2020 | Tome et al. |
| 10,564,714 B2 | 2/2020 | Marggraff et al. |
| 10,565,448 B2 | 2/2020 | Bell et al. |
| 10,565,761 B2 | 2/2020 | Deluca et al. |
| 10,573,067 B1 | 2/2020 | Naik et al. |
| 10,599,570 B1 | 3/2020 | Ding et al. |
| 10,630,803 B2 | 4/2020 | Hwang et al. |
| 10,642,368 B2 | 5/2020 | Chen |
| 10,645,332 B2 | 5/2020 | Zhang |
| 10,664,043 B2 | 5/2020 | Ikuta et al. |
| 10,664,048 B2 | 5/2020 | Cieplinski et al. |
| 10,664,050 B2 | 5/2020 | Alcaide et al. |
| 10,671,241 B1 | 6/2020 | Jia et al. |
| 10,671,243 B2 | 6/2020 | Ryu et al. |
| 10,678,403 B2 | 6/2020 | Duarte et al. |
| 10,691,216 B2 | 6/2020 | Geisner et al. |
| 10,698,562 B1 | 6/2020 | Zhou et al. |
| 10,699,488 B1 | 6/2020 | Terrano |
| 10,708,965 B1 | 7/2020 | Subramanian et al. |
| 10,712,900 B2 | 7/2020 | Osman et al. |
| 10,754,434 B2 | 8/2020 | Hall et al. |
| 10,762,716 B1 | 9/2020 | Paul et al. |
| 10,768,421 B1 | 9/2020 | Rosenberg et al. |
| 10,768,693 B2 | 9/2020 | Powderly et al. |
| 10,776,933 B2 | 9/2020 | Faulkner |
| 10,846,864 B2 | 11/2020 | Kim et al. |
| 10,861,242 B2 | 12/2020 | Lacey et al. |
| 10,877,645 B2 | 12/2020 | Lee et al. |
| 10,885,701 B1 | 1/2021 | Patel |
| 10,890,967 B2 | 1/2021 | Stellmach et al. |
| 10,922,744 B1 | 2/2021 | Mahajan |
| 10,929,099 B2 | 2/2021 | Querze et al. |
| 10,930,075 B2 * | 2/2021 | Costa .................... G06F 3/017 |
| 10,936,148 B1 | 3/2021 | Merkl et al. |
| 10,956,724 B1 | 3/2021 | Terrano |
| 10,983,663 B2 | 4/2021 | Iglesias |
| 11,003,308 B1 | 5/2021 | Dryer et al. |
| 11,017,611 B1 | 5/2021 | Mount et al. |
| 11,023,035 B1 | 6/2021 | Atlas et al. |
| 11,055,920 B1 | 7/2021 | Bramwell et al. |
| 11,079,995 B1 | 8/2021 | Hulbert et al. |
| 11,082,463 B2 | 8/2021 | Felman |
| 11,095,857 B1 | 8/2021 | Krol et al. |
| 11,112,875 B1 | 9/2021 | Zhou et al. |
| 11,126,850 B1 | 9/2021 | Ichim et al. |
| 11,132,840 B2 | 9/2021 | Sarangdhar et al. |
| 11,138,798 B2 | 10/2021 | Paul et al. |
| 11,146,909 B1 | 10/2021 | Pinto et al. |
| 11,175,791 B1 | 11/2021 | Patnaikuni et al. |
| 11,176,755 B1 | 11/2021 | Tichenor et al. |
| 11,199,898 B2 | 12/2021 | Blume et al. |
| 11,200,742 B1 | 12/2021 | Post et al. |
| 11,204,678 B1 | 12/2021 | Baker et al. |
| 11,232,643 B1 | 1/2022 | Stevens et al. |
| 11,243,734 B2 | 2/2022 | Boissière et al. |
| 11,249,556 B1 | 2/2022 | Schwarz et al. |
| 11,262,885 B1 | 3/2022 | Burckel |
| 11,266,919 B2 | 3/2022 | Bear et al. |
| 11,294,472 B2 | 4/2022 | Tang et al. |
| 11,294,475 B1 | 4/2022 | Pinchon et al. |
| 11,307,653 B1 | 4/2022 | Qian et al. |
| 11,340,756 B2 | 5/2022 | Faulkner et al. |
| 11,347,319 B2 | 5/2022 | Goel et al. |
| 11,348,300 B2 | 5/2022 | Zimmermann et al. |
| 11,379,033 B2 | 7/2022 | O'hern et al. |
| 11,380,323 B2 | 7/2022 | Shin et al. |
| 11,382,611 B1 | 7/2022 | Westling et al. |
| 11,406,896 B1 | 8/2022 | Cheung et al. |
| 11,409,363 B2 | 8/2022 | Chen et al. |
| 11,416,080 B2 | 8/2022 | Heo et al. |
| 11,432,095 B1 | 8/2022 | Satongar et al. |
| 11,461,973 B2 | 10/2022 | Pinchon |
| 11,496,571 B2 | 11/2022 | Berliner et al. |
| 11,500,510 B2 | 11/2022 | Tokuchi et al. |
| 11,531,402 B1 | 12/2022 | Stolzenberg |
| 11,531,459 B2 | 12/2022 | Poupyrev et al. |
| 11,557,102 B2 | 1/2023 | Palangie et al. |
| 11,567,625 B2 | 1/2023 | Faulkner et al. |
| 11,573,363 B2 | 2/2023 | Zou et al. |
| 11,574,452 B2 | 2/2023 | Berliner et al. |
| 11,599,239 B2 | 3/2023 | Rockel et al. |
| 11,604,080 B2 | 3/2023 | Paoletti et al. |
| 11,615,596 B2 | 3/2023 | Faulkner et al. |
| 11,641,460 B1 | 5/2023 | Geusz et al. |
| 11,669,155 B2 | 6/2023 | Bowman et al. |
| 11,682,180 B1 | 6/2023 | Willkie |
| 11,689,632 B2 | 6/2023 | Raisher et al. |
| 11,720,171 B2 | 8/2023 | Pastrana Vicente et al. |
| 11,726,577 B2 | 8/2023 | Katz |
| 11,730,226 B2 | 8/2023 | Stolarz et al. |
| 11,733,824 B2 | 8/2023 | Iskandar et al. |
| 11,743,215 B1 | 8/2023 | Murillo et al. |
| 11,762,457 B1 | 9/2023 | Ikkai et al. |
| 11,762,473 B2 | 9/2023 | Cipoletta et al. |
| 11,768,544 B2 | 9/2023 | Schwarz et al. |
| 11,842,454 B1 | 12/2023 | Lin et al. |
| 11,847,748 B2 | 12/2023 | Liu et al. |
| 11,861,056 B2 | 1/2024 | Burns et al. |
| 11,861,136 B1 | 1/2024 | Faulkner et al. |
| 11,868,582 B2 | 1/2024 | Kim et al. |
| 11,875,013 B2 | 1/2024 | Lemay et al. |
| 11,875,162 B2 | 1/2024 | Garstenauer et al. |
| 11,886,643 B2 | 1/2024 | Irie et al. |
| 11,899,845 B2 | 2/2024 | Chung et al. |
| 11,909,453 B2 | 2/2024 | Javaudin et al. |
| 11,914,759 B2 | 2/2024 | Klein et al. |
| 11,922,588 B2 | 3/2024 | Fillhardt et al. |
| 11,928,263 B2 | 3/2024 | Jung et al. |
| 11,934,569 B2 | 3/2024 | Pastrana Vicente et al. |
| 11,948,263 B1 | 4/2024 | Rudman et al. |
| 11,954,242 B2 | 4/2024 | Dascola et al. |
| 11,972,092 B2 | 4/2024 | Zurmoehle et al. |
| 11,983,326 B2 | 5/2024 | Lacey |
| 11,988,832 B2 | 5/2024 | Singh et al. |
| 11,989,965 B2 | 5/2024 | Tarighat Mehrabani |
| 12,020,387 B2 | 6/2024 | Maharaja |
| 12,023,579 B2 | 7/2024 | Azmandian et al. |
| 12,032,803 B2 | 7/2024 | Pastrana Vicente et al. |
| 12,099,653 B2 | 9/2024 | Chawda et al. |
| 12,099,695 B1 | 9/2024 | Smith et al. |
| 12,112,011 B2 | 10/2024 | Smith et al. |
| 12,113,948 B1 | 10/2024 | Smith et al. |
| 12,118,200 B1 | 10/2024 | Shutzberg et al. |
| 12,154,236 B1 | 11/2024 | Herman et al. |
| 12,182,325 B2 | 12/2024 | Calderone et al. |
| 12,236,546 B1 | 2/2025 | Lipton |
| 12,254,127 B2 | 3/2025 | Burns et al. |
| 12,321,515 B2 | 6/2025 | Calderone et al. |
| 12,394,167 B1 | 8/2025 | Scully et al. |
| 12,408,804 B2 | 9/2025 | Schneider et al. |
| 12,456,271 B1 | 10/2025 | Bernstein et al. |
| 2001/0047250 A1 | 11/2001 | Schuller et al. |
| 2002/0015024 A1 | 2/2002 | Westerman et al. |
| 2002/0030692 A1 | 3/2002 | Griesert |
| 2002/0044152 A1 | 4/2002 | Abbott et al. |
| 2002/0065778 A1 | 5/2002 | Bouet et al. |
| 2003/0038754 A1 | 2/2003 | Goldstein et al. |
| 2003/0151611 A1 | 8/2003 | Turpin et al. |
| 2003/0222924 A1 | 12/2003 | Baron |
| 2004/0059784 A1 | 3/2004 | Caughey |
| 2004/0104806 A1 | 6/2004 | Yui et al. |
| 2004/0230912 A1 | 11/2004 | Clow et al. |
| 2004/0243926 A1 | 12/2004 | Trenbeath et al. |
| 2005/0044510 A1 | 2/2005 | Yi |
| 2005/0062738 A1 | 3/2005 | Handley et al. |
| 2005/0100210 A1 | 5/2005 | Rice et al. |
| 2005/0138572 A1 | 6/2005 | Good et al. |
| 2005/0144570 A1 | 6/2005 | Loverin et al. |
| 2005/0144571 A1 | 6/2005 | Loverin et al. |
| 2005/0175218 A1 | 8/2005 | Vertegaal et al. |
| 2005/0190059 A1 | 9/2005 | Wehrenberg |
| 2005/0198143 A1 | 9/2005 | Moody et al. |
| 2005/0216866 A1 | 9/2005 | Rosen et al. |

(56)     References Cited

U.S. PATENT DOCUMENTS

| | | | |
|---|---|---|---|
| 2005/0231532 A1* | 10/2005 | Suzuki | G06F 3/0338 |
| | | | 345/633 |
| 2005/0248299 A1 | 11/2005 | Chemel et al. | |
| 2006/0017692 A1 | 1/2006 | Wehrenberg et al. | |
| 2006/0028400 A1 | 2/2006 | Lapstun et al. | |
| 2006/0033724 A1 | 2/2006 | Chaudhri et al. | |
| 2006/0034590 A1 | 2/2006 | Teramoto | |
| 2006/0080702 A1 | 4/2006 | Diez et al. | |
| 2006/0156228 A1 | 7/2006 | Gallo et al. | |
| 2006/0197753 A1 | 9/2006 | Hotelling | |
| 2006/0256083 A1 | 11/2006 | Rosenberg | |
| 2006/0283214 A1 | 12/2006 | Donadon et al. | |
| 2007/0172112 A1 | 7/2007 | Paley et al. | |
| 2007/0259716 A1 | 11/2007 | Mattice et al. | |
| 2008/0132249 A1 | 6/2008 | Hamilton | |
| 2008/0181502 A1 | 7/2008 | Yang | |
| 2008/0186255 A1 | 8/2008 | Cohen et al. | |
| 2008/0211771 A1 | 9/2008 | Richardson | |
| 2008/0222710 A1 | 9/2008 | Blagsvedt et al. | |
| 2008/0310707 A1 | 12/2008 | Kansal et al. | |
| 2009/0037844 A1 | 2/2009 | Kim et al. | |
| 2009/0049408 A1 | 2/2009 | Naaman et al. | |
| 2009/0064035 A1 | 3/2009 | Shibata et al. | |
| 2009/0146779 A1 | 6/2009 | Kumar et al. | |
| 2009/0146961 A1 | 6/2009 | Cheung et al. | |
| 2009/0231356 A1 | 9/2009 | Barnes et al. | |
| 2009/0254843 A1 | 10/2009 | Van et al. | |
| 2009/0319181 A1 | 12/2009 | Khosravy et al. | |
| 2009/0326810 A1 | 12/2009 | Callaghan et al. | |
| 2010/0097375 A1 | 4/2010 | Tadaishi et al. | |
| 2010/0115459 A1 | 5/2010 | Kinnunen et al. | |
| 2010/0177049 A1 | 7/2010 | Levy et al. | |
| 2010/0185949 A1 | 7/2010 | Jaeger | |
| 2010/0188503 A1 | 7/2010 | Tsai et al. | |
| 2010/0188572 A1 | 7/2010 | Card, II | |
| 2010/0269145 A1 | 10/2010 | Ingrassia et al. | |
| 2010/0293504 A1 | 11/2010 | Hachiya | |
| 2010/0302245 A1 | 12/2010 | Best | |
| 2010/0328432 A1 | 12/2010 | Tanaka | |
| 2010/0332196 A1 | 12/2010 | Fisker et al. | |
| 2011/0018895 A1 | 1/2011 | Buzyn et al. | |
| 2011/0018896 A1 | 1/2011 | Buzyn et al. | |
| 2011/0029185 A1 | 2/2011 | Aoki et al. | |
| 2011/0032365 A1 | 2/2011 | Yett | |
| 2011/0066981 A1 | 3/2011 | Chmielewski et al. | |
| 2011/0098029 A1 | 4/2011 | Rhoads et al. | |
| 2011/0142321 A1 | 6/2011 | Huffman | |
| 2011/0156879 A1 | 6/2011 | Matsushita et al. | |
| 2011/0164163 A1 | 7/2011 | Bilbrey et al. | |
| 2011/0169927 A1 | 7/2011 | Mages et al. | |
| 2011/0175932 A1 | 7/2011 | Yu et al. | |
| 2011/0216060 A1 | 9/2011 | Weising et al. | |
| 2011/0243448 A1 | 10/2011 | Kawabuchi et al. | |
| 2011/0254865 A1 | 10/2011 | Yee et al. | |
| 2011/0289691 A1 | 12/2011 | Laflèche et al. | |
| 2011/0304557 A1 | 12/2011 | Wilburn et al. | |
| 2011/0310001 A1 | 12/2011 | Madau et al. | |
| 2011/0320969 A1 | 12/2011 | Hwang et al. | |
| 2012/0038751 A1 | 2/2012 | Yuan et al. | |
| 2012/0066638 A1 | 3/2012 | Ohri | |
| 2012/0075496 A1 | 3/2012 | Akifusa et al. | |
| 2012/0086624 A1 | 4/2012 | Thompson et al. | |
| 2012/0124525 A1 | 5/2012 | Kang | |
| 2012/0131631 A1 | 5/2012 | Bhogal et al. | |
| 2012/0170089 A1 | 7/2012 | Kim et al. | |
| 2012/0170840 A1 | 7/2012 | Caruso et al. | |
| 2012/0184372 A1 | 7/2012 | Laarakkers et al. | |
| 2012/0194547 A1 | 8/2012 | Johnson et al. | |
| 2012/0223885 A1 | 9/2012 | Perez | |
| 2012/0249416 A1 | 10/2012 | Maciocci et al. | |
| 2012/0249741 A1 | 10/2012 | Maciocci et al. | |
| 2012/0256956 A1 | 10/2012 | Kasahara | |
| 2012/0256967 A1 | 10/2012 | Baldwin et al. | |
| 2012/0257035 A1 | 10/2012 | Larsen | |
| 2012/0272179 A1 | 10/2012 | Stafford | |
| 2012/0304087 A1 | 11/2012 | Walkin et al. | |
| 2013/0010062 A1 | 1/2013 | Redmann | |
| 2013/0027860 A1 | 1/2013 | Masaki et al. | |
| 2013/0088516 A1 | 4/2013 | Ota et al. | |
| 2013/0093727 A1 | 4/2013 | Eriksson et al. | |
| 2013/0103313 A1 | 4/2013 | Moore et al. | |
| 2013/0127850 A1 | 5/2013 | Bindon | |
| 2013/0147820 A1 | 6/2013 | Kalai et al. | |
| 2013/0148850 A1 | 6/2013 | Matsuda et al. | |
| 2013/0169533 A1 | 7/2013 | Jahnke | |
| 2013/0190044 A1 | 7/2013 | Kulas | |
| 2013/0191160 A1 | 7/2013 | Oran | |
| 2013/0207963 A1 | 8/2013 | Stirbu et al. | |
| 2013/0211843 A1 | 8/2013 | Clarkson | |
| 2013/0212470 A1 | 8/2013 | Karunamuni et al. | |
| 2013/0222227 A1 | 8/2013 | Johansson et al. | |
| 2013/0229345 A1 | 9/2013 | Day et al. | |
| 2013/0232430 A1 | 9/2013 | Reitan | |
| 2013/0246955 A1 | 9/2013 | Schwesig et al. | |
| 2013/0249922 A1 | 9/2013 | Hachiya | |
| 2013/0263016 A1 | 10/2013 | Lehtiniemi et al. | |
| 2013/0265227 A1 | 10/2013 | Julian | |
| 2013/0271397 A1 | 10/2013 | Hildreth et al. | |
| 2013/0278501 A1 | 10/2013 | Bulzacki | |
| 2013/0286004 A1 | 10/2013 | Mcculloch et al. | |
| 2013/0293456 A1 | 11/2013 | Son et al. | |
| 2013/0293468 A1 | 11/2013 | Perez et al. | |
| 2013/0300648 A1 | 11/2013 | Kim et al. | |
| 2013/0300654 A1 | 11/2013 | Seki | |
| 2013/0307945 A1 | 11/2013 | Cheng et al. | |
| 2013/0321462 A1 | 12/2013 | Salter et al. | |
| 2013/0325326 A1 | 12/2013 | Blumenberg et al. | |
| 2013/0326341 A1 | 12/2013 | Nonaka | |
| 2013/0326364 A1 | 12/2013 | Latta et al. | |
| 2013/0328925 A1 | 12/2013 | Latta et al. | |
| 2013/0332890 A1 | 12/2013 | Ramic et al. | |
| 2013/0342564 A1* | 12/2013 | Kinnebrew | G09G 3/003 |
| | | | 345/619 |
| 2013/0342570 A1 | 12/2013 | Kinnebrew et al. | |
| 2013/0345975 A1 | 12/2013 | Vulcano et al. | |
| 2014/0002338 A1 | 1/2014 | Raffa et al. | |
| 2014/0002444 A1 | 1/2014 | Bennett et al. | |
| 2014/0028548 A1 | 1/2014 | Bychkov et al. | |
| 2014/0040832 A1 | 2/2014 | Regelous | |
| 2014/0049462 A1* | 2/2014 | Weinberger | G06F 3/013 |
| | | | 345/156 |
| 2014/0063058 A1 | 3/2014 | Fialho et al. | |
| 2014/0068692 A1 | 3/2014 | Archibong et al. | |
| 2014/0071241 A1 | 3/2014 | Yang et al. | |
| 2014/0075361 A1 | 3/2014 | Reynolds et al. | |
| 2014/0078176 A1 | 3/2014 | Kim et al. | |
| 2014/0092018 A1 | 4/2014 | Geithner | |
| 2014/0104206 A1 | 4/2014 | Anderson | |
| 2014/0108942 A1 | 4/2014 | Freeman et al. | |
| 2014/0125584 A1 | 5/2014 | Xun et al. | |
| 2014/0126782 A1 | 5/2014 | Takai et al. | |
| 2014/0129990 A1 | 5/2014 | Xin et al. | |
| 2014/0132499 A1 | 5/2014 | Schwesinger et al. | |
| 2014/0132633 A1 | 5/2014 | Fekete et al. | |
| 2014/0139426 A1 | 5/2014 | Kryze et al. | |
| 2014/0164928 A1 | 6/2014 | Kim | |
| 2014/0168453 A1 | 6/2014 | Shoemake et al. | |
| 2014/0181683 A1 | 6/2014 | Lim et al. | |
| 2014/0198017 A1 | 7/2014 | Lamb et al. | |
| 2014/0232639 A1 | 8/2014 | Hayashi et al. | |
| 2014/0237366 A1 | 8/2014 | Poulos et al. | |
| 2014/0247210 A1 | 9/2014 | Henderek et al. | |
| 2014/0258942 A1 | 9/2014 | Kutliroff et al. | |
| 2014/0267046 A1 | 9/2014 | Ellsworth et al. | |
| 2014/0267400 A1 | 9/2014 | Mabbutt et al. | |
| 2014/0268054 A1 | 9/2014 | Olsson et al. | |
| 2014/0268925 A1 | 9/2014 | Lee et al. | |
| 2014/0282272 A1 | 9/2014 | Kies et al. | |
| 2014/0285641 A1 | 9/2014 | Kato et al. | |
| 2014/0298273 A1 | 10/2014 | Blackstone et al. | |
| 2014/0304612 A1 | 10/2014 | Collin | |
| 2014/0320404 A1 | 10/2014 | Kasahara | |
| 2014/0331187 A1 | 11/2014 | Hicks et al. | |
| 2014/0333666 A1 | 11/2014 | Poulos et al. | |

(56) References Cited

U.S. PATENT DOCUMENTS

| | | |
|---|---|---|
| 2014/0347391 A1 | 11/2014 | Keane et al. |
| 2014/0351727 A1 | 11/2014 | Danton et al. |
| 2014/0351753 A1 | 11/2014 | Shin et al. |
| 2014/0362111 A1 | 12/2014 | Kim |
| 2014/0363074 A1 | 12/2014 | Dolfing et al. |
| 2014/0368537 A1 | 12/2014 | Salter et al. |
| 2014/0368620 A1 | 12/2014 | Li et al. |
| 2014/0372957 A1 | 12/2014 | Keane et al. |
| 2014/0375683 A1 | 12/2014 | Salter et al. |
| 2015/0009118 A1 | 1/2015 | Thomas et al. |
| 2015/0035822 A1 | 2/2015 | Arsan et al. |
| 2015/0042679 A1 | 2/2015 | Järvenpää |
| 2015/0058718 A1 | 2/2015 | Kim et al. |
| 2015/0067580 A1 | 3/2015 | Um et al. |
| 2015/0077335 A1 | 3/2015 | Taguchi et al. |
| 2015/0082180 A1 | 3/2015 | Ames et al. |
| 2015/0095844 A1 | 4/2015 | Cho et al. |
| 2015/0121466 A1 | 4/2015 | Brands et al. |
| 2015/0123890 A1 | 5/2015 | Kapur et al. |
| 2015/0123901 A1 | 5/2015 | Schwesinger et al. |
| 2015/0128075 A1 | 5/2015 | Kempinski |
| 2015/0131850 A1 | 5/2015 | Qvarfordt |
| 2015/0135108 A1 | 5/2015 | Pope et al. |
| 2015/0143251 A1 | 5/2015 | Bailiang et al. |
| 2015/0145887 A1 | 5/2015 | Forutanpour et al. |
| 2015/0149961 A1 | 5/2015 | Karakotsios |
| 2015/0153833 A1 | 6/2015 | Pinault et al. |
| 2015/0177937 A1 | 6/2015 | Poletto et al. |
| 2015/0193982 A1 | 7/2015 | Mihelich et al. |
| 2015/0199081 A1 | 7/2015 | Wheeler |
| 2015/0205106 A1 | 7/2015 | Norden |
| 2015/0212576 A1 | 7/2015 | Ambrus et al. |
| 2015/0220152 A1 | 8/2015 | Tait et al. |
| 2015/0221132 A1 | 8/2015 | Kruglick |
| 2015/0242095 A1 | 8/2015 | Sonnenberg |
| 2015/0253957 A1 | 9/2015 | Crocker |
| 2015/0254905 A1 | 9/2015 | Ramsby et al. |
| 2015/0262428 A1 | 9/2015 | Tatzgern et al. |
| 2015/0277699 A1 | 10/2015 | Algreatly |
| 2015/0286741 A1 | 10/2015 | Zhu et al. |
| 2015/0312561 A1 | 10/2015 | Hoof et al. |
| 2015/0317831 A1 | 11/2015 | Ebstyne et al. |
| 2015/0317832 A1 | 11/2015 | Ebstyne et al. |
| 2015/0331240 A1 | 11/2015 | Poulos et al. |
| 2015/0331576 A1 | 11/2015 | Piya et al. |
| 2015/0332091 A1 | 11/2015 | Kim et al. |
| 2015/0370323 A1 | 12/2015 | Cieplinski et al. |
| 2015/0370404 A1 | 12/2015 | Hu et al. |
| 2015/0381974 A1 | 12/2015 | Hoffman et al. |
| 2016/0015470 A1 | 1/2016 | Border |
| 2016/0018898 A1 | 1/2016 | Tu et al. |
| 2016/0018900 A1 | 1/2016 | Tu et al. |
| 2016/0025971 A1 | 1/2016 | Crow et al. |
| 2016/0026242 A1 | 1/2016 | Burns et al. |
| 2016/0026243 A1 | 1/2016 | Bertram et al. |
| 2016/0026253 A1 | 1/2016 | Bradski et al. |
| 2016/0028961 A1 | 1/2016 | Thurairatnam |
| 2016/0050642 A1 | 2/2016 | Brown et al. |
| 2016/0062636 A1 | 3/2016 | Jung et al. |
| 2016/0070448 A1 | 3/2016 | Krol |
| 2016/0085301 A1 | 3/2016 | Lopez |
| 2016/0093108 A1 | 3/2016 | Mao et al. |
| 2016/0098093 A1 | 4/2016 | Cheon et al. |
| 2016/0098094 A1 | 4/2016 | Minkkinen |
| 2016/0098972 A1 | 4/2016 | Feit et al. |
| 2016/0127690 A1 | 5/2016 | Kaehler et al. |
| 2016/0133044 A1 | 5/2016 | Lynch |
| 2016/0133052 A1 | 5/2016 | Choi et al. |
| 2016/0171304 A1 | 6/2016 | Golding et al. |
| 2016/0179191 A1 | 6/2016 | Kim et al. |
| 2016/0179336 A1 | 6/2016 | Ambrus et al. |
| 2016/0189426 A1 | 6/2016 | Thomas et al. |
| 2016/0196692 A1 | 7/2016 | Kjallstrom et al. |
| 2016/0210784 A1 | 7/2016 | Ramsby et al. |
| 2016/0216768 A1 | 7/2016 | Goetz et al. |
| 2016/0224122 A1 | 8/2016 | Dietz et al. |
| 2016/0225012 A1 | 8/2016 | Ha et al. |
| 2016/0225164 A1 | 8/2016 | Tomlin et al. |
| 2016/0227267 A1 | 8/2016 | Tsurutani et al. |
| 2016/0253063 A1 | 9/2016 | Critchlow |
| 2016/0253821 A1 | 9/2016 | Romano et al. |
| 2016/0275702 A1 | 9/2016 | Reynolds et al. |
| 2016/0279516 A1 | 9/2016 | Gupta et al. |
| 2016/0291922 A1 | 10/2016 | Montgomerie et al. |
| 2016/0306434 A1 | 10/2016 | Ferrin |
| 2016/0313890 A1 | 10/2016 | Walline et al. |
| 2016/0334940 A1 | 11/2016 | Kandadai et al. |
| 2016/0349063 A1 | 12/2016 | Maurer et al. |
| 2016/0350973 A1 | 12/2016 | Shapira et al. |
| 2016/0357266 A1 | 12/2016 | Patel et al. |
| 2016/0363774 A1 | 12/2016 | Kawasima |
| 2016/0370858 A1 | 12/2016 | Leppänen et al. |
| 2016/0373647 A1 | 12/2016 | García Morate et al. |
| 2016/0373714 A1 | 12/2016 | Lee et al. |
| 2016/0379409 A1 | 12/2016 | Gavriliuc et al. |
| 2016/0379418 A1 | 12/2016 | Osborn et al. |
| 2017/0032568 A1 | 2/2017 | Gharpure et al. |
| 2017/0038829 A1 | 2/2017 | Lanier et al. |
| 2017/0038837 A1 | 2/2017 | Faaborg et al. |
| 2017/0038849 A1 | 2/2017 | Hwang |
| 2017/0039770 A1 | 2/2017 | Lanier et al. |
| 2017/0052373 A1 | 2/2017 | Memmott et al. |
| 2017/0052393 A1 | 2/2017 | Kweon |
| 2017/0052595 A1 | 2/2017 | Poulos et al. |
| 2017/0053383 A1 | 2/2017 | Heo |
| 2017/0060230 A1 | 3/2017 | Faaborg et al. |
| 2017/0061694 A1 | 3/2017 | Giraldi et al. |
| 2017/0090566 A1 | 3/2017 | George-svahn et al. |
| 2017/0109930 A1 | 4/2017 | Holzer et al. |
| 2017/0115728 A1 | 4/2017 | Park et al. |
| 2017/0123487 A1 | 5/2017 | Hazra et al. |
| 2017/0131964 A1 | 5/2017 | Baek et al. |
| 2017/0132694 A1 | 5/2017 | Damy |
| 2017/0132822 A1 | 5/2017 | Marschke et al. |
| 2017/0147180 A1 | 5/2017 | Yoon et al. |
| 2017/0153866 A1 | 6/2017 | Grinberg et al. |
| 2017/0154326 A1 | 6/2017 | Jo et al. |
| 2017/0162177 A1 | 6/2017 | Lebeck et al. |
| 2017/0169616 A1 | 6/2017 | Wiley et al. |
| 2017/0178392 A1 | 6/2017 | Zuccarino et al. |
| 2017/0185276 A1 | 6/2017 | Lee et al. |
| 2017/0206691 A1 | 7/2017 | Harrises et al. |
| 2017/0206692 A1 | 7/2017 | Sheaffer et al. |
| 2017/0212583 A1 | 7/2017 | Krasadakis |
| 2017/0213388 A1 | 7/2017 | Margolis et al. |
| 2017/0214782 A1 | 7/2017 | Brinda |
| 2017/0221264 A1 | 8/2017 | Perry |
| 2017/0228130 A1 | 8/2017 | Palmaro |
| 2017/0236332 A1 | 8/2017 | Kipman et al. |
| 2017/0243352 A1 | 8/2017 | Kutliroff et al. |
| 2017/0251143 A1 | 8/2017 | Peruch et al. |
| 2017/0256096 A1 | 9/2017 | Faaborg et al. |
| 2017/0270715 A1 | 9/2017 | Lindsay et al. |
| 2017/0285737 A1 | 10/2017 | Khalid et al. |
| 2017/0287215 A1 | 10/2017 | Lalonde et al. |
| 2017/0302903 A1 | 10/2017 | Ng et al. |
| 2017/0308163 A1 | 10/2017 | Cieplinski et al. |
| 2017/0315715 A1 | 11/2017 | Fujita et al. |
| 2017/0326457 A1 | 11/2017 | Tilton et al. |
| 2017/0344223 A1 | 11/2017 | Holzer et al. |
| 2017/0351094 A1 | 12/2017 | Poulos et al. |
| 2017/0357389 A1 | 12/2017 | Fleizach et al. |
| 2017/0358141 A1 | 12/2017 | Stafford et al. |
| 2017/0364198 A1 | 12/2017 | Yoganandan et al. |
| 2018/0005433 A1 | 1/2018 | Kohler et al. |
| 2018/0045963 A1 | 2/2018 | Hoover et al. |
| 2018/0046363 A1 | 2/2018 | Miller et al. |
| 2018/0075658 A1 | 3/2018 | Lanier et al. |
| 2018/0077383 A1 | 3/2018 | Akao et al. |
| 2018/0081519 A1 | 3/2018 | Kim |
| 2018/0084287 A1 | 3/2018 | Shimura |
| 2018/0088787 A1 | 3/2018 | Bereza et al. |
| 2018/0095542 A1 | 4/2018 | Mallinson |
| 2018/0095634 A1 | 4/2018 | Alexander |

(56) References Cited

U.S. PATENT DOCUMENTS

| | | |
|---|---|---|
| 2018/0095636 A1 | 4/2018 | Valdivia et al. |
| 2018/0101223 A1 | 4/2018 | Ishihara et al. |
| 2018/0103209 A1 | 4/2018 | Fischler et al. |
| 2018/0114364 A1 | 4/2018 | Mcphee et al. |
| 2018/0120944 A1 | 5/2018 | Wang et al. |
| 2018/0122043 A1 | 5/2018 | Energin et al. |
| 2018/0122138 A1 | 5/2018 | Piya et al. |
| 2018/0130255 A1 | 5/2018 | Hazeghi et al. |
| 2018/0136815 A1 | 5/2018 | Tomizuka et al. |
| 2018/0143693 A1 | 5/2018 | Calabrese et al. |
| 2018/0150204 A1 | 5/2018 | Macgillivray |
| 2018/0150997 A1 | 5/2018 | Austin |
| 2018/0157332 A1 | 6/2018 | Nie |
| 2018/0158222 A1 | 6/2018 | Hayashi |
| 2018/0165853 A1 | 6/2018 | Inagi et al. |
| 2018/0173404 A1 | 6/2018 | Smith |
| 2018/0181199 A1 | 6/2018 | Harvey et al. |
| 2018/0181272 A1 | 6/2018 | Olsson et al. |
| 2018/0183986 A1 | 6/2018 | Smith et al. |
| 2018/0188048 A1 | 7/2018 | Ding et al. |
| 2018/0188802 A1 | 7/2018 | Okumura |
| 2018/0190003 A1 | 7/2018 | Upadhyay et al. |
| 2018/0197336 A1 | 7/2018 | Rochford et al. |
| 2018/0197341 A1 | 7/2018 | Loberg et al. |
| 2018/0210628 A1 | 7/2018 | Mcphee et al. |
| 2018/0218214 A1 | 8/2018 | Pestun et al. |
| 2018/0220195 A1 | 8/2018 | Panchaksharaiah et al. |
| 2018/0239144 A1 | 8/2018 | Woods et al. |
| 2018/0247449 A1 | 8/2018 | Park et al. |
| 2018/0275753 A1 | 9/2018 | Publicover et al. |
| 2018/0286126 A1 | 10/2018 | Schwarz et al. |
| 2018/0300023 A1 | 10/2018 | Hein |
| 2018/0300952 A1 | 10/2018 | Evans et al. |
| 2018/0302687 A1 | 10/2018 | Bhattacharjee et al. |
| 2018/0315248 A1 | 11/2018 | Bastov et al. |
| 2018/0322701 A1 | 11/2018 | Pahud et al. |
| 2018/0330544 A1 | 11/2018 | Corso et al. |
| 2018/0330550 A1 | 11/2018 | Takahashi |
| 2018/0348010 A1 | 12/2018 | Coleman et al. |
| 2018/0348861 A1 | 12/2018 | Uscinski et al. |
| 2018/0348986 A1 | 12/2018 | Sawaki |
| 2018/0350099 A1 | 12/2018 | Yerkes et al. |
| 2018/0350119 A1 | 12/2018 | Kocharlakota et al. |
| 2018/0352374 A1 | 12/2018 | Ball et al. |
| 2019/0004683 A1 | 1/2019 | Pahud et al. |
| 2019/0005055 A1 | 1/2019 | Andrew et al. |
| 2019/0018479 A1 | 1/2019 | Minami |
| 2019/0018498 A1 | 1/2019 | West et al. |
| 2019/0034076 A1 | 1/2019 | Vinayak et al. |
| 2019/0037137 A1 | 1/2019 | Toksvig et al. |
| 2019/0043259 A1 | 2/2019 | Wang et al. |
| 2019/0050062 A1 | 2/2019 | Chen et al. |
| 2019/0056785 A1 | 2/2019 | Suk |
| 2019/0065027 A1 | 2/2019 | Hauenstein et al. |
| 2019/0073109 A1 | 3/2019 | Zhang et al. |
| 2019/0080572 A1 | 3/2019 | Kim et al. |
| 2019/0088149 A1 | 3/2019 | Fink et al. |
| 2019/0094963 A1 | 3/2019 | Nijs |
| 2019/0094979 A1 | 3/2019 | Hall et al. |
| 2019/0096134 A1 | 3/2019 | Amacker et al. |
| 2019/0101991 A1 | 4/2019 | Brennan |
| 2019/0102953 A1 | 4/2019 | Lindsay et al. |
| 2019/0130622 A1 | 5/2019 | Hoover et al. |
| 2019/0130633 A1 | 5/2019 | Haddad et al. |
| 2019/0138183 A1 | 5/2019 | Rosas et al. |
| 2019/0146128 A1 | 5/2019 | Cao et al. |
| 2019/0155495 A1 | 5/2019 | Klein et al. |
| 2019/0164340 A1 | 5/2019 | Pejic et al. |
| 2019/0172261 A1 | 6/2019 | Alt et al. |
| 2019/0172262 A1 | 6/2019 | Mchugh et al. |
| 2019/0180504 A1 | 6/2019 | Pomerantz et al. |
| 2019/0188895 A1 | 6/2019 | Miller et al. |
| 2019/0188918 A1 | 6/2019 | Brewer et al. |
| 2019/0204906 A1 | 7/2019 | Ross et al. |
| 2019/0212827 A1 | 7/2019 | Kin et al. |
| 2019/0213389 A1 | 7/2019 | Peruch et al. |
| 2019/0227763 A1 | 7/2019 | Kaufthal |
| 2019/0228503 A1 | 7/2019 | Tokuchi |
| 2019/0228589 A1 | 7/2019 | Dascola et al. |
| 2019/0238818 A1 | 8/2019 | Held et al. |
| 2019/0244434 A1 | 8/2019 | Pahud et al. |
| 2019/0251884 A1 | 8/2019 | Burns et al. |
| 2019/0258365 A1 | 8/2019 | Zurmoehle et al. |
| 2019/0265828 A1 | 8/2019 | Hauenstein et al. |
| 2019/0266774 A1 | 8/2019 | Sommerlade et al. |
| 2019/0277651 A1 | 9/2019 | Ruikar |
| 2019/0278432 A1 | 9/2019 | Bennett et al. |
| 2019/0279407 A1* | 9/2019 | McHugh ................. G06F 3/011 |
| 2019/0287307 A1 | 9/2019 | Rogers et al. |
| 2019/0294312 A1 | 9/2019 | Rohrbacher |
| 2019/0302977 A1 | 10/2019 | Pendergast et al. |
| 2019/0310757 A1 | 10/2019 | Lee et al. |
| 2019/0311547 A1 | 10/2019 | Ohmori |
| 2019/0324529 A1 | 10/2019 | Stellmach et al. |
| 2019/0325654 A1 | 10/2019 | Stisser et al. |
| 2019/0332244 A1 | 10/2019 | Beszteri et al. |
| 2019/0332250 A1 | 10/2019 | Lee et al. |
| 2019/0339770 A1 | 11/2019 | Kurlethimar et al. |
| 2019/0340816 A1 | 11/2019 | Rogers |
| 2019/0340832 A1 | 11/2019 | Srinivasan et al. |
| 2019/0346678 A1 | 11/2019 | Nocham |
| 2019/0346922 A1 | 11/2019 | Young et al. |
| 2019/0349575 A1 | 11/2019 | Knepper et al. |
| 2019/0354259 A1 | 11/2019 | Park |
| 2019/0361521 A1 | 11/2019 | Stellmach et al. |
| 2019/0362557 A1 | 11/2019 | Lacey et al. |
| 2019/0362560 A1 | 11/2019 | Choi et al. |
| 2019/0369569 A1 | 12/2019 | Olsen et al. |
| 2019/0370492 A1 | 12/2019 | Falchuk et al. |
| 2019/0371072 A1 | 12/2019 | Lindberg et al. |
| 2019/0377487 A1 | 12/2019 | Bailey et al. |
| 2019/0379765 A1 | 12/2019 | Fajt et al. |
| 2019/0384406 A1 | 12/2019 | Smith et al. |
| 2019/0392830 A1 | 12/2019 | Abdollahian |
| 2020/0004401 A1 | 1/2020 | Hwang et al. |
| 2020/0005539 A1 | 1/2020 | Hwang et al. |
| 2020/0012341 A1 | 1/2020 | Stellmach et al. |
| 2020/0020157 A1 | 1/2020 | Powers et al. |
| 2020/0026349 A1 | 1/2020 | Fontanel et al. |
| 2020/0026922 A1 | 1/2020 | Pekelny et al. |
| 2020/0038120 A1 | 2/2020 | Ziraknejad et al. |
| 2020/0043243 A1 | 2/2020 | Bhushan et al. |
| 2020/0045249 A1 | 2/2020 | Francois et al. |
| 2020/0048825 A1 | 2/2020 | Schultz et al. |
| 2020/0051527 A1 | 2/2020 | Ngo |
| 2020/0073521 A1 | 3/2020 | Peebler et al. |
| 2020/0081526 A1 | 3/2020 | Walker et al. |
| 2020/0082602 A1 | 3/2020 | Jones |
| 2020/0089314 A1 | 3/2020 | Poupyrev et al. |
| 2020/0092537 A1 | 3/2020 | Sutter et al. |
| 2020/0097077 A1 | 3/2020 | Nguyen et al. |
| 2020/0098140 A1 | 3/2020 | Jagnow et al. |
| 2020/0098173 A1 | 3/2020 | Mccall |
| 2020/0099989 A1 | 3/2020 | Niemirska et al. |
| 2020/0106965 A1 | 4/2020 | Malia et al. |
| 2020/0112711 A1 | 4/2020 | Enriquez et al. |
| 2020/0117213 A1 | 4/2020 | Tian et al. |
| 2020/0128227 A1 | 4/2020 | Chavez et al. |
| 2020/0128232 A1 | 4/2020 | Hwang et al. |
| 2020/0129850 A1 | 4/2020 | Ohashi |
| 2020/0135141 A1 | 4/2020 | Day et al. |
| 2020/0159017 A1 | 5/2020 | Lin et al. |
| 2020/0201444 A1 | 6/2020 | Stoyles et al. |
| 2020/0214682 A1 | 7/2020 | Zaslavsky et al. |
| 2020/0218074 A1 | 7/2020 | Hoover et al. |
| 2020/0225735 A1 | 7/2020 | Schwarz |
| 2020/0225746 A1 | 7/2020 | Bar-zeev et al. |
| 2020/0225747 A1 | 7/2020 | Bar-zeev et al. |
| 2020/0225830 A1 | 7/2020 | Tang et al. |
| 2020/0226814 A1 | 7/2020 | Tang et al. |
| 2020/0226823 A1 | 7/2020 | Stachniak et al. |
| 2020/0242844 A1 | 7/2020 | Bae et al. |
| 2020/0257245 A1 | 8/2020 | Linville et al. |
| 2020/0257484 A1 | 8/2020 | Qian et al. |

(56) References Cited

U.S. PATENT DOCUMENTS

| | | |
|---|---|---|
| 2020/0258481 A1 | 8/2020 | Woo et al. |
| 2020/0267326 A1 | 8/2020 | Mm |
| 2020/0272303 A1 | 8/2020 | Jia et al. |
| 2020/0285314 A1 | 9/2020 | Cieplinski et al. |
| 2020/0286299 A1 | 9/2020 | Wang et al. |
| 2020/0301513 A1 | 9/2020 | Mejia Cobo |
| 2020/0318955 A1 | 10/2020 | Sharapov et al. |
| 2020/0319704 A1 | 10/2020 | Kathuria et al. |
| 2020/0328913 A1 | 10/2020 | Wyas et al. |
| 2020/0356221 A1 | 11/2020 | Behzadi et al. |
| 2020/0357184 A1 | 11/2020 | Paul et al. |
| 2020/0357374 A1 | 11/2020 | Verweij et al. |
| 2020/0363867 A1 | 11/2020 | Azimi et al. |
| 2020/0371602 A1 | 11/2020 | Kanda |
| 2020/0371673 A1 | 11/2020 | Faulkner |
| 2020/0379626 A1 | 12/2020 | Guyomard et al. |
| 2020/0387214 A1 | 12/2020 | Ravasz et al. |
| 2020/0387228 A1 | 12/2020 | Ravasz et al. |
| 2020/0387287 A1 | 12/2020 | Ravasz et al. |
| 2020/0401687 A1 | 12/2020 | Mak |
| 2020/0412862 A1 | 12/2020 | Oh et al. |
| 2021/0011556 A1 | 1/2021 | Atlas et al. |
| 2021/0019036 A1 | 1/2021 | Wang et al. |
| 2021/0034163 A1 | 2/2021 | Goel et al. |
| 2021/0034319 A1 | 2/2021 | Wang et al. |
| 2021/0049826 A1 | 2/2021 | Takahashi |
| 2021/0055789 A1 | 2/2021 | Tsai et al. |
| 2021/0056748 A1 | 2/2021 | Pritchett |
| 2021/0067418 A1 | 3/2021 | Ely et al. |
| 2021/0074062 A1 | 3/2021 | Madonna et al. |
| 2021/0090222 A1 | 3/2021 | Lee et al. |
| 2021/0090337 A1 | 3/2021 | Ravasz et al. |
| 2021/0090348 A1 | 3/2021 | Croxford et al. |
| 2021/0096726 A1 | 4/2021 | Faulkner et al. |
| 2021/0097766 A1 | 4/2021 | Palangie et al. |
| 2021/0102820 A1 | 4/2021 | Le et al. |
| 2021/0103333 A1 | 4/2021 | Cieplinski et al. |
| 2021/0125414 A1 | 4/2021 | Berkebile |
| 2021/0132687 A1 | 5/2021 | Luo et al. |
| 2021/0134069 A1 | 5/2021 | Sorrento |
| 2021/0134248 A1 | 5/2021 | Wan et al. |
| 2021/0142552 A1 | 5/2021 | Kimura et al. |
| 2021/0158624 A1 | 5/2021 | Moon et al. |
| 2021/0165484 A1 | 6/2021 | Suguhara et al. |
| 2021/0165923 A1 | 6/2021 | Johnston |
| 2021/0173340 A1 | 6/2021 | Kim |
| 2021/0173536 A1 | 6/2021 | Kondo |
| 2021/0191600 A1 | 6/2021 | Lemay et al. |
| 2021/0225043 A1 | 7/2021 | Tang et al. |
| 2021/0227601 A1 | 7/2021 | Eom et al. |
| 2021/0241483 A1 | 8/2021 | Dryer et al. |
| 2021/0248674 A1 | 8/2021 | Ogunbunmi |
| 2021/0272367 A1 | 9/2021 | Richter |
| 2021/0272537 A1 | 9/2021 | Mak |
| 2021/0279957 A1 | 9/2021 | Eder et al. |
| 2021/0279967 A1 | 9/2021 | Gernoth et al. |
| 2021/0287439 A1 | 9/2021 | Goodrich et al. |
| 2021/0295592 A1 | 9/2021 | Von Cramon |
| 2021/0295602 A1 | 9/2021 | Scapel et al. |
| 2021/0303074 A1 | 9/2021 | Vanblon et al. |
| 2021/0303107 A1 | 9/2021 | Pla I Conesa et al. |
| 2021/0312713 A1 | 10/2021 | Peri et al. |
| 2021/0312717 A1 | 10/2021 | Mao |
| 2021/0326094 A1 | 10/2021 | Buerli et al. |
| 2021/0327140 A1 | 10/2021 | Rothkopf et al. |
| 2021/0331069 A1 | 10/2021 | Gustafson et al. |
| 2021/0333864 A1 | 10/2021 | Harvey et al. |
| 2021/0350564 A1 | 11/2021 | Peuhkurinen et al. |
| 2021/0350604 A1 | 11/2021 | Pejsa et al. |
| 2021/0350634 A1 | 11/2021 | Major et al. |
| 2021/0358294 A1 | 11/2021 | Parashar et al. |
| 2021/0366440 A1 | 11/2021 | Burns et al. |
| 2021/0368136 A1 | 11/2021 | Chalmers et al. |
| 2021/0374221 A1 | 12/2021 | Markhasin et al. |
| 2021/0375022 A1 | 12/2021 | Lee et al. |
| 2021/0383097 A1 | 12/2021 | Guerard et al. |
| 2021/0400744 A1 | 12/2021 | Chen et al. |
| 2021/0402306 A1 | 12/2021 | Huang |
| 2021/0405760 A1 | 12/2021 | Schoen |
| 2021/0409903 A1 | 12/2021 | Shapiro et al. |
| 2022/0011577 A1 | 1/2022 | Lawver et al. |
| 2022/0011855 A1 | 1/2022 | Hazra et al. |
| 2022/0012002 A1 | 1/2022 | Bar-zeev et al. |
| 2022/0027115 A1 | 1/2022 | Haapoja et al. |
| 2022/0028108 A1 | 1/2022 | Haapoja et al. |
| 2022/0030197 A1 | 1/2022 | Ishimoto |
| 2022/0070241 A1 | 3/2022 | Yerli |
| 2022/0076496 A1 | 3/2022 | Palangie et al. |
| 2022/0083145 A1 | 3/2022 | Matsunaga et al. |
| 2022/0083197 A1 | 3/2022 | Rockel et al. |
| 2022/0084279 A1 | 3/2022 | Lindmeier et al. |
| 2022/0086203 A1 | 3/2022 | Morris et al. |
| 2022/0086205 A1 | 3/2022 | Lebeau et al. |
| 2022/0091722 A1 | 3/2022 | Faulkner et al. |
| 2022/0091723 A1 | 3/2022 | Faulkner et al. |
| 2022/0092862 A1 | 3/2022 | Faulkner et al. |
| 2022/0100265 A1 | 3/2022 | Kies et al. |
| 2022/0100270 A1 | 3/2022 | Pastrana Vicente et al. |
| 2022/0101593 A1 | 3/2022 | Rockel et al. |
| 2022/0101612 A1 | 3/2022 | Palangie et al. |
| 2022/0104910 A1 | 4/2022 | Shelton et al. |
| 2022/0121344 A1 | 4/2022 | Pastrana Vicente et al. |
| 2022/0122303 A1 | 4/2022 | Sasikumar et al. |
| 2022/0124286 A1 | 4/2022 | Punwani et al. |
| 2022/0130107 A1 | 4/2022 | Lindh |
| 2022/0130126 A1 | 4/2022 | Delgado et al. |
| 2022/0137701 A1 | 5/2022 | Bowman et al. |
| 2022/0137705 A1 | 5/2022 | Hashimoto et al. |
| 2022/0148257 A1 | 5/2022 | Boubekeur et al. |
| 2022/0155863 A1 | 5/2022 | Wang et al. |
| 2022/0155909 A1 | 5/2022 | Kawashima et al. |
| 2022/0157029 A1 | 5/2022 | Horita et al. |
| 2022/0157083 A1 | 5/2022 | Jandhyala et al. |
| 2022/0165013 A1 | 5/2022 | Velez et al. |
| 2022/0179503 A1 | 6/2022 | Timonen et al. |
| 2022/0187907 A1 | 6/2022 | Lee et al. |
| 2022/0191570 A1 | 6/2022 | Reid et al. |
| 2022/0197403 A1 | 6/2022 | Hughes et al. |
| 2022/0198755 A1 | 6/2022 | Pinchon |
| 2022/0206298 A1 | 6/2022 | Goodman |
| 2022/0206588 A1 | 6/2022 | Canberk et al. |
| 2022/0207840 A1 | 6/2022 | Cansizoglu et al. |
| 2022/0214743 A1 | 7/2022 | Dascola et al. |
| 2022/0221976 A1 | 7/2022 | Agarwal et al. |
| 2022/0229524 A1 | 7/2022 | Mckenzie et al. |
| 2022/0229534 A1 | 7/2022 | Terre et al. |
| 2022/0232191 A1 | 7/2022 | Kawakami et al. |
| 2022/0236801 A1 | 7/2022 | Serbanati et al. |
| 2022/0239718 A1 | 7/2022 | Song et al. |
| 2022/0244536 A1 | 8/2022 | Sha et al. |
| 2022/0245888 A1 | 8/2022 | Singh et al. |
| 2022/0252882 A1 | 8/2022 | Berliner et al. |
| 2022/0253125 A1 | 8/2022 | Wallen et al. |
| 2022/0253136 A1 | 8/2022 | Holder et al. |
| 2022/0253149 A1 | 8/2022 | Berliner et al. |
| 2022/0253194 A1 | 8/2022 | Berliner et al. |
| 2022/0255995 A1 | 8/2022 | Berliner et al. |
| 2022/0276720 A1 | 9/2022 | Yasui |
| 2022/0277533 A1 | 9/2022 | Park |
| 2022/0279303 A1 | 9/2022 | Marculescu et al. |
| 2022/0286488 A1 | 9/2022 | Berliner et al. |
| 2022/0287676 A1 | 9/2022 | Steines et al. |
| 2022/0291808 A1 | 9/2022 | Stevens et al. |
| 2022/0292783 A1 | 9/2022 | Jayaram et al. |
| 2022/0292784 A1 | 9/2022 | Jayaram et al. |
| 2022/0292785 A1 | 9/2022 | Jayaram et al. |
| 2022/0295032 A1 | 9/2022 | Jayaram et al. |
| 2022/0295040 A1 | 9/2022 | Jayaram et al. |
| 2022/0295139 A1 | 9/2022 | Jayaram et al. |
| 2022/0301264 A1 | 9/2022 | O'leary et al. |
| 2022/0303680 A1 | 9/2022 | Ahmed et al. |
| 2022/0311950 A1 | 9/2022 | Ith et al. |
| 2022/0317776 A1 | 10/2022 | Sundstrom et al. |
| 2022/0319134 A1 | 10/2022 | Rodrigues et al. |

(56) References Cited

U.S. PATENT DOCUMENTS

| 2022/0326837 A1 | 10/2022 | Dessero et al. |
| 2022/0335697 A1 | 10/2022 | Harding et al. |
| 2022/0365595 A1 | 11/2022 | Cieplinski et al. |
| 2022/0365740 A1 | 11/2022 | Chang et al. |
| 2022/0374136 A1 | 11/2022 | Chang et al. |
| 2022/0382385 A1 | 12/2022 | Chen et al. |
| 2022/0383592 A1 | 12/2022 | Hare et al. |
| 2022/0391158 A1 | 12/2022 | Lemmens et al. |
| 2022/0392169 A1 | 12/2022 | Simpson et al. |
| 2022/0397962 A1 | 12/2022 | Goel et al. |
| 2022/0408164 A1 | 12/2022 | Lee et al. |
| 2022/0413691 A1 | 12/2022 | Becker et al. |
| 2022/0414975 A1 | 12/2022 | Becker et al. |
| 2022/0414999 A1 | 12/2022 | Ravasz et al. |
| 2022/0415094 A1 | 12/2022 | Kim et al. |
| 2023/0004216 A1 | 1/2023 | Rodgers et al. |
| 2023/0007335 A1 | 1/2023 | Gupta et al. |
| 2023/0008537 A1 | 1/2023 | Henderson et al. |
| 2023/0009683 A1 | 1/2023 | Biran et al. |
| 2023/0021861 A1 | 1/2023 | Fujiwara et al. |
| 2023/0027040 A1 | 1/2023 | Wang et al. |
| 2023/0030699 A1 | 2/2023 | Zion et al. |
| 2023/0031832 A1 | 2/2023 | Lipton et al. |
| 2023/0032545 A1 | 2/2023 | Mindlin et al. |
| 2023/0032771 A1 | 2/2023 | Zion et al. |
| 2023/0068660 A1 | 3/2023 | Brent et al. |
| 2023/0069764 A1 | 3/2023 | Jonker et al. |
| 2023/0074080 A1 | 3/2023 | Miller et al. |
| 2023/0076326 A1 | 3/2023 | Xu et al. |
| 2023/0092282 A1 | 3/2023 | Boesel et al. |
| 2023/0092874 A1 | 3/2023 | Krivoruchko et al. |
| 2023/0093979 A1 | 3/2023 | Stauber et al. |
| 2023/0100610 A1 | 3/2023 | Pastrana Vicente et al. |
| 2023/0100689 A1 | 3/2023 | Chiu et al. |
| 2023/0103161 A1 | 3/2023 | Li et al. |
| 2023/0114080 A1 | 4/2023 | Yang et al. |
| 2023/0119162 A1 | 4/2023 | Lipton et al. |
| 2023/0120052 A1 | 4/2023 | Wallen et al. |
| 2023/0130520 A1 | 4/2023 | Kaptelinin |
| 2023/0133579 A1 | 5/2023 | Chang et al. |
| 2023/0152889 A1 | 5/2023 | Cieplinski et al. |
| 2023/0152935 A1 | 5/2023 | Mckenzie et al. |
| 2023/0154122 A1 | 5/2023 | Dascola et al. |
| 2023/0163987 A1 | 5/2023 | Young et al. |
| 2023/0168745 A1 | 6/2023 | Yoda |
| 2023/0168788 A1 | 6/2023 | Faulkner et al. |
| 2023/0176806 A1 | 6/2023 | Chen et al. |
| 2023/0185426 A1 | 6/2023 | Rockel et al. |
| 2023/0186577 A1 | 6/2023 | Rockel et al. |
| 2023/0206572 A1 | 6/2023 | Pazmino et al. |
| 2023/0221833 A1 | 7/2023 | Holder et al. |
| 2023/0236660 A1 | 7/2023 | Kundu |
| 2023/0244857 A1 | 8/2023 | Weiss et al. |
| 2023/0259265 A1 | 8/2023 | Krivoruchko et al. |
| 2023/0260240 A1 | 8/2023 | Jayaram et al. |
| 2023/0266859 A1 | 8/2023 | Day et al. |
| 2023/0273706 A1 | 8/2023 | Smith et al. |
| 2023/0274504 A1 | 8/2023 | Ren et al. |
| 2023/0290042 A1 | 9/2023 | Casella et al. |
| 2023/0308610 A1 | 9/2023 | Henderson et al. |
| 2023/0308630 A1 | 9/2023 | Delgado |
| 2023/0314801 A1 | 10/2023 | Bove et al. |
| 2023/0316634 A1 | 10/2023 | Chiu et al. |
| 2023/0325004 A1 | 10/2023 | Burns et al. |
| 2023/0325046 A1 | 10/2023 | De Almeida E De Vincenzo et al. |
| 2023/0333646 A1 | 10/2023 | Pastrana Vicente et al. |
| 2023/0334808 A1 | 10/2023 | Sundstrom et al. |
| 2023/0341932 A1 | 10/2023 | Silva et al. |
| 2023/0343049 A1 | 10/2023 | Boesel et al. |
| 2023/0351702 A1 | 11/2023 | Tan et al. |
| 2023/0353398 A1 | 11/2023 | White |
| 2023/0359199 A1 | 11/2023 | Adachi et al. |
| 2023/0360264 A1 | 11/2023 | Wu et al. |
| 2023/0368475 A1 | 11/2023 | Chan et al. |
| 2023/0377259 A1 | 11/2023 | Becker et al. |
| 2023/0377268 A1 | 11/2023 | Hopkins et al. |
| 2023/0377295 A1 | 11/2023 | Angevine et al. |
| 2023/0377299 A1 | 11/2023 | Becker et al. |
| 2023/0377300 A1 | 11/2023 | Becker et al. |
| 2023/0384907 A1 | 11/2023 | Boesel et al. |
| 2023/0385532 A1 | 11/2023 | Mcveigh et al. |
| 2023/0388357 A1 | 11/2023 | Faulkner et al. |
| 2023/0394755 A1 | 12/2023 | Negoita et al. |
| 2023/0396854 A1 | 12/2023 | Sanders et al. |
| 2023/0400958 A1 | 12/2023 | Morrison et al. |
| 2024/0012530 A1 | 1/2024 | Lin et al. |
| 2024/0037886 A1 | 2/2024 | Chiu et al. |
| 2024/0062279 A1 | 2/2024 | Scully et al. |
| 2024/0070948 A1 | 2/2024 | Bradley et al. |
| 2024/0086031 A1 | 3/2024 | Palangie et al. |
| 2024/0086032 A1 | 3/2024 | Palangie et al. |
| 2024/0094863 A1 | 3/2024 | Smith et al. |
| 2024/0094866 A1 | 3/2024 | Lemay et al. |
| 2024/0094882 A1 | 3/2024 | Brewer et al. |
| 2024/0095984 A1 | 3/2024 | Ren et al. |
| 2024/0102821 A1 | 3/2024 | Vallet et al. |
| 2024/0103613 A1 | 3/2024 | Chawda et al. |
| 2024/0103616 A1 | 3/2024 | Yerkes et al. |
| 2024/0103636 A1 | 3/2024 | Lindmeier et al. |
| 2024/0103676 A1 | 3/2024 | Pastrana Vicente et al. |
| 2024/0103681 A1 | 3/2024 | Broughton et al. |
| 2024/0103684 A1 | 3/2024 | Yu et al. |
| 2024/0103685 A1 | 3/2024 | Pazmino et al. |
| 2024/0103686 A1 | 3/2024 | Pazmino et al. |
| 2024/0103687 A1 | 3/2024 | Pastrana Vicente et al. |
| 2024/0103701 A1 | 3/2024 | Pastrana Vicente et al. |
| 2024/0103704 A1 | 3/2024 | Pastrana Vicente et al. |
| 2024/0103707 A1 | 3/2024 | Henderson et al. |
| 2024/0103716 A1 | 3/2024 | Pastrana Vicente et al. |
| 2024/0103803 A1 | 3/2024 | Krivoruchko et al. |
| 2024/0104836 A1 | 3/2024 | Dessero et al. |
| 2024/0104843 A1 | 3/2024 | Mckenzie et al. |
| 2024/0104870 A1 | 3/2024 | Fuste Lleixa et al. |
| 2024/0104873 A1 | 3/2024 | Pastrana Vicente et al. |
| 2024/0104875 A1 | 3/2024 | Couche et al. |
| 2024/0104876 A1 | 3/2024 | Couche et al. |
| 2024/0104877 A1 | 3/2024 | Henderson et al. |
| 2024/0119682 A1 | 4/2024 | Rudman et al. |
| 2024/0126362 A1 | 4/2024 | Burns et al. |
| 2024/0135612 A1 | 4/2024 | Hold-Geoffroy et al. |
| 2024/0152245 A1 | 5/2024 | Broughton et al. |
| 2024/0152256 A1 | 5/2024 | Dascola et al. |
| 2024/0185514 A1 | 6/2024 | Singh et al. |
| 2024/0192764 A1 | 6/2024 | Dascola et al. |
| 2024/0193892 A1 | 6/2024 | Lutter et al. |
| 2024/0200967 A1 | 6/2024 | Arroyo et al. |
| 2024/0203066 A1 | 6/2024 | Kawashima et al. |
| 2024/0205509 A1 | 6/2024 | Kim et al. |
| 2024/0221273 A1 | 7/2024 | Dusseau et al. |
| 2024/0221291 A1 | 7/2024 | Henderson et al. |
| 2024/0233097 A1 | 7/2024 | Ngo et al. |
| 2024/0233288 A1 | 7/2024 | Stauber et al. |
| 2024/0265656 A1 | 8/2024 | Victor-faichney et al. |
| 2024/0272722 A1 | 8/2024 | Gitter et al. |
| 2024/0272782 A1 | 8/2024 | Pastrana Vicente et al. |
| 2024/0273838 A1 | 8/2024 | Palangie et al. |
| 2024/0281108 A1 | 8/2024 | Krivoruchko et al. |
| 2024/0281109 A1 | 8/2024 | Manjunath et al. |
| 2024/0291953 A1 | 8/2024 | Cerra et al. |
| 2024/0297919 A1 | 9/2024 | Berliner et al. |
| 2024/0310971 A1 | 9/2024 | Kawashima et al. |
| 2024/0338104 A1 | 10/2024 | Salter et al. |
| 2024/0338921 A1 | 10/2024 | Burgner et al. |
| 2024/0361832 A1 | 10/2024 | Calderone et al. |
| 2024/0361833 A1 | 10/2024 | Calderone et al. |
| 2024/0361835 A1 | 10/2024 | Hylak et al. |
| 2024/0393876 A1 | 11/2024 | Chawda et al. |
| 2024/0402800 A1 | 12/2024 | Shutzberg et al. |
| 2024/0402821 A1 | 12/2024 | Meyer et al. |
| 2024/0403080 A1 | 12/2024 | Laurita et al. |
| 2024/0404206 A1 | 12/2024 | Chiu et al. |
| 2024/0404207 A1 | 12/2024 | Laurita et al. |
| 2024/0404232 A1 | 12/2024 | Rockwell et al. |

(56) References Cited

U.S. PATENT DOCUMENTS

| | | | |
|---|---|---|---|
| 2024/0404233 A1 | 12/2024 | Boesel et al. | |
| 2024/0411444 A1 | 12/2024 | Shutzberg et al. | |
| 2024/0420435 A1 | 12/2024 | Gitter et al. | |
| 2024/0428488 A1 | 12/2024 | Ren et al. | |
| 2025/0005855 A1 | 1/2025 | Holder et al. | |
| 2025/0005864 A1 | 1/2025 | Dessero et al. | |
| 2025/0008057 A1 | 1/2025 | Chiu et al. | |
| 2025/0013343 A1 | 1/2025 | Smith et al. | |
| 2025/0013344 A1 | 1/2025 | Smith et al. | |
| 2025/0024008 A1 | 1/2025 | Cerra et al. | |
| 2025/0028423 A1 | 1/2025 | Dessero et al. | |
| 2025/0029319 A1 | 1/2025 | Boesel et al. | |
| 2025/0029328 A1 | 1/2025 | Smith et al. | |
| 2025/0031002 A1 | 1/2025 | Hawkins et al. | |
| 2025/0036255 A1 | 1/2025 | Pastrana Vicente et al. | |
| 2025/0069328 A1 | 2/2025 | Herscher et al. | |
| 2025/0077060 A1 | 3/2025 | Becker et al. | |
| 2025/0077066 A1 | 3/2025 | Lutter | |
| 2025/0078420 A1* | 3/2025 | Dessero | G06T 19/006 |
| 2025/0078429 A1 | 3/2025 | Dascola et al. | |
| 2025/0103132 A1 | 3/2025 | Rickwald et al. | |
| 2025/0104335 A1 | 3/2025 | Huang et al. | |
| 2025/0104367 A1 | 3/2025 | Huang et al. | |
| 2025/0106581 A1 | 3/2025 | Lutter et al. | |
| 2025/0106582 A1 | 3/2025 | Lutter et al. | |
| 2025/0110605 A1 | 4/2025 | Huang et al. | |
| 2025/0111472 A1 | 4/2025 | Lutter et al. | |
| 2025/0111605 A1 | 4/2025 | Huang et al. | |
| 2025/0111622 A1 | 4/2025 | Stern et al. | |
| 2025/0111626 A1 | 4/2025 | Deliz Centeno et al. | |
| 2025/0117079 A1 | 4/2025 | Chiu et al. | |
| 2025/0118038 A1 | 4/2025 | Sorrentino et al. | |
| 2025/0130707 A1 | 4/2025 | Stauber et al. | |
| 2025/0156031 A1 | 5/2025 | Holder et al. | |
| 2025/0157136 A1 | 5/2025 | Lindmeier et al. | |
| 2025/0165069 A1 | 5/2025 | Calderone et al. | |
| 2025/0199656 A1 | 6/2025 | Lipton et al. | |
| 2025/0200901 A1 | 6/2025 | Ren et al. | |
| 2025/0209744 A1 | 6/2025 | Piemonte et al. | |
| 2025/0209753 A1 | 6/2025 | Piemonte et al. | |
| 2025/0224811 A1 | 7/2025 | Lindmeier et al. | |
| 2025/0232541 A1 | 7/2025 | Chand et al. | |
| 2025/0258577 A1 | 8/2025 | Palangie et al. | |
| 2025/0278134 A1 | 9/2025 | Pastrana Vicente et al. | |
| 2025/0278166 A1 | 9/2025 | Mckenzie et al. | |
| 2025/0278907 A1 | 9/2025 | Pazmino et al. | |
| 2025/0284344 A1 | 9/2025 | Sundstrom et al. | |
| 2025/0291470 A1 | 9/2025 | Hylak et al. | |
| 2025/0306727 A1 | 10/2025 | Kawashima et al. | |
| 2025/0322612 A1 | 10/2025 | Cerra et al. | |
| 2025/0348186 A1 | 11/2025 | Krivoruchko | |
| 2025/0350902 A1 | 11/2025 | Keatch et al. | |

FOREIGN PATENT DOCUMENTS

| | | | |
|---|---|---|---|
| CN | 102298493 A | 12/2011 | |
| CN | 104714771 A | 6/2015 | |
| CN | 104981681 A | 10/2015 | |
| CN | 105264461 A | 1/2016 | |
| CN | 105264478 A | 1/2016 | |
| CN | 106990838 A | 7/2017 | |
| CN | 108519818 A | 9/2018 | |
| CN | 108563335 A | 9/2018 | |
| CN | 108633307 A | 10/2018 | |
| CN | 110413171 A | 11/2019 | |
| CN | 110476142 A | 11/2019 | |
| CN | 110673718 A | 1/2020 | |
| CN | 110830786 A | 2/2020 | |
| CN | 111033572 A | 4/2020 | |
| CN | 111213183 A | 5/2020 | |
| CN | 111488056 A | 8/2020 | |
| CN | 111580652 A | 8/2020 | |
| CN | 111913565 A | 11/2020 | |
| CN | 112068757 A | 12/2020 | |
| CN | 113168737 A | 7/2021 | |
| CN | 109491508 B | 8/2022 | |
| CN | 115309271 A | 11/2022 | |
| CN | 116132905 A | 5/2023 | |
| CN | 117043722 A | 11/2023 | |
| CN | 117857981 A | 4/2024 | |
| CN | 118102204 A | 5/2024 | |
| DE | 102016125811 A1 | 11/2017 | |
| DE | 102020101675 A1 | 7/2020 | |
| DE | 102020128536 A1 | 5/2021 | |
| EP | 0816983 A2 | 1/1998 | |
| EP | 1530115 A2 | 5/2005 | |
| EP | 1562021 A1 | 8/2005 | |
| EP | 2393056 A1 | 12/2011 | |
| EP | 2458486 A1 | 5/2012 | |
| EP | 2551763 A1 | 1/2013 | |
| EP | 2741175 A2 | 6/2014 | |
| EP | 2893297 A1 | 7/2015 | |
| EP | 2947545 A1 | 11/2015 | |
| EP | 3088997 A1 | 11/2016 | |
| EP | 3118722 A1 | 1/2017 | |
| EP | 3249497 A1 | 11/2017 | |
| EP | 3306444 A1 | 4/2018 | |
| EP | 3316075 A1 | 5/2018 | |
| EP | 3336805 A1 | 6/2018 | |
| EP | 3451135 A1 | 3/2019 | |
| EP | 3503101 A1 | 6/2019 | |
| EP | 3506151 A1 | 7/2019 | |
| EP | 3570144 A1 | 11/2019 | |
| EP | 3588255 A1 | 1/2020 | |
| EP | 3654147 A1 | 5/2020 | |
| EP | 4155867 A1 | 3/2023 | |
| EP | 3688726 B1 | 8/2023 | |
| GB | 2540791 A | 2/2017 | |
| JP | H06-4596 A | 1/1994 | |
| JP | H10-51711 A | 2/1998 | |
| JP | H10-78845 A | 3/1998 | |
| JP | H11289555 A | 10/1999 | |
| JP | 2004510239 A | 4/2004 | |
| JP | 2005-215144 A | 8/2005 | |
| JP | 2005293142 A | 10/2005 | |
| JP | 2005-333524 A | 12/2005 | |
| JP | 2006-004093 A | 1/2006 | |
| JP | 2006-107048 A | 4/2006 | |
| JP | 2006-146803 A | 6/2006 | |
| JP | 2006215750 A | 8/2006 | |
| JP | 2006-295236 A | 10/2006 | |
| JP | 2006318094 A | 11/2006 | |
| JP | 2011-203880 A | 10/2011 | |
| JP | 2012-234550 A | 11/2012 | |
| JP | 2013-178639 A | 9/2013 | |
| JP | 2013-196158 A | 9/2013 | |
| JP | 2013-254358 A | 12/2013 | |
| JP | 2013-257716 A | 12/2013 | |
| JP | 2014-21565 A | 2/2014 | |
| JP | 2014-59840 A | 4/2014 | |
| JP | 2014-71663 A | 4/2014 | |
| JP | 2014-99184 A | 5/2014 | |
| JP | 2014-514652 A | 6/2014 | |
| JP | 2014514653 A | 6/2014 | |
| JP | 2015-56173 A | 3/2015 | |
| JP | 2015-515040 A | 5/2015 | |
| JP | 2015-118332 A | 6/2015 | |
| JP | 2015222565 A | 12/2015 | |
| JP | 2016-96513 A | 5/2016 | |
| JP | 2016-194744 A | 11/2016 | |
| JP | 2017-27206 A | 2/2017 | |
| JP | 2017-58528 A | 3/2017 | |
| JP | 2017126009 A | 7/2017 | |
| JP | 2017525002 A | 8/2017 | |
| JP | 2017-531221 A | 10/2017 | |
| JP | 2018-5516 A | 1/2018 | |
| JP | 2018-5517 A | 1/2018 | |
| JP | 2018-41477 A | 3/2018 | |
| JP | 2018063567 A | 4/2018 | |
| JP | 2018-514005 A | 5/2018 | |
| JP | 2018-101019 A | 6/2018 | |
| JP | 2018088118 A | 6/2018 | |
| JP | 2018-106499 A | 7/2018 | |
| JP | 2019-40333 A | 3/2019 | |

(56)  References Cited

FOREIGN PATENT DOCUMENTS

| | | |
|---|---|---|
| JP | 2019515361 A | 6/2019 |
| JP | 2019517012 A | 6/2019 |
| JP | 2019-169154 A | 10/2019 |
| JP | 2019-175449 A | 10/2019 |
| JP | 2019527881 A | 10/2019 |
| JP | 2019532382 A | 11/2019 |
| JP | 2019-536131 A | 12/2019 |
| JP | 2020-503595 A | 1/2020 |
| JP | 2020086913 A | 6/2020 |
| JP | 2022-53334 A | 4/2022 |
| JP | 2022175629 A | 11/2022 |
| JP | 2023052278 A | 4/2023 |
| KR | 10-2011-0017236 A | 2/2011 |
| KR | 20110128487 A | 11/2011 |
| KR | 20140097654 A | 8/2014 |
| KR | 10-2016-0012139 A | 2/2016 |
| KR | 20170027240 A | 3/2017 |
| KR | 20180102171 A | 9/2018 |
| KR | 10-2019-0100957 A | 8/2019 |
| KR | 10-2020-0010296 A | 1/2020 |
| KR | 10-2020-0035103 A | 4/2020 |
| KR | 20200110788 A | 9/2020 |
| KR | 20200135496 A | 12/2020 |
| KR | 20200140378 A | 12/2020 |
| KR | 20210083016 A | 7/2021 |
| KR | 20210123530 A | 10/2021 |
| WO | 2010/026519 A1 | 3/2010 |
| WO | 2011/008638 A1 | 1/2011 |
| WO | 2012/145180 A1 | 10/2012 |
| WO | 2013169849 A2 | 11/2013 |
| WO | 2013184447 A2 | 12/2013 |
| WO | 2014105276 A1 | 7/2014 |
| WO | 2014190106 A1 | 11/2014 |
| WO | 2014/203301 A1 | 12/2014 |
| WO | 2015/195216 A1 | 12/2015 |
| WO | 2016014877 A1 | 1/2016 |
| WO | 2016118344 A1 | 7/2016 |
| WO | 2016126522 A1 | 8/2016 |
| WO | 2017024142 A1 | 2/2017 |
| WO | 2017/088487 A1 | 6/2017 |
| WO | 2018005557 A1 | 1/2018 |
| WO | 2018/046957 A2 | 3/2018 |
| WO | 2018090060 A1 | 5/2018 |
| WO | 2018106299 A1 | 6/2018 |
| WO | 2018116556 A1 | 6/2018 |
| WO | 2018125428 A1 | 7/2018 |
| WO | 2018/175735 A1 | 9/2018 |
| WO | 2018213801 A1 | 11/2018 |
| WO | 2019074771 A1 | 4/2019 |
| WO | 2019/142560 A1 | 7/2019 |
| WO | 2019152286 A2 | 8/2019 |
| WO | 2019172678 A1 | 9/2019 |
| WO | 2019/217163 A1 | 11/2019 |
| WO | 2019213111 A1 | 11/2019 |
| WO | 2020/066682 A1 | 4/2020 |
| WO | 2020105349 A1 | 5/2020 |
| WO | 2020121483 A1 | 6/2020 |
| WO | 2020179027 A1 | 9/2020 |
| WO | 2021/061351 A1 | 4/2021 |
| WO | 2021061349 A1 | 4/2021 |
| WO | 2021133053 A1 | 7/2021 |
| WO | 2021/173839 A1 | 9/2021 |
| WO | 2021202783 A1 | 10/2021 |
| WO | 2021203856 A1 | 10/2021 |
| WO | 2022/046340 A1 | 3/2022 |
| WO | 2022/055822 A1 | 3/2022 |
| WO | 2022/066399 A1 | 3/2022 |
| WO | 2022/066535 A2 | 3/2022 |
| WO | 2022055821 A1 | 3/2022 |
| WO | 2022067075 A1 | 3/2022 |
| WO | 2022067343 A2 | 3/2022 |
| WO | 2022072187 A2 | 4/2022 |
| WO | 2022/146936 A1 | 7/2022 |
| WO | 2022/146938 A1 | 7/2022 |
| WO | 2022/147146 A1 | 7/2022 |
| WO | 2022/164881 A1 | 8/2022 |
| WO | 2022192040 A1 | 9/2022 |
| WO | 2022204664 A1 | 9/2022 |
| WO | 2022208797 A1 | 10/2022 |
| WO | 2023043646 A1 | 3/2023 |
| WO | 2023/096940 A2 | 6/2023 |
| WO | 2023/141535 A1 | 7/2023 |
| WO | 2024064036 A1 | 3/2024 |
| WO | 2024064373 A1 | 3/2024 |

OTHER PUBLICATIONS

Corrected Notice of Allowability received for U.S. Appl. No. 17/932,999, mailed on Jan. 23, 2025, 9 pages.
Corrected Notice of Allowability received for U.S. Appl. No. 18/174,337, mailed on Jan. 15, 2025, 2 pages.
European Search Report received for European Patent Application No. 22703771.0, mailed on Feb. 26, 2025, 4 pages.
Extended European Search Report received for European Patent Application No. 24217335.9, mailed on Feb. 24, 2025, 8 pages.
Final Office Action received for U.S. Appl. No. 17/580,495, mailed on Feb. 12, 2025, 29 pages.
International Search Report received for PCT Patent Application No. PCT/US2023/060592, mailed on Jun. 14, 2023, 7 pages.
International Search Report received for PCT Patent Application No. PCT/US2024/039190, mailed on Nov. 22, 2024, 5 pages.
Non-Final Office Action received for U.S. Appl. No. 18/149,640, mailed on Jan. 15, 2025, 17 pages.
Non-Final Office Action received for U.S. Appl. No. 18/153,943, mailed on Dec. 31, 2024, 33 pages.
Non-Final Office Action received for U.S. Appl. No. 18/298,994, mailed on Mar. 7, 2025, 26 pages.
Non-Final Office Action received for U.S. Appl. No. 18/473,196, mailed on Feb. 28, 2025, 20 pages.
Non-Final Office Action received for U.S. Appl. No. 18/645,292, mailed on Feb. 21, 2025, 39 pages.
Non-Final Office Action received for U.S. Appl. No. 18/988,115, mailed on Feb. 24, 2025, 40 pages.
Notice of Allowance received for U.S. Appl. No. 18/154,757, mailed on Jan. 23, 2025, 12 pages.
Notice of Allowance received for U.S. Appl. No. 18/671,936, mailed on Jan. 15, 2025, 9 pages.
Notice of Allowance received for U.S. Appl. No. 18/671,936, mailed on Mar. 5, 2025, 7 pages.
MACMOSTVIDEO, "A Beginner's Guide to Selecting Items On Your Mac (#1566)", Bibliographic Information, Jan. 4, 2018, Retrieved from <URL:https://www.youtube.com/watch?v=a6MDAuh7M0Q&ab_channel=macmostvideo/>, [retrieved on Feb. 19, 2025], Most relevant passage of the video is 00:10 to 00:30, 2 pages.
AquaSnap Window Manager: dock, snap, tile, organize [online], Nurgo Software, Available online at: <https://www.nurgo-software.com/products/aquasnap>, [retrieved on Jun. 27, 2023], 5 pages.
Corrected Notice of Allowability received for U.S. Appl. No. 17/448,875, mailed on Apr. 24, 2024, 4 pages.
Corrected Notice of Allowability received for U.S. Appl. No. 17/479,791, mailed on May 19, 2023, 2 pages.
Corrected Notice of Allowability received for U.S. Appl. No. 17/659,147, mailed on Feb. 14, 2024, 6 pages.
Corrected Notice of Allowability received for U.S. Appl. No. 17/932,655, mailed on Oct. 12, 2023, 2 pages.
Corrected Notice of Allowability received for U.S. Appl. No. 17/935,095, mailed on Oct. 18, 2024, 3 pages.
Corrected Notice of Allowability received for U.S. Appl. No. 18/154,757, mailed on Aug. 30, 2024, 2 pages.
Corrected Notice of Allowability received for U.S. Appl. No. 18/421,827, mailed on Aug. 29, 2024, 2 pages.
Corrected Notice of Allowability received for U.S. Appl. No. 18/463,739, mailed on Oct. 4, 2024, 2 pages.
Corrected Notice of Allowability received for U.S. Appl. No. 18/465,098, mailed on Mar. 13, 2024, 3 pages.
Corrected Notice of Allowance received for U.S. Appl. No. 17/478,593, mailed on Dec. 21, 2022, 2 pages.

(56) References Cited

OTHER PUBLICATIONS

European Search Report received for European Patent Application No. 21791153.6, mailed on Mar. 22, 2024, 5 pages.
European Search Report received for European Patent Application No. 21801378.7, mailed on Jul. 10, 2024, 5 pages.
Extended European Search Report received for European Patent Application No. 23158818.7, mailed on Jul. 3, 2023, 12 pages.
Extended European Search Report received for European Patent Application No. 23158929.2, mailed on Jun. 27, 2023, 12 pages.
Extended European Search Report received for European Patent Application No. 23197572.3, mailed on Feb. 19, 2024, 7 pages.
Extended European Search Report received for European Patent Application No. 24159868.9, mailed on Oct. 9, 2024, 13 pages.
Extended European Search Report received for European Patent Application No. 24178730.8, mailed on Oct. 14, 2024, 8 pages.
Extended European Search Report received for European Patent Application No. 24178752.2, mailed on Oct. 4, 2024, 8 pages.
Extended European Search Report received for European Patent Application No. 24179233.2, mailed on Oct. 2, 2024, 10 pages.
Extended European Search Report received for European Patent Application No. 24179830.5, mailed on Nov. 5, 2024, 11 pages.
Extended European Search Report received for European Patent Application No. 24190323.6, mailed on Dec. 12, 2024, 9 pages.
Final Office Action received for U.S. Appl. No. 14/531,874, mailed on Nov. 4, 2016, 10 pages.
Final Office Action received for U.S. Appl. No. 15/644,639, mailed on Sep. 19, 2019, 12 pages.
Final Office Action received for U.S. Appl. No. 17/202,034, mailed on May 4, 2023, 41 pages.
Final Office Action received for U.S. Appl. No. 17/202,034, mailed on Nov. 4, 2024, 50 pages.
Final Office Action received for U.S. Appl. No. 17/448,875, mailed on Mar. 16, 2023, 24 pages.
Final Office Action received for U.S. Appl. No. 17/580,495, mailed on May 13, 2024, 29 pages.
Final Office Action received for U.S. Appl. No. 17/659,147, mailed on Oct. 4, 2023, 17 pages.
Final Office Action received for U.S. Appl. No. 17/816,314, mailed on Jan. 20, 2023, 11 pages.
Final Office Action received for U.S. Appl. No. 17/935,095, mailed on Dec. 29, 2023, 15 pages.
Final Office Action received for U.S. Appl. No. 18/157,040, mailed on Dec. 2, 2024, 25 pages.
Final Office Action received for U.S. Appl. No. 18/182,300, mailed on Feb. 16, 2024, 32 pages.
Final Office Action received for U.S. Appl. No. 18/182,300, mailed on Oct. 31, 2024, 34 pages.
Final Office Action received for U.S. Appl. No. 18/375,280, mailed on Jul. 12, 2024, 19 pages.
Final Office Action received for U.S. Appl. No. 18/473,196, mailed on Dec. 6, 2024, 22 pages.
Home | Virtual Desktop [online], Virtual Desktop, Available online at: <https://www.vrdesktop.net>, [retrieved on Jun. 29, 2023], 4 pages.
International Search Report received for PCT Application No. PCT/US2022/076603, mailed on Jan. 9, 2023, 4 pages.
International Search Report received for PCT Application No. PCT/US2023/018213, mailed on Jul. 26, 2023, 6 pages.
International Search Report received for PCT Application No. PCT/US2023/060052, mailed on May 24, 2023, 6 pages.
International Search Report received for PCT Application No. PCT/US2023/060943, mailed on Jun. 6, 2023, 7 pages.
International Search Report received for PCT Application No. PCT/US2023/074962, mailed on Jan. 19, 2024, 9 pages.
International Search Report received for PCT Application No. PCT/US2024/030107, mailed on Oct. 23, 2024, 9 pages.
International Search Report received for PCT Application No. PCT/US2024/032314, mailed on Nov. 11, 2024, 6 pages.
International Search Report received for PCT Application No. PCT/US2024/032451, mailed on Nov. 15, 2024, 6 pages.

International Search Report received for PCT Application No. PCT/US2024/032456, mailed on Nov. 14, 2024, 6 pages.
International Search Report received for PCT Patent Application No. PCT/US2015/029727, mailed on Nov. 2, 2015, 6 pages.
International Search Report received for PCT Patent Application No. PCT/US2021/022413, mailed on Aug. 13, 2021, 7 pages.
International Search Report received for PCT Patent Application No. PCT/US2021/049131, mailed on Dec. 21, 2021, 4 pages.
International Search Report received for PCT Patent Application No. PCT/US2021/050948, mailed on Mar. 4, 2022, 6 pages.
International Search Report received for PCT Patent Application No. PCT/US2021/071518, mailed on Feb. 25, 2022, 7 pages.
International Search Report received for PCT Patent Application No. PCT/US2021/071595, mailed on Mar. 17, 2022, 7 pages.
International Search Report received for PCT Patent Application No. PCT/US2021/071596, mailed on Apr. 8, 2022, 7 pages.
International Search Report received for PCT Patent Application No. PCT/US2022/013208, mailed on Apr. 26, 2022, 7 pages.
International Search Report received for PCT Patent Application No. PCT/US2022/071704, mailed on Aug. 26, 2022, 6 pages.
International Search Report received for PCT Patent Application No. PCT/US2022/076985, mailed on Feb. 20, 2023, 5 pages.
International Search Report received for PCT Patent Application No. PCT/US2023/074257, mailed on Nov. 21, 2023, 5 pages.
International Search Report received for PCT Patent Application No. PCT/US2023/074793, mailed on Feb. 6, 2024, 6 pages.
International Search Report received for PCT Patent Application No. PCT/US2023/074950, mailed on Jan. 3, 2024, 9 pages.
International Search Report received for PCT Patent Application No. PCT/US2023/074979, mailed on Feb. 26, 2024, 6 pages.
International Search Report received for PCT Patent Application No. PCT/US2024/026102, mailed on Aug. 26, 2024, 5 pages.
Letter Restarting Period for Response received for U.S. Appl. No. 15/644,639, mailed on Sep. 28, 2018, 8 pages.
Non-Final Office Action received for U.S. Appl. No. 14/531,874, mailed on May 18, 2016, 11 pages.
Non-Final Office Action received for U.S. Appl. No. 15/644,639, mailed on Apr. 12, 2019, 11 pages.
Non-Final Office Action received for U.S. Appl. No. 15/644,639, mailed on Sep. 10, 2018, 9 pages.
Non-Final Office Action received for U.S. Appl. No. 16/881,599, mailed on Apr. 28, 2021, 8 pages.
Non-Final Office Action received for U.S. Appl. No. 17/123,000, mailed on Nov. 12, 2021, 8 pages.
Non-Final Office Action received for U.S. Appl. No. 17/202,034, mailed on Jan. 19, 2024, 44 pages.
Non-Final Office Action received for U.S. Appl. No. 17/202,034, mailed on Jul. 20, 2022, 38 pages.
Non-Final Office Action received for U.S. Appl. No. 17/448,875, mailed on Oct. 6, 2022, 25 pages.
Non-Final Office Action received for U.S. Appl. No. 17/448,875, mailed on Sep. 29, 2023, 30 pages.
Non-Final Office Action received for U.S. Appl. No. 17/479,791, mailed on May 11, 2022, 18 pages.
Non-Final Office Action received for U.S. Appl. No. 17/580,495, mailed on Aug. 15, 2024, 28 pages.
Non-Final Office Action received for U.S. Appl. No. 17/580,495, mailed on Dec. 11, 2023, 27 pages.
Non-Final Office Action received for U.S. Appl. No. 17/659,147, mailed on Mar. 16, 2023, 19 pages.
Non-Final Office Action received for U.S. Appl. No. 17/816,314, mailed on Jul. 6, 2023, 10 pages.
Non-Final Office Action received for U.S. Appl. No. 17/816,314, mailed on Sep. 23, 2022, 10 pages.
Non-Final Office Action received for U.S. Appl. No. 17/932,655, mailed on Apr. 20, 2023, 10 pages.
Non-Final Office Action received for U.S. Appl. No. 17/932,999, mailed on Feb. 23, 2024, 22 pages.
Non-Final Office Action received for U.S. Appl. No. 17/935,095, mailed on Jun. 22, 2023, 15 pages.
Non-Final Office Action received for U.S. Appl. No. 18/154,697, mailed on Nov. 24, 2023, 10 pages.

(56) References Cited

OTHER PUBLICATIONS

Non-Final Office Action received for U.S. Appl. No. 18/157,040, mailed on May 2, 2024, 25 pages.
Non-Final Office Action received for U.S. Appl. No. 18/182,300, mailed on May 29, 2024, 33 pages.
Non-Final Office Action received for U.S. Appl. No. 18/182,300, mailed on Oct. 26, 2023, 29 pages.
Non-Final Office Action received for U.S. Appl. No. 18/322,469, mailed on Nov. 15, 2024, 34 pages.
Non-Final Office Action received for U.S. Appl. No. 18/336,770, mailed on Jun. 5, 2024, 12 pages.
Non-Final Office Action received for U.S. Appl. No. 18/375,280, mailed on Nov. 27, 2024, 17 pages.
Non-Final Office Action received for U.S. Appl. No. 18/473,196, mailed on Aug. 16, 2024, 21 pages.
Notice of Allowance received for U.S. Appl. No. 18/154,757, mailed on Aug. 26, 2024, 12 pages.
Notice of Allowance received for U.S. Appl. No. 14/531,874, mailed on Mar. 28, 2017, 9 pages.
Notice of Allowance received for U.S. Appl. No. 15/644,639, mailed on Jan. 16, 2020, 16 pages.
Notice of Allowance received for U.S. Appl. No. 16/881,599, mailed on Dec. 17, 2021, 7 pages.
Notice of Allowance received for U.S. Appl. No. 17/123,000, mailed on May 27, 2022, 8 pages.
Notice of Allowance received for U.S. Appl. No. 17/123,000, mailed on Sep. 19, 2022, 7 pages.
Notice of Allowance received for U.S. Appl. No. 17/448,875, mailed on Apr. 17, 2024, 8 pages.
Notice of Allowance received for U.S. Appl. No. 17/448,875, mailed on Jul. 12, 2024, 8 pages.
Notice of Allowance received for U.S. Appl. No. 17/448,876, mailed on Apr. 7, 2022, 9 pages.
Notice of Allowance received for U.S. Appl. No. 17/448,876, mailed on Jul. 20, 2022, 8 pages.
Notice of Allowance received for U.S. Appl. No. 17/478,593, mailed on Aug. 31, 2022, 10 pages.
Notice of Allowance received for U.S. Appl. No. 17/479,791, mailed on Mar. 13, 2023, 9 pages.
Notice of Allowance received for U.S. Appl. No. 17/479,791, mailed on Nov. 17, 2022, 9 pages.
Notice of Allowance received for U.S. Appl. No. 17/580,495, mailed on Jun. 6, 2023, 6 pages.
Notice of Allowance received for U.S. Appl. No. 17/580,495, mailed on Nov. 30, 2022, 12 pages.
Notice of Allowance received for U.S. Appl. No. 17/659,147, mailed on Jan. 26, 2024, 13 pages.
Notice of Allowance received for U.S. Appl. No. 17/659,147, mailed on May 29, 2024, 13 pages.
Notice of Allowance received for U.S. Appl. No. 17/816,314, mailed on Jan. 4, 2024, 6 pages.
Notice of Allowance received for U.S. Appl. No. 17/932,655, mailed on Jan. 24, 2024, 7 pages.
Notice of Allowance received for U.S. Appl. No. 17/932,655, mailed on Sep. 29, 2023, 7 pages.
Notice of Allowance received for U.S. Appl. No. 17/932,999, mailed on Sep. 12, 2024, 9 pages.
Notice of Allowance received for U.S. Appl. No. 17/935,095, mailed on Jul. 3, 2024, 9 pages.
Notice of Allowance received for U.S. Appl. No. 18/154,697, mailed on Aug. 6, 2024, 8 pages.
Notice of Allowance received for U.S. Appl. No. 18/154,697, mailed on Dec. 3, 2024, 7 pages.
Notice of Allowance received for U.S. Appl. No. 18/154,757, mailed on Jan. 23, 2024, 10 pages.
Notice of Allowance received for U.S. Appl. No. 18/154,757, mailed on May 10, 2024, 12 pages.
Notice of Allowance received for U.S. Appl. No. 18/174,337, mailed on Jan. 2, 2025, 8 pages.
Notice of Allowance received for U.S. Appl. No. 18/336,770, mailed on Nov. 29, 2024, 9 pages.
Notice of Allowance received for U.S. Appl. No. 18/421,675, mailed on Apr. 11, 2024, 9 pages.
Notice of Allowance received for U.S. Appl. No. 18/421,675, mailed on Jul. 31, 2024, 8 pages.
Notice of Allowance received for U.S. Appl. No. 18/421,827, mailed on Aug. 14, 2024, 10 pages.
Notice of Allowance received for U.S. Appl. No. 18/423,187, mailed on Jun. 5, 2024, 9 pages.
Notice of Allowance received for U.S. Appl. No. 18/463,739, mailed on Feb. 1, 2024, 10 pages.
Notice of Allowance received for U.S. Appl. No. 18/463,739, mailed on Jun. 17, 2024, 9 pages.
Notice of Allowance received for U.S. Appl. No. 18/463,739, mailed on Oct. 30, 2023, 11 pages.
Notice of Allowance received for U.S. Appl. No. 18/465,098, mailed on Jun. 20, 2024, 8 pages.
Notice of Allowance received for U.S. Appl. No. 18/465,098, mailed on Mar. 4, 2024, 6 pages.
Notice of Allowance received for U.S. Appl. No. 18/465,098, mailed on Nov. 17, 2023, 8 pages.
Notice of Allowance received for U.S. Appl. No. 18/515,188, mailed on Nov. 27, 2024, 9 pages.
Restriction Requirement received for U.S. Appl. No. 17/932,999, mailed on Oct. 3, 2023, 6 pages.
Restriction Requirement received for U.S. Appl. No. 18/473,187, mailed on Dec. 30, 2024, 5 pages.
Search Report received for Chinese Patent Application No. 202310873465.7, mailed on Feb. 1, 2024, 5 pages (2 pages of English Translation and 3 pages of Official Copy).
Supplemental Notice of Allowance received for U.S. Appl. No. 14/531,874, mailed on Jul. 26, 2017, 5 pages.
Supplemental Notice of Allowance received for U.S. Appl. No. 18/515,188, mailed on Dec. 12, 2024, 2 pages.
Bhowmick Shimmila, "Explorations on Body-Gesture Based Object Selection on HMD Based VR Interfaces for Dense and Occluded Dense Virtual Environments", Report: State of the Art Seminar, Department of Design Indian Institute of Technology, Guwahati, Nov. 2018, 25 pages.
Bohn Dieter, "Rebooting WebOS: How LG Rethought The Smart TV", The Verge, Available online at: <http://www.theverge.com/2014/1/6/5279220/rebooting-webos-how-lg-rethought-the-smart-tv>, [Retrieved Aug. 26, 2019], Jan. 6, 2014, 5 pages.
Bolt et al., "Two-Handed Gesture in Multi-Modal Natural Dialog", Uist '92, 5th Annual Symposium on User Interface Software and Technology. Proceedings Of the ACM Symposium on User Interface Software and Technology, Monterey, Nov. 15-18, 1992, pp. 7-14.
Brennan Dominic, "4 Virtual Reality Desktops for Vive, Rift, and Windows VR Compared", [online]. Road to VR, Available online at: <https://www.roadtovr.com/virtual-reality-desktop-compared-oculus-rift-htc-vive/>, [retrieved on Jun. 29, 2023], Jan. 3, 2018, 4 pages.
Chatterjee et al., "Gaze+Gesture: Expressive, Precise and Targeted Free-Space Interactions", ICMI '15, Nov. 9-13, 2015, 8 pages.
Fatima et al., "Eye Movement Based Human Computer Interaction", 3rd International Conference on Recent Advances In Information Technology (RAIT), Mar. 3, 2016, pp. 489-494.
Grey Melissa, "Comcast's New X2 Platform Moves your DVR Recordings from the Box to the Cloud", Engadget, Available online at: <http://www.engadget.com/2013/06/11/comcast-x2-platform/>, Jun. 11, 2013, 15 pages.
Lin et al., "Towards Naturally Grabbing and Moving Objects in VR", IS&T International Symposium on Electronic Imaging and The Engineering Reality of Virtual Reality, 2016, 6 pages.
McGill et al., "Expanding the Bounds Of Seated Virtual Workspaces", University of Glasgow, Available online at: <https://core.ac.uk/download/pdf/323988271.pdf>, [retrieved on Jun. 27, 2023], Jun. 5, 2020, 44 pages.
Pfeuffer et al., "Gaze + Pinch Interaction in Virtual Reality", In Proceedings of SUI '17, Brighton, United Kingdom, Oct. 16-17, 2017, pp. 99-108.

(56) References Cited

OTHER PUBLICATIONS

Pfeuffer et al., "Gaze and Touch Interaction on Tablets", UIST '16, Tokyo, Japan, ACM, Oct. 16-19, 2016, pp. 301-311.

Schenk et al., "SPOCK: A Smooth Pursuit Oculomotor Control Kit", CHI'16 Extended Abstracts, San Jose, CA, USA, ACM, May 7-12, 2016, pp. 2681-2687.

Simple Modal Window with Background Blur Effect, Available online at: <http://web.archive.org/web/20160313233427/https://www.cssscript.com/simple-modal-window-with-background-blur-effect/>, Mar. 13, 2016, 5 pages.

Yamada Yoshihiro, "How to Generate a Modal Window with ModalPopup Control", Available online at: <http://web.archive.org/web/20210920015801/https://atmarkit.itmedia.co.jp/fdotnet/dotnettips/580aspajaxmodalpopup/aspajaxmodalpopup.html>[Search Date Aug. 22, 2023], Sep. 20, 2021, 8 pages (1 page of English Abstract and 7 pages of Official Copy).

Extended European Search Report received for European Patent Application No. 25179367.5, mailed on Jul. 1, 2025, 10 pages.

Extended European Search Report received for European Patent Application No. 25169060.8, mailed on May 12, 2025, 10 pages.

Extended European Search Report received for European Patent Application No. 25169059.0, mailed on May 12, 2025, 11 pages.

Extended European Search Report received for European Patent Application No. 25174955.2, mailed on Jun. 25, 2025, 12 pages.

European Search Report received for European Patent Application No. 22723527.2, mailed on May 12, 2025, 4 pages.

International Search Report received for PCT Patent Application No. PCT/US2023/074978, mailed on Apr. 4, 2024, 4 pages.

International Search Report received for PCT Patent Application No. PCT/US2024/012828, mailed on May 6, 2024, 4 pages.

International Search Report received for PCT Patent Application No. PCT/US2024/032109, mailed on Sep. 13, 2024, 4 pages.

International Search Report received for PCT Patent Application No. PCT/US2024/043470, mailed on Oct. 29, 2024, 4 pages.

International Search Report received for PCT Patent Application No. PCT/US2025/011189, mailed on Apr. 23, 2025, 4 pages.

Search Report received for Chinese Patent Application No. 202210728190.3, mailed on Aug. 29, 2025, 5 pages (2 pages of English Translation and 3 pages of Official Copy Only).

International Search Report received for PCT Patent Application No. PCT/US2023/074960, mailed on Feb. 12, 2024, 6 pages.

International Search Report received for PCT Patent Application No. PCT/US2024/032153, mailed on Nov. 11, 2024, 6 pages.

International Search Report received for PCT Patent Application No. PCT/US2025/032533, mailed on Oct. 30, 2025, 6 pages.

Extended European Search Report received for European Patent Application No. 24221722.2, mailed on Apr. 17, 2025, 7 pages.

International Search Report received for PCT Patent Application No. PCT/US2023/074973, mailed on Mar. 7, 2024, 7 pages.

International Search Report received for PCT Patent Application No. PCT/US2025/032549, mailed on Oct. 23, 2025, 7 pages.

International Search Report received for PCT Patent Application No. PCT/US2025/029736, mailed on Nov. 6, 2025, 8 pages.

International Search Report received for PCT Patent Application No. PCT/US2025/029209, mailed on Nov. 5, 2025, 9 pages.

Adding Environments, Available online at: https://manual.keyshot.com/manual/environments/adding-environments/, [retrieved on Jun. 9, 2023], 2 pages.

Area Light, Available online at: https://manual.keyshot.com/manual/materials/material-types/light-sources/area-light/, [retrieved on Jun. 9, 2023], 24 pages.

Artec Leo, Artec 3D [online], 2018 [retrieved on Apr. 25, 2024]. Retrieved from the Internet: <URL: https://artec3d.com/portable-3d-scanners/artec-leo>, 39 pages.

Artec Leo Full 3D Scanning Demo w/ Sample Data, Digitize Designs, LLC, Available online at: <https://www.youtube.com/watch?v=ecBKo_h3Pug>, [retrieved on Sep. 1, 2022], Feb. 22, 2019, 3 pages.

Curious Blocks Alternatives 12, progsoft [online]. Progsoft, Available Online at: <URL: https://progsoft.net/en/software/curious-blocks>, [retrieved on Apr. 25, 2024], 2024, 7 pages.

Extended European Search Report received for European Patent Application No. 24158036.4, mailed on Jul. 18, 2024, 12 pages.

Extended European Search Report received for European Patent Application No. 24171800.6, mailed on Sep. 5, 2024, 15 pages.

Extended European Search Report received for European Patent Application No. 24171804.8, mailed on Sep. 5, 2024, 13 pages.

Eye-supported target positioning in MRTK, Mixed Reality Toolkit Documentation [online]. Features and Architecture [retrieved on Mar. 21, 2025]. Retrieved from the Internet: <URL: https://microsoft.github.io/MixedRealityToolkit-Unity/Documentation/EyeTracking/Eye Tracking_Positioning.html>, 2 pages.

Feature Highlights, Available online at: https://manual.keyshot.com/manual/whats-new/feature-highlights/, [retrieved on Jun. 9, 2023], 28 pages.

How to Use Your Phone or Tablet in VR! | iOS and Android, YouTube [online]. YouTube, Dec. 20, 2017, Available online at <https://www.youtube.com/watch?v=QhfZjbVUxZE>, [Retrieved from Internet on Dec. 23, 2022], 4 pages.

International Search Report received for PCT Patent Application No. PCT/US2021/049520, mailed on Apr. 8, 2022, 8 pages.

International Search Report received for PCT Patent Application No. PCT/US2022/071208, mailed on Aug. 18, 2022, 9 pages.

International Search Report received for PCT Patent Application No. PCT/US2022/071228, mailed on Aug. 25, 2022, 6 pages.

International Search Report received for PCT Patent Application No. PCT/US2022/076808, mailed on Mar. 28, 2023, 6 pages.

International Search Report received for PCT Patent Application No. PCT/US2022/082379, mailed on May 30, 2023, 7 pages.

International Search Report received for PCT Patent Application No. PCT/US2023/019309, mailed on Sep. 1, 2023, 6 pages.

International Search Report received for PCT Patent Application No. PCT/US2023/060429, mailed on Jun. 28, 2023, 7 pages.

International Search Report received for PCT Patent Application No. PCT/US2023/074955, mailed on Feb. 1, 2024, 6 pages.

International Search Report received for PCT Patent Application No. PCT/US2023/074957, mailed on Jan. 30, 2024, 7 pages.

International Search Report received for PCT Patent Application No. PCT/US2023/074968, mailed on Feb. 26, 2024, 7 pages.

International Search Report received for PCT Patent Application No. PCT/US2024/030661, mailed on Nov. 4, 2024, 5 pages.

International Search Report received for PCT Patent Application No. PCT/US2024/032140, mailed on Sep. 10, 2024, 4 pages.

International Search Report received for PCT Patent Application No. PCT/US2024/032423, mailed on Sep. 25, 2024, 5 pages.

International Search Report received for PCT Patent Application No. PCT/US2024/032455, mailed on Sep. 25, 2024, 4 pages.

International Search Report received for PCT Patent Application No. PCT/US2024/039204, mailed on Nov. 14, 2024, 4 pages.

Kitasenju Design, X [online], X Corp., Available Online at: <URL: https://twitter.com/kitasenjudesign/status/1282665402812608513>, [retrieved on Apr. 25, 2024], 2024, 1 page.

Light Manager, Available online at: https://manual.keyshot.com/manual/lighting/lighting-manager/, [retrieved on Jun. 9, 2023], 3 pages.

Magica Voxel 0.99.5 Review, YouTube [online], Google LLC, Available Online at: <URL: https://www.youtube.com/watch?v=WPPFnHQWwFk>, [retrieved on Apr. 25, 2024], 2024, 2 pages.

Open Source Voxel Editor for Windows, Mac, Linux, iOS, and Android, GOXEL [online]. Goxel by Guillaume Chereau, Available Online at: <URL: https://goxel.xyz/>, [retrieved on Apr. 25, 2024], 2024, 3 pages.

POP 2 3D Scanner (Infrared Light | Precision 0.05mm), REVPOINT [online]. Revopoint 3D, <URL: https://global.revopoint3d.com/products/face-3d-scanner-pop2?_ ga=2.182721893.277596832.1650264227-586470518.1640327512&ref=dh0L07OOzRuqo&utm_campaign=pop2_banner&utm_medium=referral&utm_source=Official_Website>, [retrieved on Apr. 25, 2024], 2014, 16 pages.

Reality Scan, Unreal Engine [online], [retrieved on Jun. 14, 2024]. Retrieved from the Internet: <URL: https://www.unrealengine.com/en-US/realityscan>, 11 pages.

(56)          References Cited

OTHER PUBLICATIONS

RealityScan Available Now | Capture the World and Create Your Own, YouTube [online]. YouTube, Dec. 1, 2022 [retrieved on Jun. 14, 2024]. Retrieved from the Internet: <URL: https://www.youtube.com/watch?v=fXLOMOWWBJQ>, 2 pages.

Search Report received for United Kingdom Patent Application No. GB2210885.6, mailed on Jan. 27, 2023, 1 page.

Sharevox, PHORIA [online]. PHORIA Pty Ltd, Available Online at: <URL: https://www.phoria.com.au/projects/sharevox/>, [retrieved on Apr. 25, 2024], 2024, 2 pages.

Sliders, Mixed Reality Toolkit Documentation [online]. Features and Architecture [retrieved on Mar. 21, 2025]. Retrieved from the Internet: <URL: https://microsoft.github.io/MixedRealityToolkit-Unity/Documentation/README_Sliders.html>, 3 pages.

Spatial Audio Head Tracking on Apple Tv Automatically Resets when You Get Up from the Couc . . . , AppleInsider [online]. Jun. 10, 2021 [retrieved on Dec. 20, 2024]. Retrieved from the Internet: <https://forums.appleinsider.com/discussion/222259/spatial-audio-head-tracking-on-apple-tv-automatically-resets-when-you-get-up-from-the-couc>, 2024, 6 pages.

VoxEdit Beta Tutorial—Introduction and How To Animate Voxel Creations, YouTube [online], Google LLC, Available Online at: <URL: https://www.youtube.com/watch?v=fqcArJWtyqM>, [retrieved on Apr. 25, 2024], 2024, 2 pages.

Voxel World Lens, Snapchat [online]. Snapchat Inc., Available Online at: < URL: https://www.snapchat.com/lens/689751dd6a7d446280d903d15d79f104?locale=en-US>, [retrieved on 2024-04-25], 2024, 1 page.

Voxelize, Rossiev [online]. Denis Rossiev 2018-2024, Available Online at: <URL: https://www.rossiev.pro/voxelize/>, [retrieved on Apr. 25, 2024], 2024, 16 pages.

VR Design Best Practices, LeapMotion, Aug. 29, 2015, 31 pages.

Your PC in VR, Virtual Desktop [online]. Virtual Desktop, Inc., 2023 [retrieved on Apr. 17, 2024]. Retrieved from the Internet: <URL: https://www.vrdesktop.net/>, 4 pages.

Coloring a Point Cloud Using 3DF Zephyr Pro, Wayback Machine, https://web.archive.org/web/20170522233043/http://www.3dflow.net:80/technology/documents/3df-zephyr-tutorials/point-cloud-coloring-using-3df-zephyr/, May 22, 2017, 1 page.

Apple, "Use Continuity to Connect Your Mac, iPhone, iPad, and Apple Watch", Apple Support, Available online at <https://support.apple.com/en-us/HT204681>, [Retrieved from Internet on Dec. 23, 2022], 4 pages.

Apple, "Use Message Effects with iMessage on Your iPhone, iPad, and iPod Touch", Apple Support, Available online at: <https://support.apple.com/en-us/HT206894>, [retrieved on Feb. 22, 2024], 5 pages.

Banta et al., "A Next-Best-View System for Autonomous 3-D Object Reconstruction", IEEE Transactions on Systems, Man, and Cybernetics—Part A: Systems and Humans vol. 30, No. 5, Sep. 30, 2000, pp. 589-598.

Berard Francois, "A Study on Two-Dimensional Scrolling with Head Motion", CLIPS-IMAG Technical Report. France, Ref: <TR-IMAG-CLIPS-IHM-199901>, Retrieved from: <http://iihm.imag.fr/publs/1999/TR199901_PWindowRate.pdf>, Retrieved on Dec. 226, 2024, Jan. 8, 1999, 7 pages.

Bermejo et al., "Exploring Button Designs for Mid-air Interaction in Virtual Reality: A Hexa-metric Evaluation of Key Representations and Multi-modal Cues", Proceedings of the ACM on Human-Computer Interaction, vol. 5, No. EICS, Article 194, May 27, 2021, 26 pages.

Capturing Reality, "Data Sheet RealityCapture TARASQUE 1.2", Wayback Machine, https://web.archive.org/web/20220327110303/https://www.capturingreality.com/assets/Documents/datasheet_TARASQUE_1.2.pdf, Mar. 27, 2022, 5 pages.

Capturing Reality, "RealityCapture tutorial: Complete model in PPI", Youtube, https://www.youtube.com/watch?v=tw6wNNEbH_M, Oct. 14, 2021, 2 pages.

Cas and Chary XR, "Oculus Go & Your Phone As 2nd Controller!!—An Inexpensive Way To Play PC VR Games", posted on Mar. 8, 2019, https://www.youtube.com/watch?v=i_iRVa0kemw, 2019, 4 pages.

Choe et al., "Augmented-Reality-Based 3D Emotional Messenger for Dynamic User Communication with Smart Devices", Electronics, vol. 9, No. 1127, Jul. 10, 2020, 15 pages.

Dhakal et al., "SLAM-Share: Visual Simultaneous Localization and Mapping for Real-time Multi-user Augmented Reality", Nov. 30, 2022. CoNEXT '22: Proceedings of the 18th International Conference on emerging Networking Experiments and Technologies, Dec. 6-9, 2022, Roma, Italy, pp. 293-306. Retrieved from <https://doi.org/10.1145/3555050.3569142>, 14 pages.

Didehkhorshid et al., "Text Input in Virtual Reality Using a Tracked Drawing Tablet", HCII 2020, LNCS 12428, 2020, pp. 314-329.

Dudley et al., "Fast and Precise Touch-Based Text Entry for Head-Mounted Augmented Reality with Variable Occlusion", ACM Transactions on Computer-Human Interaction (TOCHI), vol. 25, No. 6, Article 30, Dec. 13, 2018, 40 pages.

Edmiston et al., "Touch-Enabled Input Devices for Controlling Virtual Environments", 12th IFAC Symposium on Analysis, Design and Evaluation of Human-Machine Systems, Las Vegas, NV, USA, Aug. 11-15, 2013, pp. 349-356.

Gamedbharat, "I Want to Rotate a Object on Double Tap, Can Any One Help Me With This?", posted on Jul. 26, 2017, https://discussions.unity.com/t/i-want-to-rotate-a-object-on-double-tap-can-any-one-help-me-with-this/192010, 2017, 3 pages.

Ghosh et al., "NotifiVIR: Exploring Interruptions and Notifications in Virtual Reality", IEEE transactions on visualization and computer graphics, vol. 24, No. 4, Apr. 2018, pp. 1447-1456.

Headmaster Introduction, "If You Can Move Your Head, You Can Move Your World", Retrieved from: <https://www.microsoft.com/buxtoncollection/a/pdf/HeadMaster%20Introduction.pdf)>, Retrieved on Dec. 26, 2024, 4 pages.

Huang et al., "Proxy-Based Security Audit System for Remote Desktop Access", Computer Communications And Networks, ICCCN 2009. Proceedings of 18th International Conference On, IEEE, Piscataway, NJ, USA, Aug. 3, 2009, 5 pages.

Jones et al., "The Future of Virtual Museums: On-Line, Immersive, 3D Environments", ProQuest (Technology Collection Database, Dissertations and Theses Database): Technical Literature Search, Jul. 26, 2002, 12 pages.

Kim et al., "Pseudo-haptic Button for Improving User Experience of Mid-air Interaction in VR", International Journal of Human-Computer Studies, vol. 168, No. 102907, Aug. 9, 2022, 11 pages.

Kim et al., "Virtual Object Sizes for Efficient and Convenient Mid-air Manipulation", The Visual Computer, vol. 38, No. 9, Jul. 1, 2022, pp. 3463-3474.

Lachambre et al., "Unity Photogrammetry Workflow", https://unity3d.com/files/solutions/photogrammetry/Unity-Photogrammetry-Workflow_2017-07_v2.pdf, Jun. 23, 2017, pp. 55-64.

Lee et al., "UbiPoint: Towards Non-intrusive Mid-Air Interaction for Hardware Constrained Smart Glasses", In Proceedings of the 11th ACM Multimedia Systems Conference, May 27, 2020, pp. 190-201.

Lin et al., "Ubii: Physical World Interaction Through Augmented Reality", Publisher: IEEE, vol. 16, No. 3, DOI: 10.1109/TMC.2016.2567378, May 13, 2016, pp. 872-885.

Locher et al., "Mobile Phone and Cloud—a Dream Team for 3D Reconstruction", 2016 IEEE Winter Conference on Applications of Computer Vision (WACV), 2016, pp. 1-8.

Lor Cas, "Reality Capture: Exporting Mesh", Youtube, https://www.youtube.com/watch?v=PdvTRa2B_s0, Dec. 10, 2020, 2 pages.

Medeiros et al., "Promoting Reality Awareness in Virtual Reality through Proxemics", IEEE Virtual Reality and 3D User Interfaces (VR), Mar. 27-Apr. 1, 2021, 11 pages.

Mendes et al., "Mid-Air Interactions Above Stereoscopic Interactive Tables", IEEE Symposium on 3D User Interfaces (3DUI), Mar. 29-30, 2014, pp. 3-10.

Metalnwood, "Using a Tablet for Touch Control, with VR Headset On. (Demo Vid)", Virtual Reality, ED Forums, Jun. 12, 2020, Available online at <https://forum.dcs.world/topic/237992-using-a-

(56) References Cited

OTHER PUBLICATIONS tablet-for-touch-control-with-vr-headset-on-demo-vid/>, [Retrieved from Internet on Jan. 2, 2024], 9 pages.

Nunez Angulo et al., "Manual for the Design of Didactic Units in Augmented Reality Using the Cospaces EDU Application", 2020, 75 pages.

Pfeuffer et al., "Gaze+touch vs. Touch: What's the Trade-off When Using Gaze to Extend Touch to Remote Displays?", Advances In Databases And Information Systems, Aug. 30, 2015, pp. 349-367.

Process a 3D Scan With Projection in Reality Capture (RC), Wayback Machine, https://web.archive.org/web/20200116135047/http:/www.pi3dscan.com/index.php/instructions/item/process-a-3d-scan-with-projection-in-reality-capture-rc, Jan. 16, 2020, 1 page.

Qi et al., "PointNet++: Deep Hierarchical Feature Learning on Point Sets in a Metric Space", Stanford University, Jun. 7, 2017, 14 pages.

Ran et al., "Multi-User Augmented Reality with Communication Efficient and Spatially Consistent Virtual Objects", Nov. 24, 2020. CoNEXT '20: Proceedings of the 16th International Conference on emerging Networking Experiments and Technologies, Dec. 1-4, 2020, Barcelona, Spain, pp. 386-398. Retrieved from <https://doi.org/10.1145/3386367.3431312>, 13 pages.

Ro et al., "AR Pointer: Advanced Ray-Casting Interface Using Laser Pointer Metaphor for Object Manipulation in 3D Augmented Reality Environment", Applied Sciences, vol. 9, No. 3078, [retrieved on Jul. 27, 2020], Jul. 30, 2019, 18 pages.

Schubert Martin, "Design Sprints at Leap Motion: A Playground of 3D User Interfaces", Ultraleap For Developers [online]. Nov. 8, 2017 [retrieved on Mar. 21, 2025]. Retrieved from the Internet: <URL: https://blog.leapmotion.com/design-playground-3d-user-interfaces/>, 17 pages.

Schuetz Markus, "Interactive Exploration of Point Clouds", Technische Universitat Wien, reposiTUm, https://doi.org/10.34726/hss.2021.91668, Mar. 8, 2021, 119 pages.

Slambekova Dana, "Gaze and Gesture Based Object Interaction in Virtual World", [retrieved on Dec. 17, 2015]. Retrieved from the Internet: <URL:https://www.cs.rit.edu/~dxs4659/Report.pdf>, May 31, 2012, 54 pages.

Speicher et al., "Pseudo-haptic Controls for Mid-air Finger-based Menu Interaction", CHI'19 Extended Abstracts, May 4-9, 2019, Conference on Human Factors in Computing Systems, May 2, 2019, pp. 1-6.

Strand Robin, "Surface Skeletons in Grids With Non-cubic Voxels", 2004 IEEE Xplore, Available Online at: <DOI: 10.1109/ICPR.2004.1334195>, Sep. 2004, 5 pages.

Sun et al., "MagicHand: Interact with IoT Devices in Augmented Reality Environment", 2019 IEEE Conference on Virtual Reality and 3D User Interfaces, Osaka, Japan, Mar. 23-27, 2019, [retrieved on Dec. 4, 2020], 6 pages.

Tolle et al., "Design of Head Movement Controller System (HEMOCS) for Control Mobile Application through Head Pose Movement Detection", Retrieved from :<https://www.google.com/url?sa=t&source=web&rct=j&opi=89978449&url=https://online-journals.org/index.php/i-jim/article/download/5552/4029/19224&ved=2ahUKEwj-w86vga-HAxUJJDQIHYMNDNw4HhAWegQILhAB&usg=AOvVaw3HRlt7v8Rx7osc1lp0UfOh>, DOI: <httpdx.doi.org/10.3991/ijim.v10i3.5552>, Retrieved on Dec. 26, 2024, 2016, 5 pages.

Wood Tyriel, "The HoloLens 2 Tour!—Discovering a World of Holograms", YouTube [online]. YouTube, Mar. 23, 2021 [retrieved on Dec. 7, 2023], Retrieved from the Internet: <URL: https://www.youtube.com/watch?v=rMks7sMzPxl>, 2 pages.

Writtenhouse Sandy, "How to Use Live View on Google Maps", Available online at <https://www.lifewire.com/use-live-view-google-maps-5323691>, [Retrieved from Internet on Jun. 27, 2024], Jul. 5, 2022, 6 pages.

Yue et al., "Optimal Region Selection for Stereoscopic Video Subtitle Insertion", IEEE Transactions on Circuits and Systems for Video Technology, vol. 28, No. 11, Nov. 2018, 13 pages.

Zhuang et al., "Distributed Architecture for 3D Graphics Rendering in Collaborative System", Computer and Modernization, Issue 4, 2017, 5 pages (1 page of English Abstract and 4 pages of Official Copy).

* cited by examiner

Figure 1A

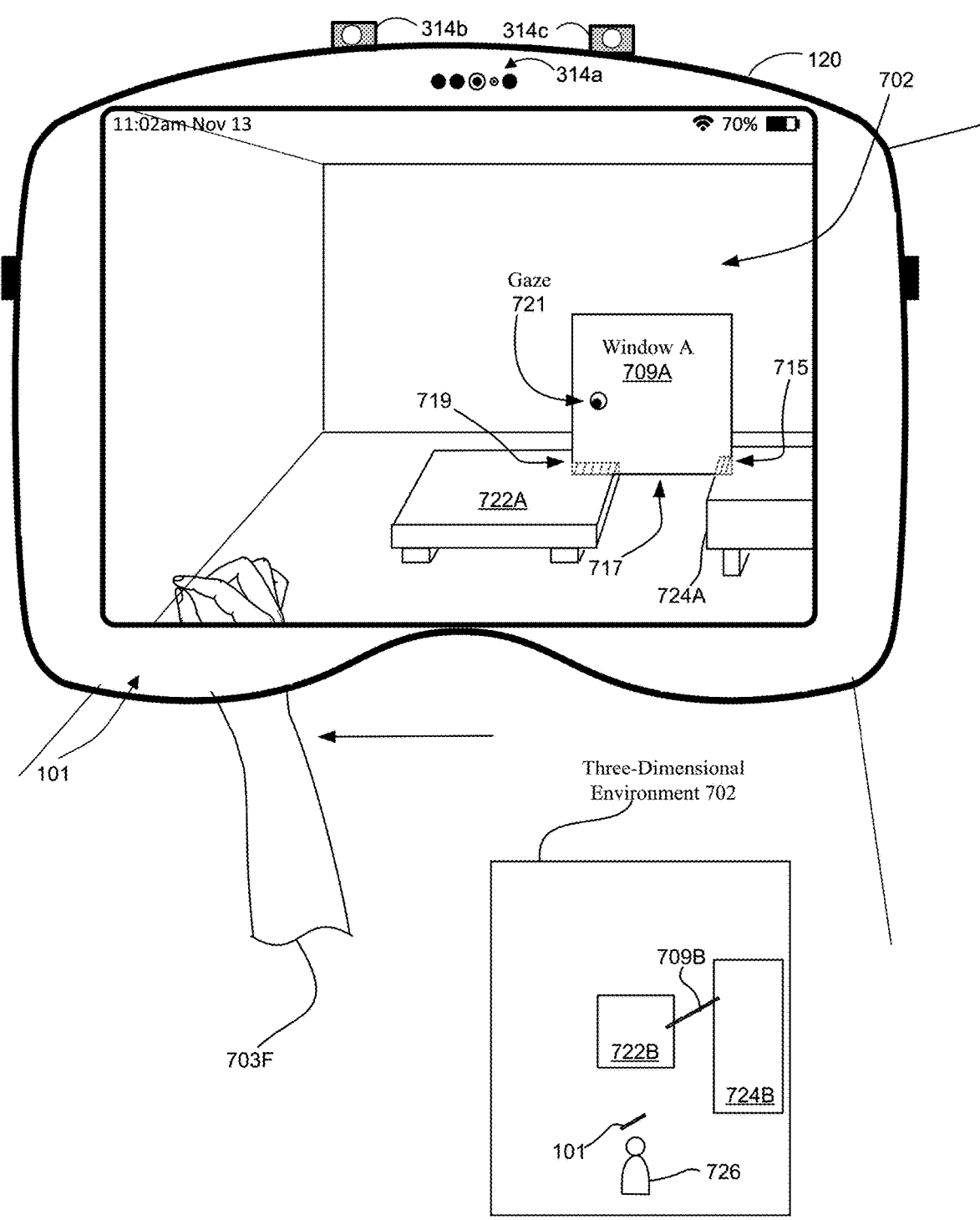
FIG. 7F1

800

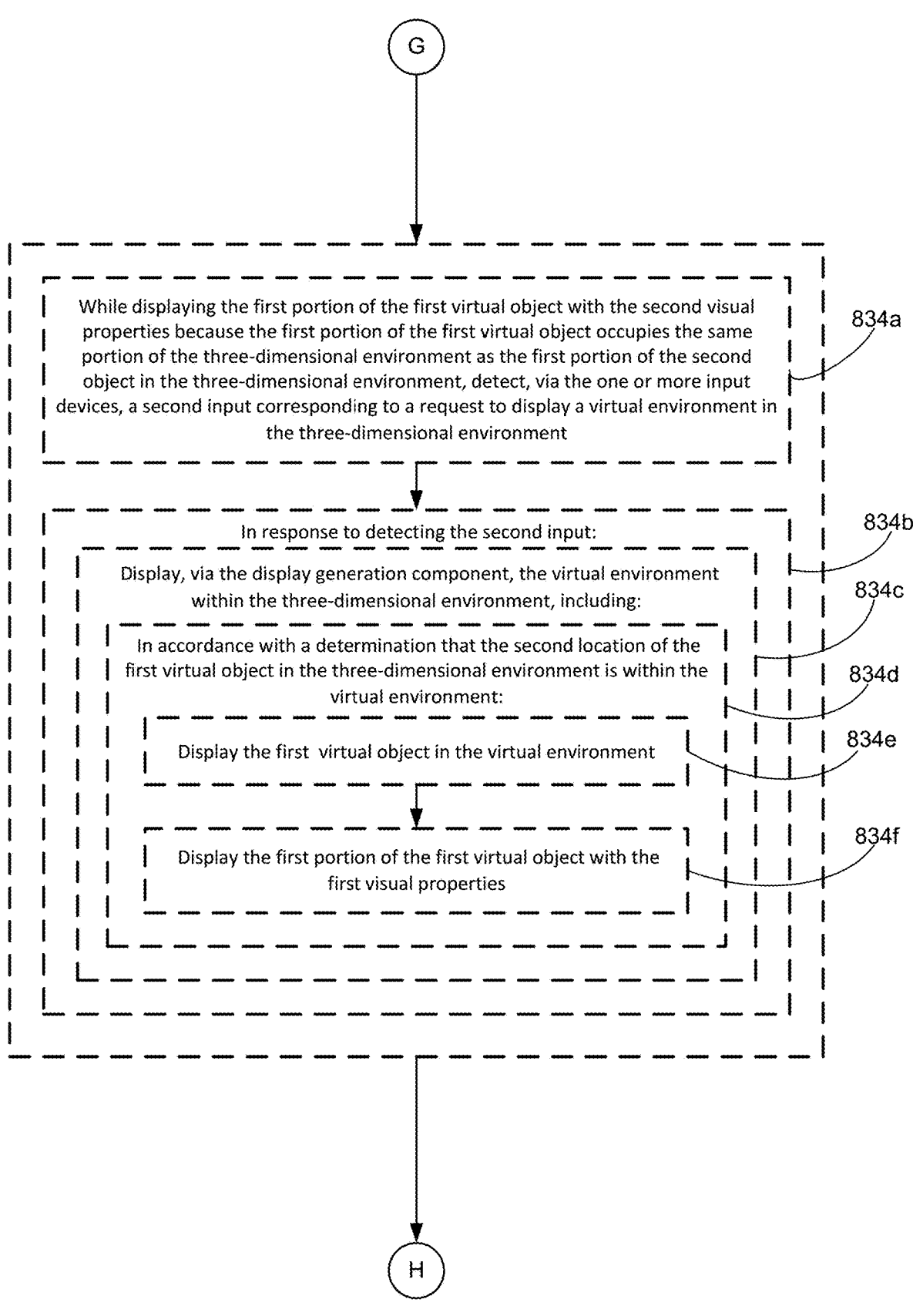

G

While displaying the first portion of the first virtual object with the second visual properties because the first portion of the first virtual object occupies the same portion of the three-dimensional environment as the first portion of the second object in the three-dimensional environment, detect, via the one or more input devices, a second input corresponding to a request to display a virtual environment in the three-dimensional environment 834a In response to detecting the second input:

834b

Display, via the display generation component, the virtual environment within the three-dimensional environment, including:

834c

In accordance with a determination that the second location of the first virtual object in the three-dimensional environment is within the virtual environment:

834d

Display the first virtual object in the virtual environment

834e

Display the first portion of the first virtual object with the first visual properties 834f

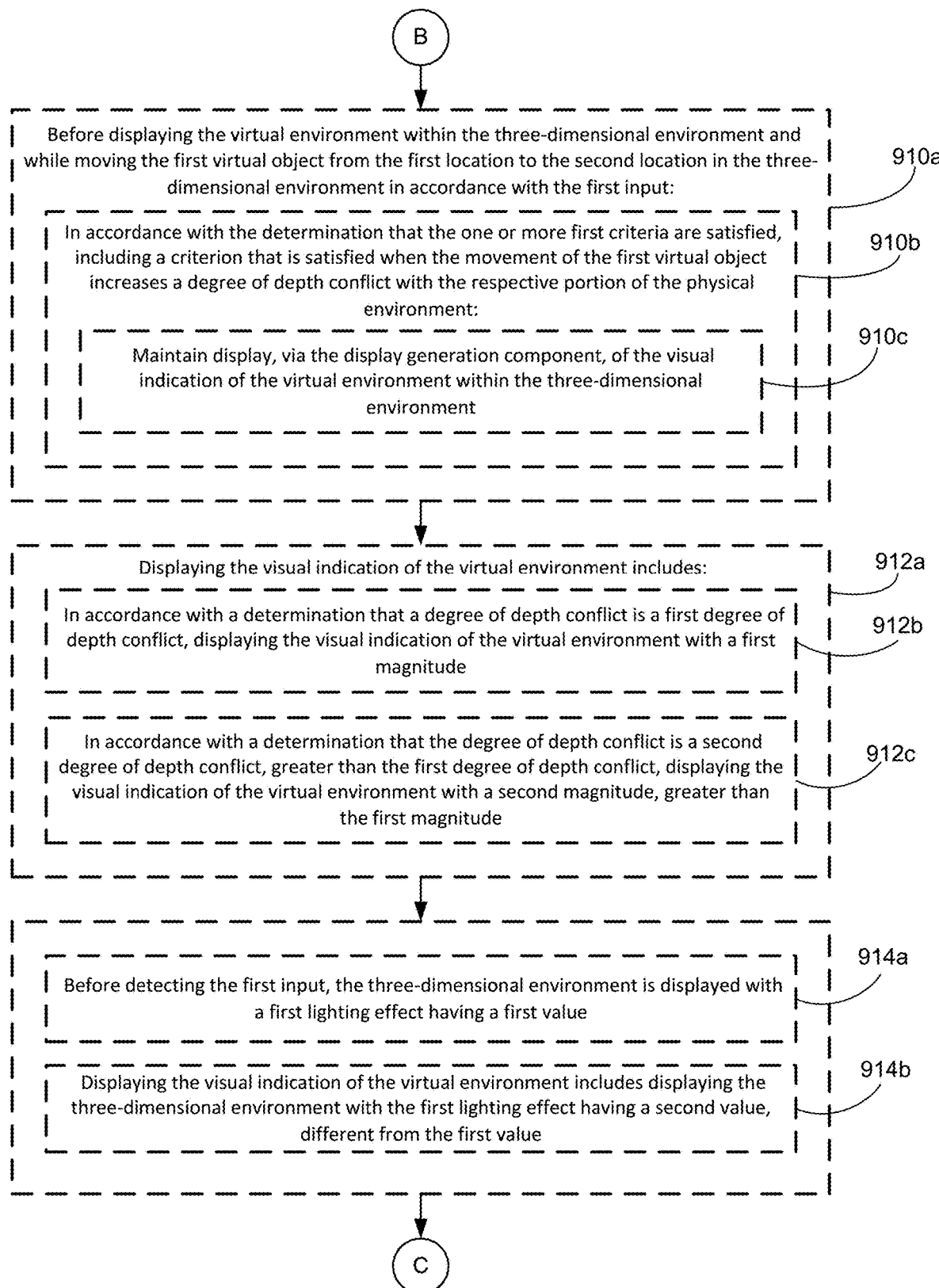

B

Before displaying the virtual environment within the three-dimensional environment and while moving the first virtual object from the first location to the second location in the three-dimensional environment in accordance with the first input:  910a In accordance with the determination that the one or more first criteria are satisfied, including a criterion that is satisfied when the movement of the first virtual object increases a degree of depth conflict with the respective portion of the physical environment:  910b Maintain display, via the display generation component, of the visual indication of the virtual environment within the three-dimensional environment  910c Displaying the visual indication of the virtual environment includes:  912a In accordance with a determination that a degree of depth conflict is a first degree of depth conflict, displaying the visual indication of the virtual environment with a first magnitude  912b In accordance with a determination that the degree of depth conflict is a second degree of depth conflict, greater than the first degree of depth conflict, displaying the visual indication of the virtual environment with a second magnitude, greater than the first magnitude  912c Before detecting the first input, the three-dimensional environment is displayed with a first lighting effect having a first value  914a Displaying the visual indication of the virtual environment includes displaying the three-dimensional environment with the first lighting effect having a second value, different from the first value  914b

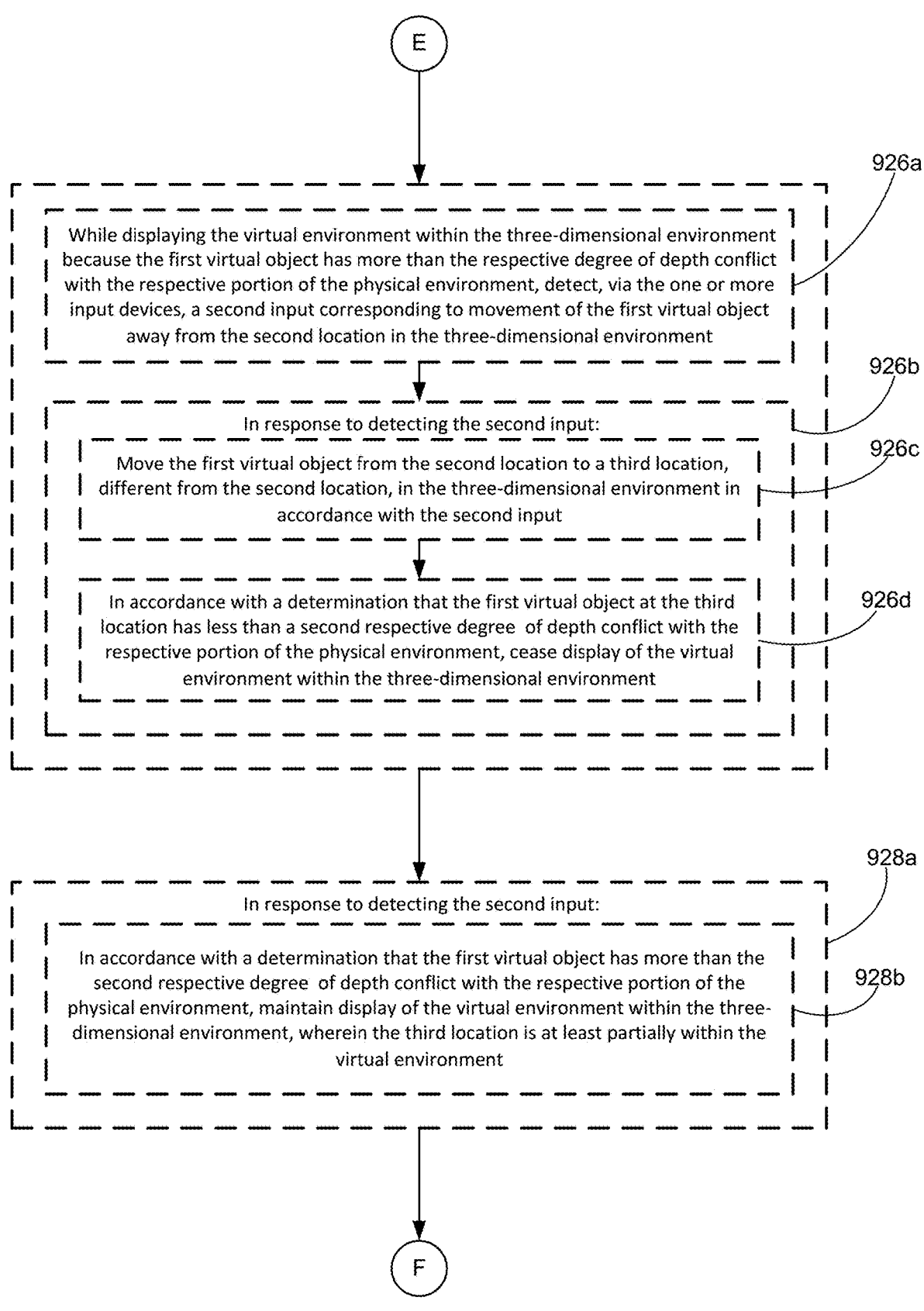

E

926a

While displaying the virtual environment within the three-dimensional environment because the first virtual object has more than the respective degree of depth conflict with the respective portion of the physical environment, detect, via the one or more input devices, a second input corresponding to movement of the first virtual object away from the second location in the three-dimensional environment 926b In response to detecting the second input:

926c

Move the first virtual object from the second location to a third location, different from the second location, in the three-dimensional environment in accordance with the second input 926d In accordance with a determination that the first virtual object at the third location has less than a second respective degree of depth conflict with the respective portion of the physical environment, cease display of the virtual environment within the three-dimensional environment 928a In response to detecting the second input:

928b

In accordance with a determination that the first virtual object has more than the second respective degree of depth conflict with the respective portion of the physical environment, maintain display of the virtual environment within the three-dimensional environment, wherein the third location is at least partially within the virtual environment

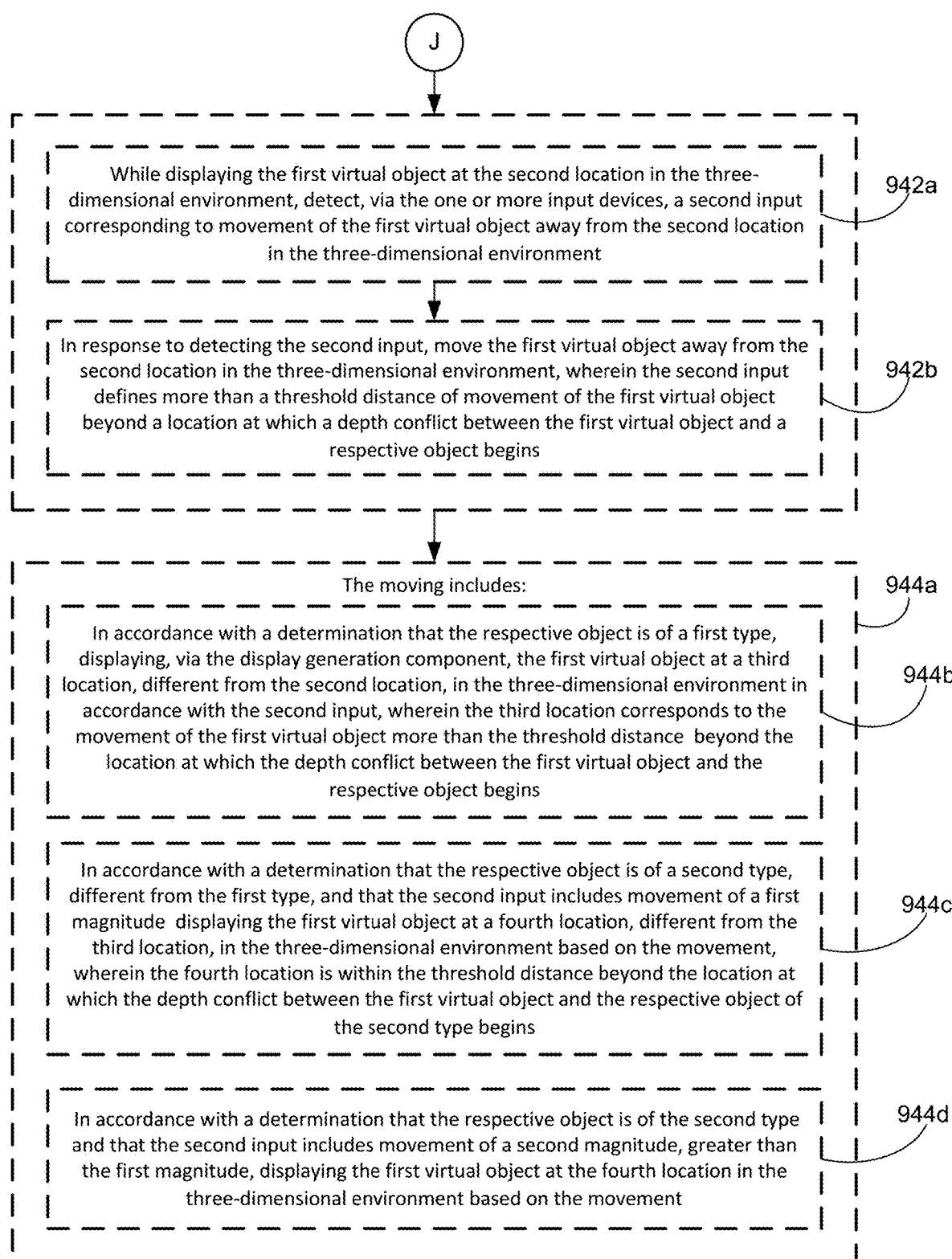

J

While displaying the first virtual object at the second location in the three-dimensional environment, detect, via the one or more input devices, a second input corresponding to movement of the first virtual object away from the second location in the three-dimensional environment — 942a In response to detecting the second input, move the first virtual object away from the second location in the three-dimensional environment, wherein the second input defines more than a threshold distance of movement of the first virtual object beyond a location at which a depth conflict between the first virtual object and a respective object begins — 942b The moving includes: — 944a In accordance with a determination that the respective object is of a first type, displaying, via the display generation component, the first virtual object at a third location, different from the second location, in the three-dimensional environment in accordance with the second input, wherein the third location corresponds to the movement of the first virtual object more than the threshold distance beyond the location at which the depth conflict between the first virtual object and the respective object begins — 944b In accordance with a determination that the respective object is of a second type, different from the first type, and that the second input includes movement of a first magnitude displaying the first virtual object at a fourth location, different from the third location, in the three-dimensional environment based on the movement, wherein the fourth location is within the threshold distance beyond the location at which the depth conflict between the first virtual object and the respective object of the second type begins — 944c In accordance with a determination that the respective object is of the second type and that the second input includes movement of a second magnitude, greater than the first magnitude, displaying the first virtual object at the fourth location in the three-dimensional environment based on the movement — 944d

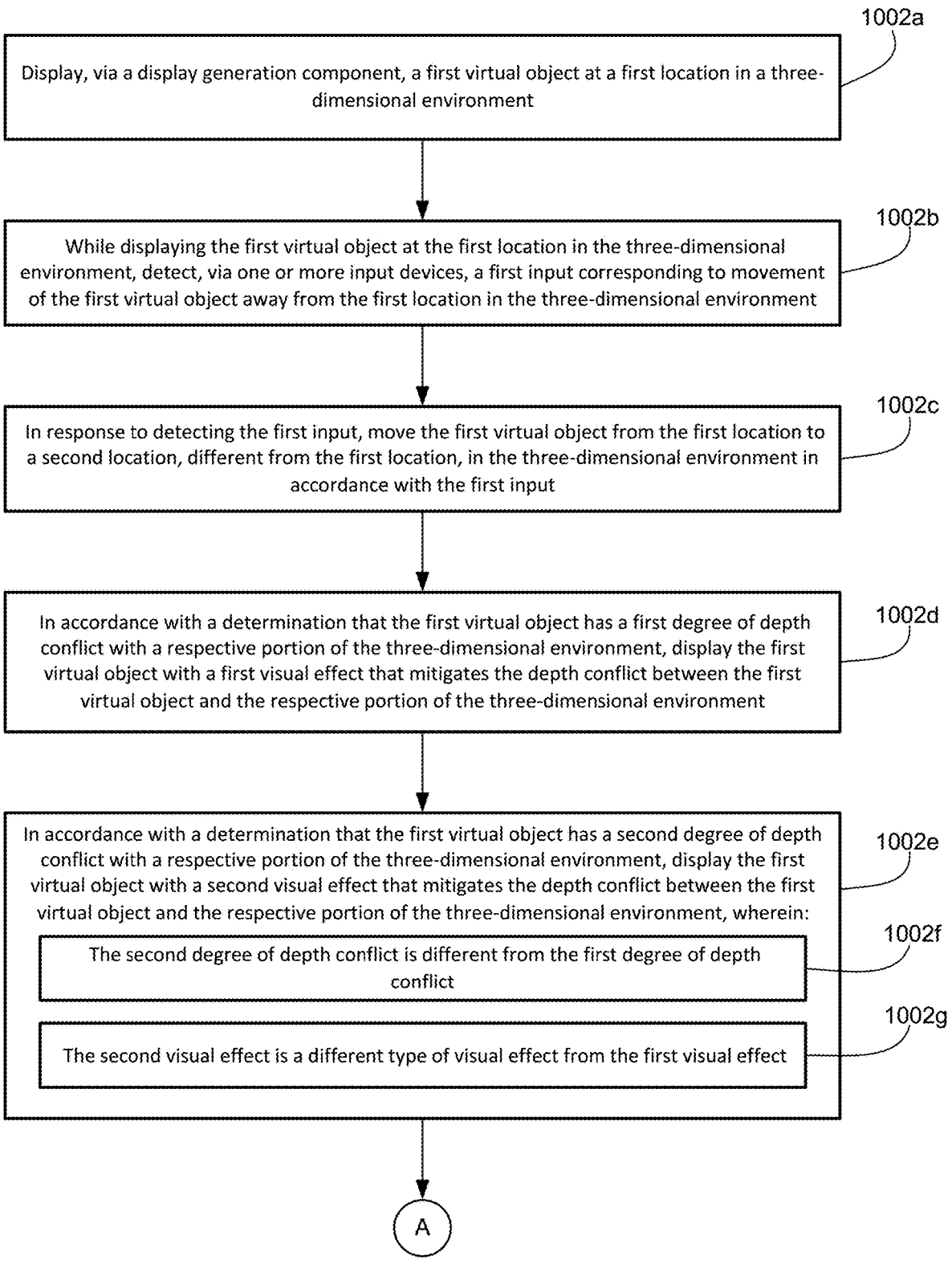

Display, via a display generation component, a first virtual object at a first location in a three-dimensional environment 1002a While displaying the first virtual object at the first location in the three-dimensional environment, detect, via one or more input devices, a first input corresponding to movement of the first virtual object away from the first location in the three-dimensional environment 1002b In response to detecting the first input, move the first virtual object from the first location to a second location, different from the first location, in the three-dimensional environment in accordance with the first input 1002c In accordance with a determination that the first virtual object has a first degree of depth conflict with a respective portion of the three-dimensional environment, display the first virtual object with a first visual effect that mitigates the depth conflict between the first virtual object and the respective portion of the three-dimensional environment 1002d In accordance with a determination that the first virtual object has a second degree of depth conflict with a respective portion of the three-dimensional environment, display the first virtual object with a second visual effect that mitigates the depth conflict between the first virtual object and the respective portion of the three-dimensional environment, wherein:

1002e

The second degree of depth conflict is different from the first degree of depth conflict 1002f The second visual effect is a different type of visual effect from the first visual effect 1002g

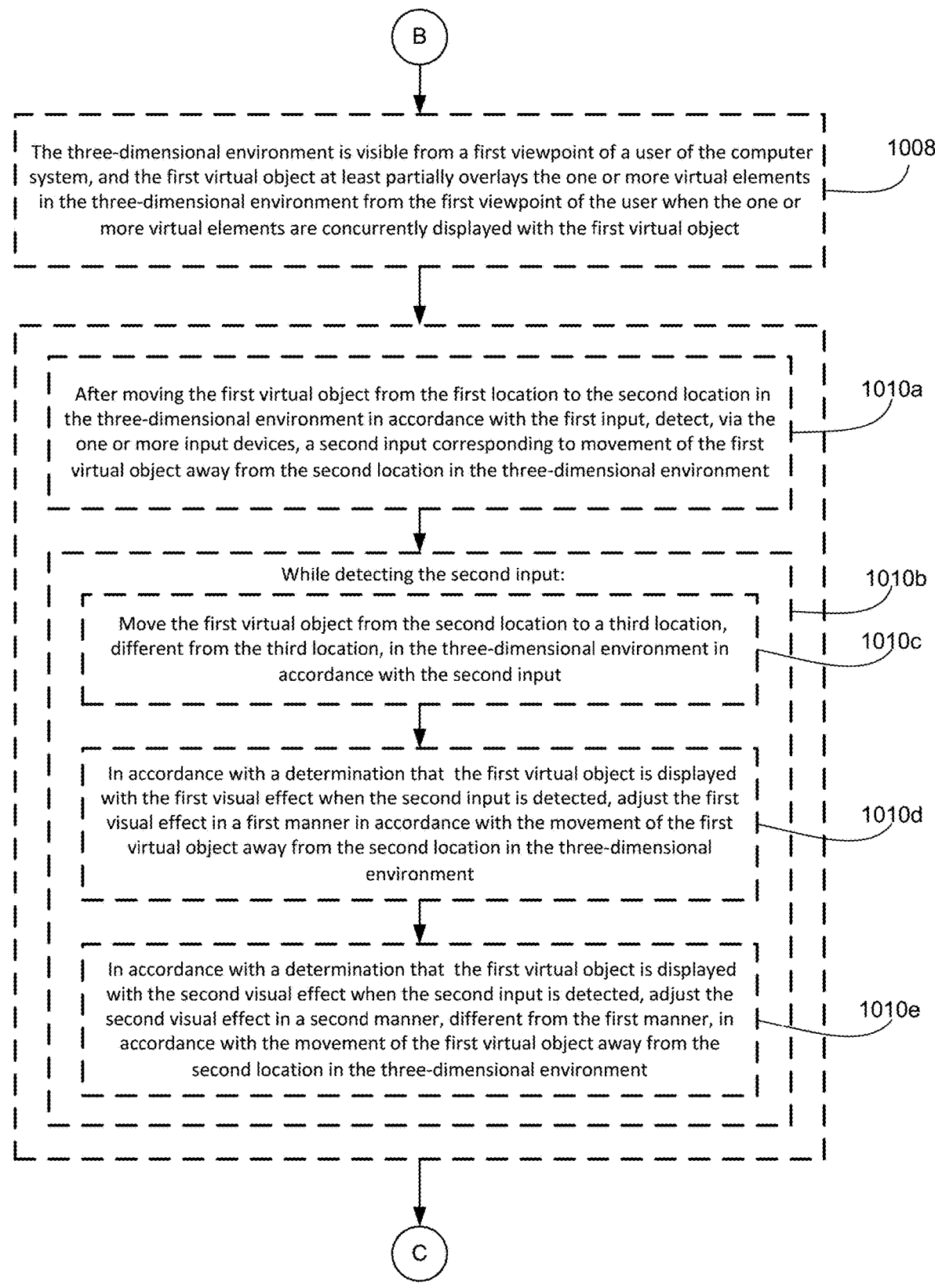

B

The three-dimensional environment is visible from a first viewpoint of a user of the computer system, and the first virtual object at least partially overlays the one or more virtual elements in the three-dimensional environment from the first viewpoint of the user when the one or more virtual elements are concurrently displayed with the first virtual object

1008

After moving the first virtual object from the first location to the second location in the three-dimensional environment in accordance with the first input, detect, via the one or more input devices, a second input corresponding to movement of the first virtual object away from the second location in the three-dimensional environment 1010a While detecting the second input:

1010b

Move the first virtual object from the second location to a third location, different from the third location, in the three-dimensional environment in accordance with the second input 1010c In accordance with a determination that the first virtual object is displayed with the first visual effect when the second input is detected, adjust the first visual effect in a first manner in accordance with the movement of the first virtual object away from the second location in the three-dimensional environment 1010d In accordance with a determination that the first virtual object is displayed with the second visual effect when the second input is detected, adjust the second visual effect in a second manner, different from the first manner, in accordance with the movement of the first virtual object away from the second location in the three-dimensional environment 1010e

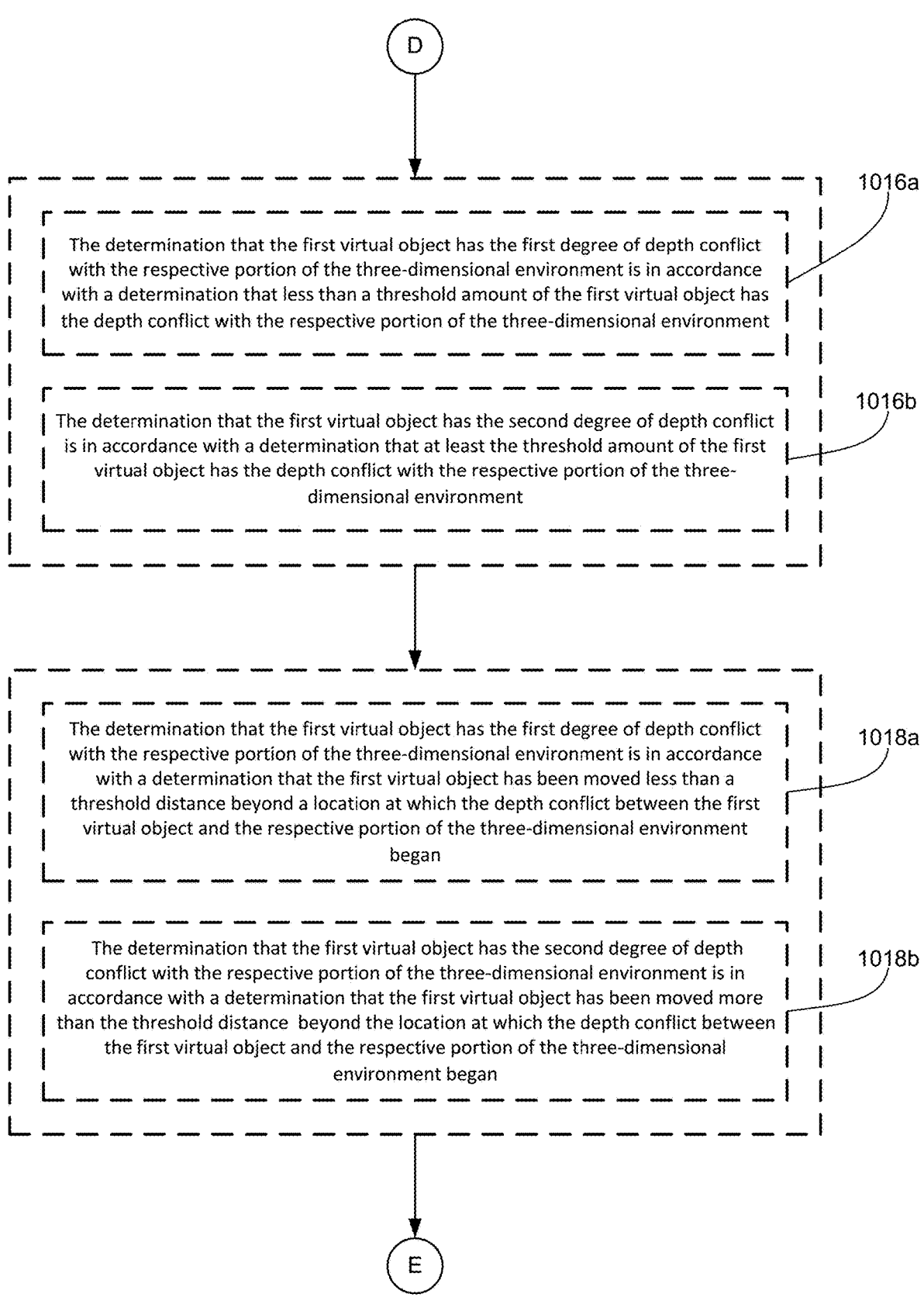

D

The determination that the first virtual object has the first degree of depth conflict with the respective portion of the three-dimensional environment is in accordance with a determination that less than a threshold amount of the first virtual object has the depth conflict with the respective portion of the three-dimensional environment 1016a The determination that the first virtual object has the second degree of depth conflict is in accordance with a determination that at least the threshold amount of the first virtual object has the depth conflict with the respective portion of the three-dimensional environment 1016b The determination that the first virtual object has the first degree of depth conflict with the respective portion of the three-dimensional environment is in accordance with a determination that the first virtual object has been moved less than a threshold distance beyond a location at which the depth conflict between the first virtual object and the respective portion of the three-dimensional environment began 1018a The determination that the first virtual object has the second degree of depth conflict with the respective portion of the three-dimensional environment is in accordance with a determination that the first virtual object has been moved more than the threshold distance beyond the location at which the depth conflict between the first virtual object and the respective portion of the three-dimensional environment began 1018b

METHODS FOR DEPTH CONFLICT MITIGATION IN A THREE-DIMENSIONAL ENVIRONMENT

CROSS-REFERENCE TO RELATED APPLICATIONS

This application claims the benefit of U.S. Provisional Application No. 63/375,614, filed Sep. 14, 2022, and U.S. Provisional Application No. 63/505,030, filed May 30, 2023, the contents of which are herein incorporated by reference in their entireties for all purposes.

TECHNICAL FIELD

This relates generally to computer systems that provide computer-generated experiences, including, but no limit to, electronic devices that provide virtual reality and mixed reality experiences via a display generation component.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing computer-generated experiences to users that make interaction with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for interacting with content in a three-dimensional environment. Such methods and interfaces may complement or replace conventional methods for interacting with content in a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges.

In some embodiments, a computer system facilitates depth conflict mitigation for a virtual object that is in contact with one or more physical objects in a three-dimensional environment by changing visual properties of one or more portions of the virtual object. In some embodiments, a computer system facilitates depth conflict mitigation for a virtual object that is in contact with one or more physical objects in a three-dimensional environment by displaying the virtual object in a virtual environment within the three-dimensional environment. In some embodiments, a computer system facilitates depth conflict mitigation for a virtual object that is in contact with one or more physical objects in a three-dimensional environment by variably changing visual properties of one or more portions of the virtual object and/or by variably displaying the virtual object in a virtual environment based on one or more characteristics of the depth conflict.

Note that the various embodiments described above can be combined with any other embodiments described herein.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the Figs.

FIGS. 8A-8J is a flowchart illustrating an exemplary method of facilitating depth conflict mitigation for one or more virtual objects in a three-dimensional environment by changing visual properties of the one or more virtual objects in accordance with some embodiments.

FIGS. 9A-9K is a flowchart illustrating an exemplary method of facilitating depth conflict mitigation for one or more virtual objects in a three-dimensional environment by displaying a virtual environment in accordance with some embodiments.

FIGS. 10A-10F is a flowchart illustrating an exemplary method of facilitating variable depth conflict mitigation for one or more virtual objects in a three-dimensional environment in accordance with some embodiments.

DESCRIPTION OF EMBODIMENTS

Figure 1B:
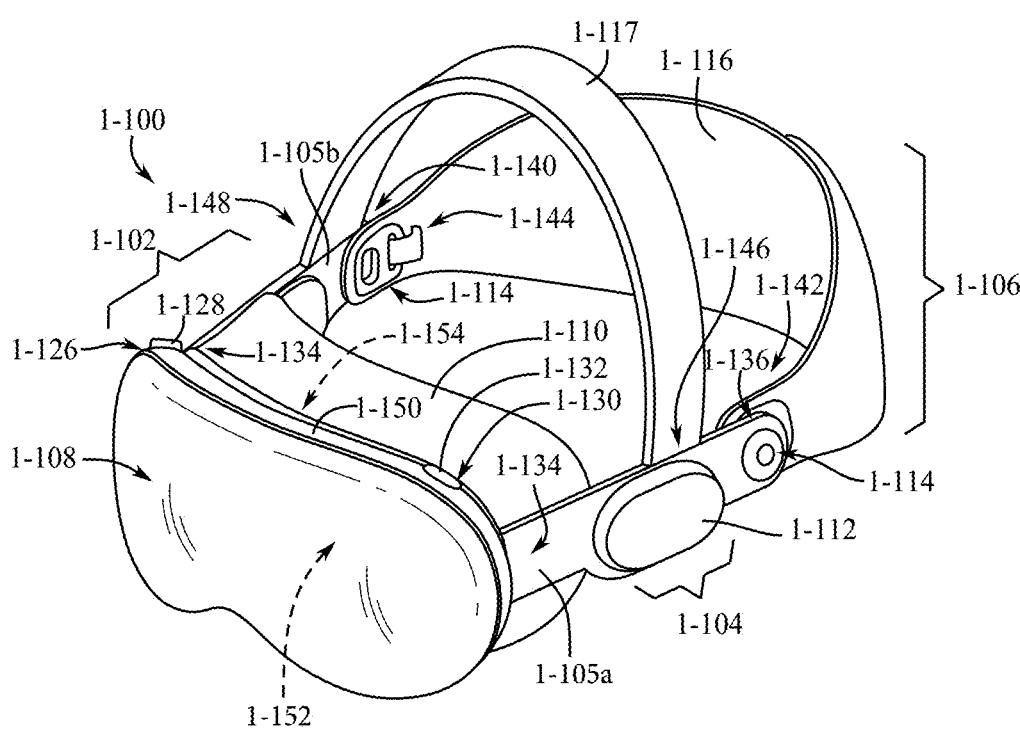
FIGS. 1B-1P are examples of a computer system for providing XR experiences in the operating environment of FIG. 1A.

The present disclosure relates to user interfaces for providing a computer generated (CGR) experience to a user, in accordance with some embodiments.

The systems, methods, and GUIs described herein provide improved ways for an electronic device to facilitate interaction with and manipulate objects in a three-dimensional environment.

In some embodiments, a computer system displays a three-dimensional environment including a virtual object and one or more physical objects. In some embodiments, the computer system moves the virtual object within the three-dimensional environment in response to detecting user input directed to the virtual object. In some embodiments, if the computer system determines that at least a portion of the virtual object encounters a depth conflict with a physical object of the one or more physical objects, the computer system changes visual properties of the portion of the virtual object that has the depth conflict with the physical object in the three-dimensional environment. In some embodiments, changing the visual properties of the portion of the virtual object occludes a portion of the physical object with which the virtual object has the depth conflict, thus mitigating the depth conflict between the virtual object and the physical object in the three-dimensional environment.

In some embodiments, a computer system displays a three-dimensional environment including a virtual object and one or more physical objects. In some embodiments, the computer system moves the virtual object within the three-dimensional environment in response to detecting user input directed to the virtual object. In some embodiments, if the computer system determines that at least a portion of the virtual object encounters a depth conflict with a physical object of the one or more physical objects, the computer system displays a virtual environment within the three-dimensional environment. In some embodiments, the computer system displays at least a portion of the virtual object within the virtual environment, such that the virtual environment occludes a portion of the physical object with which the virtual object has the depth conflict, thus mitigating the depth conflict between the virtual object and the physical object in the three-dimensional environment.

In some embodiments, a computer system displays a three-dimensional environment including a virtual object and one or more physical objects. In some embodiments, the computer system moves the virtual object within the three-dimensional environment in response to detecting user input directed to the virtual object. In some embodiments, if the computer system determines that at least a portion of the virtual object encounters a depth conflict with a physical object of the one or more physical objects, the computer system selectively mitigates the depth conflict in the three-dimensional environment. In some embodiments, if a degree of the depth conflict between the virtual object and the physical object is a first degree of depth conflict, the computer system changes visual properties of the portion of the virtual object that has the depth conflict with the physical object to mitigate the depth conflict in the three-dimensional environment. In some embodiments, if the degree of the depth conflict between the virtual object and the physical object is a second degree of depth conflict, the computer system displays a virtual environment within the three-dimensional environment to mitigate the depth conflict in the three-dimensional environment.

Figure 1A:
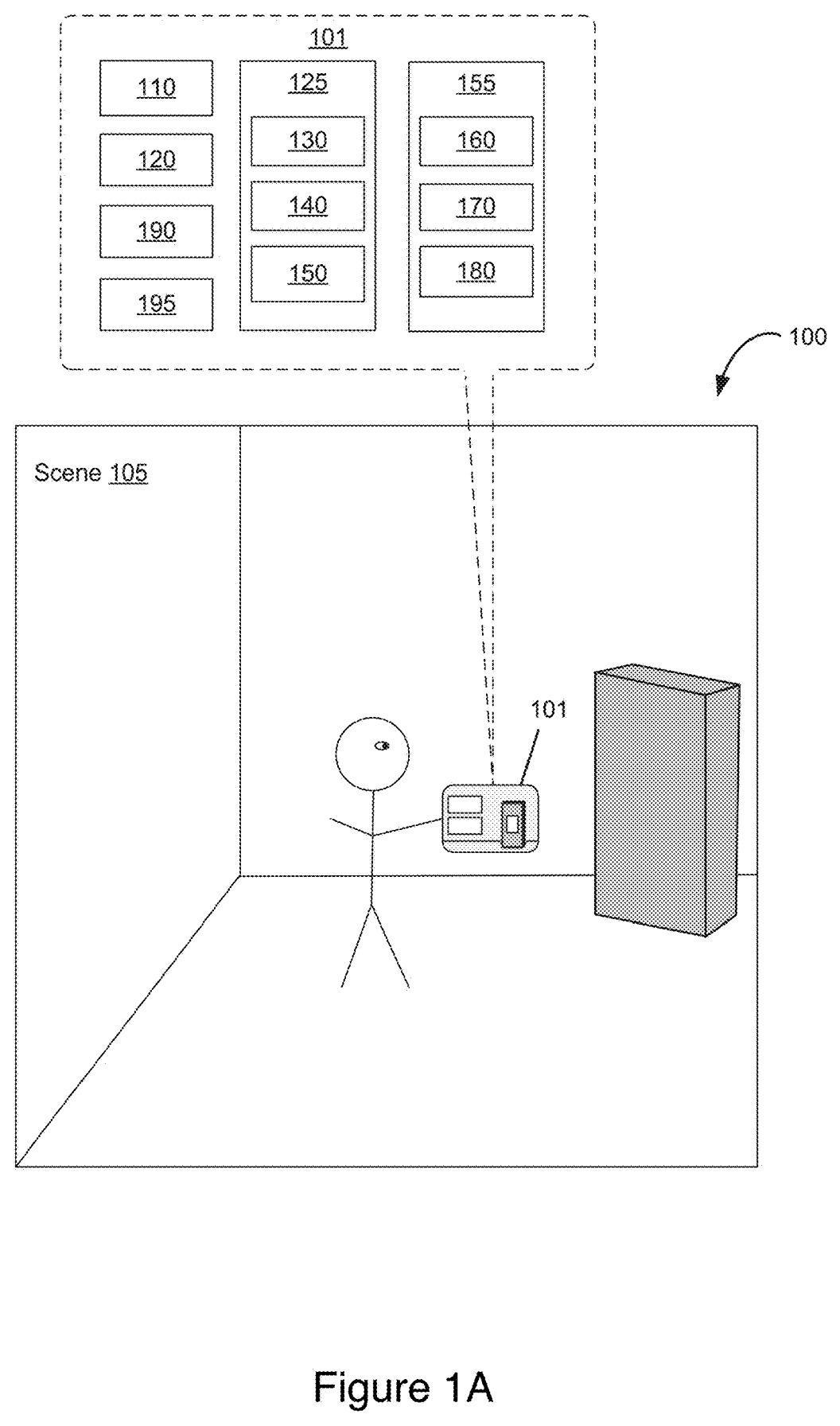

FIGS. 1A-6 provide a description of example computer systems for providing XR experiences to users (such as described below with respect to methods 800, 900, and/or 1000). FIGS. 7A-7P illustrate example techniques for facilitating depth conflict mitigation for one or more virtual objects in a three-dimensional environment in accordance with some embodiments. FIGS. 8A-8J is a flow diagram of methods of facilitating depth conflict mitigation for one or more virtual objects in a three-dimensional environment by changing visual properties of the one or more virtual objects in accordance with some embodiments. The user interfaces in FIGS. 7A-7P are used to illustrate the processes in FIGS. 8A-8J. FIGS. 9A-9K is a flow diagram of methods of facilitating depth conflict mitigation for one or more virtual objects in a three-dimensional environment by displaying a virtual environment in accordance with some embodiments. The user interfaces in FIGS. 7A-7P are used to illustrate the processes in FIGS. 9A-9K. FIGS. 10A-10F is a flow diagram of methods of facilitating variable depth conflict mitigation for one or more virtual objects in a three-dimensional environment in accordance with some embodiments. The user interfaces in FIGS. 7A-7P are used to illustrate the processes in FIGS. 10A-10F.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less-precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location an direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment). In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display.

Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides an XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

Figure 1C:
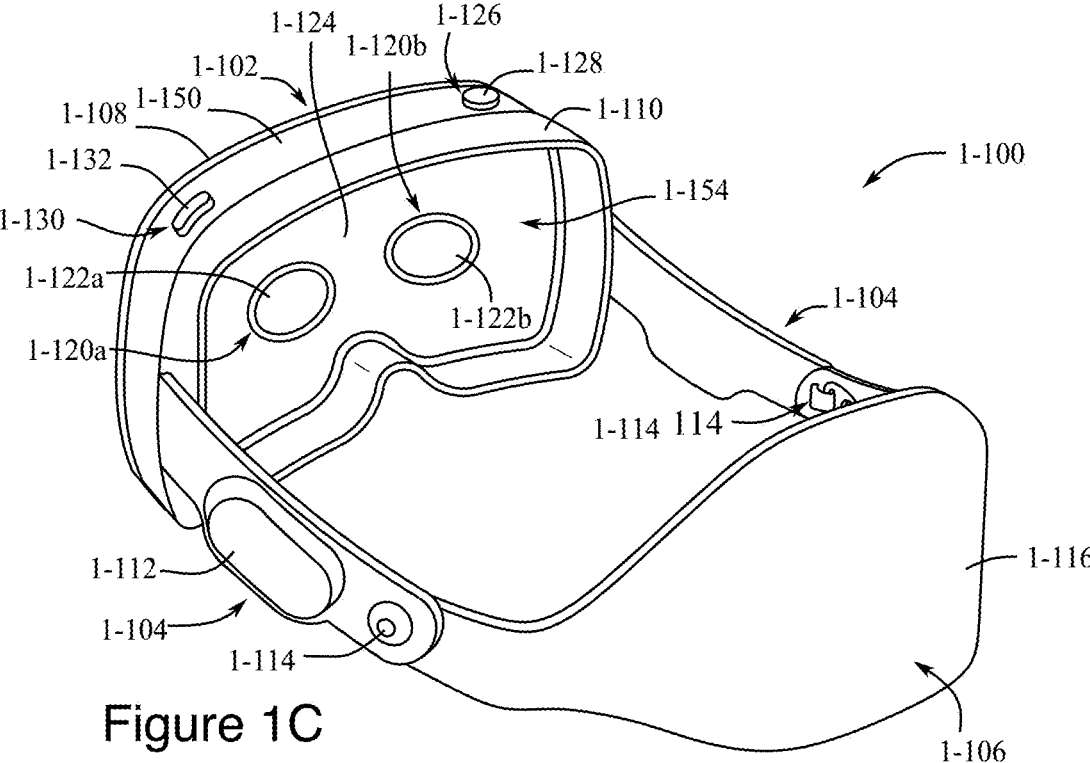
FIG. 1A is a block diagram illustrating an operating environment of a computer system for providing XR experiences in accordance with some embodiments.
Figure 1D:
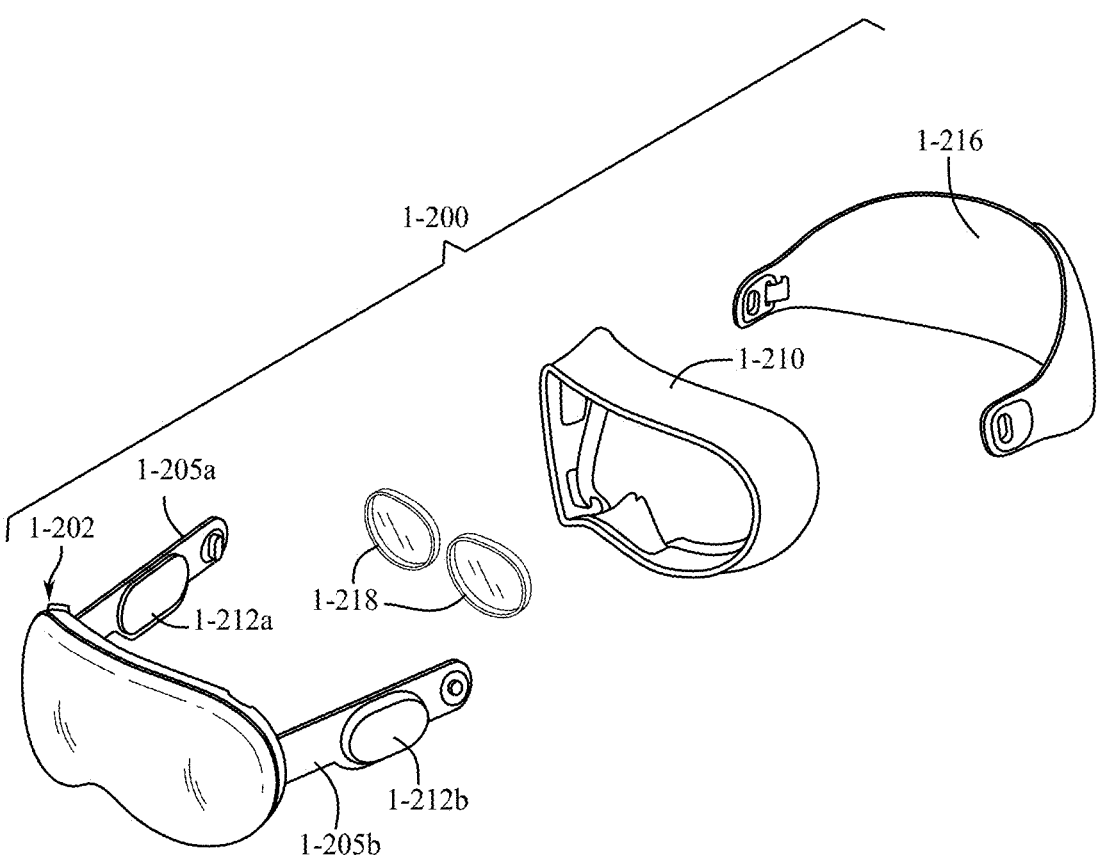
Figure 1E:
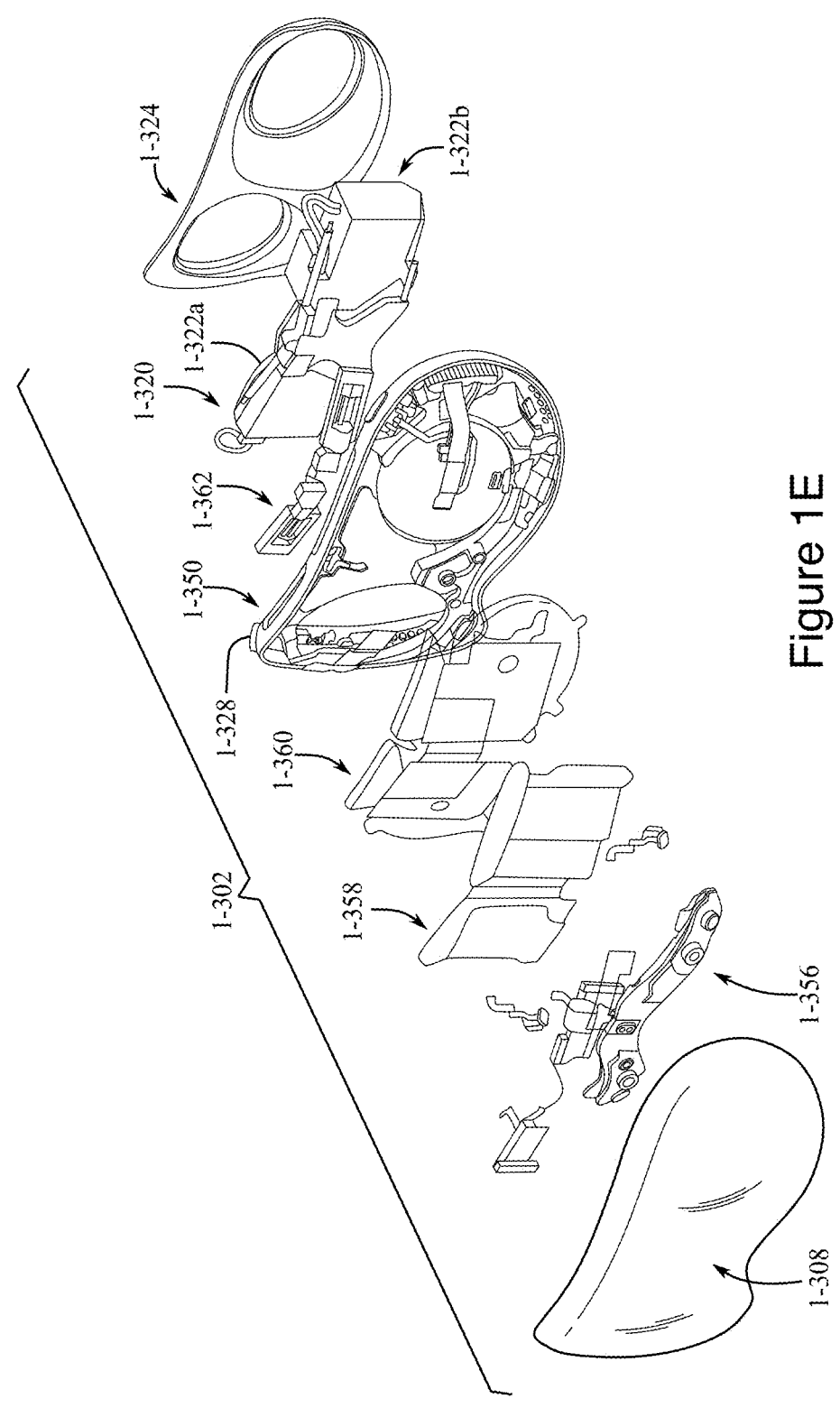
Figure 1F:
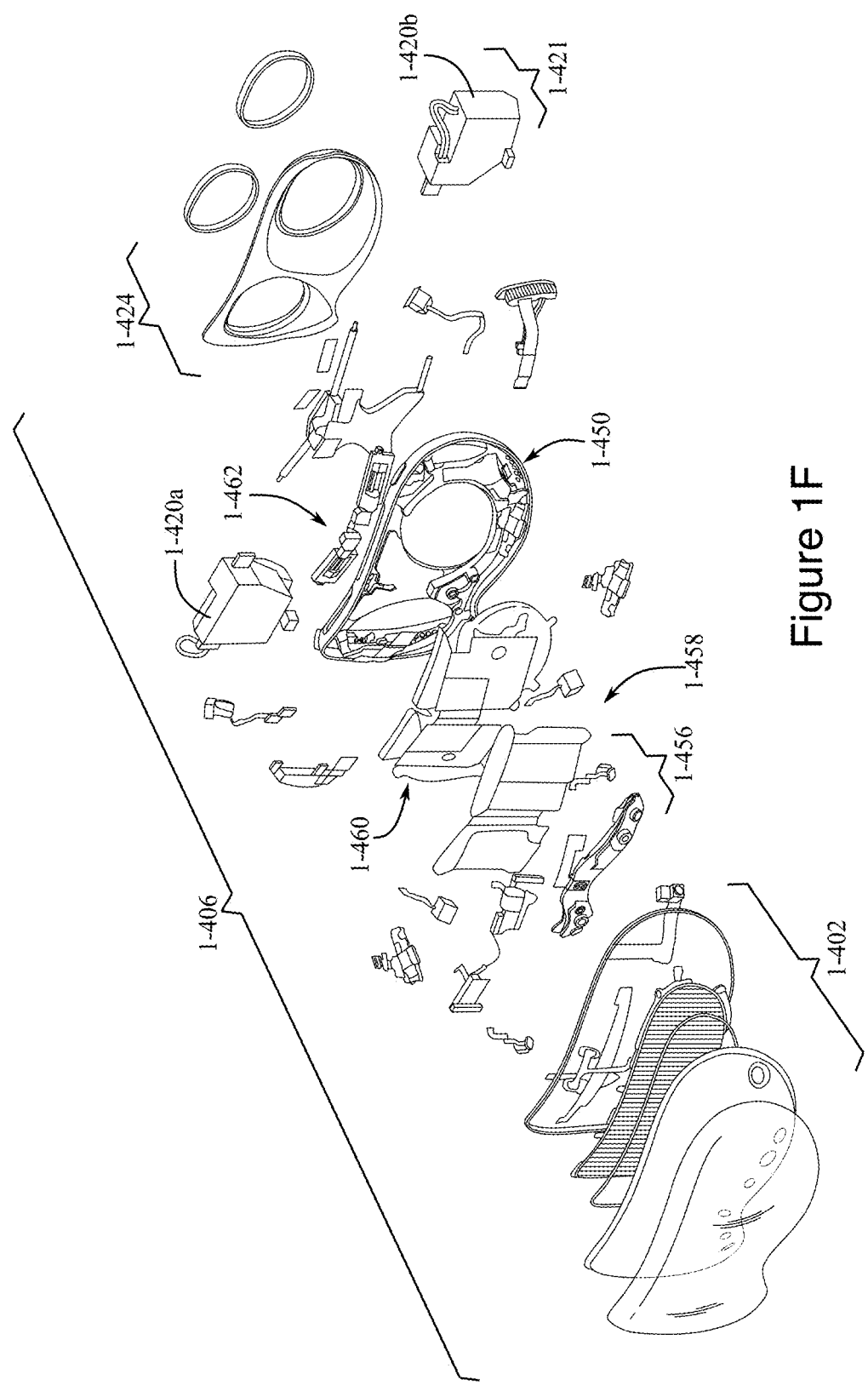
Figure 1G:
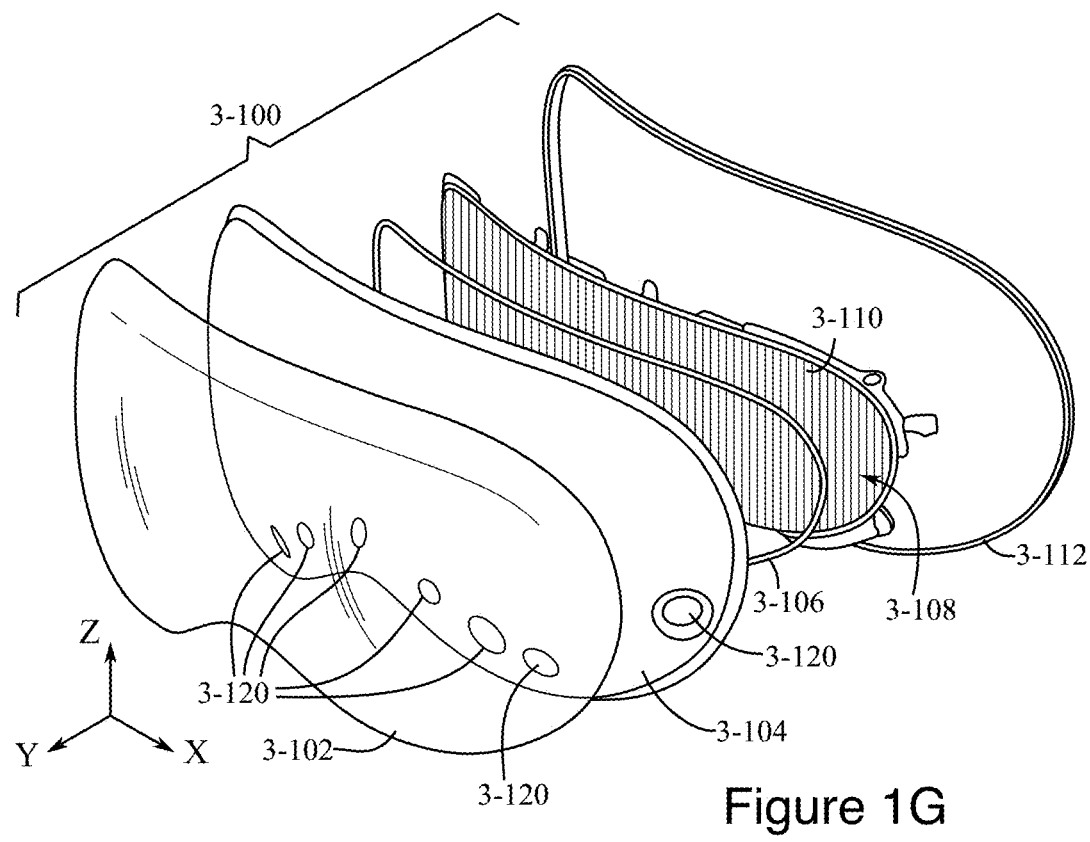
Figure 1H:
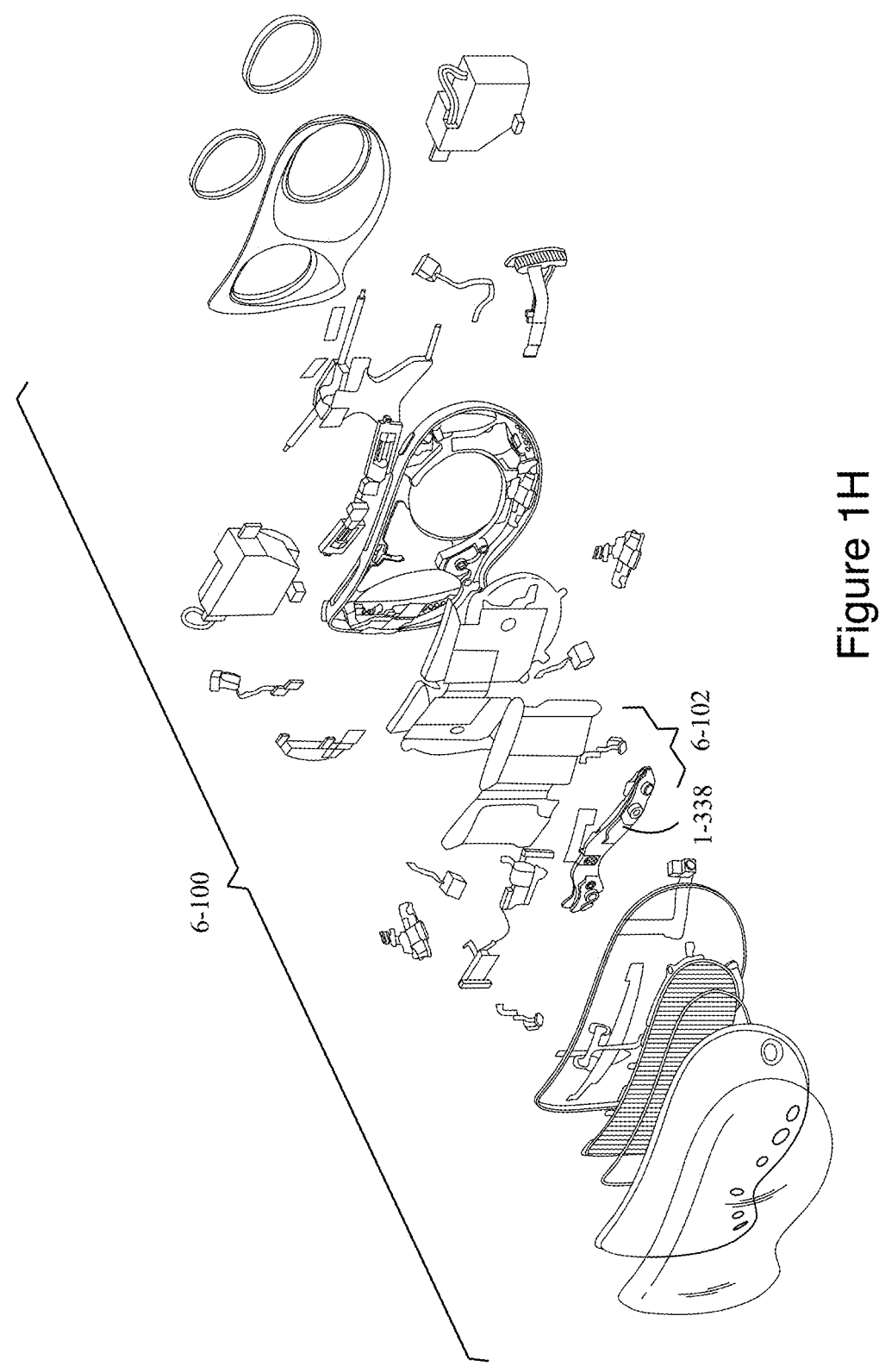
Figure 1I:
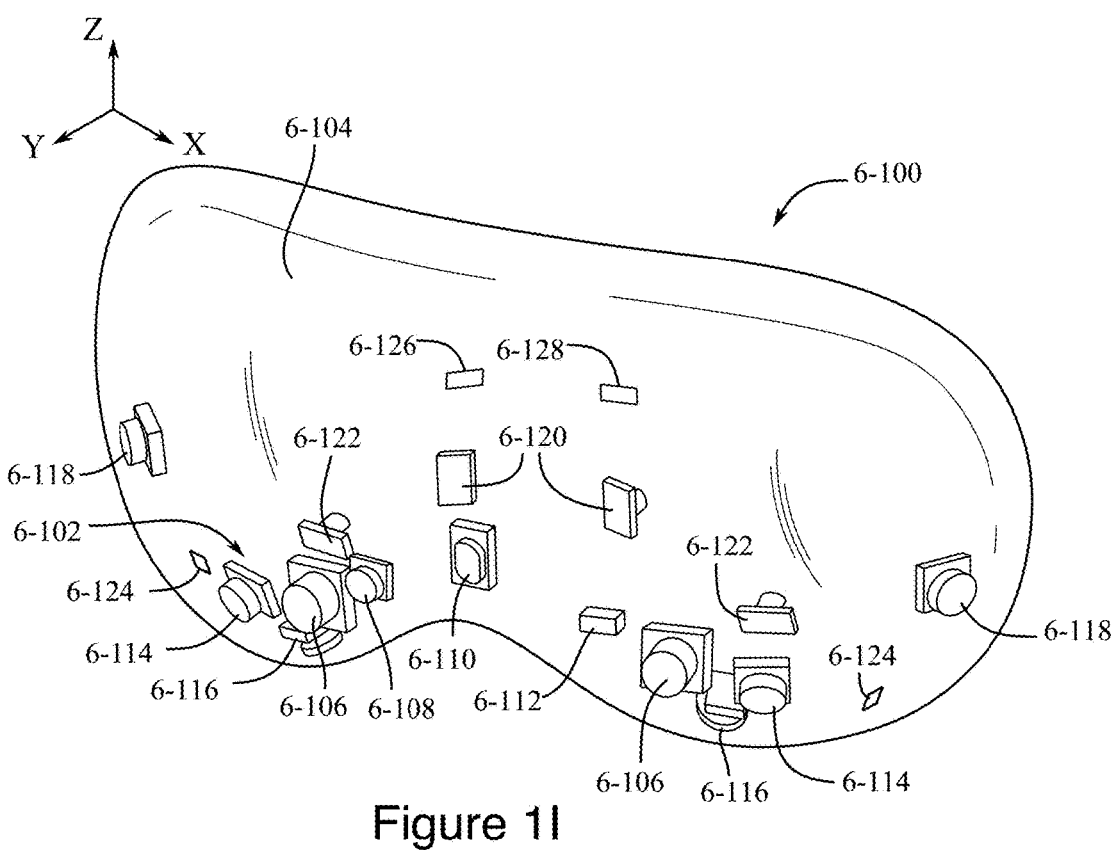
Figure 1J:
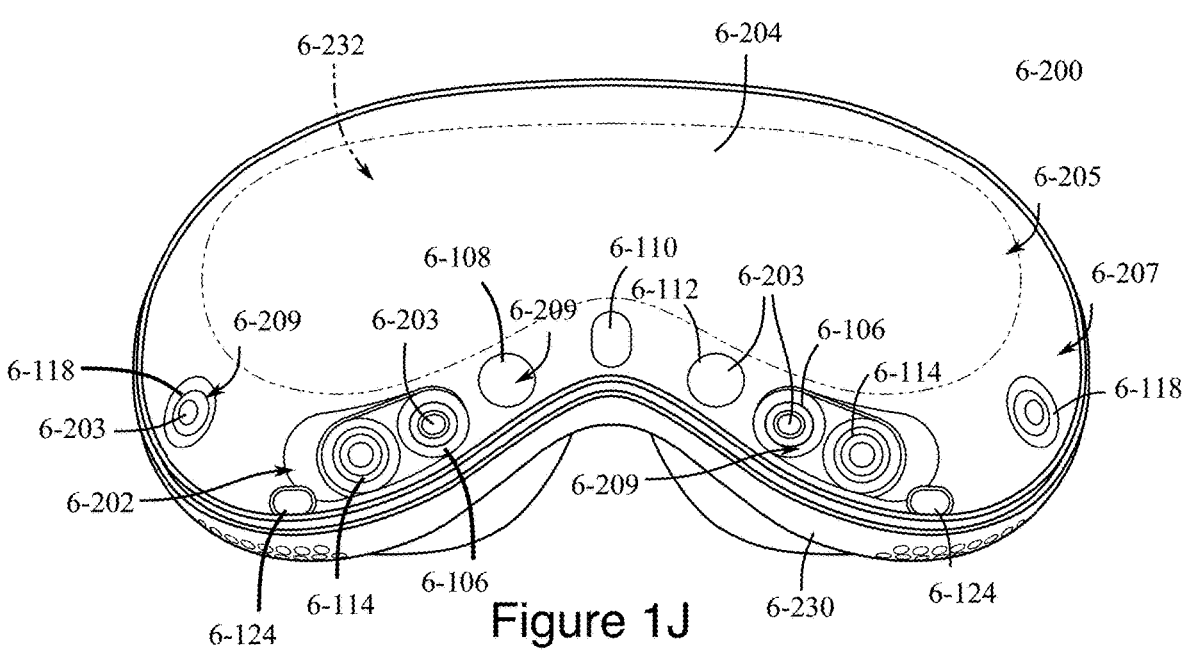
Figure 1K:
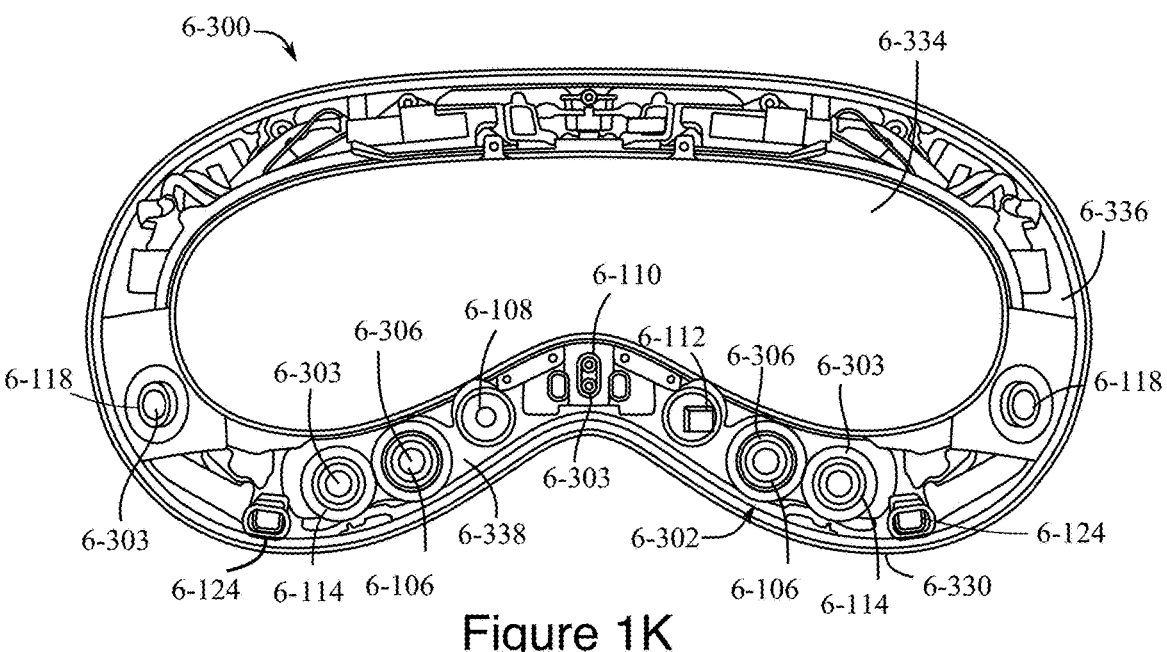
Figure 1L:
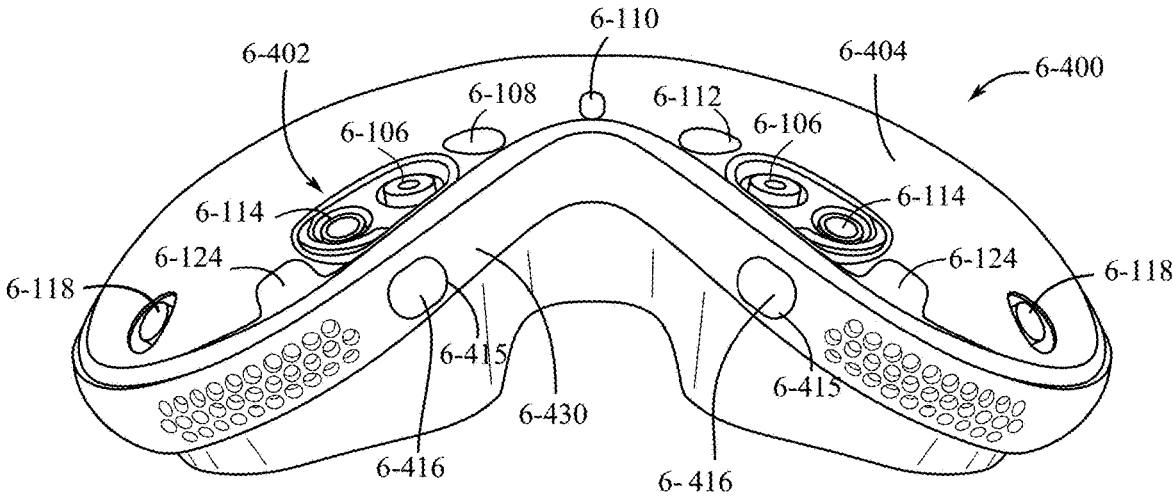
Figure 1M:
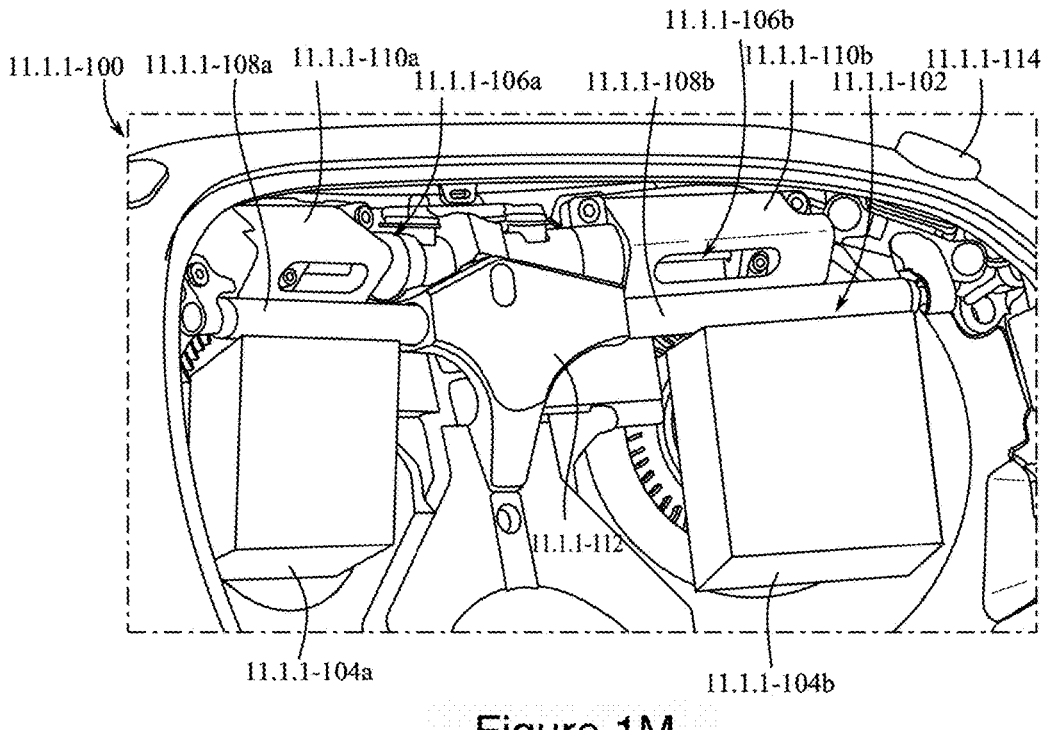
Figure 1N:
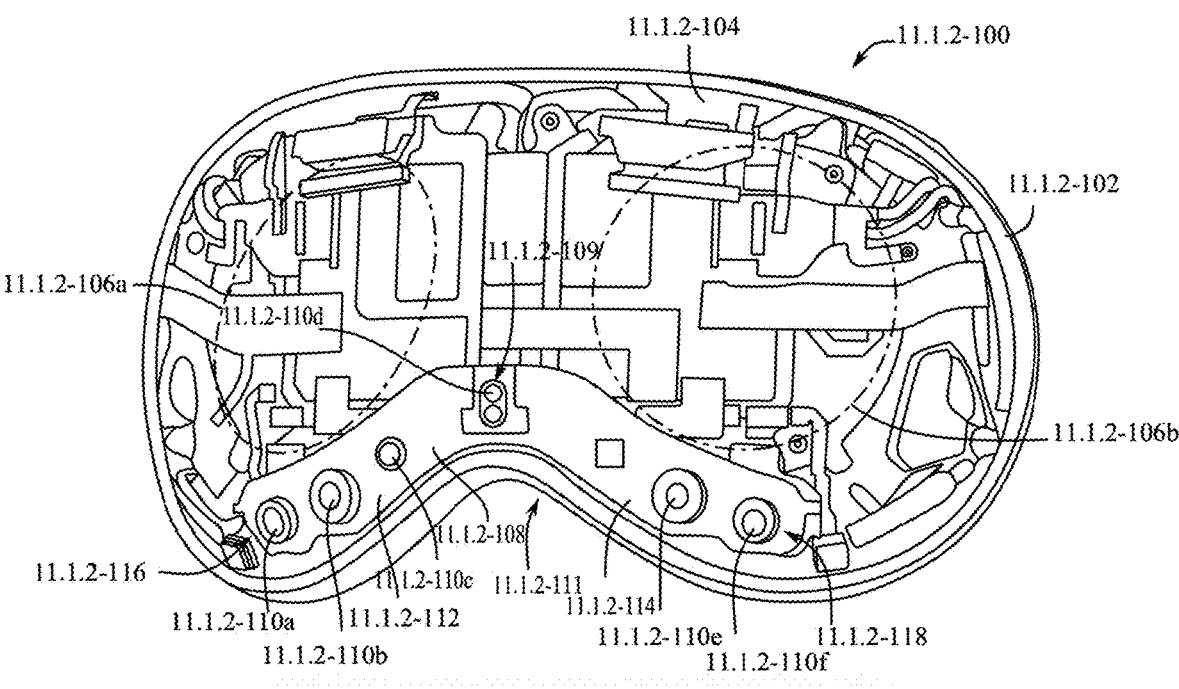
Figure 1O:
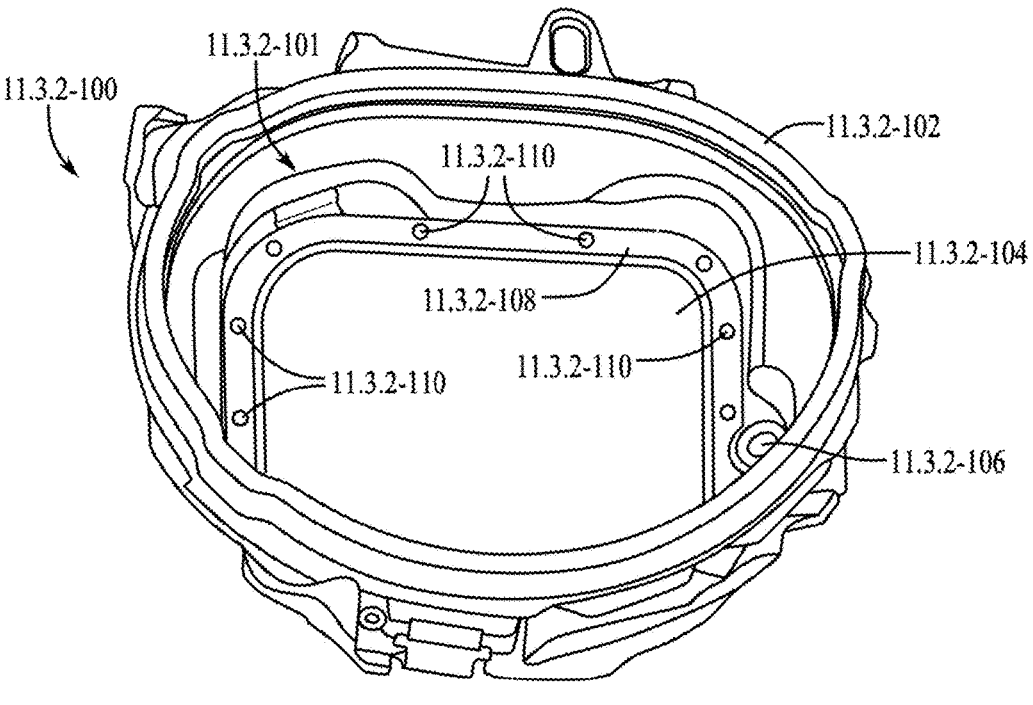
Figure 1P:
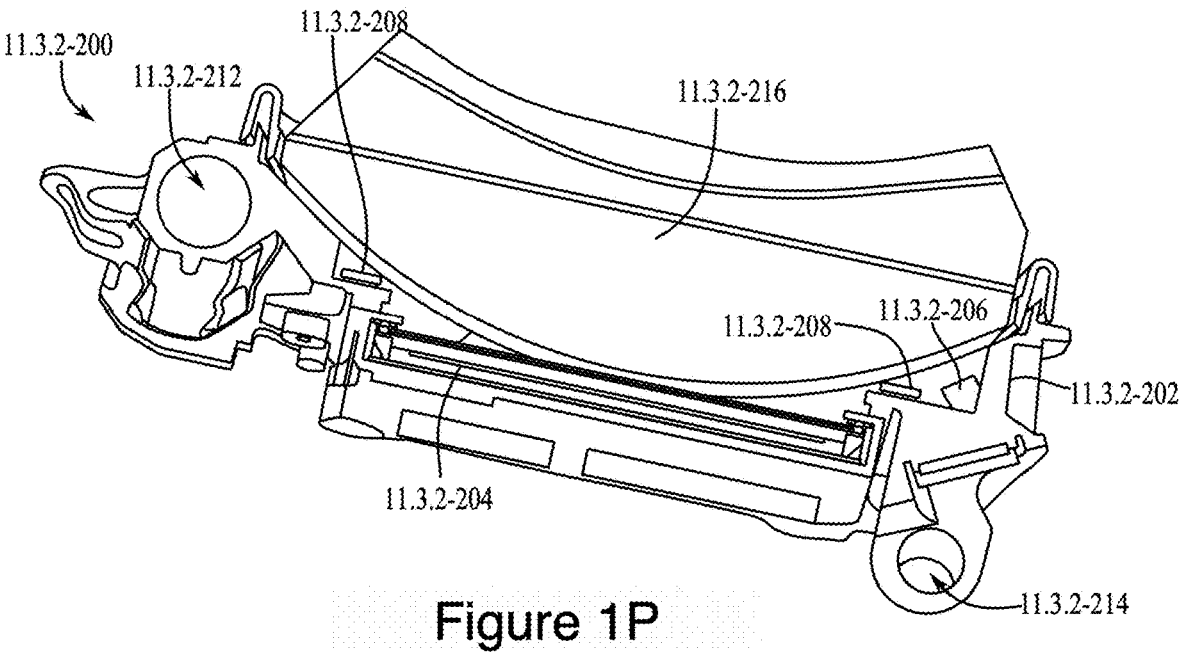

FIGS. 1A-1P illustrate various examples of a computer system that is used to perform the methods and provide audio, visual and/or haptic feedback as part of user interfaces described herein. In some embodiments, the computer system includes one or more display generation components (e.g., first and second display assemblies 1-120a, 1-120b and/or first and second optical modules 11.1.1-104a and 11.1.1-104b) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120a, 1-120b and/or first and second optical modules 11.1.1-104a and 11.1.1-104b), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, the computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 1O) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120a, 1-120b and/or first and second optical modules 11.1.1-104a and 11.1.1-104b).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105a, 1-105b of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105a including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105b including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105a and the second electronic strap 1-105b. The straps 1-105a-b and band 1-116 can be coupled via connection mechanisms or assemblies 1-114. In at least one example, the second band 1-117 includes a first end 1-146 coupled to the first electronic strap 1-105a between the first proximal end 1-134 and the first distal end 1-136 and a second end 1-148 coupled to the second electronic strap 1-105b between the second proximal end 1-138 and the second distal end 1-140.

In at least one example, the first and second electronic straps 1-105a-b include plastic, metal, or other structural materials forming the shape the substantially rigid straps 1-105a-b. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105a-b can define internal strap volumes and include one or more electronic components disposed in the internal strap volumes. In one example, as shown in FIG. 1B, the first electronic strap 1-105a can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120a, 1-120b disposed at or in the rearward facing second opening 1-154 defined by the housing 1-150 and/or disposed in the internal volume of housing 1-150 and configured to project light through the second opening 1-154. In at least one example, each display assembly 1-120a-b can include respective display screens 1-122a, 1-122b configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122a-b can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120a-b. In at least one example, the curtain 1-124 can be elastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-1F and described herein. Likewise, any of the features, components, and/or parts, including the arrangements and configurations thereof shown and described with reference to FIGS. 1D-1F can be included, either alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205a, 1-205b. The first securement strap 1-205a can include a first electronic component 1-212a and the second securement strap 1-205b can include a second electronic component 1-212b. In at least one example, the first and second straps 1-205a-b can be removably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205a-b can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1B, 1C, and 1E-1F and described herein. Likewise, any of the features, components, and/or parts, including the arrangements and configurations thereof shown and described with reference to FIGS. 1B, 1C, and 1E-1F can be included, either alone or in any combination, in the example of the devices, features, components, and parts shown in FIG. 1D.

FIG. 1E illustrates an exploded view of an example of a display unit 1-306 of a HMD. The display unit 1-306 can include a front display assembly 1-308, a frame/housing assembly 1-350, and a curtain assembly 1-324. The display unit 1-306 can also include a sensor assembly 1-356, logic board assembly 1-358, and cooling assembly 1-360 disposed between the frame assembly 1-350 and the front display assembly 1-308. In at least one example, the display unit 1-306 can also include a rear-facing display assembly 1-320 including first and second rear-facing display screens 1-322a, 1-322b disposed between the frame 1-350 and the curtain assembly 1-324.

In at least one example, the display unit 1-306 can also include a motor assembly 1-362 configured as an adjustment mechanism for adjusting the positions of the display screens 1-322a-b of the display assembly 1-320 relative to the frame 1-350. In at least one example, the display assembly 1-320 is mechanically coupled to the motor assembly 1-362, with at least one motor for each display screen 1-322a-b, such that the motors can translate the display screens 1-322a-b to match an interpupillary distance of the user's eyes.

In at least one example, the display unit 1-306 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322*a-b*.

Any of the features, components, and/or parts, including the arrangements and configurations thereof shown in FIG. 1E can be included, either alone or in any combination, in any of the other examples of devices, features, components, and parts shown in FIGS. 1B-1D and 1F and described herein. Likewise, any of the features, components, and/or parts, including the arrangements and configurations thereof shown and described with reference to FIGS. 1B-1D and 1F can be included, either alone or in any combination, in the example of the devices, features, components, and parts shown in FIG. 1E.

FIG. 1F illustrates an exploded view of another example of a display unit 1-406 of a HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420*a*, 1-420*b* of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the front cover assembly 3-1 of the HMD 3-100 shown in FIG. 1G or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HDM device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The downward cameras 6-114, for example, can be used to capture facial expressions and movements for the face of the user below the HMD device 6-100, including the cheeks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin. for hand and body tracking, headset tracking, and facial avatar In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein. Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HDM 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 1I and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 1I-1J and 1L and described herein. Likewise, any of the features, components, and/or parts, including the arrangements and configurations thereof shown and described with reference to FIGS. 1I-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 1I-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 1I-1K and described herein. Likewise, any of the features, components, and/or parts, including the arrangements and configurations thereof shown and described with reference to FIGS. 1I-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104*a-b* slidably engaging/coupled to respective guide-rods 11.1.1-108*a-b* and motors 11.1.1-110*a-b* of left and right adjustment subsystems 11.1.1-106*a-b*. The IPD adjustment system 11.1.1-102 can be coupled to a bracket 11.1.1-112 and include a button 11.1.1-114 in electrical communication with the motors 11.1.1-110*a-b*. In at least one example, the button 11.1.1-114 can electrically communicate with the first and second motors 11.1.1-110*a-b* via a processor or other circuitry components to cause the first and second motors 11.1.1-110*a-b* to activate and cause the first and second optical modules 11.1.1-104*a-b*, respectively, to change position relative to one another.

In at least one example, the first and second optical modules 11.1.1-104*a-b* can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104*a-b* to match the inter-pupillary distance of the user's eyes. The optical modules 11.1.1-104*a-b* can also include one or more cameras or other sensors/sensor systems for imaging and measuring the IPD of the user such that the optical modules 11.1.1-104*a-b* can be adjusted to match the IPD.

In one example, the user can manipulate the button 11.1.1-114 to cause an automatic positional adjustment of the first and second optical modules 11.1.1-104*a-b*. In one example, the user can manipulate the button 11.1.1-114 to cause a manual adjustment such that the optical modules 11.1.1-104*a-b* move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104*a-b* via the motors 11.1.1-110*a-b* is provided by an electrical power source. In one example, the adjustment and movement of the optical modules 11.1.1-104*a-b* via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106*a*, 11.1.2-106*b*. The apertures 11.1.2-106*a-b* are shown in dotted lines in FIG. 1N because a view of the apertures 11.1.2-106*a-b* can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106*a-b*.

The mounting bracket 11.1.2-108 can include a middle or central portion 11.1.2-109 coupled to the inner frame 11.1.2-104. In some examples, the middle or central portion 11.1.2-109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106*a-b* such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110*a-f*. Each sensor of the plurality of sensors 11.1.2-110*a-f* can include various types of sensors, including cameras, IR sensors, and so forth. In some examples, one or more of the sensors 11.1.2-110*a-f* can be used for object recognition in three-dimensional space such that it is important to maintain a precise relative position of two or more of the plurality of sensors 11.1.2-110*a-f*. The cantilevered nature of the mounting bracket 11.1.2-108 can protect the sensors 11.1.2-110*a-f* from damage and altered positioning in the case of accidental drops by the user. Because the sensors 11.1.2-110*a-f* are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110*a-f* coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 1O illustrates an example of an optical module 11.3.2-100 for use in an electronic device such as an HMD, including HDM devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned.

The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 1O can be replicated in another (e.g., second) optical module disposed with the HMD to interact (e.g., project light and capture images) of another eye of the user.

Any of the features, components, and/or parts, including the arrangements and configurations thereof shown in FIG. 1O can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 1O.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

Figure 2:
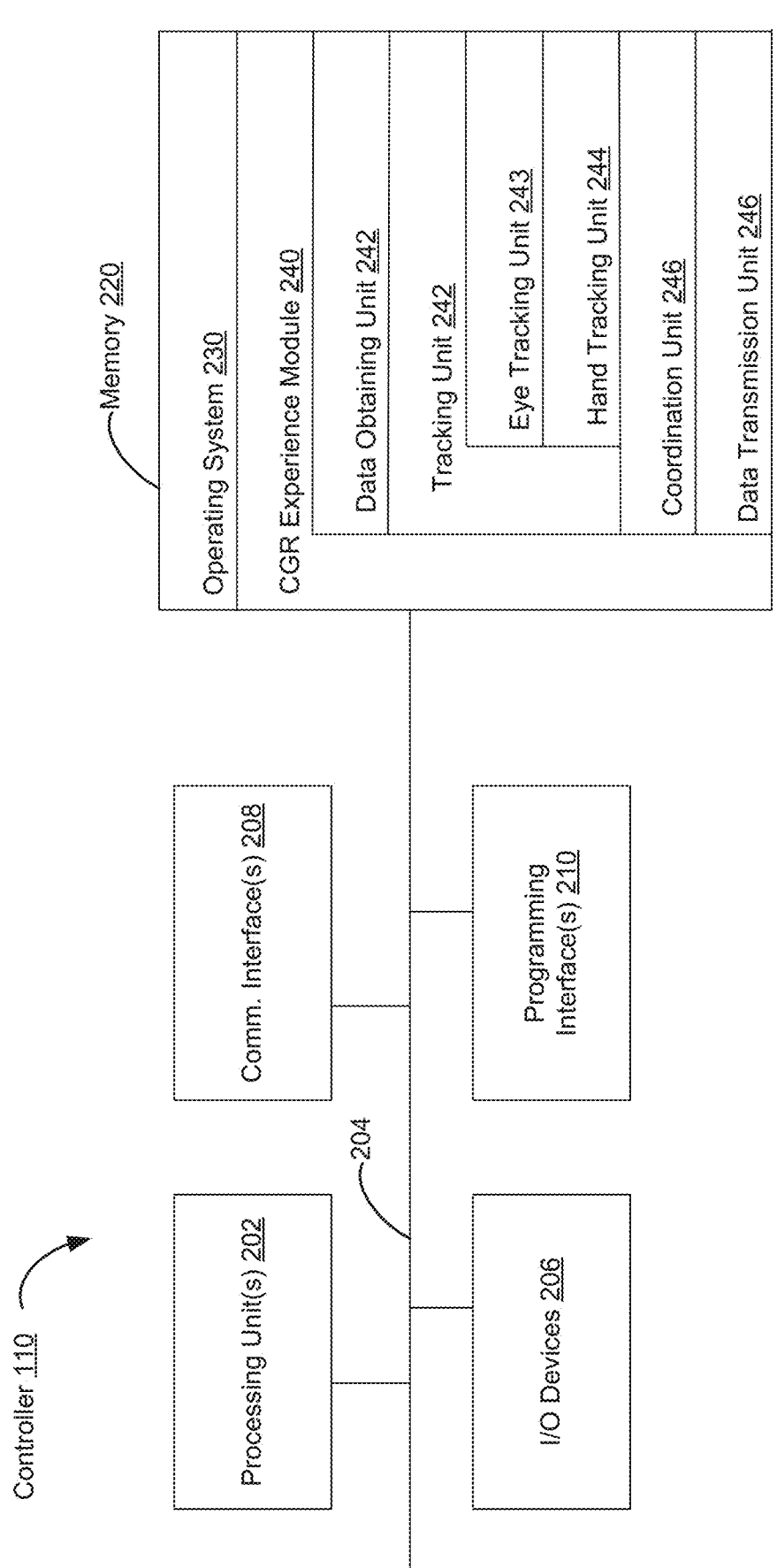
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
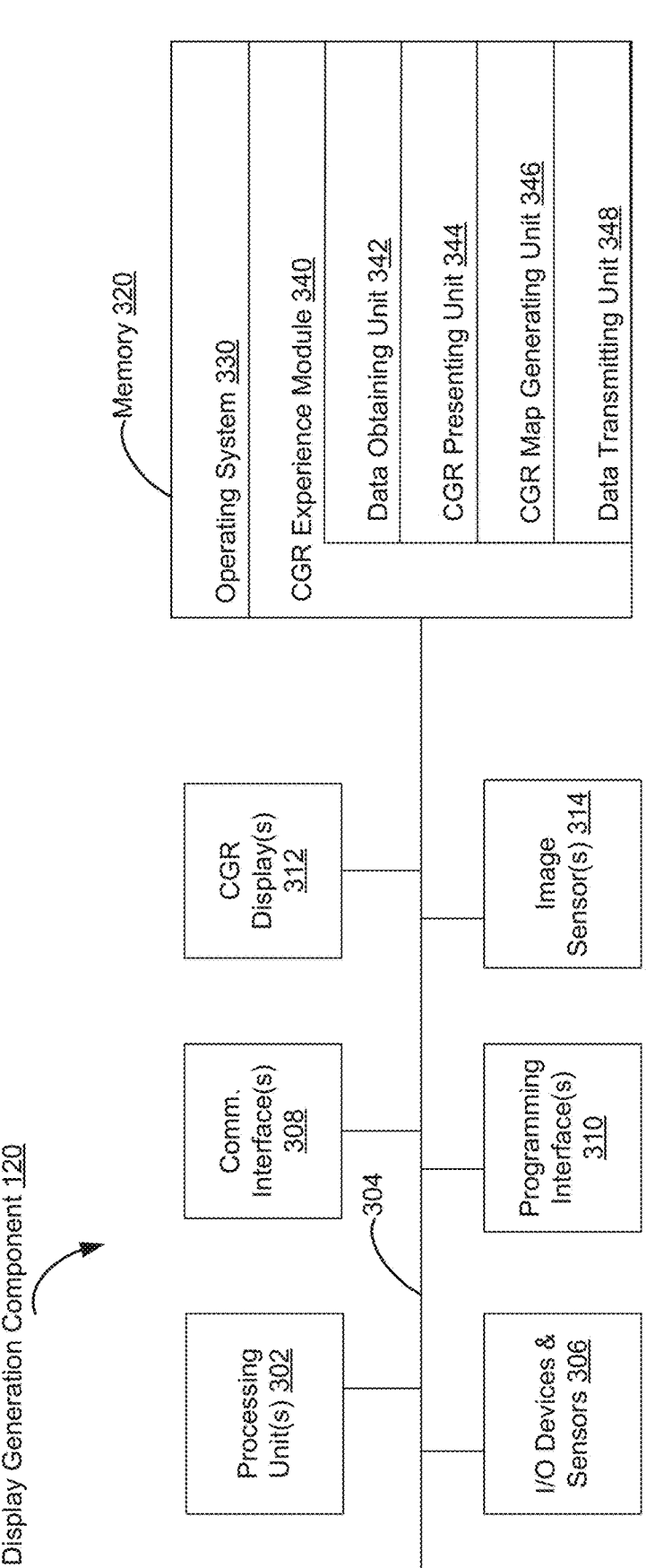
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
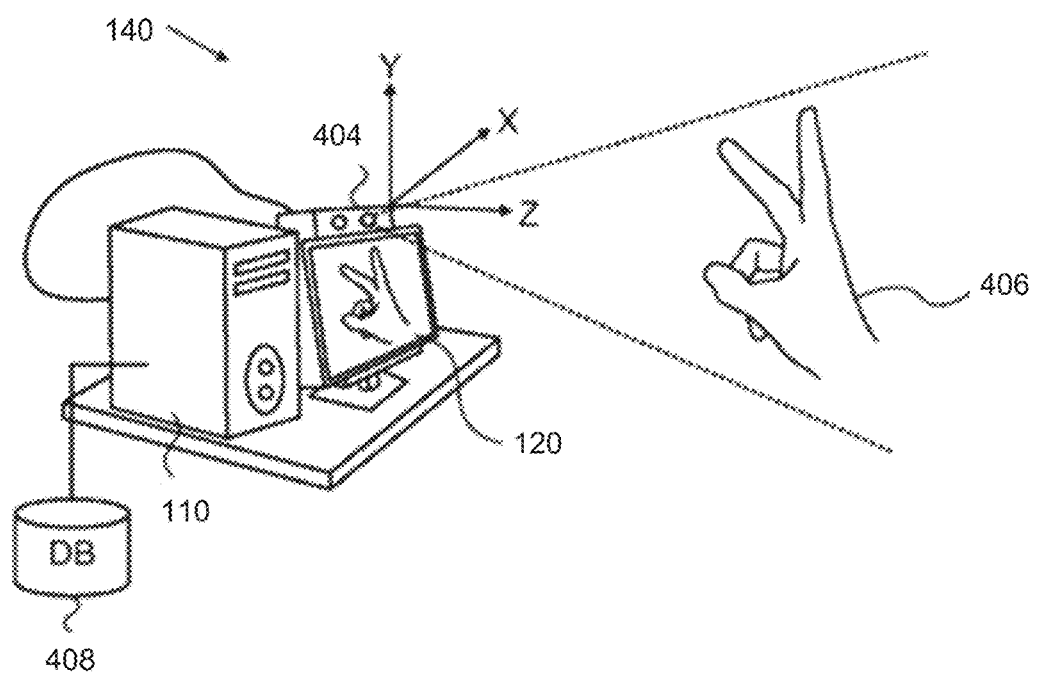
FIG. 4 is a block diagram illustrating a hand tracking unit of a computer system that is configured to capture gesture inputs of the user in accordance with some embodiments.
Figure 4:
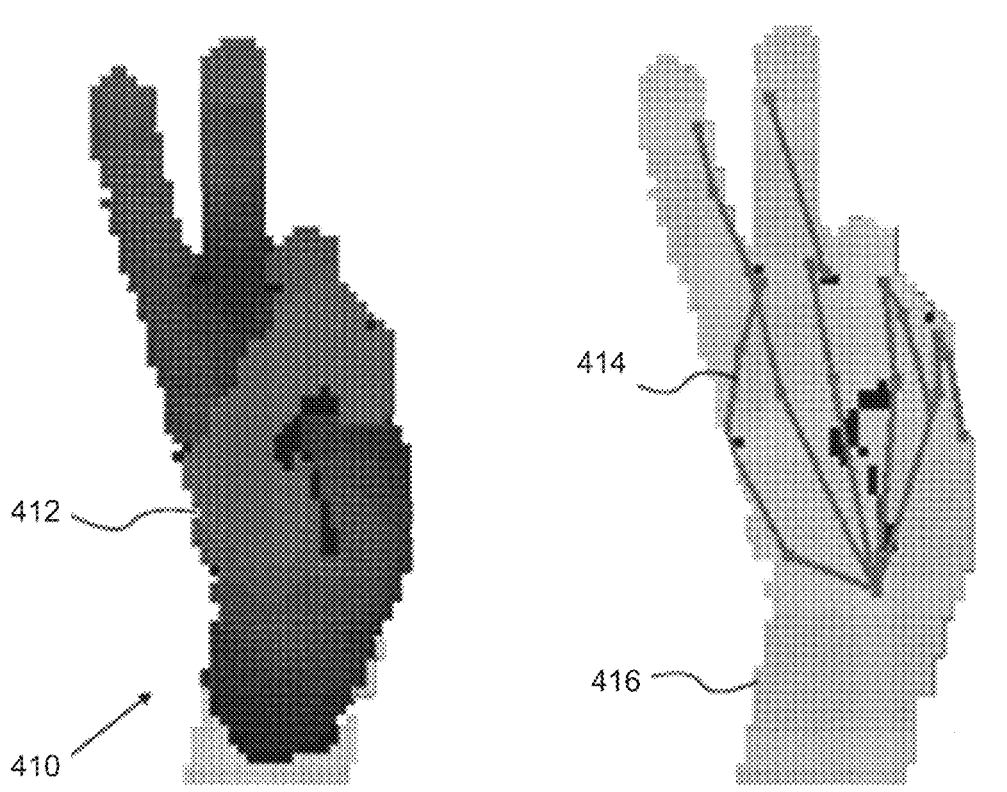

FIG. 4 is a schematic, pictorial illustration of an example embodiment of the hand tracking device 140. In some embodiments, hand tracking device 140 (FIG. 1A) is controlled by hand tracking unit 244 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user. User inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, where the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
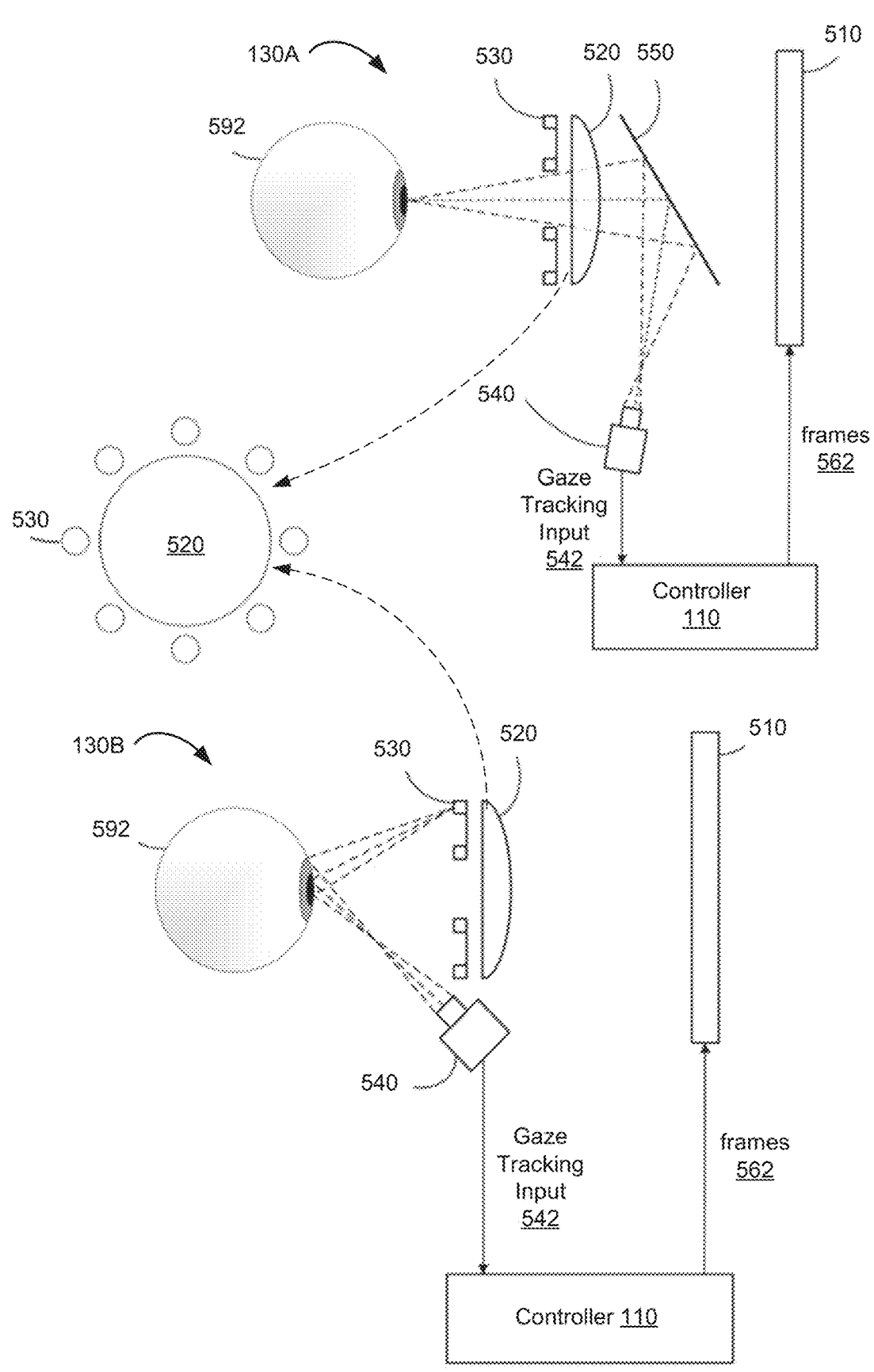
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as a headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., illumination sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight illumination sources 530 (e.g., LEDs) are arranged around each lens 520 as an example. However, more or fewer illumination sources 530 may be used, and other arrangements and locations of illumination sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
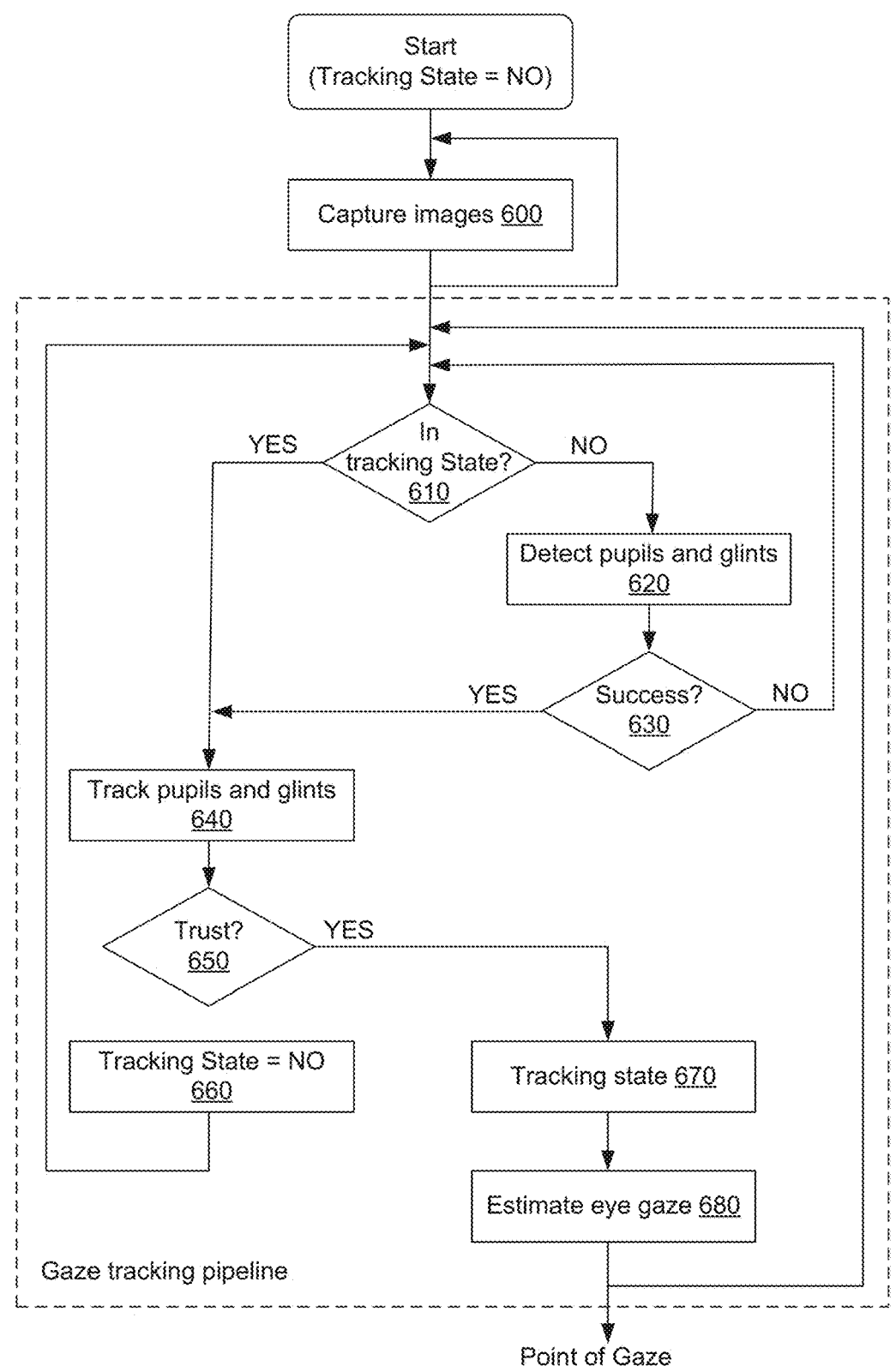
FIG. 6 is a flowchart illustrating a glint-assisted gaze tracking pipeline in accordance with some embodiments.
Figure 7A:
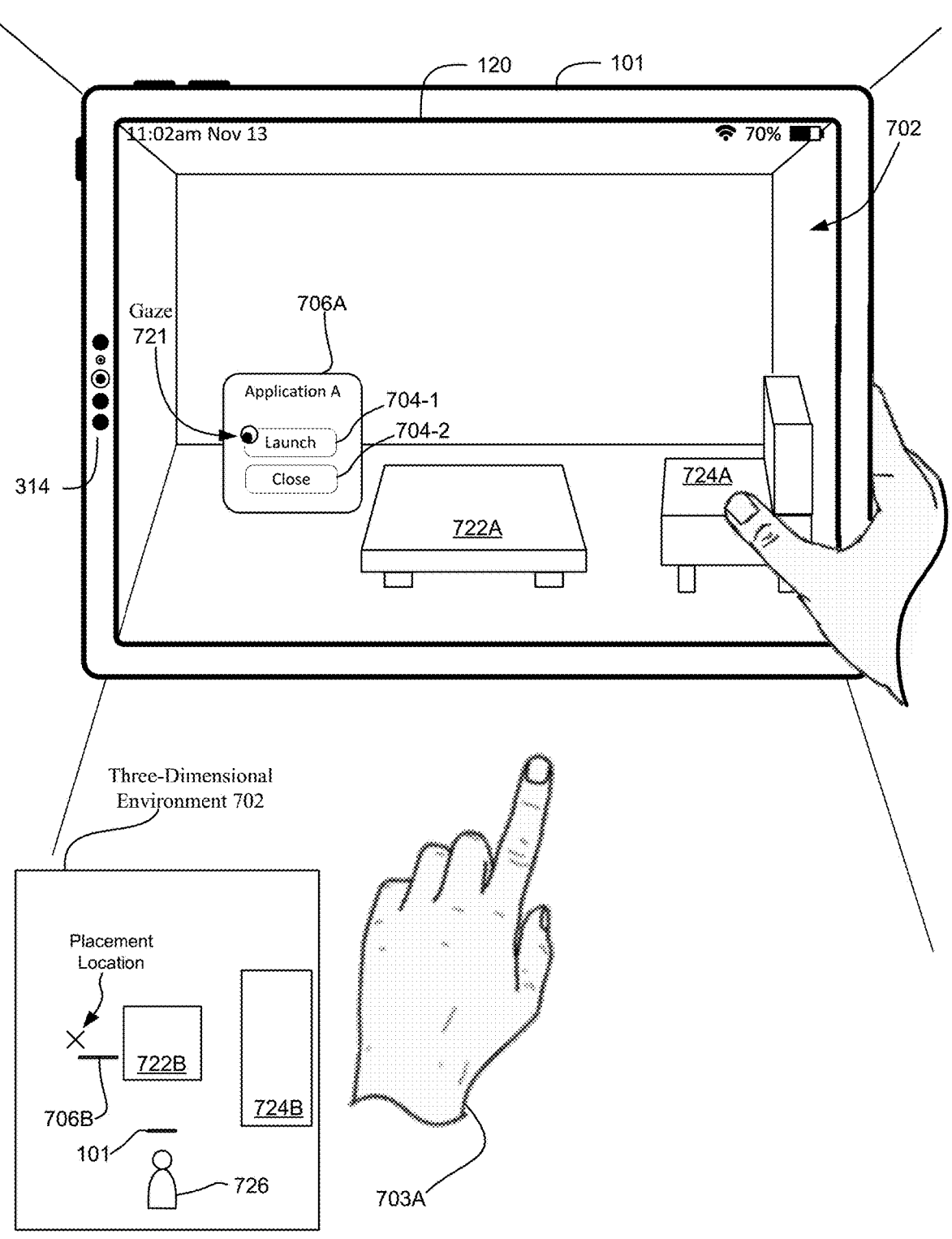
FIGS. 7A-7P illustrate examples of a computer system facilitating depth conflict mitigation for one or more virtual objects in a three-dimensional environment in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1A and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/ or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

FIGS. 7A-7P illustrate examples of a computer system facilitating depth conflict mitigation for one or more virtual objects in a three-dimensional environment in accordance with some embodiments.

FIG. 7A illustrates a computer system (e.g., an electronic device) 101 displaying, via a display generation component (e.g., display generation component 120 of FIG. 1), a three-dimensional environment 702 from a viewpoint of the user of the computer system 101 (e.g., facing the back wall of the physical environment in which computer system 101 is located). In some embodiments, computer system 101 includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or attention (e.g., based on gaze) of the user (e.g., internal sensors facing inwards towards the face of the user).

As shown in FIG. 7A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 702. For example, three-dimensional environment 702 includes a representation 722a of a coffee table, which is optionally a representation of a physical coffee table in the physical environment, and three-dimensional environment 702 includes a representation 724a of sofa, which is optionally a representation of a physical sofa in the physical environment.

In FIG. 7A, three-dimensional environment 702 also includes user interface object 706a ("Application A," corresponding to object 706b in the overhead view). In some embodiments, user interface object 706a includes a first selectable option 704-1 and a second selectable option 704-2, as shown in FIG. 7A. In some embodiments, the first selectable option 704-1 is selectable to cause the computer system 101 to display a virtual object corresponding to the user interface object (e.g., an application window corresponding to "Application A") in the three-dimensional environment 702, as described in more detail below. For example, the user interface object 706a corresponds to an application icon that is selectable to display a user interface of Application A and/or a representation of an image (e.g., a photograph) that is selectable to display the image in the three-dimensional environment 702. Accordingly, the user interface object 706a optionally does not include the first selectable option 704-1. In some embodiments, the second selectable option 704-2 is selectable to cause the computer system 101 to perform an alternate operation, such as ceasing display of the user interface object 706a in the three-dimensional environment 702.

In FIG. 7A, the computer system 101 detects a selection input provided by hand 703a. In some embodiments, computer system 101 detects hand 703a move away from the body of the user 726 and provide a pinch directed to the first selectable option 704-1 (and/or the user interface object 706a) in the three-dimensional environment 702. For example, as shown in FIG. 7A, the computer system 101 detects the selection input while attention (e.g., based on gaze 721) of the user is directed to the first selectable option 704-1 in the three-dimensional environment 702. In some embodiments, the input from the hand 703a is an air gesture input. As mentioned above, in some embodiments, the first selectable option 704-1 is selectable to cause the computer system 101 to display a virtual object (e.g., corresponding to "Application A") in the three-dimensional environment 702. As shown in the overhead view in FIG. 7A, the virtual object will optionally be displayed at the location labeled "Placement Location" in the three-dimensional environment 702 in response to detecting selection of the first selectable option 704-1. In some embodiments, the placement location for the virtual object is selected automatically by the computer system 101. For example, the placement location for the virtual object is a predefined location (e.g., a location behind, adjacent to, or in front of the user interface object 706a) and/or corresponds to a current location of the user interface object 706a in the three-dimensional environment 702. It should be understood that, in some embodiments, the indication of the "Placement Location" is not visually displayed in the three-dimensional environment 702.

In some embodiments, the computer system 101 mitigates a depth conflict between a virtual object and a portion of the three-dimensional environment 702. For example, as discussed in more detail below, in response to determining that movement of the virtual object within the three-dimensional environment 702 causes the virtual object to contact and/or intersect with a portion of three-dimensional environment 702 (e.g., a physical object in the physical environment surrounding the display generation component 120), the computer system 101 changes an appearance of the virtual object to resolve or reduce the depth conflict between the virtual object and the portion of the three-dimensional environment 702. In some embodiments, as discussed in more detail below, in response to determining that movement of the virtual object within the three-dimensional environment 702 causes the virtual object to contact and/or intersect with a portion of the three-dimensional environment 702, the computer system 101 displays a virtual environment within the three-dimensional environment 702 that resolves or reduces the depth conflict between the virtual object and the portion of the three-dimensional environment 702. In some embodiments, as described below, the computer system 101 selectively changes the appearance of the virtual object or displays the virtual environment within the three-dimensional environment 702 to resolve or reduce the depth conflict based on a degree of the depth conflict between the virtual object and the portion of the three-dimensional environment 702. Additional details of the above and below with respect to resolving depth conflicts are provided with reference to methods 800, 900 and/or 1000.

Figure 7B:
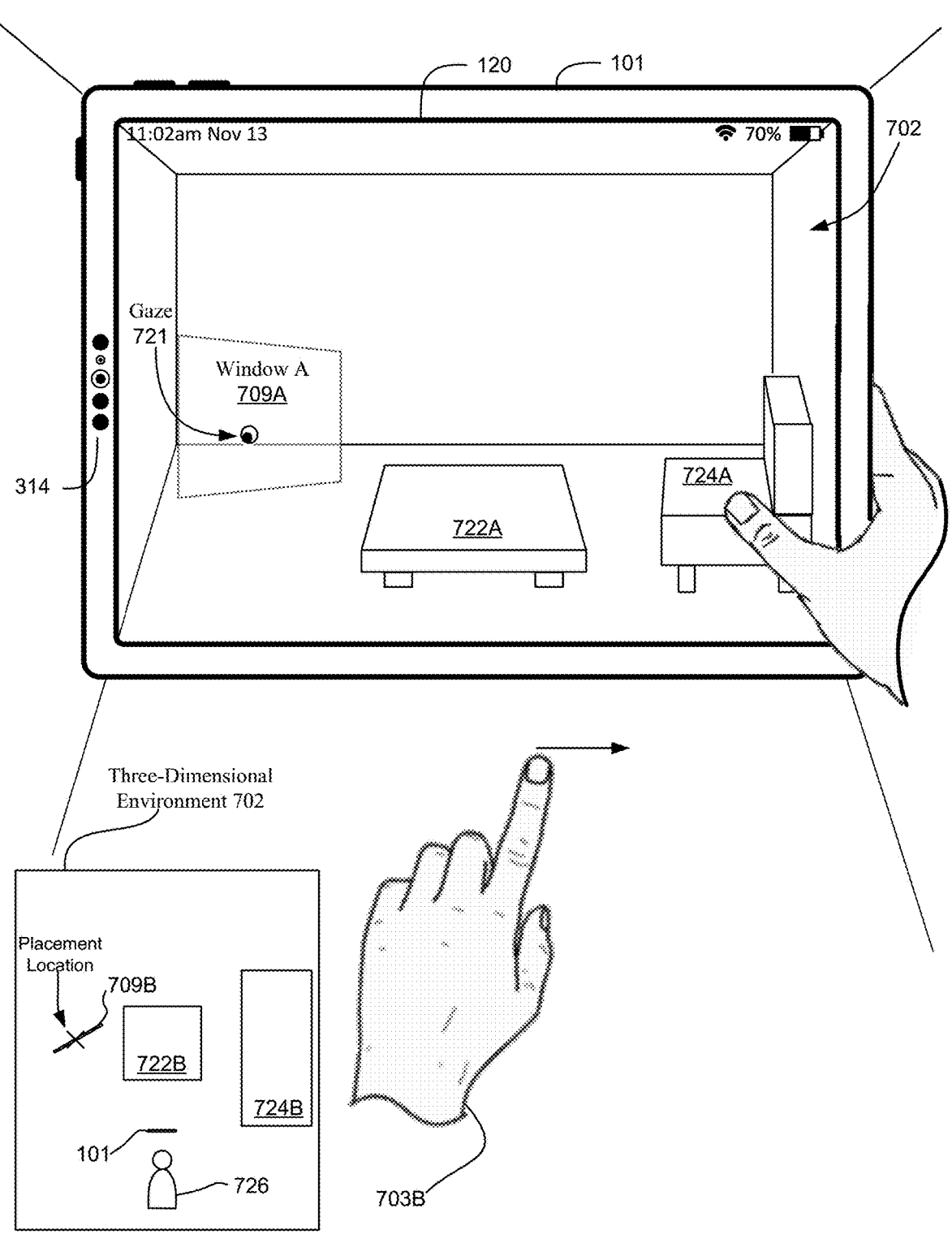

In some embodiments, in response to detecting selection of the first selectable option 704-1 in FIG. 7A, the computer system 101 displays virtual object 709a ("Window A," corresponding to object 709b in the overhead view) in the three-dimensional environment 702, as shown in FIG. 7B. For example, as shown in the overhead view in FIG. 7B, the computer system 101 displays the virtual object 709a at the indicated "Placement Location" in the three-dimensional environment 702. In some embodiments, the virtual object 709a is or includes one or more of user interfaces of an application (e.g., "Application A" in FIG. 7A) containing content (e.g., quick look windows displaying photographs), three-dimensional objects (e.g., virtual clocks, virtual balls, and/or virtual cars) or any other element displayed by computer system 101 that is not included in the physical environment of display generation component 120. In some embodiments, the virtual object 709a is world-locked in the three-dimensional environment 702.

In some embodiments, virtual objects are displayed in three-dimensional environment 702 with respective orientations relative to the viewpoint of user 726 (e.g., prior to receiving input interacting with the virtual objects, which will be described later, in three-dimensional environment 702). As shown in FIG. 7B, virtual object 709a has a first orientation in three-dimensional environment 702. For example, the front-facing surface/portion of virtual object 709a is oriented towards the viewpoint of user 726, as shown by 709b in the overhead view of FIG. 7B. It should be understood that the orientation of the virtual object 709a in FIG. 7B is merely exemplary and that other orientations are possible; for example, the virtual object is optionally displayed with a different orientation in three-dimensional environment 702.

In some embodiments, as mentioned above, the virtual object 709a can encounter a depth conflict in the three-dimensional environment 702. For example, as described herein, movement of the virtual object 709a within the three-dimensional environment 702 may cause the virtual object 709a to be displayed at a simulated location that would contact and/or intersect with a physical object (e.g., a representation of the physical object in the three-dimensional environment 702) of the physical environment surrounding the display generation component 120 or a second virtual object (e.g., similar to virtual object 709a) in the three-dimensional environment 702. It should be understood that when a virtual object is being described as intersecting with and/or contacting a physical object, the intersection is a virtual intersection that describes an apparent spatial or depth conflict that would occur if the virtual object were displayed at a respective location relative to the physical object. In some embodiments, the virtual object 709a encounters a depth conflict with a portion of the three-dimensional environment 702 when the virtual object 709a is first displayed in the three-dimensional environment 702. For example, if the indicated "Placement Location" in the overhead view in FIG. 7A were located at a location at which the virtual object 709a at least partially overlaps with a representation of a physical object (e.g., such as the representation of the table 722a and/or the representation of the sofa 724a) in the three-dimensional environment 702, displaying the virtual object 709a (e.g., as similarly shown in FIG. 7B) at the indicated "Placement Location" would optionally cause the virtual object 709a to encounter a depth conflict with the representation of the physical object in the three-dimensional environment 702.

In some embodiments, as mentioned above, the computer system 101 displays a virtual environment when the virtual object 709a encounters a depth conflict in the three-dimensional environment. Therefore, if the computer system 101 displays the virtual object 709a at a placement location at which a depth conflict would occur, the computer system 101 optionally also displays a virtual environment within the three-dimensional environment 702 to resolve or reduce the depth conflict with the representation of the physical object. For example, the computer system 101 displays the virtual object 709a within the virtual environment, as similarly shown in FIG. 7J. In some embodiments, as described in more detail below, display of the virtual environment within the three-dimensional environment 702 mitigates the depth conflict between the virtual object 709a and the representation of the physical object in the three-dimensional environment 702 by occluding the representation of the physical object, as similarly shown in FIG. 7J and as described in more detail with reference to methods 800, 900, and/or 1000. In some embodiments, as shown in FIG. 7B, the computer system 101 displays the virtual object 709a in the three-dimensional environment 702 without also displaying the virtual environment within the three-dimensional environment 702 because the placement location of the virtual object 709a in the three-dimensional environment 702 is not a location at which a depth conflict occurs.

In FIG. 7B, the computer system 101 detects the hand 703b of the user 726 provide a movement input directed toward the virtual object 709a. For example, as shown in FIG. 7B, the computer system detects the hand 703b provide an air pinch gesture while the attention (e.g., based on gaze 721) of the user 726 is directed to the virtual object 709a in the three-dimensional environment 702, followed by movement of the hand 703b in a rightward direction with a respective magnitude (e.g., of distance and/or speed) while the hand remains in the pinch hand shape. In some embodiments, as shown in FIG. 7B, the computer system 101 changes an opacity of the virtual object 709a in the three-dimensional environment 702 in response to detecting the movement input provided by the hand 703b. For example, as shown in FIG. 7B, the computer system 101 displays one or more portions of (or all of) the virtual object 709a that do not have a depth conflict in the three-dimensional environment 702 with an increased amount of translucency during the movement of the virtual object 709a within the three-dimensional environment 702 (e.g., compared to the amount of translucency of the virtual object 709a shown in FIG. 7L). In FIG. 7B, because the virtual object 709a does not have a depth conflict with any portion of the three-dimensional environment 702, the computer system 101 optionally displays all portions of the virtual object 709a with an increased amount of translucency during the movement of the virtual object 709a within the three-dimensional environment 702.

Figure 7C:
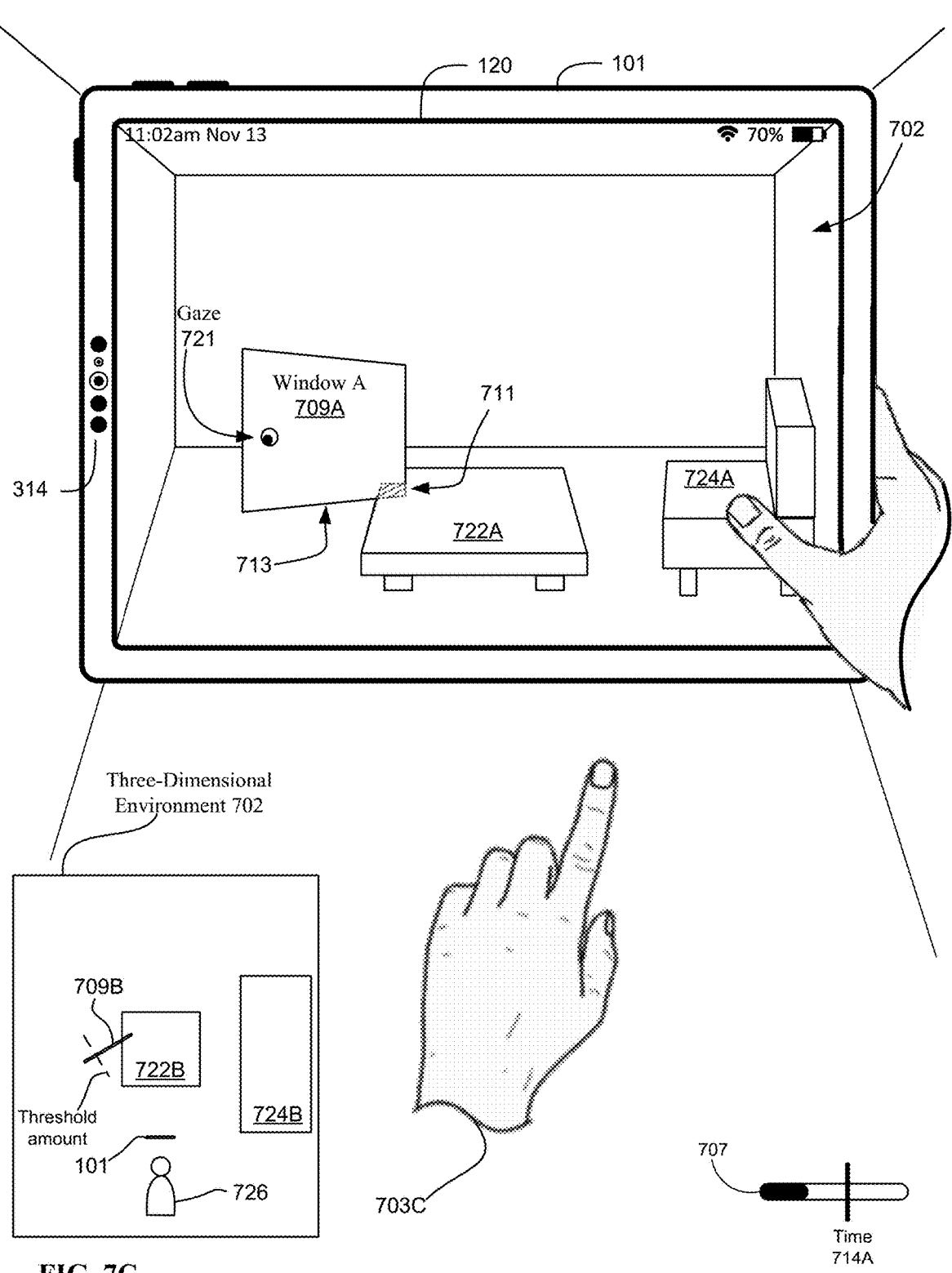

In some embodiments, movement of the virtual object 709a within the three-dimensional environment 702 causes the virtual object 709a to encounter a depth conflict with a portion of the three-dimensional environment 702. For example, as shown in FIG. 7C, the computer system 101 moves the virtual object 709a rightward (e.g., relative to the viewpoint of the user 726) in the three-dimensional environment 702 in accordance with the movement of the hand 703b, which causes the virtual object 709a to contact/intersect with the representation of the table 722a in the three-dimensional environment 702 (e.g., as indicated by the intersection of objects 709b and 722b in the overhead view in FIG. 7C). In some embodiments, as mentioned above, when the computer system 101 determines that the virtual object 709a encounters the depth conflict with the representation of the table 722a in the three-dimensional environment 702 (e.g., the table in the physical environment surrounding the display generation component 120), such as described in more detail with reference to methods 800, 900, and/or 1000, the computer system 101 changes visual properties (e.g., a visual appearance) of the portion of the virtual object 709a that has the depth conflict with the representation of the table 722a in the three-dimensional environment 702, as shown in FIG. 7C. For example, as shown in FIG. 7C, the computer system 101 changes the visual properties (e.g., opacity, brightness, coloration, and/or saturation amount) of a first portion 711 of the virtual object 709a that is contacting/intersecting the representation of the table 722a in the three-dimensional environment 702. In some embodiments, as shown in FIG. 7C, changing the visual properties of the first portion 711 of the virtual object 709a mitigates the depth conflict between the virtual object 709a and the representation of the table 722a. For example, as shown in FIG. 7C, changing the amount of opacity, brightness, coloration, and/or saturation of the first portion 711 of the virtual object 709a occludes a respective portion of the representation of the table 722a with which the virtual object 709a has the depth conflict in the three-dimensional environment 702.

In some embodiments, as shown in FIG. 7C, when the computer system 101 changes the appearance of the first portion 711 of the virtual object 709a, the computer system 101 maintains an appearance of a second portion 713 of the virtual object 709a that does not have the depth conflict in the three-dimensional environment 702. For example, as shown in FIG. 7B (and/or FIG. 7L), the computer system 101 displays the virtual object 709a with first visual properties (e.g., a first visual appearance) in the three-dimensional environment 702 before the first portion 711 of the virtual object 709a encounters the depth conflict with the representation of the table 722a in the three-dimensional environment. As shown in FIG. 7C and as described above, when the virtual object 709a encounters the depth conflict with the representation of the table 722a in the three-dimensional environment 702 after the computer system 101 moves the virtual object 709a in accordance with the movement of the hand 703b in FIG. 7B, the computer system 101 displays the first portion 711 of the virtual object 709a with second visual properties (e.g., a second visual appearance), different from the first visual properties, that resolve or reduce the depth conflict in the three-dimensional environment 702. Additionally, as shown in FIG. 7C, the computer system 101 optionally maintains display of the second portion 713 of the virtual object 709a with the first visual appearance in the three-dimensional environment 702 because the second portion 713 of the virtual object 709a does not have a depth conflict with any portion of the three-dimensional environment 702.

In some embodiments, changing the appearance of the first portion 711 of the virtual object 709a includes displaying a boundary between the first portion 711 of the virtual object 709a and the second portion 713 of the virtual object 709a with a visual transition. For example, as shown in FIG. 7C, the computer system 101 displays a boundary between the first portion 711 that has the depth conflict in the three-dimensional environment 702 and the second portion 713 that does not have a depth conflict in the three-dimensional environment 702. In some embodiments, displaying the boundary with the visual transition includes displaying an animation effect (e.g., a gradient of the visual properties of the first portion 711 of the virtual object 709a) that causes the first portion 711 of the virtual object 709a to no longer be occluded by the representation of the table 722a in the three-dimensional environment 702 relative to the viewpoint of the user 726. For example, the animation effect includes a feathering effect that extends from the second portion 713 of the virtual object 709a (e.g., at the boundary between the first portion 711 and the second portion 713) and gradually changes the visual characteristics of the first portion 711 to occlude the representation of the table 722a.

As mentioned above, in some embodiments, the virtual object 709a is or includes content, such as one or more user interfaces. Accordingly, in FIG. 7C, when the computer system 101 optionally maintains display of the second portion 713 of the virtual object 709*a* with the first visual appearance, the computer system 101 maintains display of the content included within the second portion 713 of the virtual object 709*a* in the three-dimensional environment 702. Additionally, when the computer system 101 displays the first portion 711 of the virtual object 709*a* with the second visual appearance to resolve or reduce the depth conflict with the representation of the table 722*a*, at least a portion of the content included within the first portion 711 of the virtual object 709*a* is displayed. For example, when the computer system 101 changes the amount of opacity, brightness, coloration, and/or saturation of the first portion 711 of the virtual object 709*a* to occlude the representation of the table 722*a* with which the virtual object 709*a* has the depth conflict, a portion of the content included in the first portion 711 remains visible relative to the viewpoint of the user 726. In some embodiments, the change in the visual properties of the first portion 711 of the virtual object 709*a* applies to the content in the first portion 711 but not the content in the second portion 713 of the virtual object 709*a*.

It should be understood that the change in appearance of the first portion 711 of the virtual object 709*a* shown in FIG. 7C is exemplary and that, in some embodiments, a larger amount or a smaller amount of the first portion 711 of the virtual object 709*a* is displayed with the second visual appearance than that shown in FIG. 7C. For example, the amount of the first portion 711 of the virtual object 709*a* that is displayed with the second visual appearance is larger or smaller (e.g., by 5, 10, 15, 20, 25, 30, 40, 50, or 60%) than the amount of the first portion 711 of the virtual object 709*a* that has the depth conflict in the three-dimensional environment 702.

In some embodiments, the computer system 101 mitigates the depth conflict between the virtual object 709*a* and the representation of the table 722*a* in the three-dimensional environment 702 by changing the appearance of the first portion 711 of the virtual object 709*a* that has the depth conflict because a first set of criteria is satisfied. For example, as shown in the overhead view in FIG. 7C, the first set of criteria is satisfied because the virtual object 809*b* has a first degree of depth conflict in the three-dimensional environment 702 (e.g., less than a threshold amount (e.g., less than 60, 65, 70, 75, 80, 90, or 95%) of the virtual object 709*b* has the depth conflict with the representation of the table 722*b*). In some embodiments, as similarly described above, if the first set of criteria is satisfied when the virtual object 709*a* encounters a depth conflict, the computer system 101 changes the visual properties (e.g., appearance) of the portion of the virtual object 709*a* that has the depth conflict in the three-dimensional environment 702 without changing the visual appearance (e.g., appearance) of portions of the virtual object 709*a* that do not have the depth conflict in the three-dimensional environment 702. For example, as described above, if the first set of criteria is satisfied, the computer system 101 displays the portion of the virtual object 709*a* that has the depth conflict in the three-dimensional environment 702 with the second visual properties while maintaining display of the portions of the virtual object 709*a* that do not have the depth conflict with the first visual properties. In some embodiments, the first set of criteria includes a criterion that is satisfied when the object with which the virtual object 709*a* has the depth conflict is an object of a first type. In some embodiments, objects of the first type include movable objects and/or objects that are located within a space of the physical environment surrounding the display generation component

120. For example, in FIG. 7C, the object with which the virtual object 709*a* has the depth conflict is a table (e.g., the representation of the table 722*a*), which is a piece of furniture that is movable and that is located within the space of the physical environment. Accordingly, in FIG. 7C, the first set of criteria is optionally satisfied because the virtual object 709*a* has the depth conflict with the representation of the table 722*a*, which is an object of the first type. In some embodiments, as described in more detail below, if the first set of criteria is not satisfied (e.g., and a second set of criteria is satisfied) when the virtual object 709*a* encounters a depth conflict in the three-dimensional environment 702, the computer system 101 displays a virtual environment within the three-dimensional environment 702 to mitigate the depth conflict instead of changing the appearance of the portion of the virtual object 709*a* that has the depth conflict in the three-dimensional environment 702.

In some embodiments, the determination of whether the virtual object 709*a* satisfies the first set of criteria is based on the type of object with which the virtual object 709*a* has the depth conflict in the three-dimensional environment 702. For example, as discussed above, in FIG. 7C, the virtual object 709*a* encounters the depth conflict with the representation of the table 722*a* in the three-dimensional environment 702. In some embodiments, the determination whether the virtual object 709*a* has the first degree of depth conflict discussed above in the three-dimensional environment 702 is based on the table (e.g., representation of the table 722*a*) with which the virtual object 709*a* has the depth conflict. For example, the threshold amount indicated in the overhead view in FIG. 7C is determined based on the table (e.g., representation of the table 722*b*), which is an object of the first type, as discussed above. In some instances, the threshold amount of the virtual object 709*b* (e.g., indicative of whether the virtual object 709*b* has the first degree of depth conflict) indicated in the overhead view changes if the virtual object 709*b* encounters the depth conflict with a different type of object (e.g., an object of a second type, as discussed in more detail later). For example, the threshold amount indicated in the overhead view in FIG. 7C (and thus the evaluation of the degree of the depth conflict) is different (e.g., is smaller) for an object such as the floor of the physical environment surrounding the display generation component 120.

In some embodiments, the first set of criteria includes a criterion that is satisfied if the object with which the virtual object 709*a* encounters the depth conflict is located less than a threshold distance (e.g., 0.1, 0.25, 0.5, 1, 2, 3, 5, 10, 15, 20, or 30 m) from the viewpoint of the user 726. For example, in FIG. 7C, the representation of the table 722*a* is located less than the threshold distance from the viewpoint of the user 726. Accordingly, when the virtual object 709*a* encounters the depth conflict with the representation of the table 722*a*, which is located less than the threshold distance from the viewpoint of the user, the first set of criteria is satisfied, which causes the computer system 101 to change the appearance of the first portion 711 of the virtual object 709*a* to mitigate the depth conflict in the three-dimensional environment 702, as shown in FIG. 7C.

In FIG. 7C, the computer system 101 detects an end of the movement input directed to the virtual object 709*a* in the three-dimensional environment 702. For example, the computer system 101 detects the hand 703*c* of the user 726 release the air pinch gesture directed to the virtual object 709*a* in the three-dimensional environment 702 (e.g., such that the index finger and thumb of the hand 703*c* are no longer touching). In some embodiments, the computer system 101 adjusts at least a portion of the change in appearance of the first portion 711 of the virtual object 709a after detecting an end of the movement input directed to the virtual object 709a, as described in more detail below. In some embodiments, the computer system 101 adjusts at least a portion of the change in appearance of the first portion 711 of the virtual object 709a after a threshold amount of time (e.g., 0.1, 0.5, 1, 2, 3, 4, 5, or 10 seconds) has elapsed since detecting the end of the movement input provided by the hand of the user 726, as represented by threshold time 714a in timeline 707 in FIG. 7C.

Figure 7D:
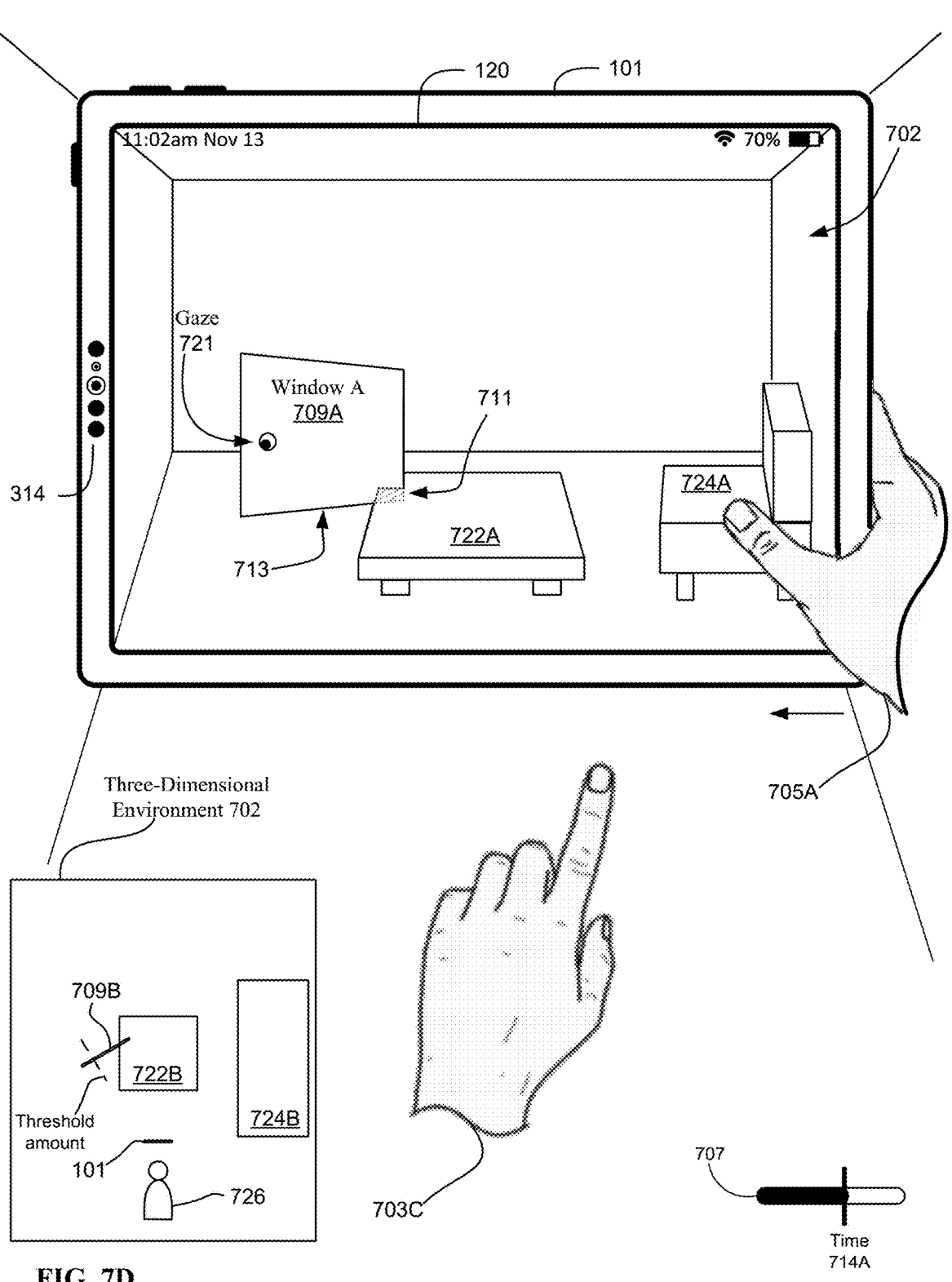

In some embodiments, as shown in FIG. 7D, when the computer system 101 determines that the threshold amount of time above has elapsed since detecting the release of the movement input provided by hand 703c, as indicated in timeline 707, the computer system 101 adjusts the change in appearance of at least a portion of the first portion 711 of the virtual object 709a. For example, as shown in FIG. 7D, the computer system 101 adjusts the change in visual appearance of the first portion 711 from the first visual appearance to the second visual appearance described above. As shown in FIG. 7D, the computer system 101 optionally increases the opacity of the first portion 711 of the virtual object 709a (e.g., to an opacity value at or below the opacity value for the first visual appearance) and/or decreases the brightness of the first portion 711 of the virtual object 709a (e.g., to a brightness value at or below the brightness value for the first visual appearance). In some embodiments, adjusting the change in appearance of the first portion 711 of the virtual object 709a in the three-dimensional environment 702 causes at least a portion of the representation of the table 722a to become visible (or more visible) through the first portion 711 of the virtual object 709a from the viewpoint of the user 726.

In FIG. 7D, the computer system 101 detects movement of the viewpoint of the user 726 while the virtual object 709a has the depth conflict with the representation of the table 722a in the three-dimensional environment 702. For example, as shown in FIG. 7D, the computer system 101 detects hand 705a that is holding the computer system 101 move in a leftward direction (e.g., a counterclockwise direction about a body of the user 726). In some embodiments, as described below, movement of the viewpoint of the user 726 causes the portion of the three-dimensional environment 702, including the physical environment surrounding the display generation component 120, in the field of view of the user 726, to change in accordance with the movement of the viewpoint. In some embodiments, the input for changing the viewpoint of the user 726 corresponds to a movement of the head of the user 726 in the physical environment (e.g., movement of the head-mounted display worn by the user 726 in the physical environment).

Figure 7E:
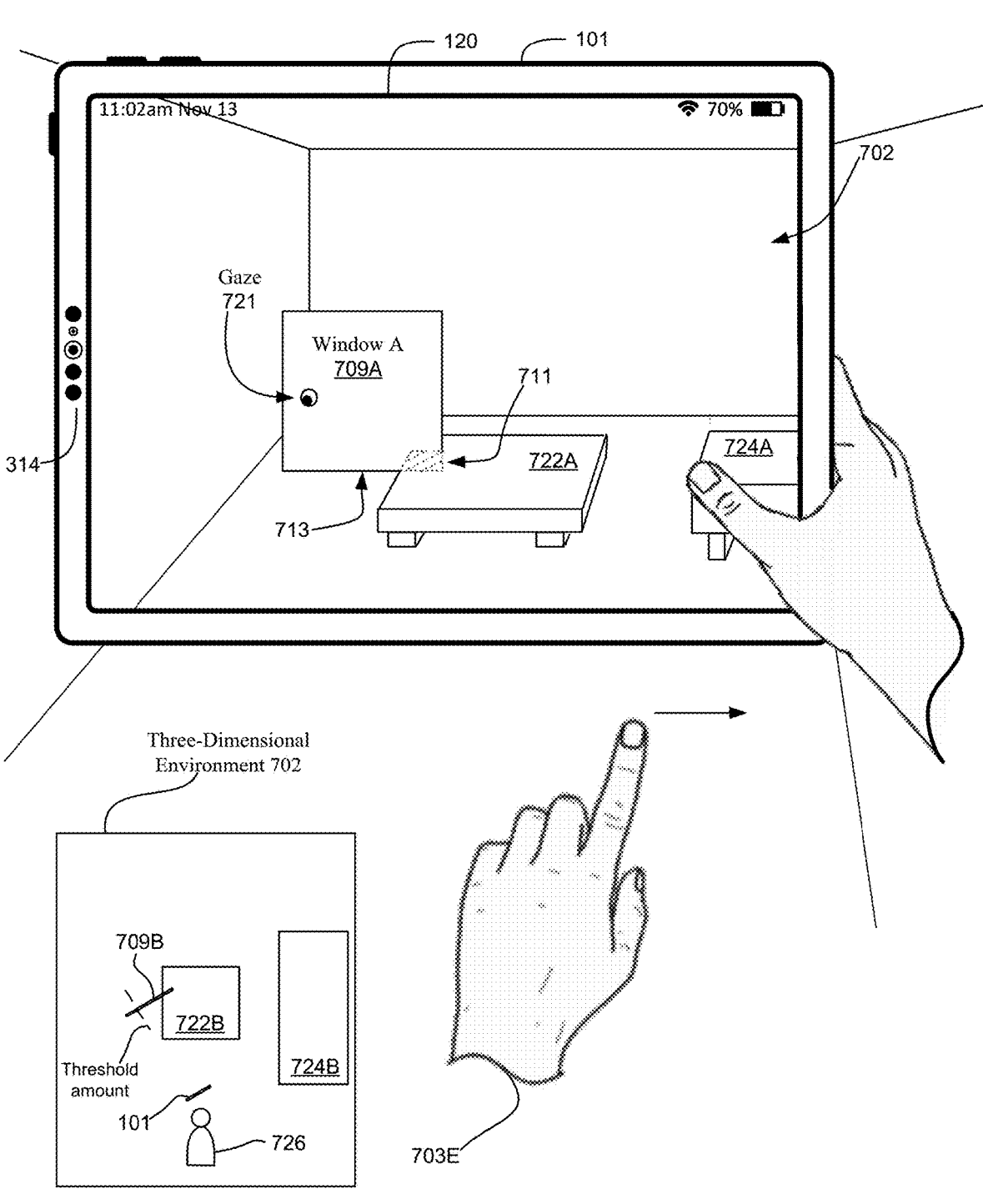

In some embodiments, as shown in FIG. 7E, in response to detecting movement of the hand 705a in FIG. 7D, the computer system 101 updates display of the three-dimensional environment 702 relative to the new viewpoint of the user 726 in accordance with the movement. For example, as shown in the overhead view in FIG. 7E, the computer system 101 is moved/angled counterclockwise about the body of the user 726, such that the computer system 101 is facing the front-facing surface/portion of the virtual object 709b in the three-dimensional environment 702. Accordingly, as shown in FIG. 7E, the computer system 101 optionally updates display of the orientation of the virtual object 709a such that the front-facing surface/portion of the virtual object 709b is parallel relative to the new viewpoint of the user 726. In some embodiments, the computer system 101 updates dis-play of the orientation of the virtual object 709a without moving (e.g., translating) the virtual object 709a based on the movement of the viewpoint of the user 726. For example, because the virtual object 709a is world-locked in the three-dimensional environment 702, as discussed above, the virtual object 709a remains displayed at the same location in the three-dimensional environment 702 (e.g., contacting the representation of the table 722a) when the viewpoint of the user 726 changes. Additionally, as shown in FIG. 7E, when the viewpoint of the user 726 moves, the portion of the physical environment that is visible via the display generation component 120 changes in accordance with the movement of the viewpoint (e.g., a smaller portion of the representation of the sofa 724a is visible in the three-dimensional environment 702 relative to the new viewpoint of the user 726).

In some embodiments, the movement of the viewpoint of the user 726 causes a degree of the depth conflict encountered by the virtual object 709a to change in the three-dimensional environment 702. For example, as mentioned above, the movement of the viewpoint of the user 726 causes the orientation of the virtual object 709a to change/shift in accordance with the movement of the viewpoint. Details regarding the shift in the orientation of the virtual object 709a in accordance with the movement of the viewpoint of the user are given below with reference to method 800. In some embodiments, the shift in the orientation of the virtual object 709a increases or decreases the degree of the depth conflict between the first portion 711 of the virtual object 709a and the representation of the table 722a in the three-dimensional environment 702. In some embodiments, when the movement of the viewpoint of the user causes the degree of depth conflict encountered by the virtual object 709a to change and/or causes the virtual object 709a to encounter a depth conflict in the three-dimensional environment 702, the computer system 101 changes the appearance of the portion of the virtual object 709a that has the depth conflict, as similarly described above. For example, as shown in FIG. 7E, the computer system 101 changes the appearance of the first portion 711 of the virtual object 709a that has the depth conflict with the representation of the table 722a without changing the appearance of the second portion 713 of the virtual object 709a that does not have a depth conflict in the three-dimensional environment 702. In some embodiments, the computer system 101 changes the appearance of the first portion 711 of the virtual object 709a that has the depth conflict in the three-dimensional environment because the first set of criteria is satisfied (e.g., because less than the threshold amount of the virtual object 709b is in contact with the representation of the table 722b in the overhead view in FIG. 7E), as similarly discussed above.

In some embodiments, the change in appearance applied to the virtual object 709a when the virtual object 709a encounters a depth conflict in the three-dimensional environment 702 in response to movement of the virtual object 709a within the three-dimensional environment 702 is different from the change in appearance applied to the virtual object 709a when the virtual object 709a encounters a depth conflict in response to movement of the viewpoint of the user 726. For example, in FIG. 7E, the computer system 101 displays the first portion 711 of the virtual object 709a with third visual properties (e.g., a third visual appearance), which is different from the second visual properties discussed above (e.g., the appearance of the first portion 711 in FIG. 7C). In some embodiments, the opacity and/or brightness of the first portion 711 of the virtual object 709a when the depth conflict is encountered due to direct movement of the virtual object 709*a* (e.g., in response to movement input directed to the virtual object 709*a*, such as movement of the hand 703*b* in FIG. 7B) is different from the opacity and/or brightness of the first portion 711 of the virtual object 709*a* when the depth conflict is encountered due to movement of the viewpoint of the user 726. For example, values of the opacity and/or brightness of the first portion 711 of the virtual object 709*a* when the depth conflict is encountered due to direct movement of the virtual object 709*a* are greater than those of the first portion 711 of the virtual object 709*a* when the depth conflict is encountered due to movement of the viewpoint.

As described previously above, in some embodiments, changing the appearance of the first portion 711 of the virtual object 709*a* includes displaying a boundary between the first portion 711 of the virtual object 709*a* and the second portion 713 of the virtual object 709*a* with a visual transition. For example, as shown in FIG. 7E, the computer system 101 displays a boundary between the first portion 711 that has the depth conflict in the three-dimensional environment 702 and the second portion 713 that does not have a depth conflict in the three-dimensional environment 702. In some embodiments, the visual transition of the boundary between the first portion 711 and the second portion 713 applied to the virtual object 709*a* when the virtual object 709*a* encounters a depth conflict in the three-dimensional environment 702 in response to movement of the virtual object 709*a* within the three-dimensional environment 702 is different from the visual transition of the boundary between the first portion 711 and the second portion 713 applied to the virtual object 709*a* when the virtual object 709*a* encounters a depth conflict in response to movement of the viewpoint of the user 726. As described previously above, in some embodiments, displaying the boundary with the visual transition includes displaying a visual effect, such as a feathering effect, that extends from the second portion 713 of the virtual object 709*a* (e.g., at the boundary between the first portion 711 and the second portion 713) and gradually change the visual characteristics of the first portion 711 to occlude the representation of the table 722*a*. In some embodiments, the feathering effect for occluding the representation of the table 722*a* when the depth conflict is caused by movement of the virtual object 709*a* within the three-dimensional environment 702 is displayed with a greater amount of precision (e.g., the transition region between the first portion 711 and the second portion 713 is displayed with a greater length/width) than the feathering effect when the depth conflict is caused by movement of the viewpoint of the user 726. For example, the feathering effect causes a greater amount of the first portion 711 of the virtual object 709*a* to have the change in appearance when the depth conflict is caused by the movement of the viewpoint than that of the first portion 711 of the virtual object 709*a* when the depth conflict is caused by the movement of the virtual object 709*a* within the three-dimensional environment 702, as shown in FIG. 7E.

Figure 7F:
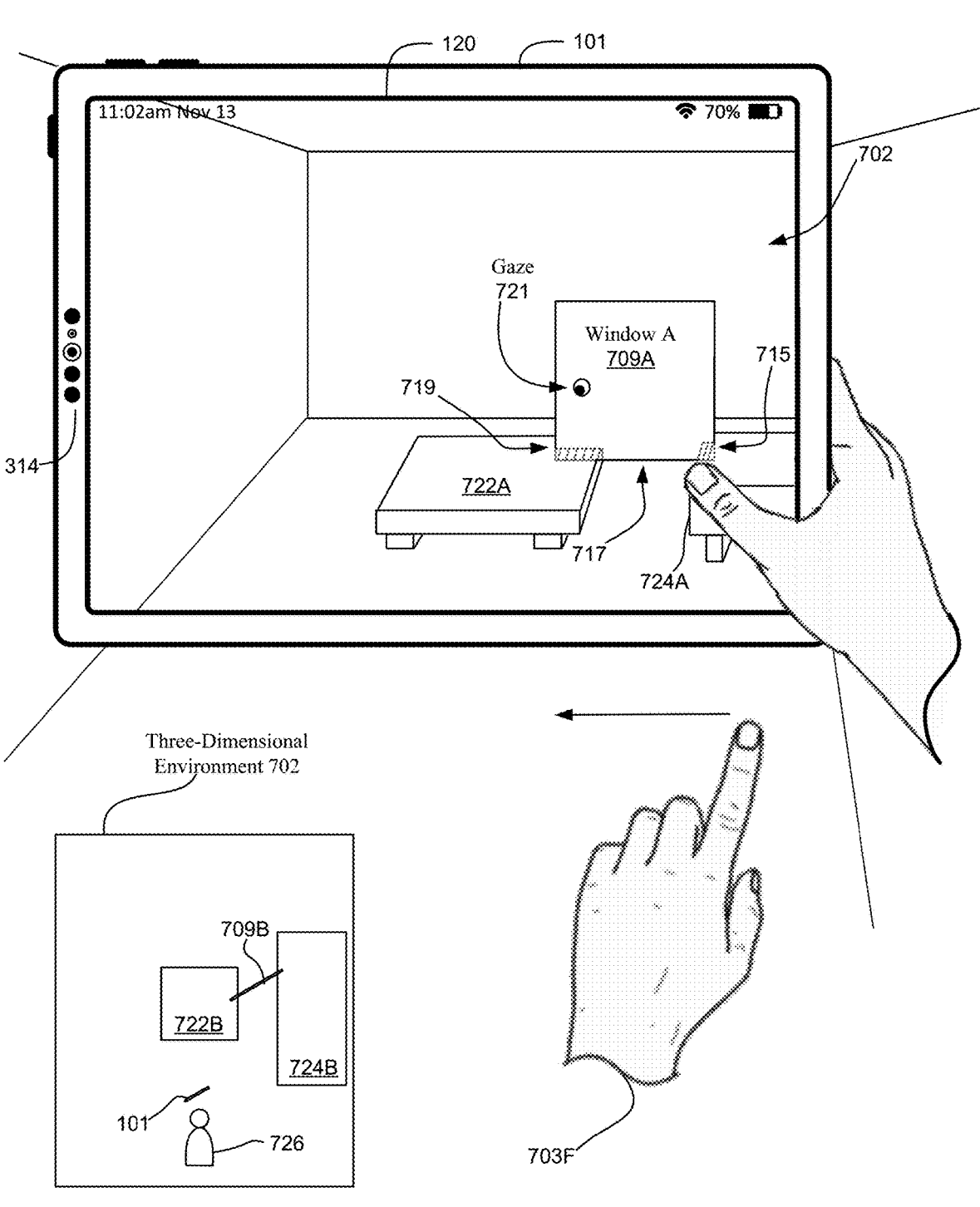

In FIG. 7E, the computer system 101 detects a movement input directed to the virtual object 709*a* in the three-dimensional environment 702. For example, as shown in FIG. 7E, the computer system 101 detects the hand 703*e* of the user 726 provide an air pinch gesture while the attention (e.g., based on gaze 721) is directed to the virtual object 709*a*, followed by movement of the hand 703*e* in a rightward direction while maintaining the pinch hand shape. In some embodiments, as shown in FIG. 7F, in response to detecting the movement input, the computer system 101 moves the virtual object 709*a* within the three-dimensional environment 702 in accordance with the movement of the hand of the user 726. For example, as shown in FIG. 7F, the computer system 101 moves the virtual object 709*a* rightward in the three-dimensional environment 702 based on the movement of the hand 703*e*.

In FIG. 7F, the virtual object 709*a* encounters depth conflicts in the three-dimensional environment 702 as a result of the movement of the virtual object 709*a*. For example, as shown in the overhead view in FIG. 7F, the virtual object 709*b* contacts/intersects with the representation of the table 722*b* and the representation of the sofa 724*b* when the virtual object 709*b* is moved within the three-dimensional environment 702. In some embodiments, as similarly described above, the computer system 101 changes an appearance of portions of the virtual object 709*a* that encounter depth conflicts in the three-dimensional environment 702. For example, as shown in FIG. 7F, the computer system 101 changes the appearance of a first portion 715 of the virtual object 709*a* that has a depth conflict with the representation of the sofa 724*a* and changes the appearance of a second portion 717 of the virtual object 709*a* that has a depth conflict with the representation of the table 722*a* in the three-dimensional environment 702. In some embodiments, the computer system 101 concurrently changes the appearances of the first portion 715 and the second portion 717 of the virtual object 709*a* to resolve or reduce the depth conflicts with the representations of the sofa 724*a* and the table 722*a*, respectively. For example, the computer system 101 changes values of the opacity, brightness, coloration, and/or saturation of the first portion 715 and the second portion 717 of the virtual object 709*a* to occlude portions of the representation of the sofa 724*a* and the representation of the table 722*a* that are spatially conflicting with the virtual object 709*a* in the three-dimensional environment. Additionally, as similarly described above, in some embodiments, the computer system 101 forgoes changing an appearance of a third portion 719 of the virtual object 709*a* that does not have a depth conflict in the three-dimensional environment 702. For example, the computer system 101 maintains display of the third portion 719 of the virtual object 709*a* with the same appearance as that before the virtual object 709*a* is moved within the three-dimensional environment 702 (e.g., such as the appearance of the portions of the virtual object 709*a* that do not have the depth conflict in FIG. 7E).

Figure 7G:
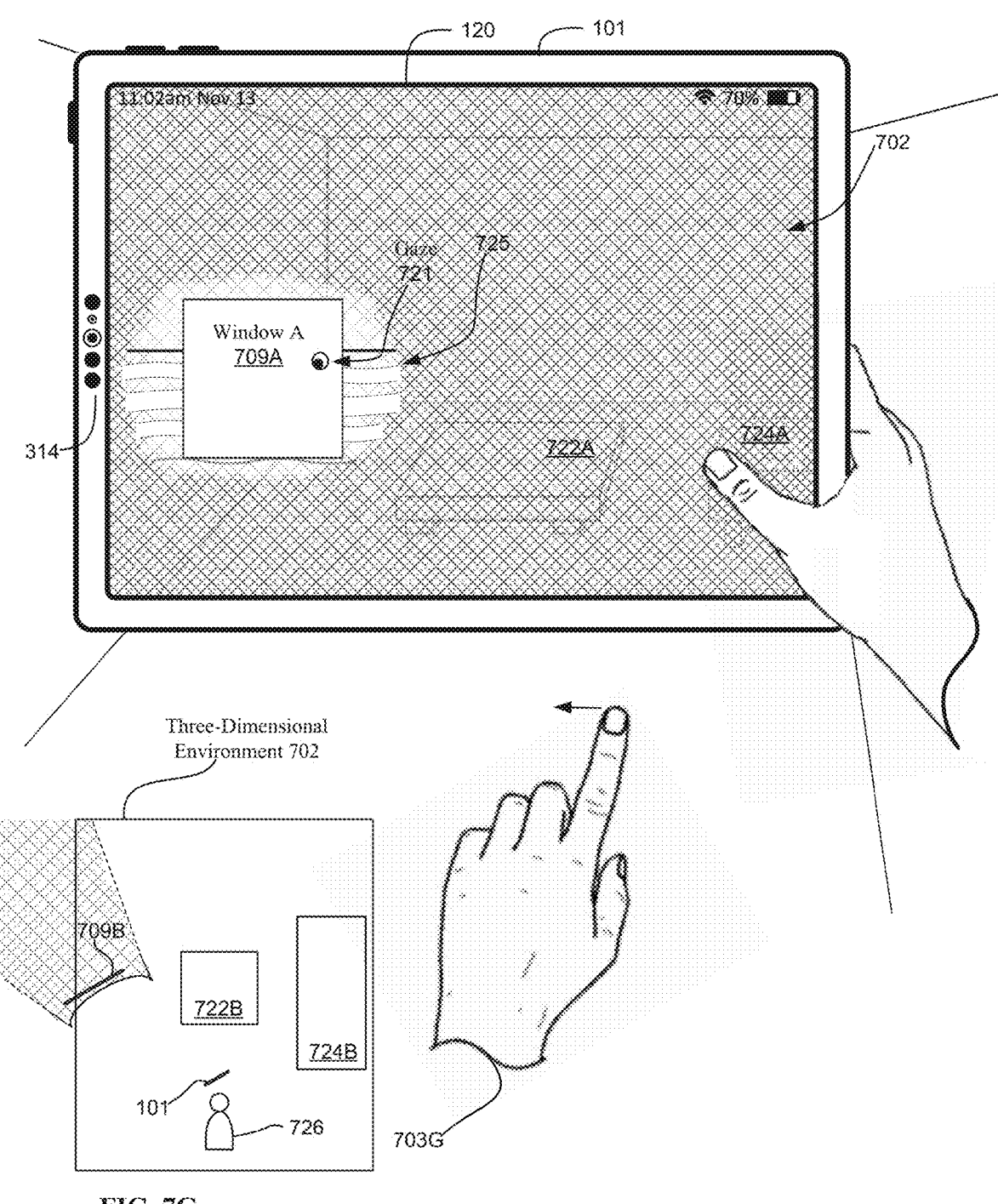

In FIG. 7F, the computer system 101 detects a movement input directed to the virtual object 709*a* in the three-dimensional environment 702. For example, as shown in FIG. 7F, the computer system 101 detects the hand 703*f* of the user 726 provide an air pinch gesture while the attention (e.g., based on gaze 721) is directed to the virtual object 709*a*, followed by movement of the hand 703*f* in a leftward direction while maintaining the pinch hand shape. In some embodiments, as shown in FIG. 7G, in response to detecting the movement input, the computer system 101 moves the virtual object 709*a* within the three-dimensional environment 702 in accordance with the movement of the hand of the user 726. For example, as shown in FIG. 7G, the computer system 101 moves the virtual object 709*a* leftward in the three-dimensional environment 702 based on the movement of the hand 703*f*. In some embodiments, the computer system 101 detects the hand of the user 726 remain in the pinch hand shape after the computer system 101 moves the virtual object 709*a* in the three-dimensional environment 702.

In FIG. 7F, the virtual object 709*a* encounters depth conflicts in the three-dimensional environment 702 as a result of the movement of the virtual object 709*a*. For example, as shown in the overhead view in FIG. 7G, the virtual object 709*b* contacts/intersects with the left side wall of the physical environment surrounding the display generation component 120. In some embodiments, when the virtual object 709*a* encounters the depth conflict with the left side wall of the physical environment in response to the movement of the virtual object 709*a* within the three-dimensional environment 702, the computer system 101 displays a visual indication (e.g., a hint) 725 of a virtual environment within the three-dimensional environment 702, as shown in FIG. 7G. For example, as shown in the overhead view in FIG. 7G, the computer system 101 displays the virtual object 709*b* within the visual indication 725 of the virtual environment, such that the visual indication 725 occludes the portion of the left side wall with which the virtual object 709*a* has the depth conflict in the three-dimensional environment 702. In some embodiments, the visual indication 725 of the virtual environment includes a preview (e.g., one or more portions) of the virtual environment that will be displayed within the three-dimensional environment 702 in response to further input, as described below. In some embodiments, as shown in FIG. 7G, the visual indication 725 of the virtual environment occupies a portion of the three-dimensional environment 720 surrounding the virtual object 709*a*. For example, as shown in FIG. 7G, portions of the virtual environment included in the visual indication 725 extend outward from the edges of the virtual object 709*a* (e.g., with the virtual object 709*a* located at a center of the visual indication 725).

FIG. 7F1 illustrates similar and/or the same concepts as those shown in FIG. 7F (with many of the same reference numbers). It is understood that unless indicated below, elements shown in FIG. 7F1 that have the same reference numbers as elements shown in FIGS. 7A-7P have one or more or all of the same characteristics. FIG. 7F1 includes computer system 101, which includes (or is the same as) display generation component 120. In some embodiments, computer system 101 and display generation component 120 have one or more of the characteristics of computer system 101 shown in FIGS. 7A-7P and display generation component 120 shown in FIGS. 1 and 3, respectively, and in some embodiments, computer system 101 and display generation component 120 shown in FIGS. 7A-7P have one or more of the characteristics of computer system 101 and display generation component 120 shown in FIG. 7F1.

In FIG. 7F1, display generation component 120 includes one or more internal image sensors 314*a* oriented towards the face of the user (e.g., eye tracking cameras 540 described with reference to FIG. 5). In some embodiments, internal image sensors 314*a* are used for eye tracking (e.g., detecting a gaze of the user). Internal image sensors 314*a* are optionally arranged on the left and right portions of display generation component 120 to enable eye tracking of the user's left and right eyes. Display generation component 120 also includes external image sensors 314*b* and 314*c* facing outwards from the user to detect and/or capture the physical environment and/or movements of the user's hands. In some embodiments, image sensors 314*a*, 314*b*, and 314*c* have one or more of the characteristics of image sensors 314 described with reference to FIGS. 7A-7P.

In FIG. 7F1, display generation component 120 is illustrated as displaying content that optionally corresponds to the content that is described as being displayed and/or visible via display generation component 120 with reference to FIGS. 7A-7P. In some embodiments, the content is displayed by a single display (e.g., display 510 of FIG. 5)

included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 7F1.

Display generation component 120 has a field of view (e.g., a field of view captured by external image sensors 314*b* and 314*c* and/or visible to the user via display generation component 120) that corresponds to the content shown in FIG. 7F1. Because display generation component 120 is optionally a head-mounted device, the field of view of display generation component 120 is optionally the same as or similar to the field of view of the user.

In FIG. 7F1, the user is depicted as performing an air pinch gesture (e.g., with hand 703F) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 7A-7P.

In some embodiments, computer system 101 responds to user inputs as described with reference to FIGS. 7A-7P.

In the example of FIG. 7F1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 7A-7P and/or described with reference to the corresponding method(s) are optionally implemented on computer system 101 and display generation unit 120 in a manner similar or analogous to that shown in FIG. 7F1.

In some embodiments, displaying the visual indication 725 of the virtual environment includes changing a lighting effect of the three-dimensional environment 702 surrounding the virtual object 709*a*. For example, as shown in FIG. 7G, the computer system 101 decreases the lighting of the three-dimensional environment 702 surrounding the virtual object 709*a* (e.g., such that the passthrough of the physical environment visible via the display generation component 120 is dimmed/darkened relative to the virtual object 709*a*) when the visual indication 725 is displayed. In some embodiments, the portions of the virtual environment that are included in the visual indication 725 are displayed in the three-dimensional environment 702 with a first amount of opacity. For example, as shown in FIG. 7G, portions of the physical environment behind the virtual object 709*a* and/or visual indication 725 are partially visible through the visual indication 725 from the viewpoint of the user 726.

In FIG. 7G, the computer system 101 detects a movement input directed to the virtual object 709*a* while the visual indication 725 is displayed in the three-dimensional environment 702. For example, as shown in FIG. 7G, the computer system 101 detects the hand 703*g* of the user 726 provide an air pinch gesture while the attention (e.g., based on gaze 721) is directed to the virtual object 709*a*, followed by movement of the hand 703*g* in a leftward direction while maintaining the pinch hand shape. In some embodiments, as shown in FIG. 7H, in response to detecting the movement input, the computer system 101 moves the virtual object 709*a* within the three-dimensional environment 702 in accordance with the movement of the hand of the user 726.

Figure 7H:
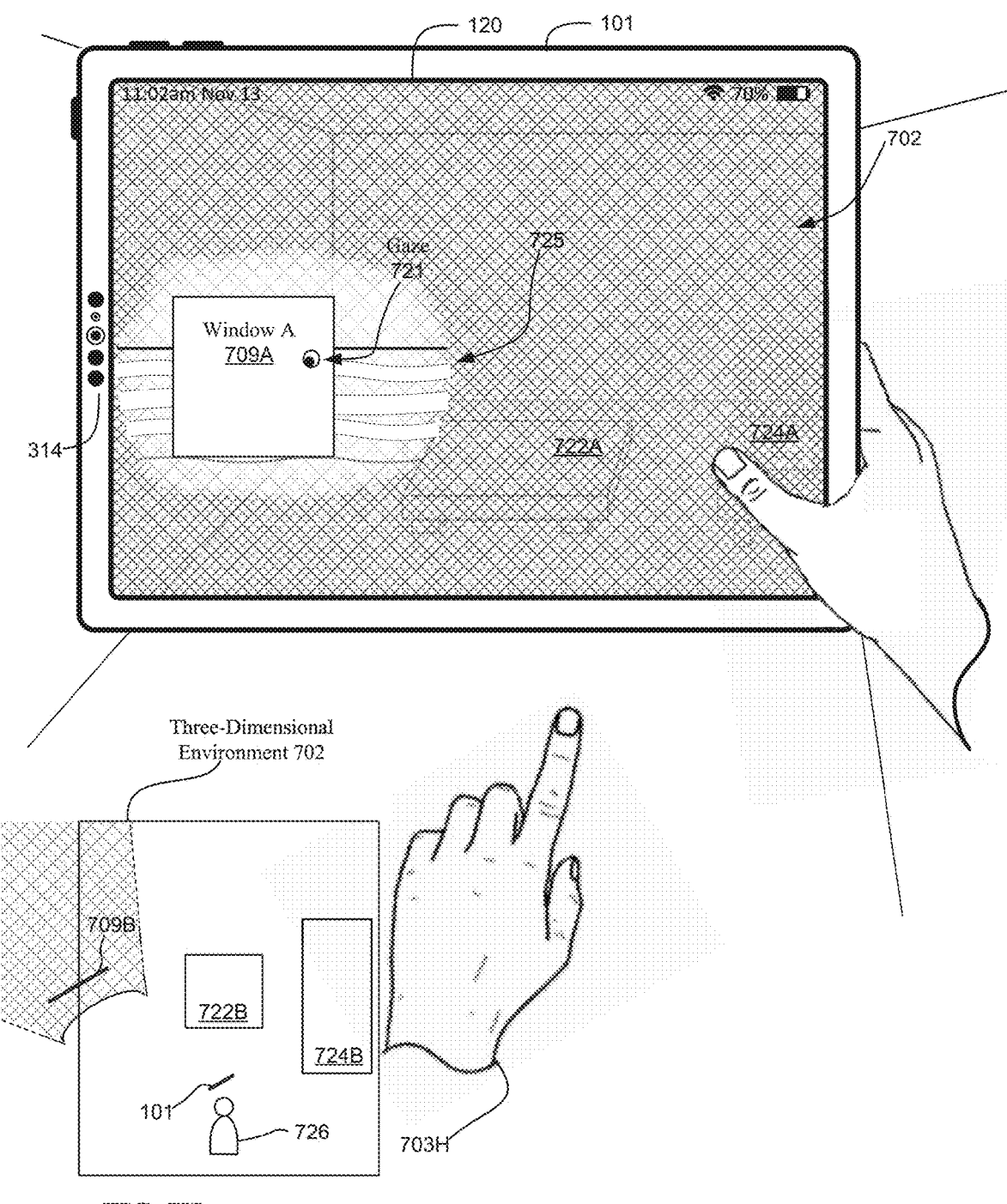

For example, as shown in FIG. 7H, the computer system 101 moves the virtual object 709*a* leftward in the three-dimensional environment 702 based on the movement of the hand 703*g*. In some embodiments, the computer system 101 detects the hand of the user 726 remain in the pinch hand shape after the computer system 101 moves the virtual object 709*a* in the three-dimensional environment 702.

In FIG. 7H, a degree of the depth conflict between the virtual object 709*a* and the left side wall of the physical environment increases as a result of the movement of the virtual object 709*a* in the three-dimensional environment 702. For example, as shown in the overhead view in FIG. 7H, a greater portion of the virtual object 709*b* contacts/ intersects with the left side wall after the virtual object 709*b* is moved within the three-dimensional environment 702. In some embodiments, the computer system 101 increases a size of the visual indication 725 of the virtual environment in response to the increase of the degree of the depth conflict between the virtual object 709*a* and the left side wall of the physical environment. For example, as shown in FIG. 7H, when the portion of the virtual object 709*a* that is contacting/ intersecting with the left side wall increases as a result of the movement of the virtual object 709*a* within the three-dimensional environment 702, the computer system 101 increases the portion of the three-dimensional environment 702 surrounding the virtual object 709*a* that the visual indication 725 occupies. In some embodiments, additional portions of the virtual environment are displayed within the three-dimensional environment 702 when the size of the visual indication 725 is increased, as shown in the overhead view in FIG. 7H. For example, as shown in FIG. 7H, additional portions of the virtual environment included in the visual indication 725 are displayed around the edges of the virtual object 709*a* in the three-dimensional environment 702. Accordingly, the computer system 101 gradually increases the size of the visual indication 725 (e.g., and thus gradually displays additional portions of the virtual environment) in the three-dimensional environment 702 as the degree of the depth conflict increases for the virtual object 709*a* (e.g., in response to movement of the virtual object 709*a* within the three-dimensional environment).

In some embodiments, the computer system 101 restricts movement of the virtual object 709*a* more than a threshold distance (e.g., 0.1, 0.2, 0.5, 1, 2, 3, or 5 m) beyond a detected surface for certain objects in the physical environment surrounding the display generation component 120. For example, in FIG. 7H, if the computer system 101 detects a movement input directed to the virtual object 709*a* (e.g., such as the movement input described above) that includes movement toward the left side wall of the physical environment, which increases the depth conflict between the virtual object 709*a* and the left side wall, the computer system 101 restricts movement of the virtual object 709*a* more than the threshold distance beyond the surface of the left side wall. In some embodiments, restricting movement of the virtual object 709*a* includes ceasing movement of the virtual object 709*a* in the three-dimensional environment 702 when the threshold distance is reached (e.g., irrespective of further input directed to the virtual object 709*a* corresponding to movement of the virtual object 709*a* more than the threshold distance beyond the detected surface).

In some embodiments, if the computer system 101 detects a movement input directed to the virtual object 709*a* (e.g., such as the movement input described above) that includes movement away from the left side wall of the physical environment, the computer system 101 ceases display of the visual indication 725 of the virtual environment in the three-dimensional environment. For example, if the virtual object 709*a* is moved away from the left side wall in response to movement input, such that the virtual object 709*a* no longer has a depth conflict with the left side wall, the computer system 101 ceases display of the visual indication 725 in the three-dimensional environment 702. In some embodiments, the computer system 101 displays the visual indication 725 of the virtual environment in the three-dimensional environment 702 while the hand of the user maintains the air pinch gesture. For example, while the virtual object 709*a* has the depth conflict in the three-dimensional environment 702, the computer system 101 displays the visual indication 725 if the index finger and thumb of the hand of the user 726 that provided the movement input discussed above remain in contact. Additionally, in some embodiments, while the hand of the user maintains the air pinch gesture, the computer system 101 maintains display of the portions of the three-dimensional environment 702 surrounding the visual indication 725 with the dimmed/darkened lighting effect discussed above relative to the visual indication 725. In some embodiments, as discussed below, if the computer system 101 determines that the hand of the user is no longer maintaining the air pinch gesture while the visual indication 725 is displayed, the computer system 101 ceases display of the visual indication 725 in the three-dimensional environment 702. Additionally, in some embodiments, if the computer system 101 determines that the hand of the user is no longer maintaining the air pinch gesture while the visual indication 725 is displayed, the computer system 101 no longer changes the lighting effect of the portions of the three-dimensional environment 702 surrounding the visual indication 725 (e.g., no longer dims/darkens the portions of the three-dimensional environment 702 relative to the visual indication 725).

Figure 7I:
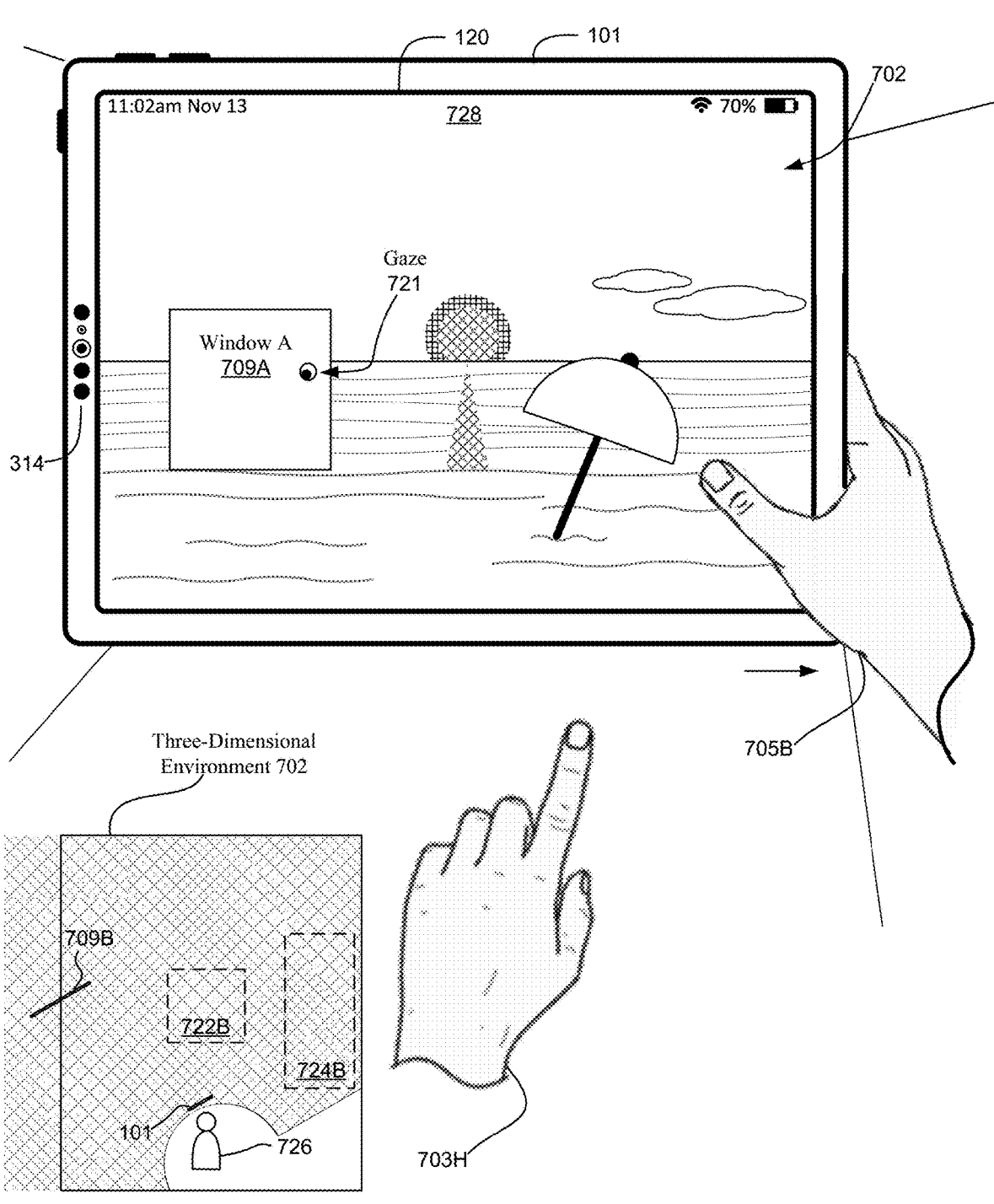

In FIG. 7H, the computer system 101 detects the hand 703*h* release the air pinch gesture while the visual indication 725 of the virtual environment is displayed in the three-dimensional environment 702. For example, the computer system detects that the index finger and thumb of the hand 703*h* separate (e.g., are no longer touching). In some embodiments, in response to detecting the release of the air pinch gesture by hand 703*h*, the computer system 101 displays virtual environment 728 within the three-dimensional environment 702, as shown in FIG. 7I. For example, the computer system 101 replaces display of the visual indication 725 of the virtual environment with the virtual environment 728. In some embodiments, as shown in FIG. 7I, the virtual environment 728 is the virtual environment previewed via the visual indication 725 in FIGS. 7G-7H. For example, as shown in FIG. 7I, the virtual environment 728 includes the portion of the virtual environment displayed in the visual indication 725 in FIG. 7H and additional portions of the virtual environment that were not displayed in the visual indication 725. In some embodiments, displaying the virtual environment 728 includes (optionally displaying an animation of) expanding (e.g., increasing the size of) the visual indication 725 in the three-dimensional environment, such that the portion of the virtual environment 728 included in the visual indication 725 in FIG. 7H expands to occupy a larger portion of the three-dimensional environment 702 from the viewpoint of the user 726. For example, an immersion level of the virtual environment 728, discussed in more detail below, is increased such that the virtual environment 728 occupies a larger portion of the three-dimensional environment 702 from the viewpoint of the user 726. In some embodiments, as shown in FIG. 7I, the virtual environment 728 occupies the portion of the three-dimensional environment 702 (including the physical environment surrounding the display generation component 120) surrounding the virtual object 709*a* from the viewpoint of the user 726. For example, as shown in the overhead view in FIG. 7I, the virtual environment 728 occludes the representation of the table 722*b*, the representation of the sofa 724*b*, and the left side and rear walls of the physical environment in which the display generation component 120 is located.

In some embodiments, as mentioned above, the display of the virtual environment 728 within the three-dimensional environment 702 mitigates the depth conflict between the virtual object 709*a* and the left side wall of the physical environment. For example, as shown in the overhead view in FIG. 7I, the virtual object 709*b* is displayed within the virtual environment 728 in the three-dimensional environment 702, such that portions of the virtual environment 728 surround and extend behind the virtual object 709*b*. Accordingly, the virtual environment 728 optionally occludes the physical environment that is visible via the display generation component 120, including the left side wall with which the virtual object 709*a* has the depth conflict. In some embodiments, the computer system 101 displays the virtual environment 728 with an amount of opacity relative to the three-dimensional environment 702 that causes the portions of the three-dimensional environment 702 (e.g., including the left side wall) surrounding the virtual object 709*b* in the field of the view of the user 726 to no longer be visible relative to the viewpoint of the user 726. For example, as shown in FIG. 7I, the virtual environment 728 is displayed with a greater opacity than the portions of the virtual environment included in the visual indication 725 in FIGS. 7G-7H discussed above. Therefore, in some embodiments, display of the virtual environment 728 within the three-dimensional environment 702 resolves or reduces the depth conflict for the virtual object 709*a* in the three-dimensional environment 702.

In some embodiments, the virtual environment 728 is a system environment selected for display by the user 726. For example, as shown in FIG. 7I, the virtual environment 728 corresponds to a beach environment during sunset. In some embodiments, the beach environment shown in FIG. 7I was selected for display by the user 726 before display of the virtual environment 728 (e.g., in FIG. 7B). For example, the beach environment is selected from a library of virtual environments prior to detecting the input for displaying and/or moving the virtual object 709*a* in the three-dimensional environment 702 (and/or prior to detecting the input for displaying the visual indication 725 in FIG. 7G). Accordingly, in FIG. 7I, the virtual environment 728 is displayed within the three-dimensional environment 702 without detecting input selecting the virtual environment 728 for display. It should be understood that the virtual environment 728 illustrated in FIG. 7I is exemplary and that, in some embodiments, an alternative virtual environment is displayed within the three-dimensional environment 702 in the manner discussed above.

In some embodiments, the computer system 101 displays the virtual environment 728 within the three-dimensional environment 702 to mitigate the depth conflict in the three-dimensional environment 702 in accordance with a determination that a second set of criteria is satisfied. For example, the second set of criteria is different from the first set of criteria discussed previously above. In some embodiments, the second set of criteria includes a criterion that is satisfied when the object with which the virtual object 709*a* has the depth conflict is a second type of object different from the first type of object described above with reference to the first set of criteria. In some embodiments, objects of the second type include stationary, non-movable objects and/or objects that define the space of the physical environment surrounding the display generation component 120 (e.g., such as a wall, a window, a cabinet, and/or a floor). For example, as discussed above, the virtual object 709*a* has the depth conflict with the left side wall of the physical environment surrounding the display generation component 120. Accordingly, in FIG. 7I, the second set of criteria is optionally satisfied because the virtual object 709*a* has the depth conflict with the left side wall, which is an object of the second type. In some embodiments, if the second set of criteria is not satisfied, the computer system 101 forgoes displaying the virtual environment 728 within the three-dimensional environment 702 to resolve or reduce a depth conflict in the three-dimensional environment 702 (e.g., and instead changes an appearance of a portion of the virtual object 709*a* that has the depth conflict, as described above with reference to FIG. 7C).

In FIG. 7I, the computer system 101 detects movement of the viewpoint of the user 726 while the virtual environment 728 is displayed within the three-dimensional environment 702. For example, as shown in FIG. 7I, the computer system 101 detects hand 705*b* that is holding the computer system 101 move in a rightward direction (e.g., a clockwise direction about the body of the user 726). In some embodiments, as described below, movement of the viewpoint of the user 726 causes the portion of the three-dimensional environment 702 that is displayed in the field of view of the user 726 to change in accordance with the movement of the viewpoint. In some embodiments, the input for changing the viewpoint of the user 726 corresponds to a movement of the head of the user 726 in the physical environment (e.g., movement of the head-mounted display worn by the user 726 in the physical environment).

Figure 7J:
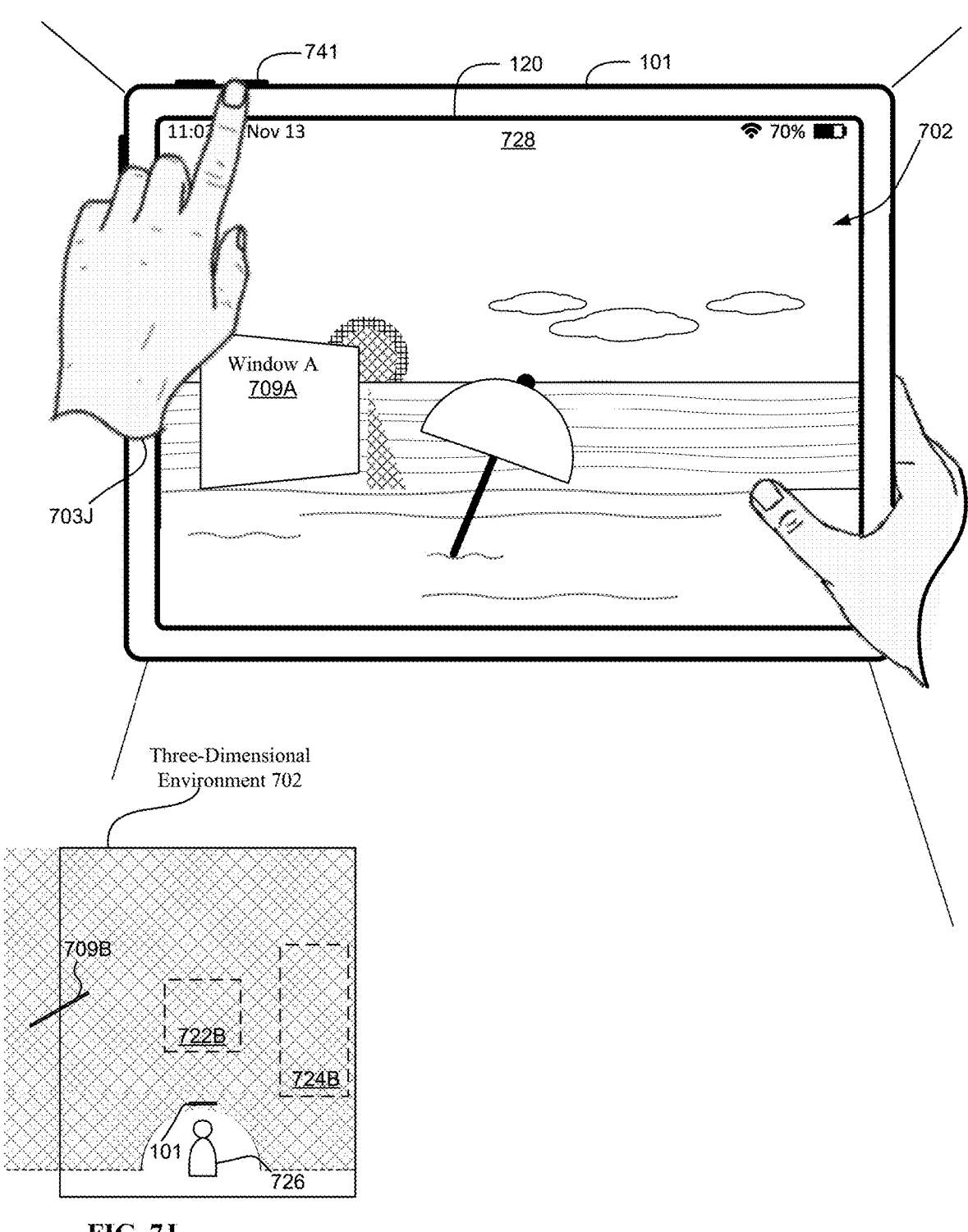

In some embodiments, as shown in FIG. 7J, in response to detecting movement of the hand 705*b* in FIG. 7I, the computer system 101 updates display of the three-dimensional environment 702 relative to the new viewpoint of the user 726 in accordance with the movement. For example, as shown in FIG. 7J, the movement of the viewpoint of the user 726 causes the virtual object 709*a* to be viewable from a different angle in accordance with the movement of the viewpoint (e.g., such that the front-facing surface/portion of the virtual object 709*a* is angled rightward relative to the new viewpoint of the user 726). Additionally, in some embodiments, the computer system 101 updates display of the virtual environment 728 within the three-dimensional environment 702. For example, as shown in FIG. 7J, the computer system 101 optionally displays additional portions of the virtual environment 728 (e.g., portions of the virtual environment 728 to the right of those displayed prior to the movement of the viewpoint of the user 726 in FIG. 7I) relative to the new viewpoint of the user 726 in the overhead view.

In some embodiments, as shown in FIG. 7J, the computer system 101 maintains display of the virtual environment 728 within the three-dimensional environment 702 when the viewpoint of the user 726 changes, as similarly discussed above. For example, as discussed above, the virtual environment 728 is displayed within the three-dimensional environment 702 to mitigate the depth conflict between the virtual object 709*a* and the left side wall of the physical environment surrounding the display generation component 120. In FIG. 7H, the computer system 101 detects the movement of the viewpoint of the user 726 while the virtual object 709a is still contacting the left side wall. Accordingly, when the viewpoint of the user 726 is moved, the virtual object 709a optionally still has the depth conflict with the left side wall, causing the computer system 101 to maintain display of the virtual environment 728 within the three-dimensional environment 702.

Referring back to FIG. 7E, in some embodiments, while the virtual object 709a has the depth conflict with the representation of the table 722a, movement of the viewpoint of the user 726 causes the computer system 101 to change the manner in which the depth conflict is resolved in the three-dimensional environment 702. For example, as discussed above with reference to FIG. 7E, the computer system 101 changes (e.g., increases) values of the opacity and/or brightness of the first portion 711 of the virtual object 709a to mitigate the increased depth conflict between the virtual object 709a and the representation of the table 722a from the new viewpoint of the user 726. In FIG. 7J, however, the computer system 101 does not change the manner in which the depth conflict is resolved in the three-dimensional environment 702. For example, as similarly discussed above, if the movement of the viewpoint of the user 726 causes the degree of the depth conflict between the virtual object 709a and the left side wall to increase relative to the new viewpoint of the user 726, the computer system 101 maintains display of the virtual environment 728 within the three-dimensional environment 702 and forgoes changing an appearance of the portion of the virtual object 709a that has the depth conflict with the left side wall. Accordingly, as outlined above, while the virtual object 709a has a depth conflict in the three-dimensional environment 702, if the computer system 101 detects movement of the viewpoint of the user 726 while displaying a portion of the virtual object 709a with a changed appearance, the computer system 101 optionally further changes the appearance of the portion of the virtual object 709a in the three-dimensional environment 702, and if the computer system detects movement of the viewpoint of the user 726 while displaying a virtual environment within the three-dimensional environment 702, the computer system 101 optionally maintains display of the virtual environment (e.g., without changing an appearance of the virtual object 709a).

In FIG. 7J, the computer system 101 detects an input corresponding to a request to change an immersion level of the virtual environment 728 within the three-dimensional environment 702. For example, as shown in FIG. 7J, the computer system 101 detects selection of physical button 741 of the computer system 101 provided by hand 703j. In some embodiments, the selection of the physical button 741 includes one or more presses of the physical button 741. In some embodiments, the selection of the physical button 741 includes a press and hold of the physical button 741. In some embodiments, the selection of the physical button 741 includes a scroll/swipe of the physical button 741. For example, the computer system 101 detects rotation of the physical button 741 (e.g., in a respective direction with a respective magnitude), which is optionally a rotatable input mechanism. In some embodiments, if the rotation of the physical button 741 is in a first direction (e.g., clockwise), the computer system 101 increases the immersion level of the virtual environment 728, and if the rotation of the physical button 741 is in a second direction (e.g., counter-clockwise), opposite the first direction, the computer system decreases the immersion level of the virtual environment 728. In some embodiments, as discussed below, the immersion level of the virtual environment 728 controls an amount (e.g., a percentage) of the three-dimensional environment 702 in the field of view of the user 726 that is occluded by the virtual environment 728 relative to the viewpoint of the user 726.

Figure 7K:
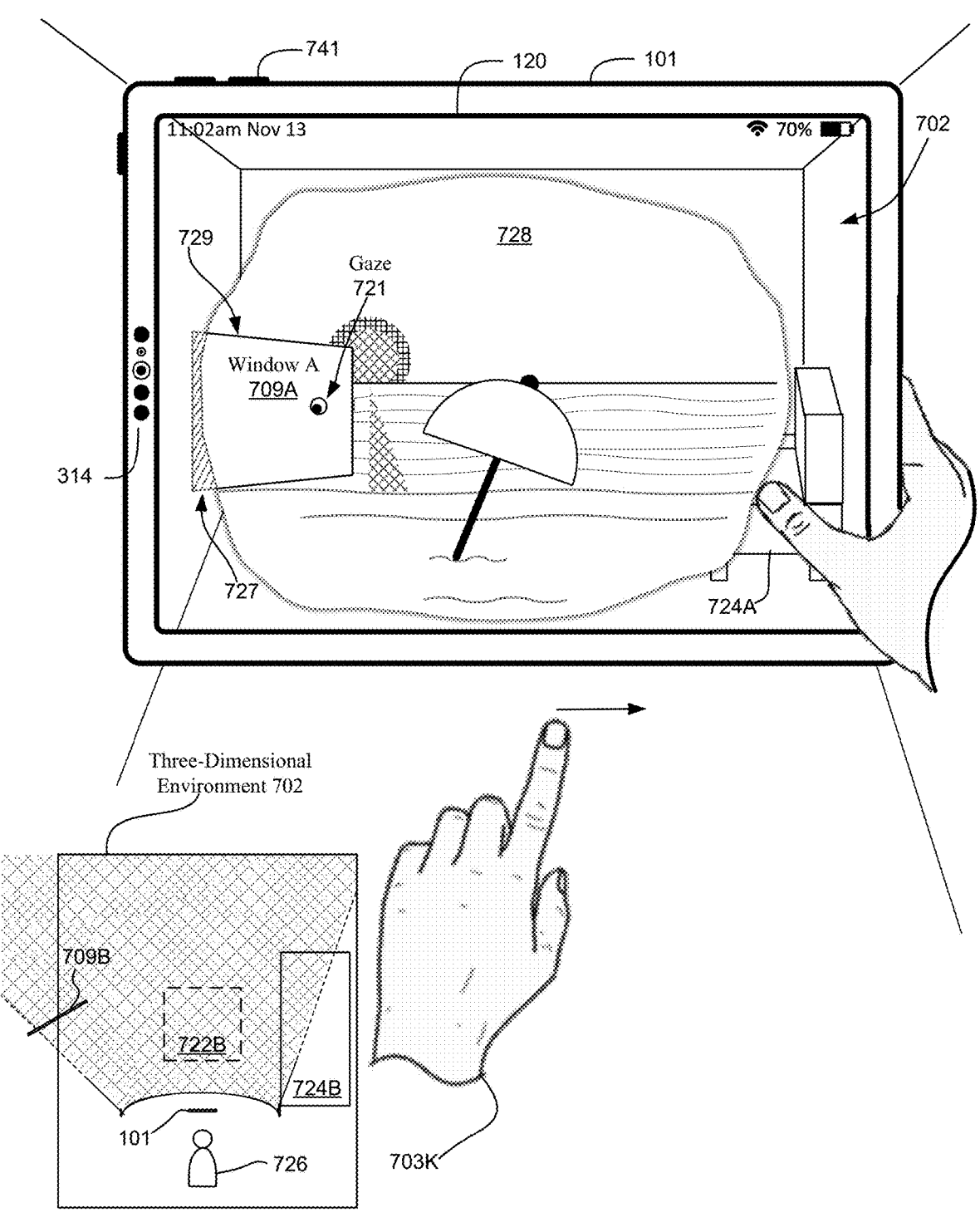

In some embodiments, in response to detecting the selection of the physical button 741 provided by the hand 703j, the computer system 101 changes the immersion level of the virtual environment 728 within the three-dimensional environment 702, as shown in FIG. 7K. For example, as shown in FIG. 7K, the computer system 101 decreases the immersion level of the virtual environment 728 in accordance with the input (e.g., based on a number of presses or a duration of the press and/or scroll of the physical button 741). As shown in FIG. 7K, decreasing the immersion level of the virtual environment 728 optionally includes decreasing the amount of the three-dimensional environment 702 in the field of view of the user 726 that is occluded by the virtual environment 728 relative to the viewpoint of the user 726. For example, as shown in the overhead view in FIG. 7K, the virtual environment 728 occludes a smaller portion of the three-dimensional environment 702 relative to the viewpoint of the user 726, such that portions of the three-dimensional environment 702 corresponding to the physical environment are visible again via the display generation component 120. As shown in FIG. 7K, portions of the physical environment surrounding the display generation component 120 are optionally visible via the display generation component 120 (e.g., portions of the representation of the sofa 724a are redisplayed in the three-dimensional environment 702). Additional details regarding the immersion level of the virtual environment 728 are given below with reference to method 900.

In some embodiments, decreasing the immersion level of the virtual environment 728 within the three-dimensional environment 702 causes at least a portion of the virtual object 709a to no longer be displayed within the virtual environment 728. For example, as shown in FIG. 7K, the computer system 101 does not move the virtual object 709a in the three-dimensional environment 702 when the immersion level of the virtual environment 728 is decreased. Accordingly, as shown in the overhead view in FIG. 7K, a portion of the virtual object 709b is no longer displayed within the virtual environment 728 in the three-dimensional environment 702 when the immersion level of the virtual environment 728 is decreased. In some embodiments, the virtual object 709a encounters a depth conflict in the three-dimensional environment 702 (and/or causes the depth conflict to become visible relative to the viewpoint of the user 726) when the immersion level of the virtual environment 728 is decreased. For example, as shown in the overhead view in FIG. 7K, the portion of the virtual object 709b that is no longer displayed in the virtual environment 728 contacts/intersects with the left side wall in the physical environment (e.g., the contact between the portion of the virtual object 709b and the left side wall becomes visible relative to the viewpoint of the user) when the immersion level of the virtual environment 728 is decreased (e.g., because the virtual environment 728 is no longer occluding the left side wall behind the portion of the virtual object 709b).

In some embodiments, the computer system 101 changes an appearance of the portion of the virtual object 709a that has the depth conflict with the left side wall of the physical environment to mitigate the depth conflict in the three-dimensional environment 702. For example, as shown in FIG. 7K, when a first portion 727 of the virtual object 709a encounters the depth conflict with the left side wall due to the decrease in immersion level of the virtual environment

728, the computer system 101 changes the appearance of the first portion 727 of the virtual object 709*a*. As previously described above with reference to FIG. 7C, the computer system 101 optionally changes values of opacity, brightness, coloration, and/or saturation of the first portion 727 of the virtual object 709*a* in the three-dimensional environment 702 to occlude the portion of the left side wall with which the virtual object 709*a* has the depth conflict. Additionally, as previously described above, in some embodiments, the computer system 101 forgoes changing the appearance of a second portion 729 of the virtual object 709*a* that does not have a depth conflict in the three-dimensional environment 702. For example, as shown in FIG. 7K, the computer system 101 does not change the appearance of the second portion 729 of the virtual object 709*a* that is still displayed in the virtual environment 728 (and thus does not have the depth conflict with the left side wall in the three-dimensional environment) when the immersion level of the virtual environment 728 is decreased.

Figure 7L:
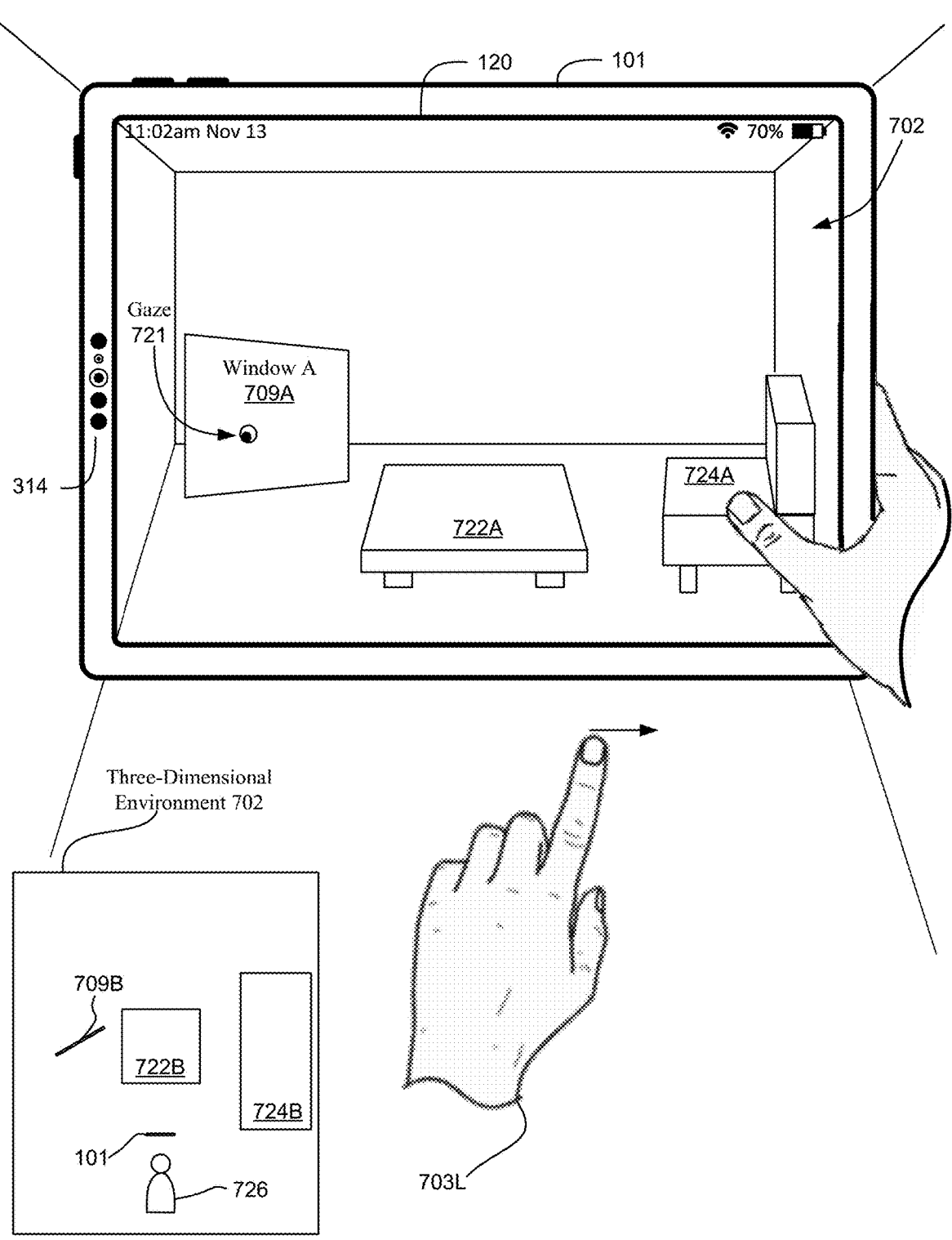

In FIG. 7K, the computer system 101 detects a movement input directed to the virtual object 709*a* in the three-dimensional environment 702 while the virtual object 709*a* has the depth conflict with the left side wall of the physical environment. For example, as shown in FIG. 7K, the computer system 101 detects the hand 703*k* of the user 726 provide an air pinch gesture while the attention (e.g., based on gaze 721) of the user 726 is directed to the virtual object 709*a*, followed by movement of the hand 703*k* in a rightward direction while maintaining the pinch hand shape. In some embodiments, as shown in FIG. 7L, in response to detecting the movement input, the computer system 101 moves the virtual object 709*a* within the three-dimensional environment 702 in accordance with the movement of the hand of the user 726. For example, as shown in FIG. 7L, the computer system 101 moves the virtual object 709*a* rightward in the three-dimensional environment 702 based on the movement of the hand 703*k*.

In some embodiments, as shown in FIG. 7L, if the computer system 101 determines that movement of the virtual object 709*a* within the three-dimensional environment 702 resolves or reduces the depth conflict in the three-dimensional environment 702, the computer system 101 no longer mitigates the depth conflict in the manner(s) described above. For example, as shown in FIG. 7L, the movement of the virtual object 709*a* within the three-dimensional environment 702 causes the virtual object 709*a* to no longer have the depth conflict with the left side wall of the physical environment surrounding the display generation component 120. Additionally, as shown in the overhead view in FIG. 7L, the virtual object 709*b* is displayed at a location in the three-dimensional environment 702 that does not at least partially contact or intersect with any objects in the three-dimensional environment 702. Accordingly, in some embodiments, the computer system 101 adjusts (e.g., reverses) the change in appearance of the portion of the virtual object 709*a* that had the depth conflict in the three-dimensional environment 702 prior to the movement of the virtual object 709*a*. For example, as shown in FIG. 7L, the computer system 101 redisplays the first portion (e.g., 727 in FIG. 7K) of the virtual object 709*a* with the original values of opacity, brightness, coloration, and/or saturation because the first portion of the virtual object 709*a* no longer has the depth conflict with the left side wall of the physical environment.

Additionally, in some embodiments, the computer system 101 ceases display of the virtual environment 728 within the three-dimensional environment 702, as shown in FIG. 7L.

For example, as shown in FIG. 7L, because the virtual object 709*a* no longer has a depth conflict with any portion of the three-dimensional environment 702 (e.g., the left side wall of the physical environment) after the movement of the virtual object 709*a*, the computer system 101 ceases displaying the virtual environment 728, such that the virtual object 709*a* is no longer displayed in the virtual environment 728.

Figure 7M:
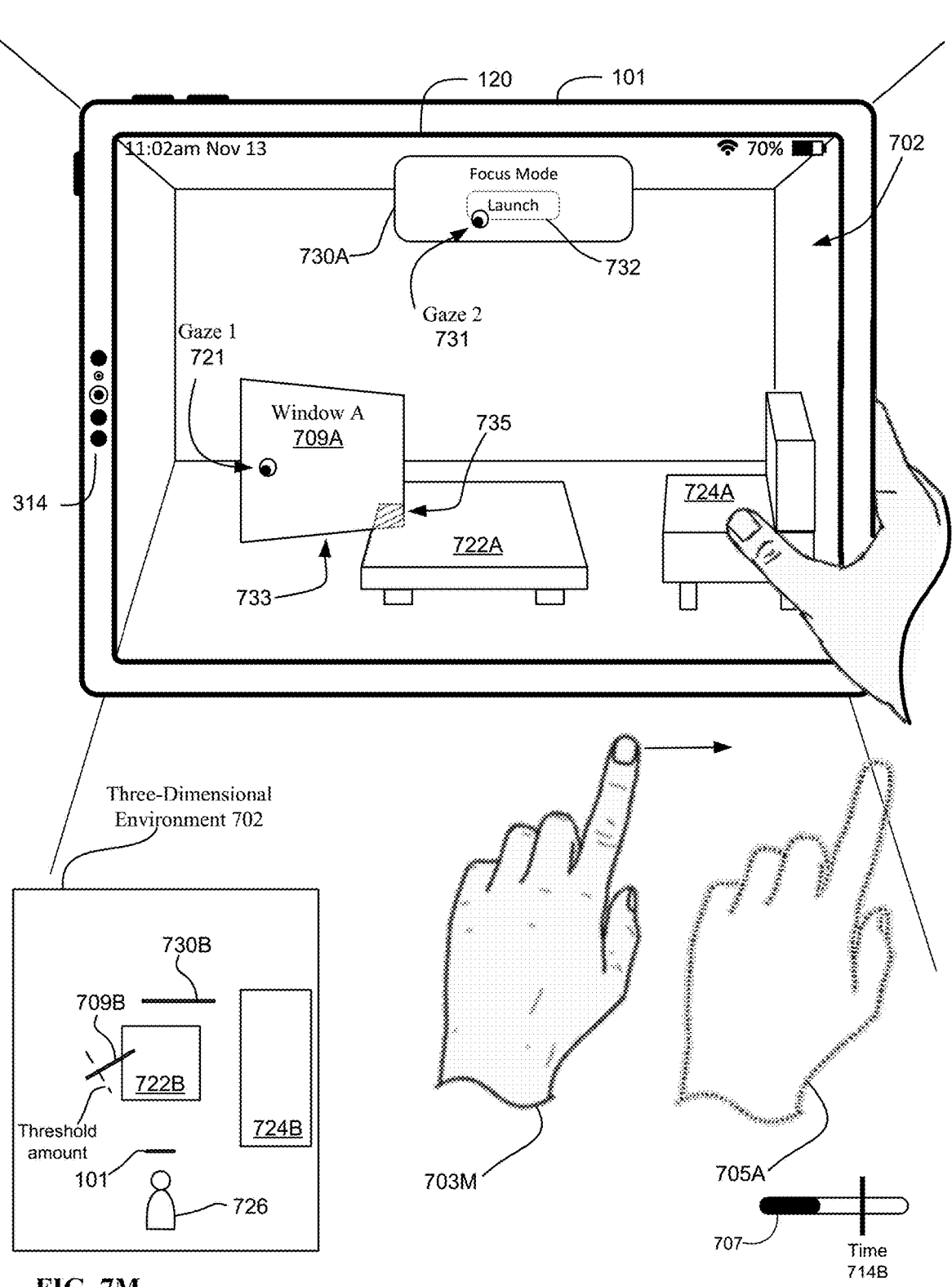

In FIG. 7L, the computer system 101 detects a movement input directed to the virtual object 709*a* in the three-dimensional environment 702. For example, as shown in FIG. 7L, the computer system 101 detects the hand 703*l* of the user 726 provide an air pinch gesture while the attention (e.g., based on gaze 721) of the user 726 is directed to the virtual object 709*a*, followed by movement of the hand 703*l* in a rightward direction while maintaining the pinch hand shape. In some embodiments, as shown in FIG. 7M, in response to detecting the movement input, the computer system 101 moves the virtual object 709*a* within the three-dimensional environment 702 in accordance with the movement of the hand of the user 726. For example, as shown in FIG. 7M, the computer system 101 moves the virtual object 709*a* rightward in the three-dimensional environment 702 based on the movement of the hand 703*l*.

In FIG. 7M, the virtual object 709*a* encounters a depth conflict in the three-dimensional environment 702 as a result of the movement of the virtual object 709*a*. For example, as shown in the overhead view in FIG. 7M, the virtual object 709*b* contacts/intersects with the representation of the table 722*b* when the virtual object 709*b* is moved within the three-dimensional environment 702. In some embodiments, as similarly described above, the computer system 101 changes an appearance of a portion of the virtual object 709*a* that encounters the depth conflict in the three-dimensional environment 702. For example, as shown in FIG. 7M, the computer system 101 changes the appearance of a first portion 735 of the virtual object 709*a* that has a depth conflict with the representation of the table 722*a* in the three-dimensional environment 702. For example, the computer system 101 changes values of the opacity, brightness, coloration, and/or saturation of the first portion 735 of the virtual object 709*a* to occlude a portion of the representation of the table 722*a* that is spatially conflicting with the virtual object 709*a* in the three-dimensional environment 702. Additionally, as similarly described above, in some embodiments, the computer system 101 forgoes changing an appearance of a second portion 733 of the virtual object 709*a* that does not have a depth conflict in the three-dimensional environment 702. For example, the computer system 101 maintains display of the second portion 733 of the virtual object 709*a* with the same appearance as that before the virtual object 709*a* is moved within the three-dimensional environment 702 (e.g., such as the appearance of the virtual object 709*a* in FIG. 7L). Additionally, in FIG. 7M, the second portion 733 of the virtual object 709*a* that has the depth conflict with the representation of the table 722*a* is optionally different from the portions of the virtual object 709*a* that had depth conflicts before the movement of the virtual object 709*a* (e.g., portion 727 in FIG. 7K and/or portion 711 in FIG. 7C).

In some embodiments, activation of a focus mode at the computer system 101 mitigates the depth conflict between the virtual object 709*a* and the representation of the table 722*a* in the three-dimensional environment 702. In some embodiments, as described in more detail below, when the focus mode is activated at the computer system 101, the virtual object 709*a* is displayed with visual prominence relative to the portions of the three-dimensional environment 702 surrounding the virtual object 709a relative to the viewpoint of the user 726. Additional details regarding the focus mode are given below with reference to method 800. In FIG. 7M, the computer system 101 detects an input corresponding to a request to activate the focus mode at the computer system 101. For example, in FIG. 7M, the computer system 101 detects the attention (e.g., based on gaze 721) directed toward the virtual object 709a in the three-dimensional environment 702. In some embodiments, the computer system 101 activates the focus mode if the attention of the user is directed toward the virtual object 709a for a threshold amount of time (e.g., 0.5, 1, 1.5, 2, 3, 5, 10, or 12 seconds), as indicated by time marker 714b in timeline 707 in FIG. 7M. Alternatively, as shown in FIG. 7M, the computer system 101 detects a selection input (e.g., an air pinch gesture, air tap gesture, button press, or other selection input) provided by hand 705a directed to selectable option 732 in user interface object 730a (e.g., while a second gaze 731 of the user is directed to the selectable option 732). In some embodiments, the selectable option 732 is selectable to cause the computer system 101 to activate the focus mode. It should be understood that while multiple gaze points are illustrated in FIG. 7M, such gaze points need not be detected by computer system 101 concurrently; rather, in some embodiments, computer system 101 independently responds to the gaze points illustrated and described in response to detecting such gaze points independently.

Additionally or alternatively, in FIG. 7M, the computer system 101 detects a movement input directed to the virtual object 709a in the three-dimensional environment 702 while the virtual object has the depth conflict with the representation of the table 722a. For example, as shown in FIG. 7M, the computer system 101 detects the hand 703m of the user 726 provide an air pinch gesture while the attention (e.g., based on gaze 721) of the user 726 is directed to the virtual object 709a, followed by movement of the hand 703m in a rightward direction while maintaining the pinch hand shape. As shown in the overhead view in FIG. 7M, the computer system 101 detects the movement input provided by the hand 703m while less than a threshold amount (e.g., discussed previously above) of the virtual object 709b has the depth conflict with the representation of the table 722b in the three-dimensional environment 702. It should be understood that while multiple hands and corresponding inputs are illustrated in FIG. 7M, such hands and inputs need not be detected by computer system 101 concurrently; rather, in some embodiments, computer system 101 independently responds to the hands and/or inputs illustrated and described in response to detecting such hands and/or inputs independently.

Figure 7N:
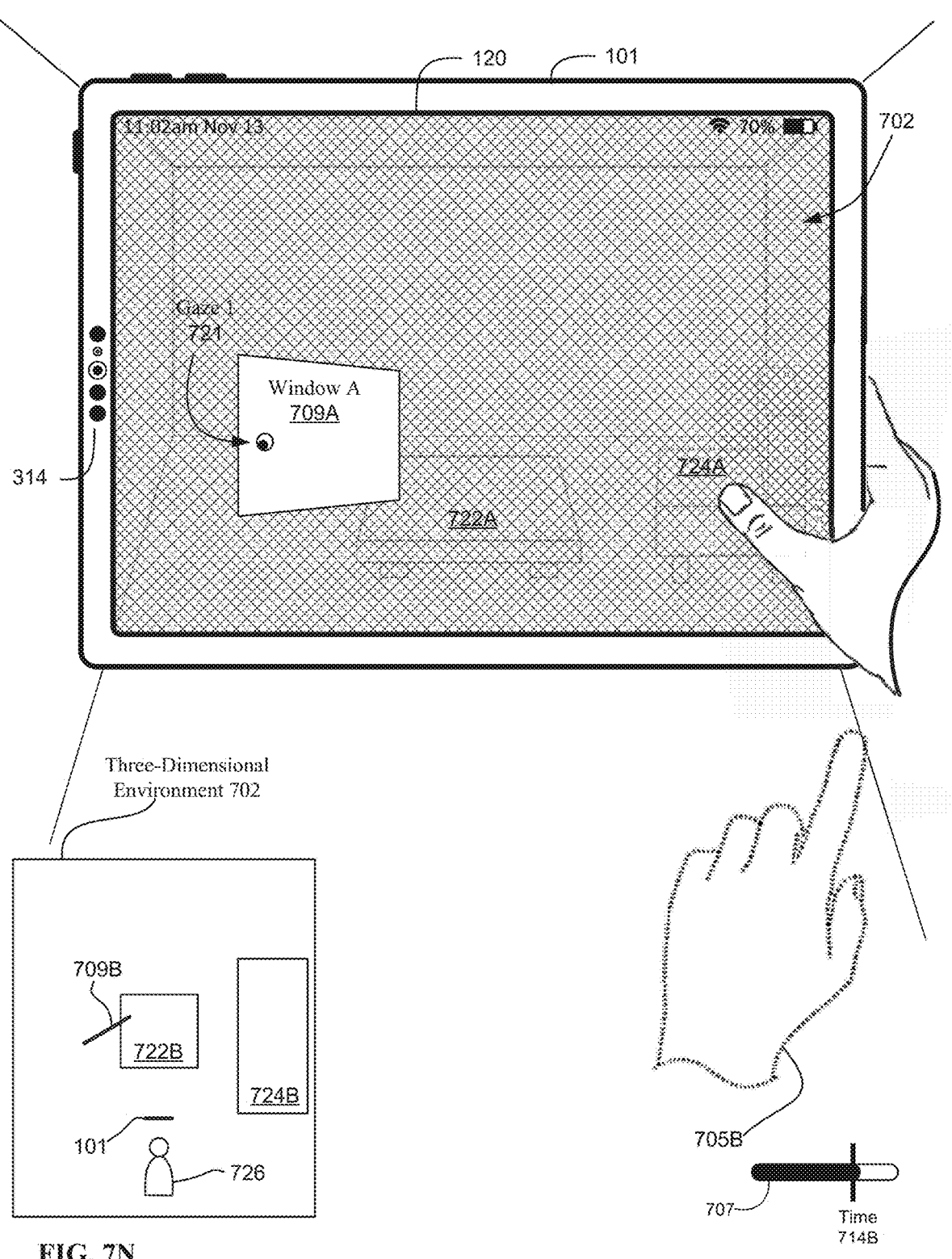

In some embodiments, in response to detecting the input corresponding to the request to activate the focus mode at the computer system 101, the computer system 101 activates the focus mode for the virtual object 709a, as shown in FIG. 7N. For example, as shown in FIG. 7N, in response to detecting the attention of the user directed to the virtual object 709a for the threshold amount of time, as indicated by timeline 707, and/or detecting the selection of the selectable option 732 in FIG. 7M, the computer system 101 displays the virtual object 709a with visual prominence relative to the three-dimensional environment 702. In some embodiments, as shown in FIG. 7N, the computer system 101 dims/darkens the portions of the three-dimensional environment 702 surrounding the virtual object 709a relative to the viewpoint of the user 726 when the focus mode is activated. In some embodiments, the darkening/dimming of the portions of the three-dimensional environment 702 surrounding the virtual object 709a mitigates the depth conflict between the virtual object 709a and the representation of the table 722a in the three-dimensional environment 702. For example, as shown in FIG. 7N, the darkening/dimming of the portions of the three-dimensional environment 702 surrounding the virtual object 709a causes the representation of the table 722a to become visually discreet relative to the virtual object 709a, such that the representation of the table 722a appears to no longer contact/intersect with the virtual object 709a in the three-dimensional environment relative to the viewpoint of the user 726.

In some embodiments, when the focus mode is activated at the computer system 101, the computer system 101 adjusts (e.g., reverses) the change in appearance of the portion of the virtual object 709a that has the depth conflict in the three-dimensional environment 702, as shown in FIG. 7N. For example, as shown in FIG. 7N, because activation of the focus mode causes the representation of the table 722a to appear to no longer visually contact/intersect with the virtual object 709a and/or reduces a visual prominence of the contact/intersection between the representation of the table 722a and the virtual object 709a in the three-dimensional environment 702, the computer system 101 redisplays the first portion (e.g., 735 in FIG. 7M) of the virtual object 709a with the values of opacity, brightness, coloration, and/or saturation that the virtual object 709a had prior to the movement of the virtual object 709a (e.g., the appearance of the virtual object 709a in FIG. 7L).

In some embodiments, the computer system 101 deactivates the focus mode in response to detecting the attention of the user 726 is no longer directed toward the virtual object 709a in the three-dimensional environment 702. For example, if the computer system 101 detects the attention (e.g., based on gaze 721) of the user 726 in FIG. 7N move away from virtual object 709a (e.g., to a location in the three-dimensional environment 702 that is outside the virtual object 709a), the computer system 101 deactivates the focus mode. In some embodiments, when the focus mode is deactivated, the computer system 101 reverses the darkening/dimming effect applied to the portions of the three-dimensional environment 702 surrounding the virtual object 709a relative to the viewpoint of the user 726. For example, the computer system 101 redisplays the portions of the three-dimensional environment 702 surrounding the virtual object 709a with the lighting shown in FIG. 7M. Additionally, in some embodiments, if the deactivation of the focus mode causes the virtual object 709a to encounter a depth conflict with a portion of the three-dimensional environment 702 (e.g., such as the representation of the table 722a), the computer system 101 changes the appearance of the portion of the virtual object 709a that has the depth conflict, as shown previously in FIG. 7M, to mitigate the depth conflict, as discussed above.

Figure 7O:
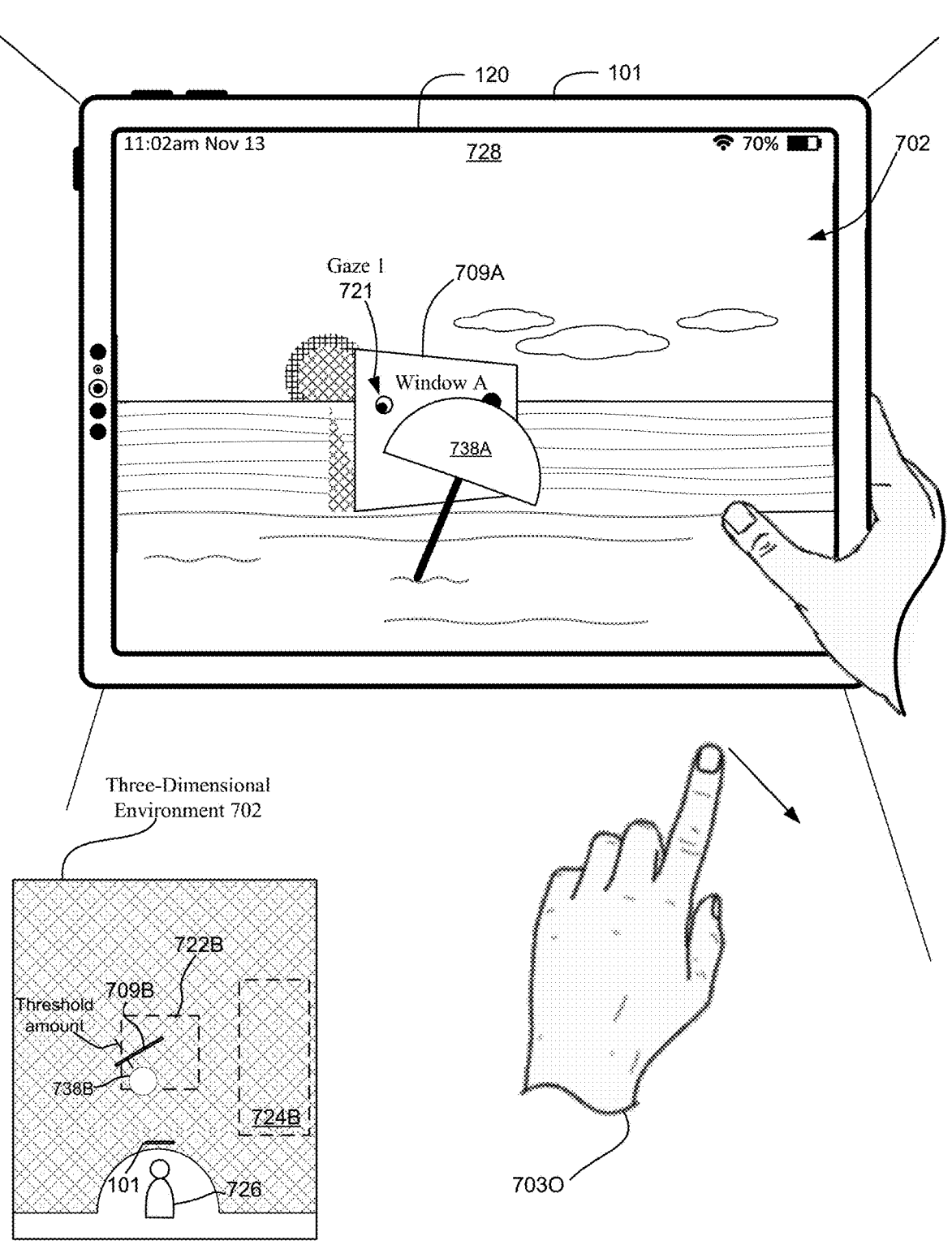
Figure 7P:
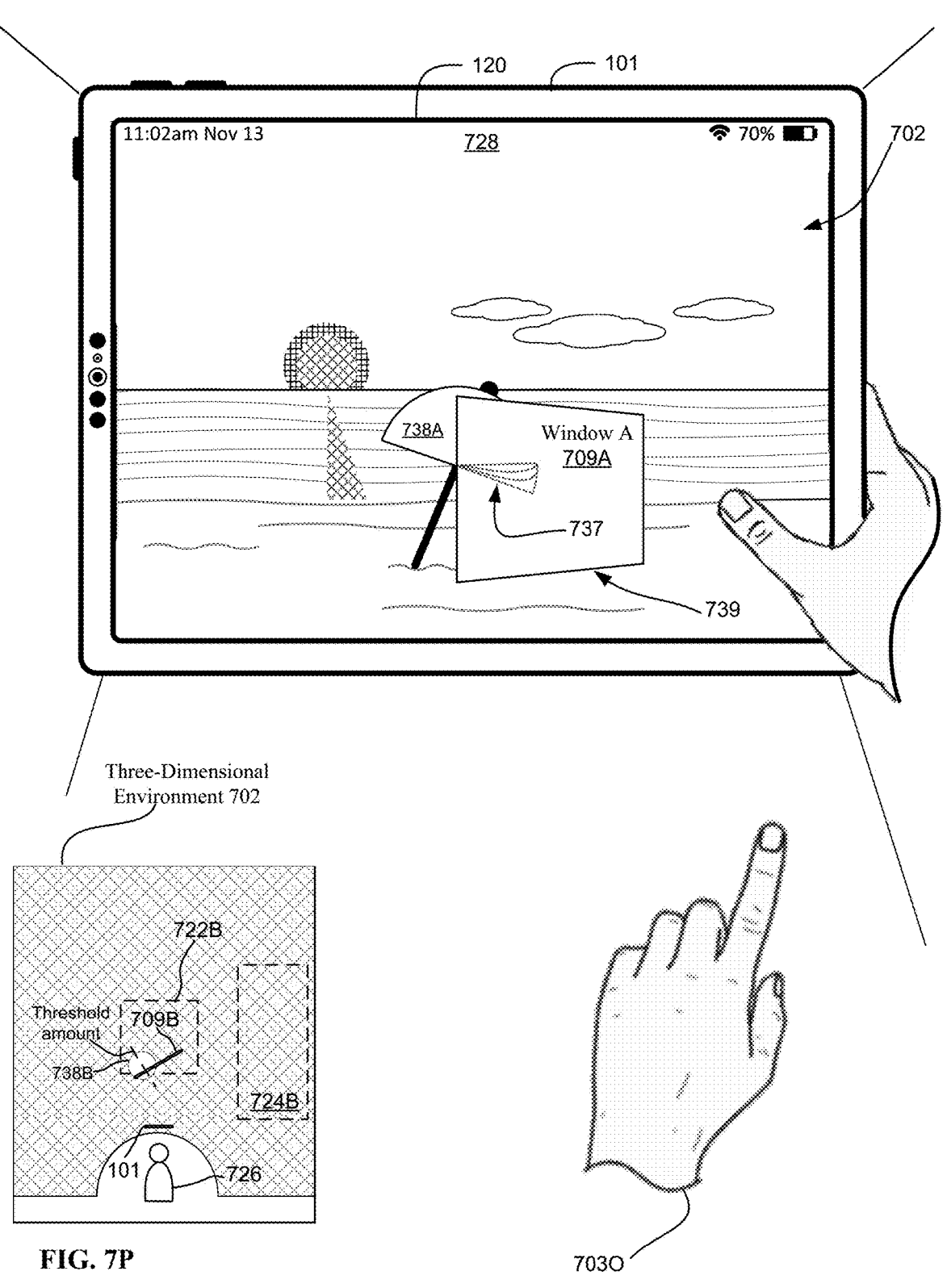
Figure 8A:
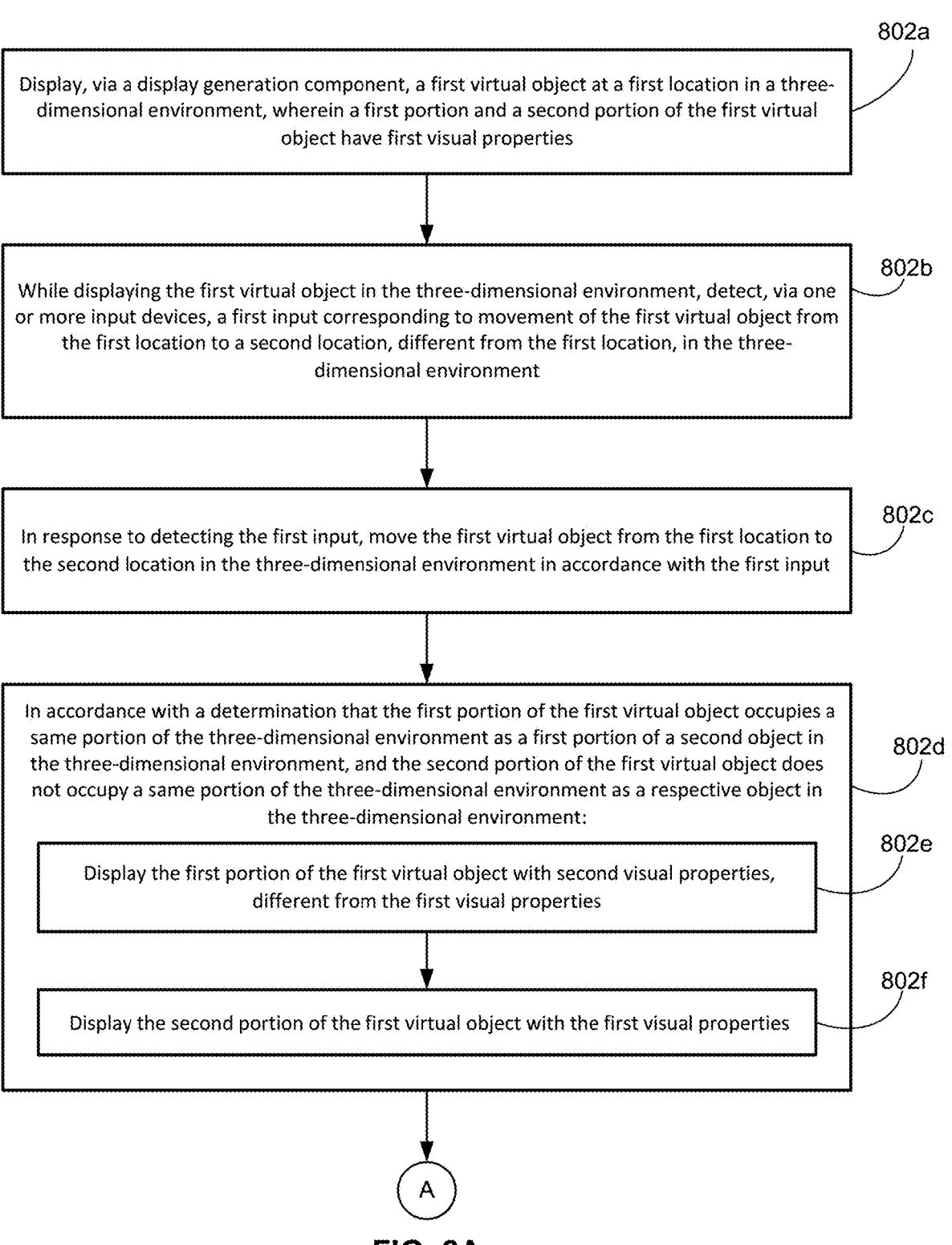
Figure 8B:
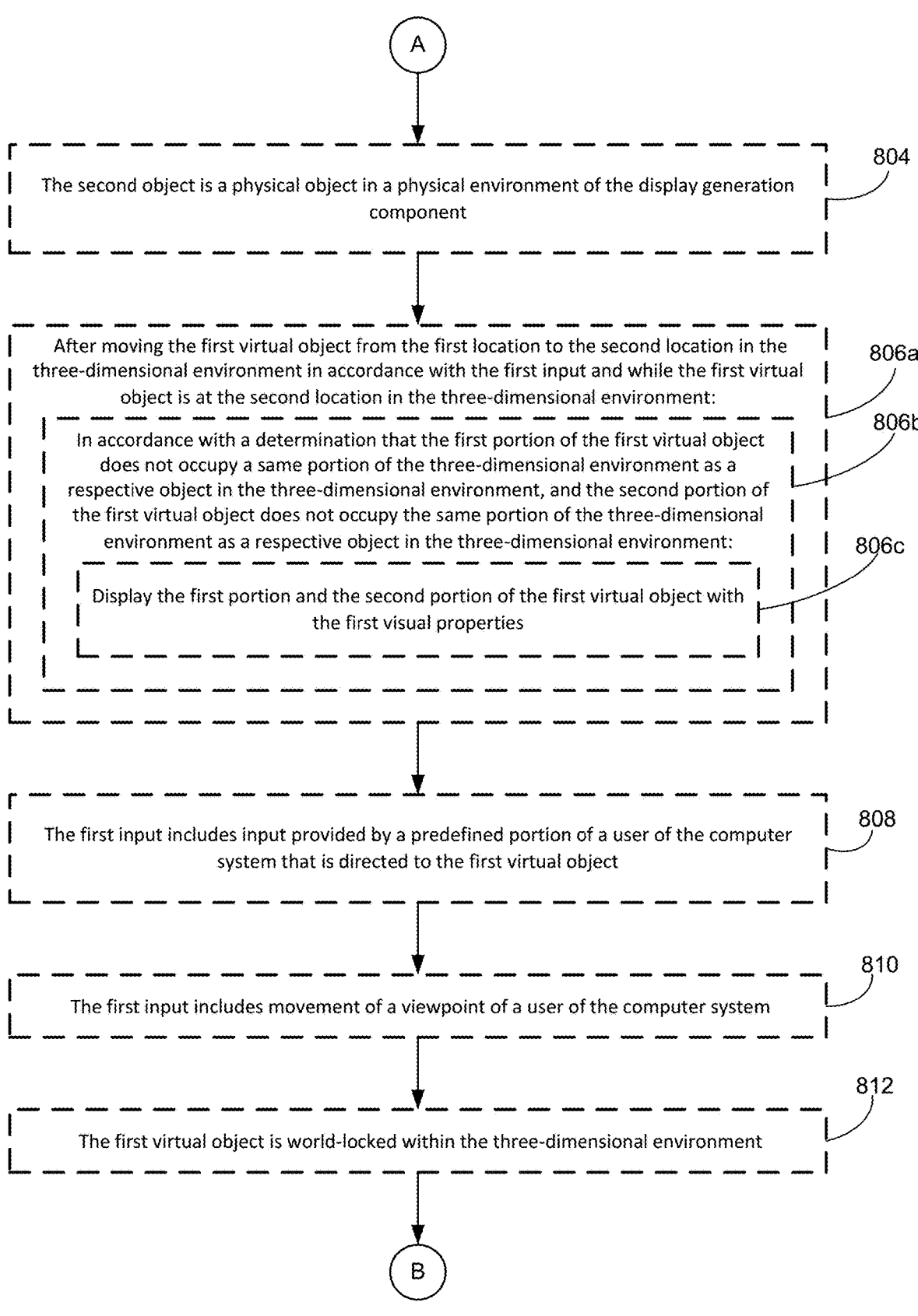
Figure 8C:
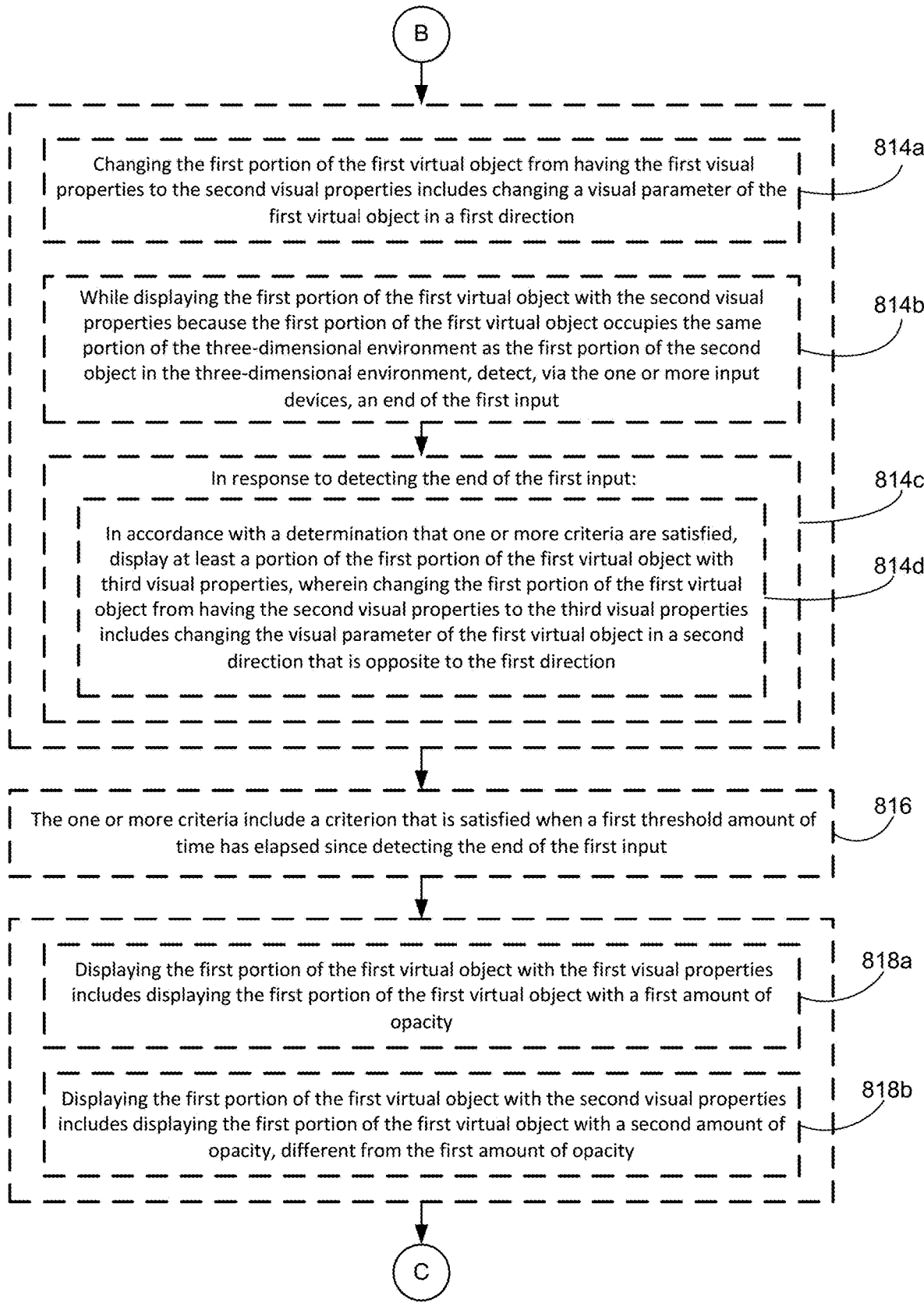
Figure 8D:
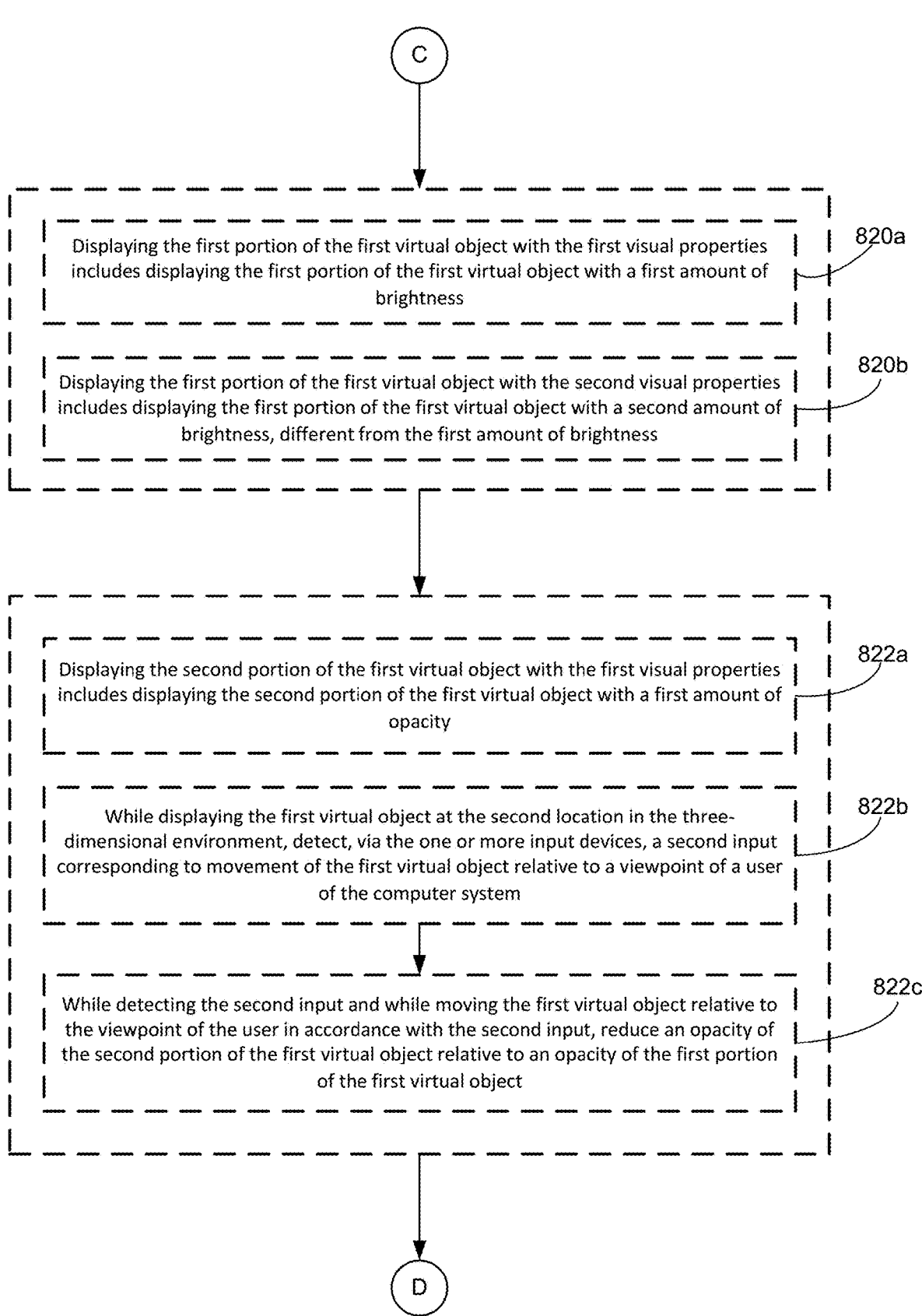
Figure 8E:
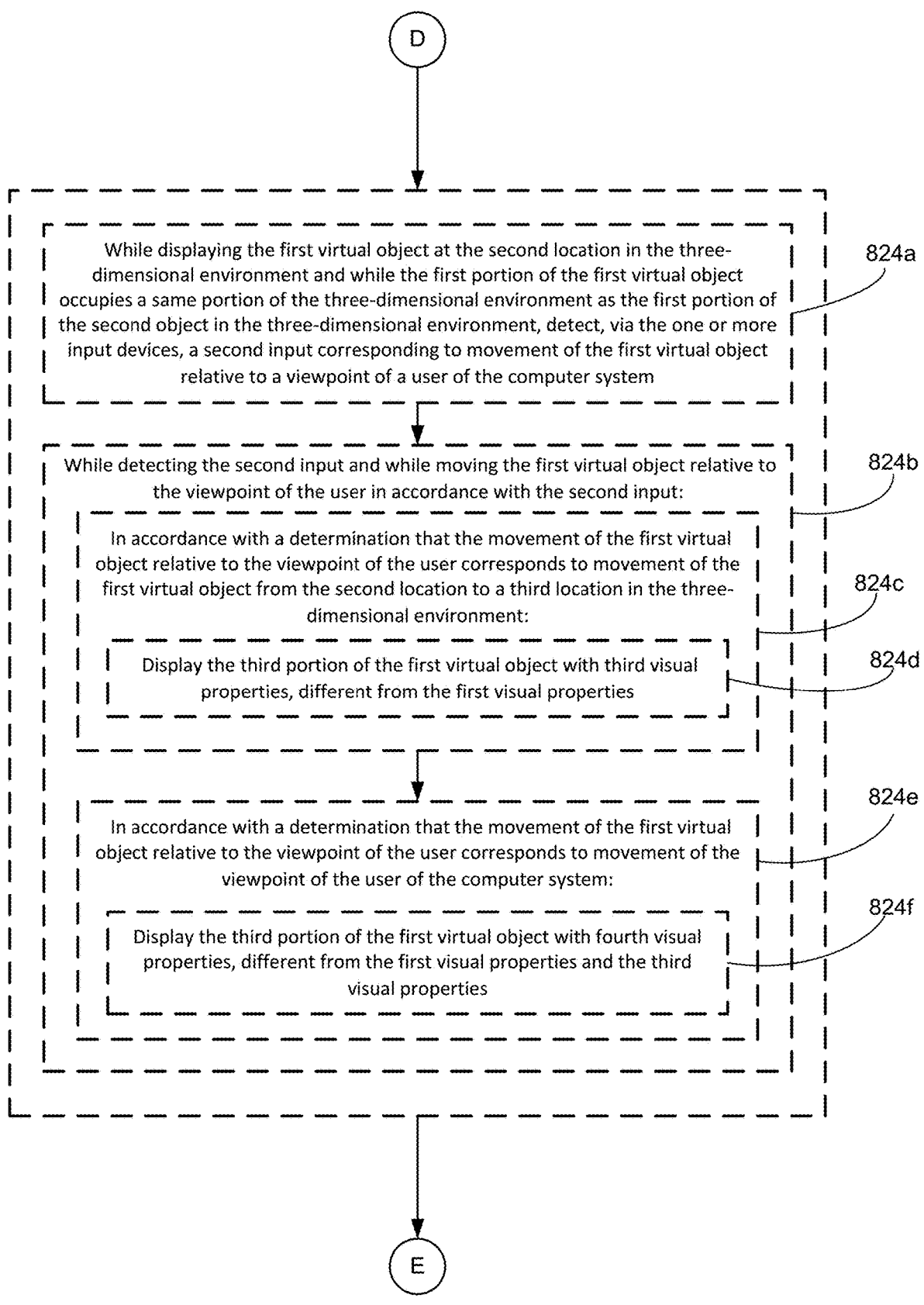
Figure 8F:
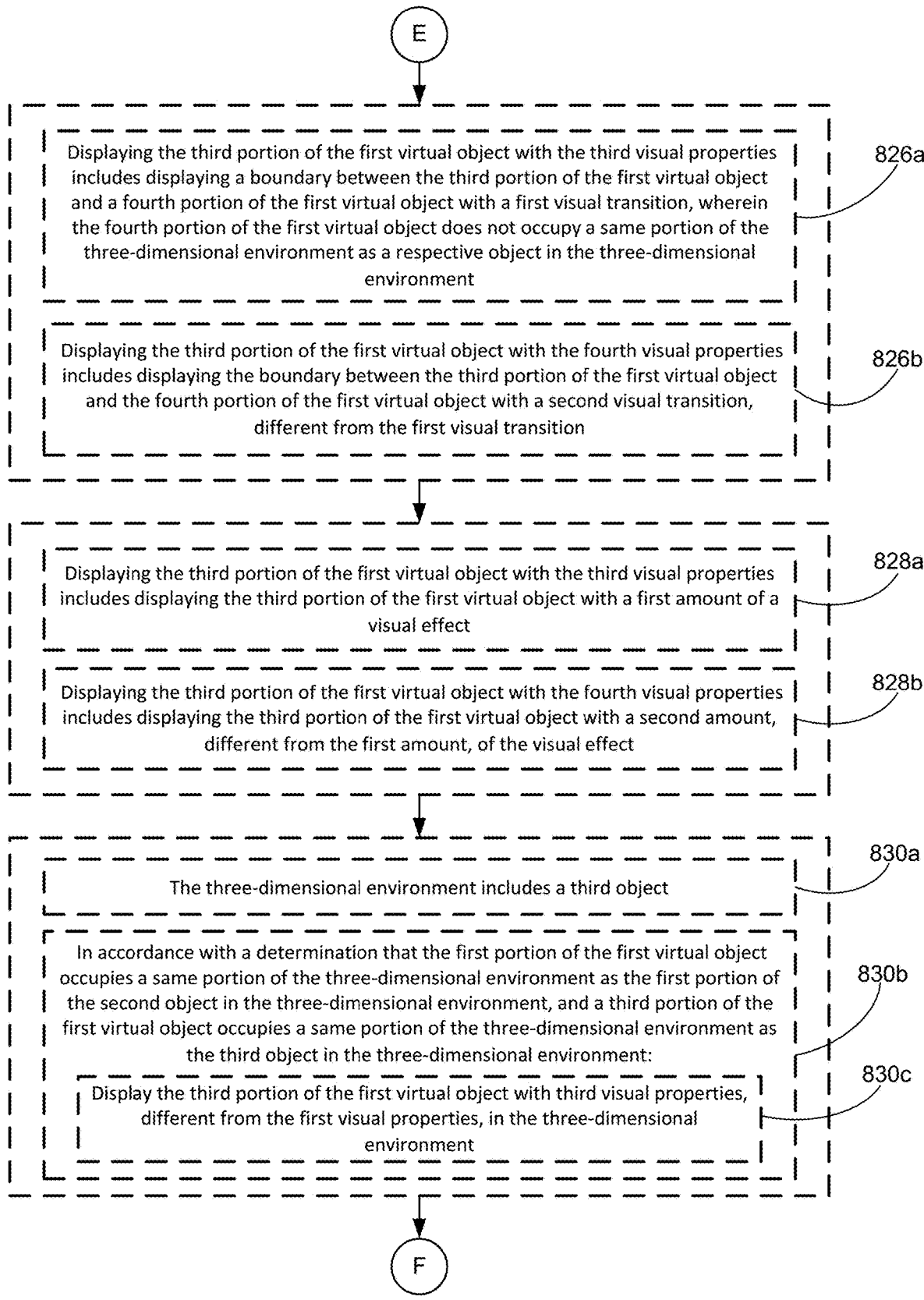
Figure 8G:
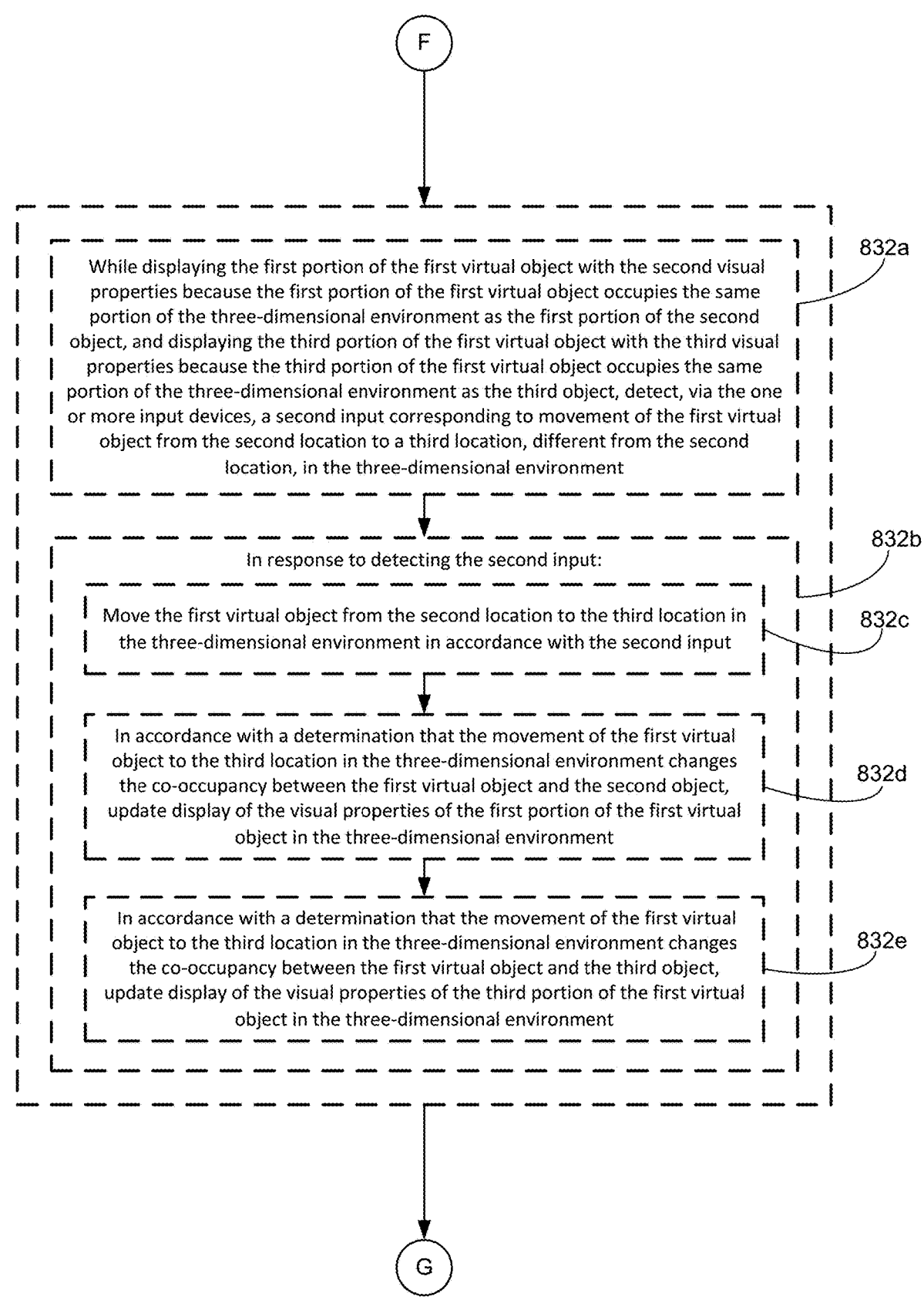
Figure 8I:
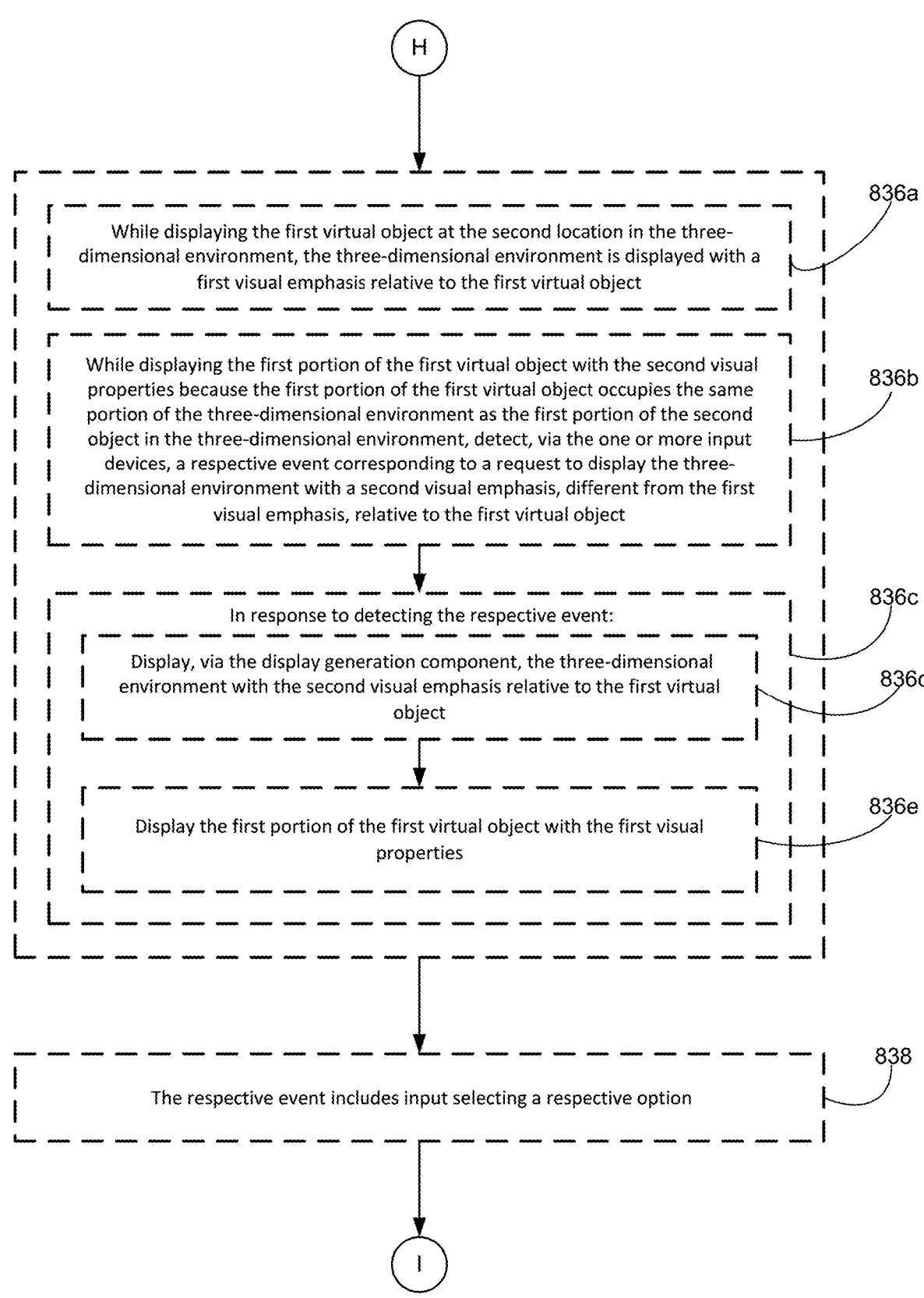
Figure 8J:
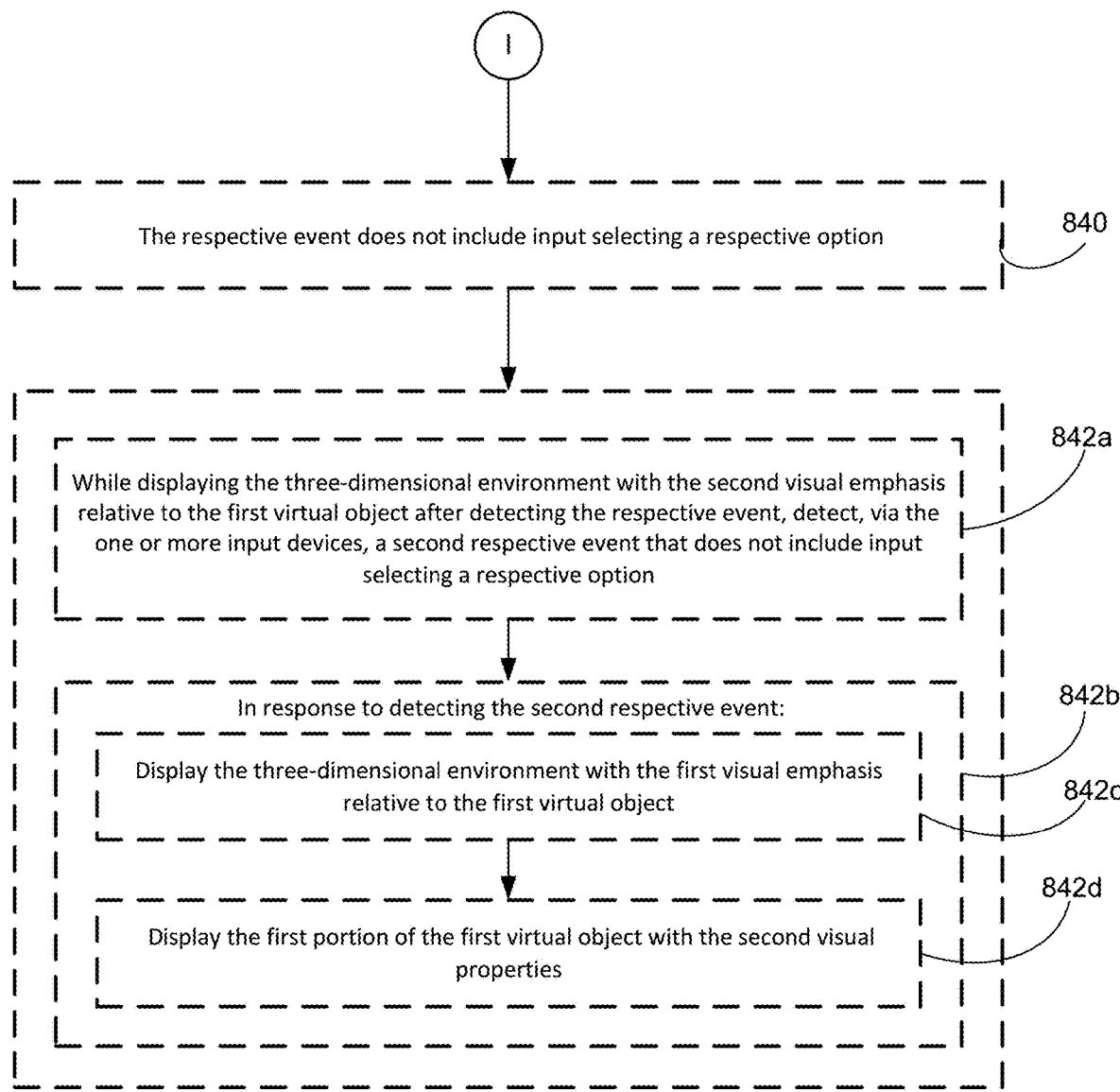
Figure 9A:
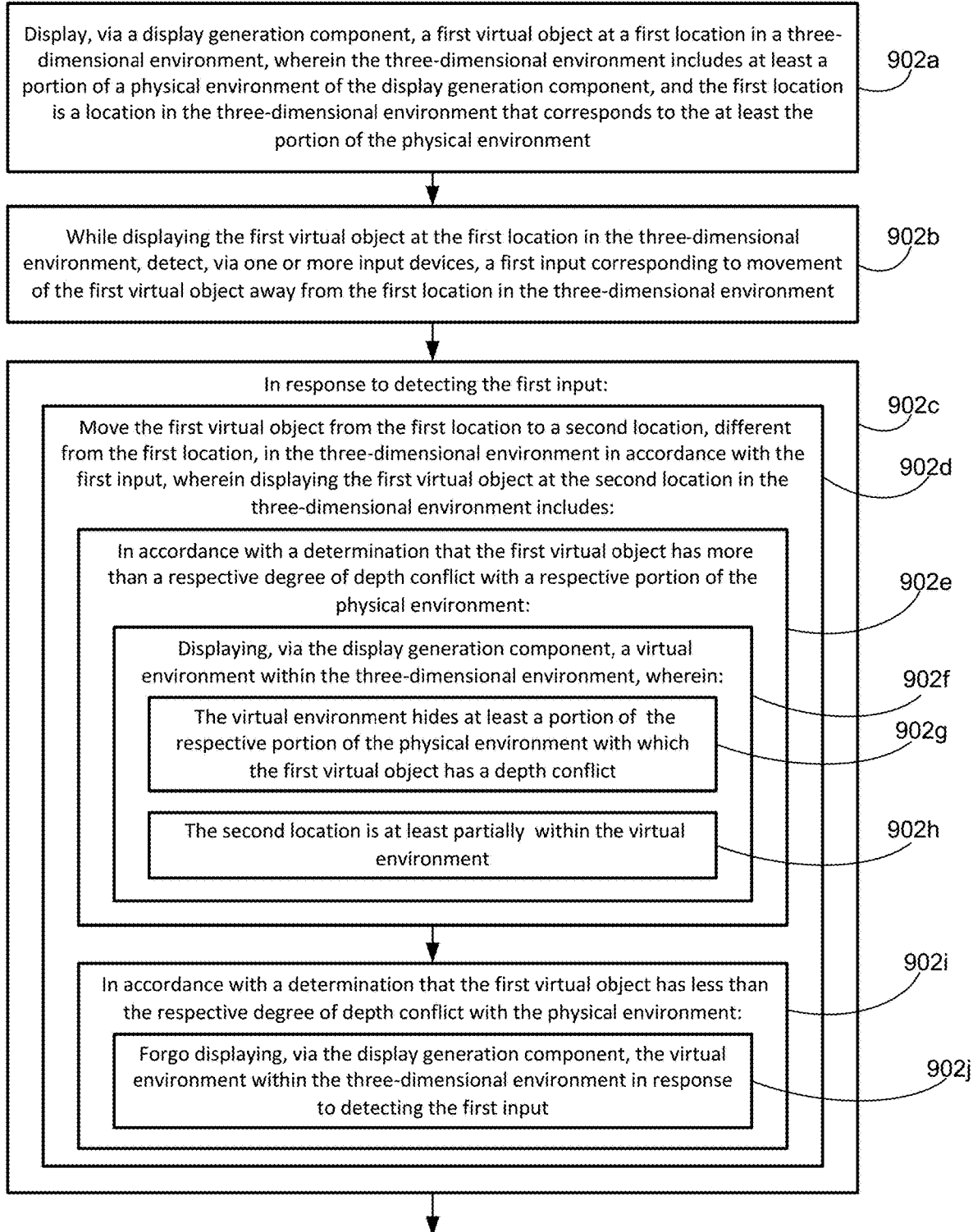
Figure 9B:
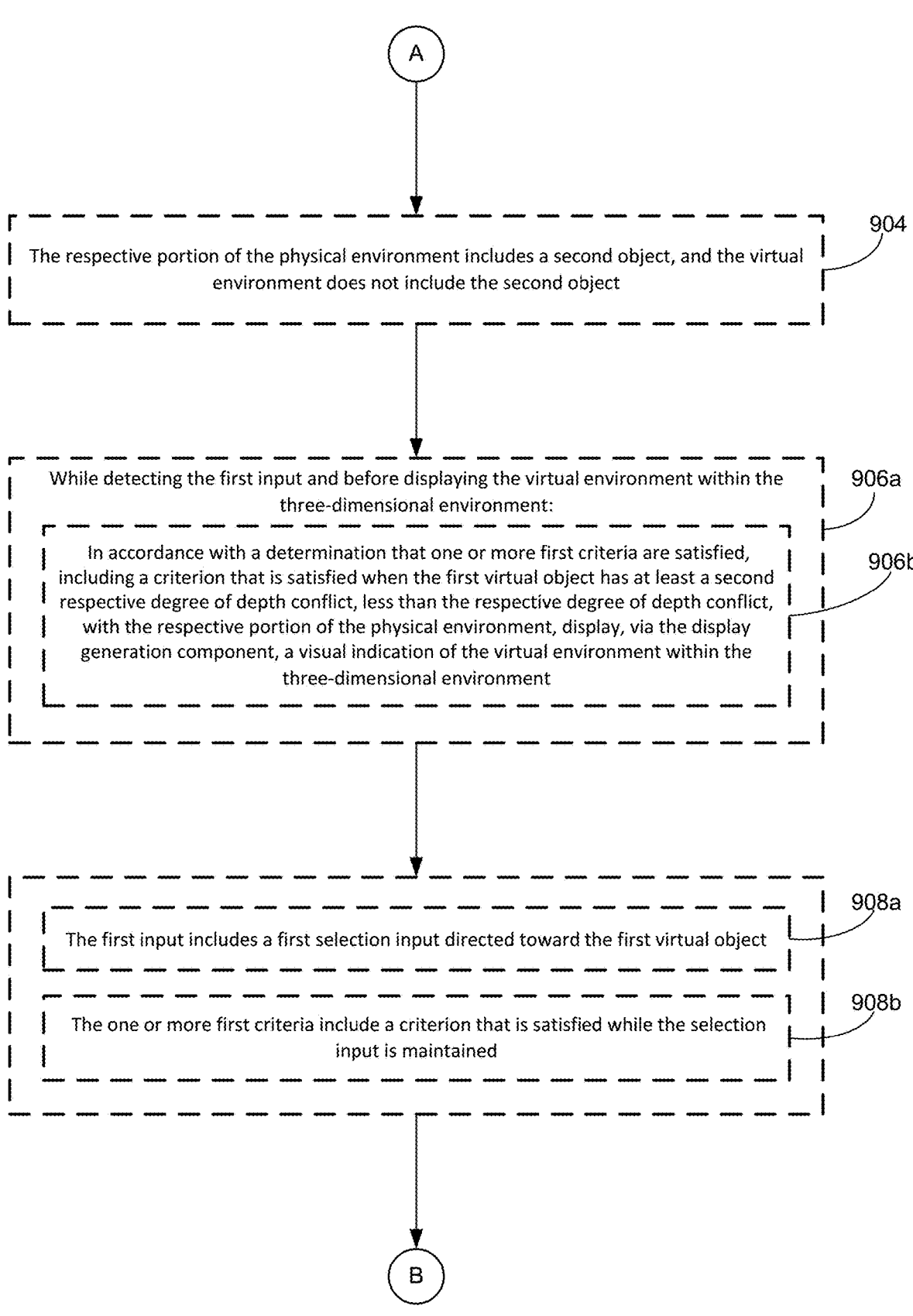
Figure 9D:
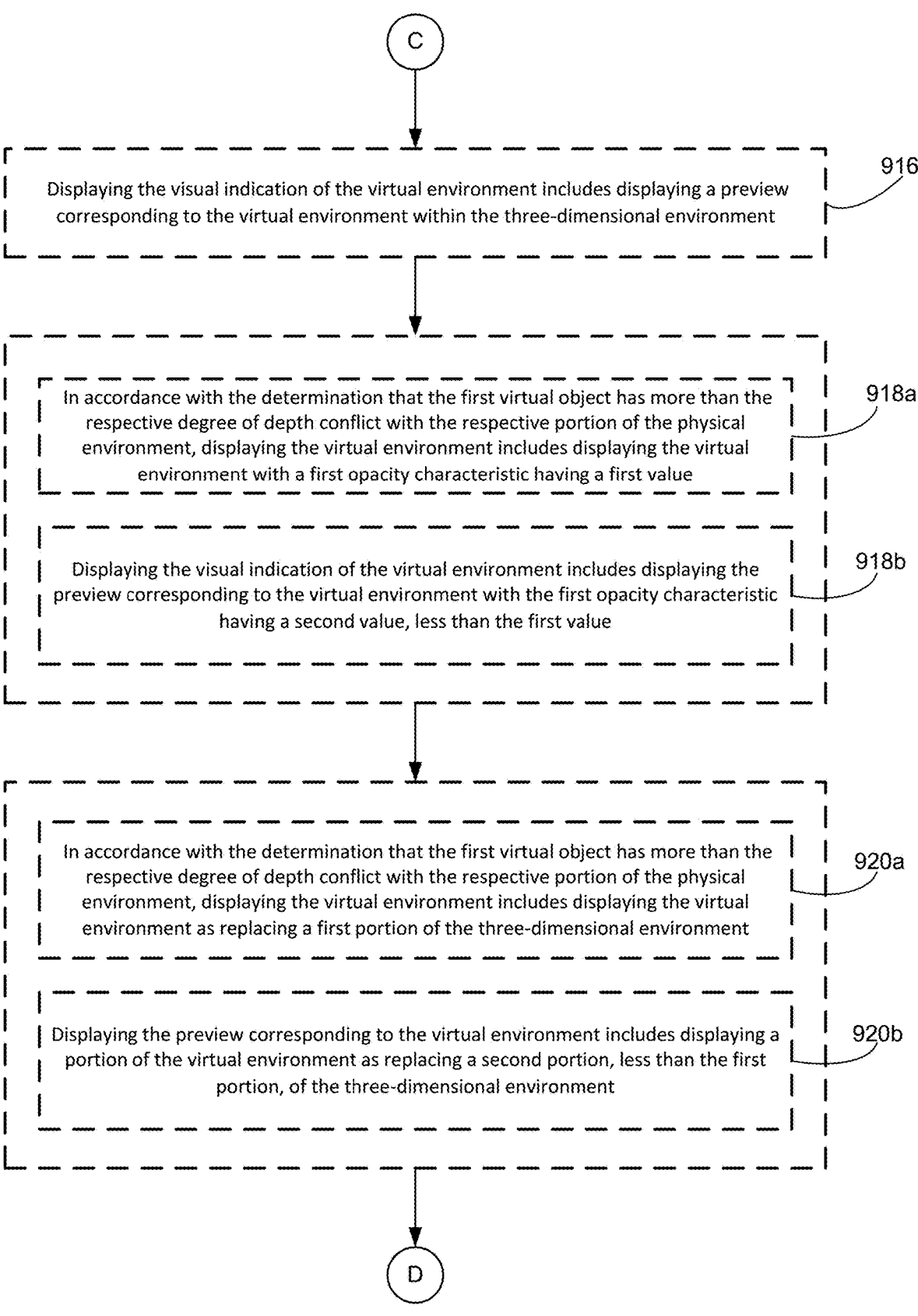
Figure 9E:
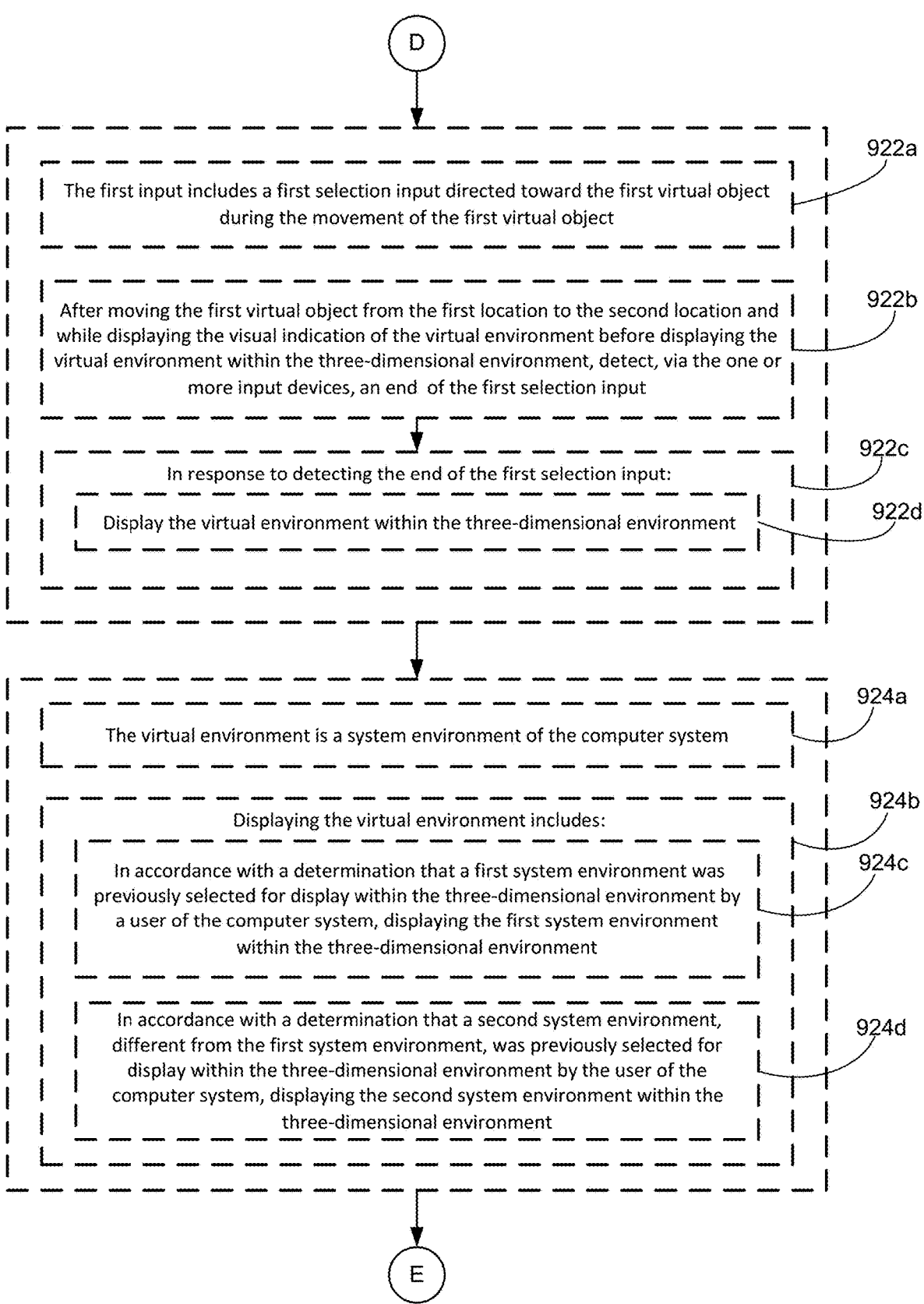
Figure 9G:
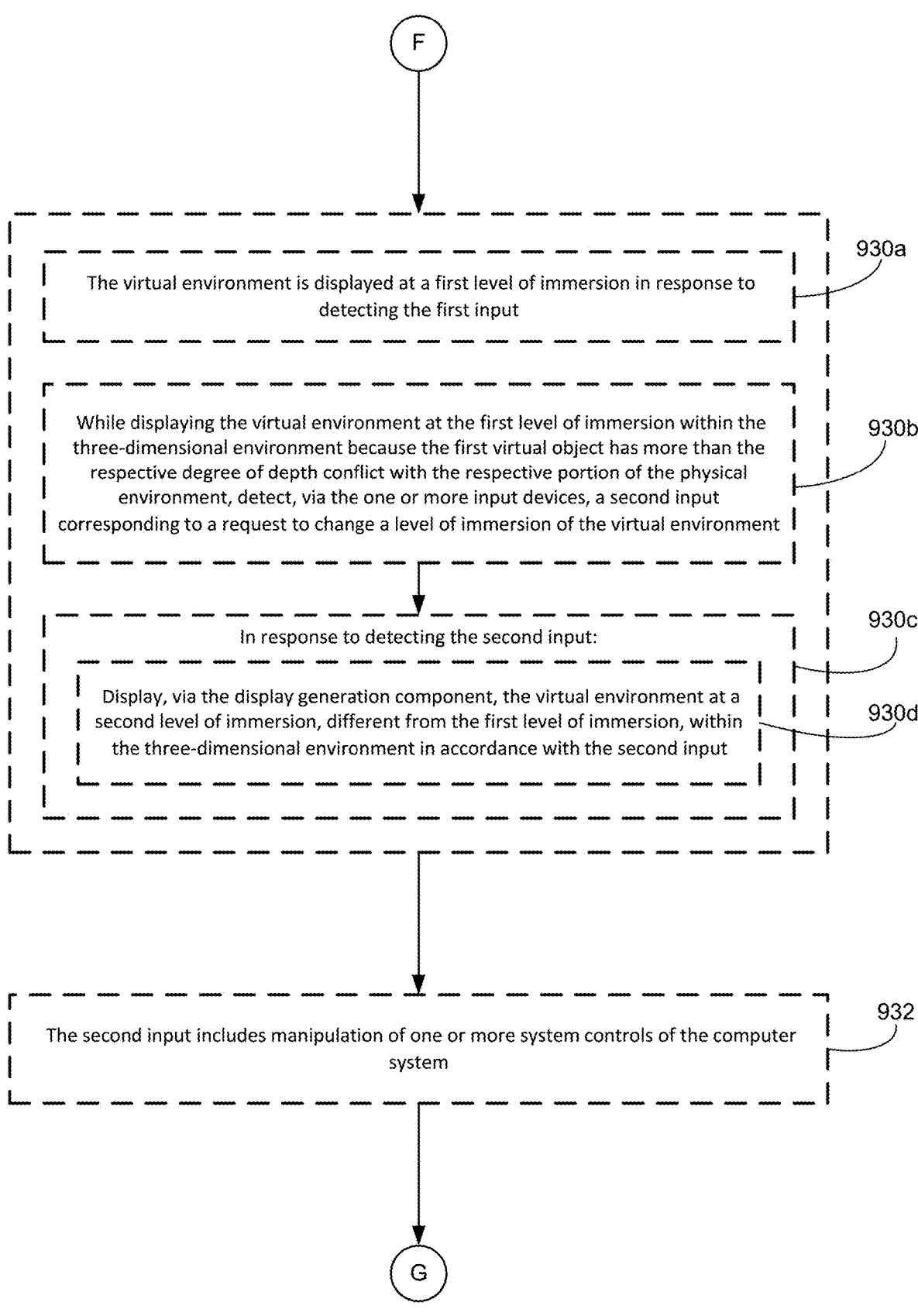
Figure 9H:
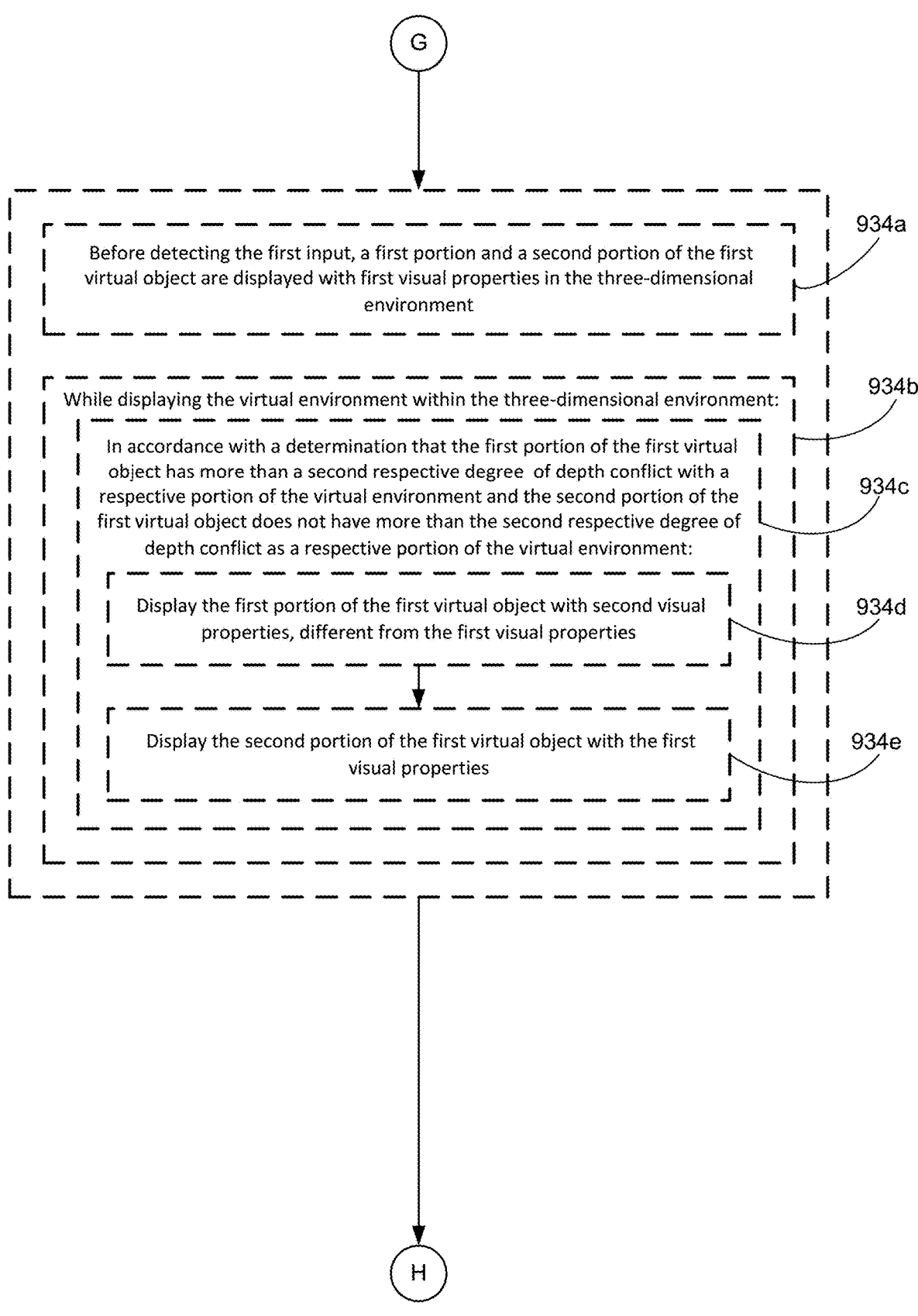
Figure 9I:
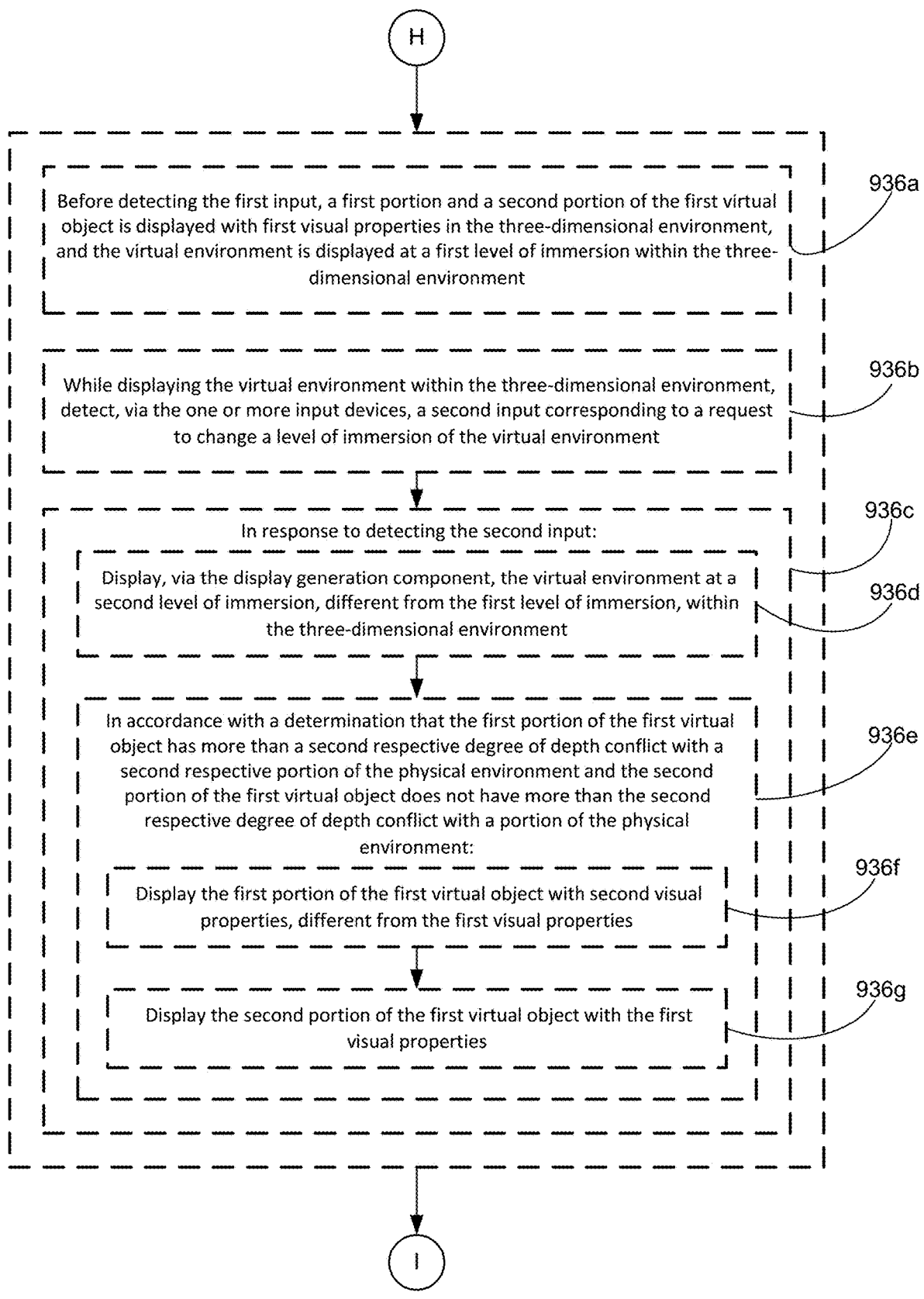
Figure 9J:
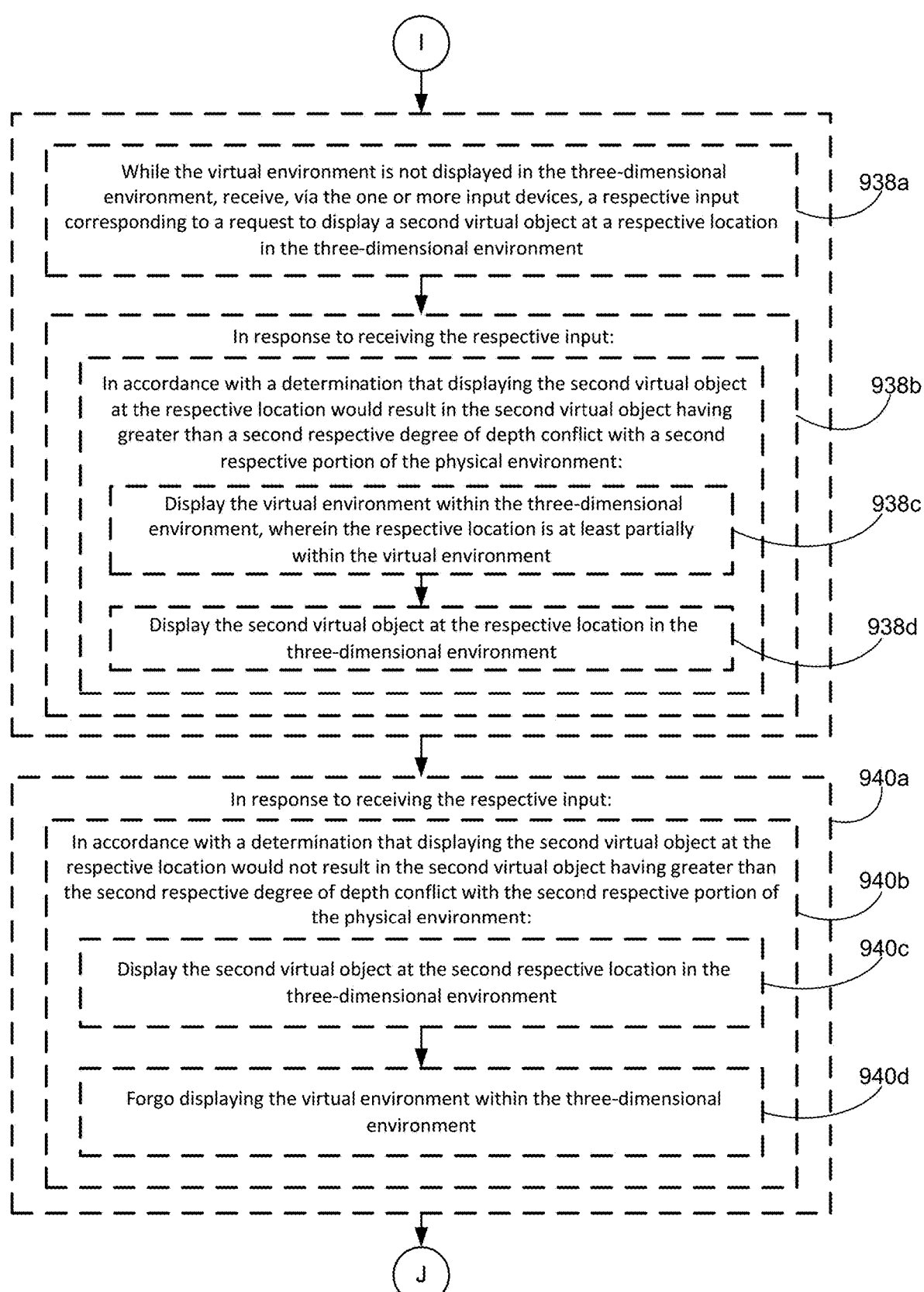
Figure 10B:
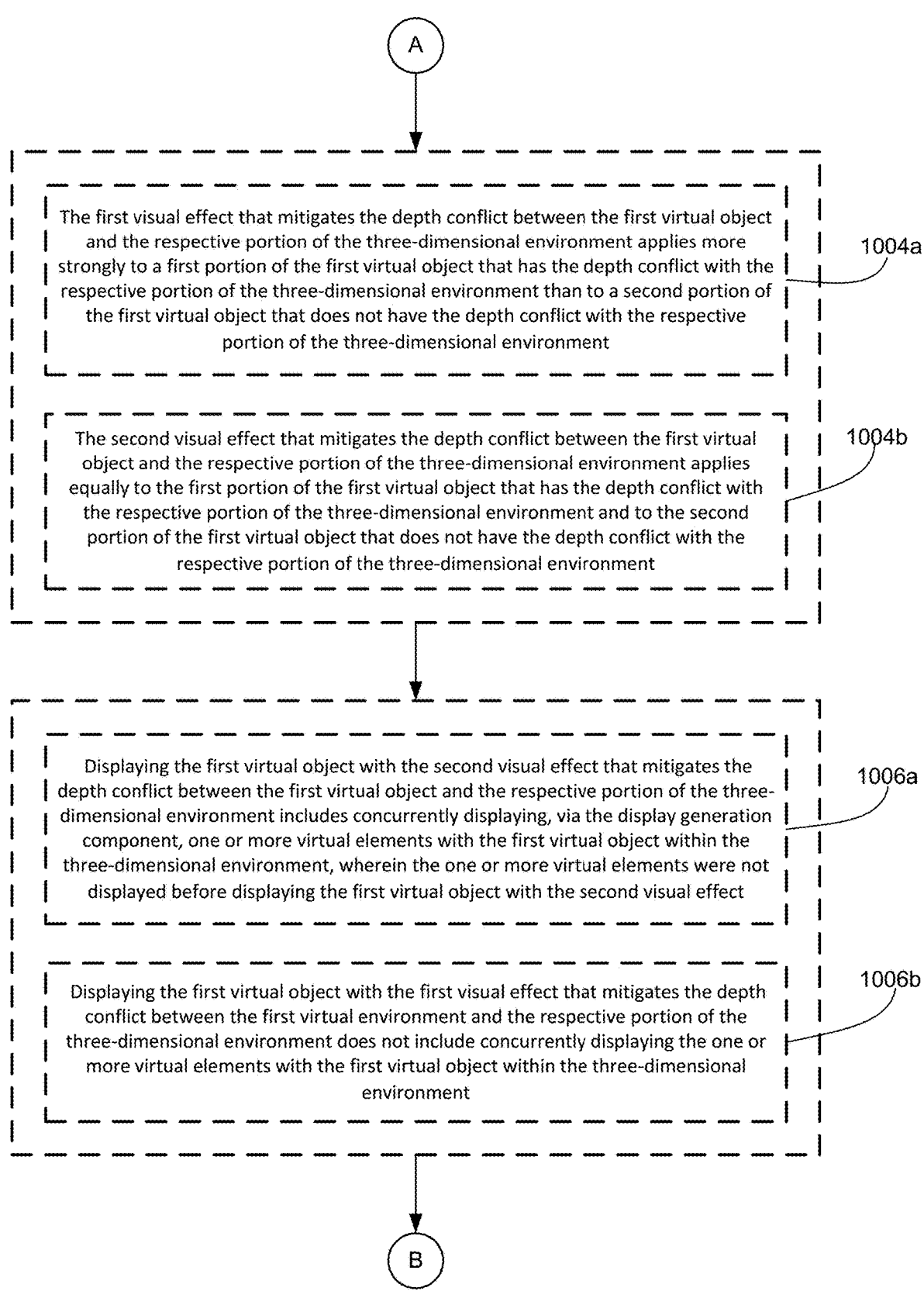
Figure 10D:
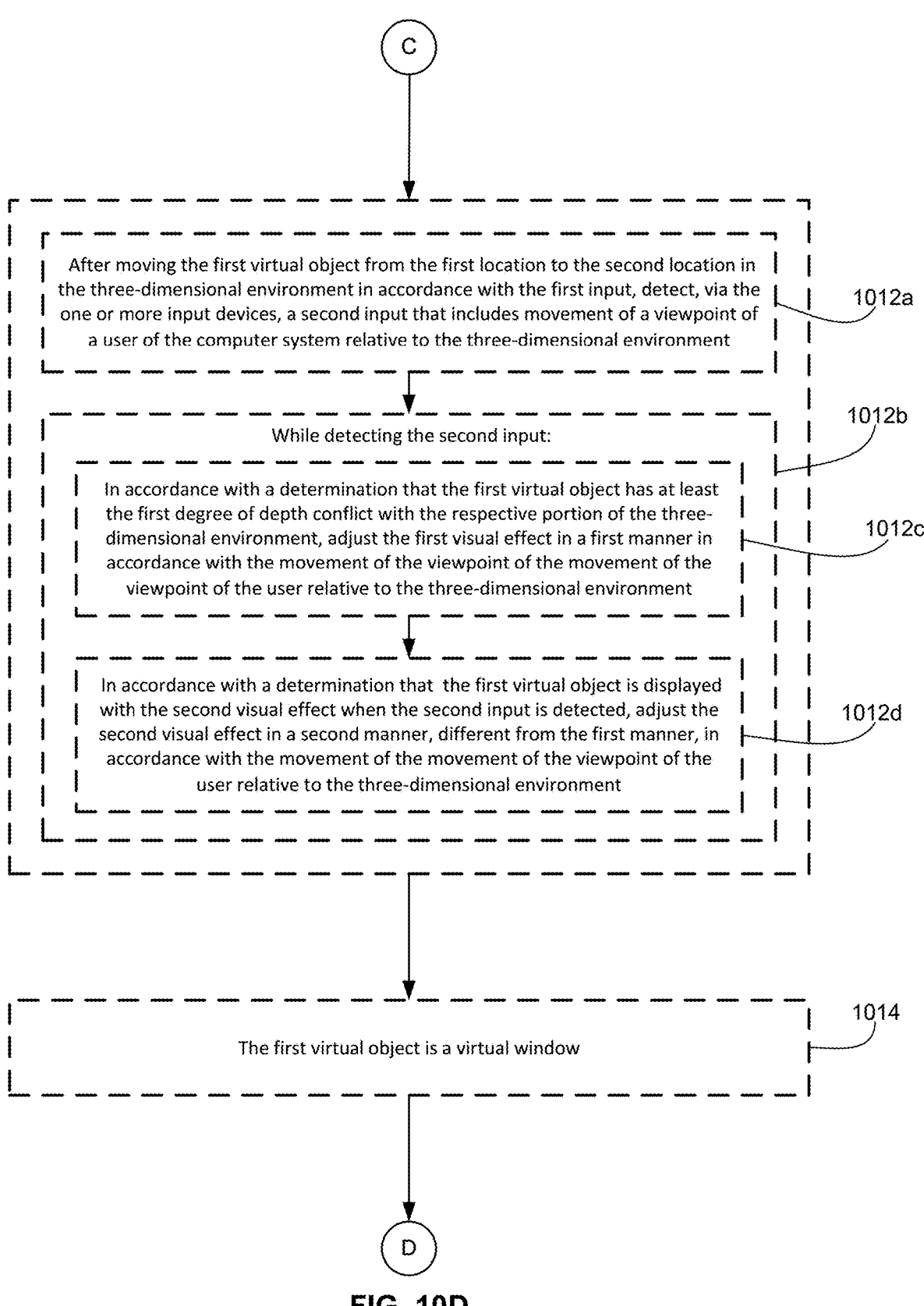
Figure 10F:
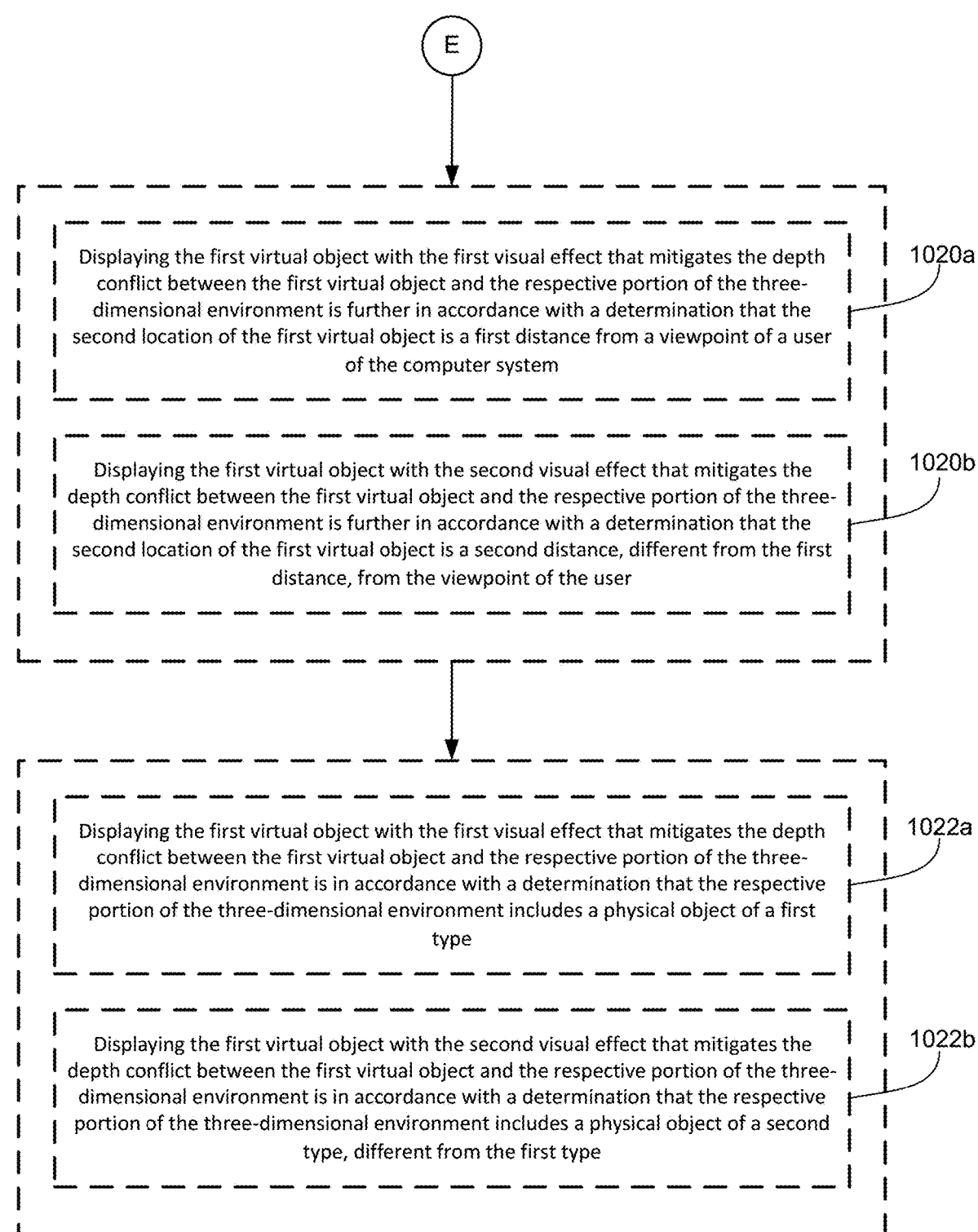

In some embodiments, in response to detecting the movement input provided by the hand 703m in FIG. 7M, the computer system 101 moves the virtual object 709a within the three-dimensional environment 702 in accordance with the movement of the hand, as shown in FIG. 7O. As mentioned above with reference to FIG. 7M, the computer system 101 optionally detects the movement input directed to the virtual object 709a while the virtual object 709a has the depth conflict with the representation of the table 722a in the three-dimensional environment 702. Additionally, as discussed above, less than the threshold amount (e.g., less than 60, 65, 70, 75, 80, 90, or 95%) of the virtual object 709a has the depth conflict with the representation of the table 722*a* when the movement input directed to the virtual object 709*a* is detected (e.g., as indicated in the overhead view in FIG. 7M). As shown in the overhead view in FIG. 7O, the movement of the virtual object 709*b* rightward in the three-dimensional environment 702 causes more than the threshold amount of the virtual object 709*b* to encounter a depth conflict in the three-dimensional environment 702. For example, as shown in the overhead view in FIG. 7O, more than the threshold amount of the virtual object 709*b* contacts/intersects with the representation of the table 722*b* in the three-dimensional environment 702 after the virtual object 709*b* is moved in the three-dimensional environment 702.

In some embodiments, as previously described above with reference to FIG. 7I, the computer system 101 displays a virtual environment 728 within the three-dimensional environment 702 when the virtual object 709*a* has a depth conflict in the three-dimensional environment 702 in accordance with the determination that a second set of criteria is satisfied. In some embodiments, the second set of criteria includes a criterion that is satisfied when more than the threshold amount of the virtual object 709*a* encounters a depth conflict in the three-dimensional environment 702. As discussed above, in FIG. 7O, the movement of the virtual object 709*a* within the three-dimensional environment 702 optionally causes more than the threshold amount (e.g., more than 60, 65, 70, 75, 80, 90, or 95%) of the virtual object 709*a* to contact/intersect with the representation of the table (e.g., 722*b* in the overhead view) in the three-dimensional environment 702. Accordingly, because more than the threshold amount of the virtual object 709*a* encounters the depth conflict in the three-dimensional environment 702, the second set of criteria is satisfied, which causes the computer system 101 to display the virtual environment 728 within the three-dimensional environment 702, as shown in FIG. 7O.

In some embodiments, the second set of criteria includes a criterion that is satisfied if the object with which the virtual object 709*a* encounters the depth conflict is located more than a threshold distance (e.g., 1, 2, 3, 5, 10, 15, 20, or 30 m) from the viewpoint of the user 726. For example, in FIG. 7M, if the computer system 101 detects the hand 703*m* provide movement input that causes the virtual object 709*a* to be moved backward in the three-dimensional environment 702 (e.g., away from the viewpoint of the user 726) and encounter a depth conflict with the rear wall of the physical environment, which is more than the threshold distance from the viewpoint of the user 726, the second set of criteria is satisfied. Accordingly, the computer system 101 would optionally display the virtual environment 728 within the three-dimensional environment 702, as shown in FIG. 7O.

As similarly discussed above with reference to FIG. 7I, in some embodiments, display of the virtual environment 728 within the three-dimensional environment 702 mitigates the depth conflict between the virtual object 709*a* and the representation of the table (e.g., 722*b* in the overhead view in FIG. 7O). For example, as shown in the overhead view in FIG. 7O, when the computer system 101 displays the virtual environment 728 within the three-dimensional environment 702, the virtual object 709*b* is displayed within the virtual environment 728. Accordingly, the virtual environment 728 occupies the portions of the three-dimensional environment 702 surrounding the virtual object 709*a* in the field of view of the user 726, and thus occludes the representation of the table with which the virtual object 709*a* has the depth conflict, as similarly described above. In some embodiments, as shown in FIG. 7O, the virtual environment 728 includes a second virtual object 738*a* (e.g., a beach umbrella, corresponding to object 738*b* in the overhead view).

In FIG. 7O, the computer system 101 detects a movement input directed to the virtual object 709*a* in the three-dimensional environment 702 while the virtual environment 728 is displayed within the three-dimensional environment 702. For example, as shown in FIG. 7O, the computer system 101 detects the hand 703*o* of the user 726 provide an air pinch gesture while the attention (e.g., based on gaze 721) of the user 726 is directed to the virtual object 709*a*, followed by movement of the hand 703*o* in a rightward direction toward the body of the user 726 while maintaining the pinch hand shape. In some embodiments, in response to detecting the movement input directed to the virtual object 709*a*, the computer system 101 moves the virtual object 709*a* in accordance with the movement of the hand 703*o*, as shown in FIG. 7P. For example, as shown in FIG. 7P, the computer system 101 moves the virtual object 709*a* rightward and forward (e.g., toward the viewpoint of the user 726) within the three-dimensional environment 702 relative to the viewpoint of the user 726.

In some embodiments, the computer system 101 maintains display of the virtual environment 728 within the three-dimensional environment 702 when the virtual object 709*a* is moved within the three-dimensional environment 702. For example, as shown in the overhead view in FIG. 7P, the virtual object 709*b* remains displayed in the virtual environment 728 when the virtual object 709*b* is moved within the three-dimensional environment 702. In some embodiments, as indicated in the overhead view in FIG. 7P, the computer system 101 maintains display of the virtual environment 728 within the three-dimensional environment 702 because more than the threshold amount of the virtual object 709*b* still has the depth conflict with the representation of the table 722*b* when the virtual object 709*b* is moved within the three-dimensional environment 702.

In some embodiments, the movement of the virtual object 709*a* within the three-dimensional environment 702 while the virtual environment 728 is displayed causes the virtual object 709*a* to encounter a depth conflict with a portion of the virtual environment 728. For example, as mentioned previously above, the virtual environment 728 includes the second virtual object 738*a*, as shown in FIG. 7P. As shown in the overhead view in FIG. 7P, when the virtual object 709*b* is moved within the three-dimensional environment 702, the virtual object 709*b* contacts/intersects with the second virtual object 738*b* of the virtual environment 728 from the viewpoint of the user 726.

In some embodiments, when the virtual object 709*a* encounters the depth conflict with the second virtual object 738*a* of the virtual environment 728, the computer system 101 changes an appearance of a portion of the virtual object 709*a* that has the depth conflict in the three-dimensional environment 702. For example, as shown in FIG. 7P, the computer system 101 changes an appearance of a first portion 737 of the virtual object 709*a* that has the depth conflict with the second virtual object 738*a* in the three-dimensional environment 702. As previously described herein, the computer system 101 optionally changes values of the opacity, brightness, coloration, and/or saturation of the first portion 737 of the virtual object 709*a* to occlude the portion of the second virtual object 738*a* with which the virtual object 709*a* has the depth conflict, thereby mitigating the depth conflict in the three-dimensional environment 702, and particularly, in the virtual environment 728. Additionally, in some embodiments, the computer system 101 forgoes changing the appearance of a second portion 739 of the virtual object 709a that does not have a depth conflict with a portion of the virtual environment 728. For example, as similarly described above, the computer system 101 maintains the values of the opacity, brightness, coloration and/or saturation of the second portion 739 of the virtual object 709a that does not have the depth conflict with any portion of the virtual environment 728.

It should be understood that, in some embodiments, the computer system 101 utilizes the above-described mitigation techniques (e.g., changing visual properties of a virtual object and/or displaying a virtual environment in a three-dimensional environment) to mitigate depth conflicts with virtual objects that exist outside/separate from a virtual environment. For example, in response to detecting that a first virtual object encounters a depth conflict with a second virtual object in a three-dimensional environment, independent of a virtual environment displayed within the three-dimensional environment, the computer system utilizes the above-described techniques to reduce or resolve the depth conflict between the first virtual object and the second virtual object in the three-dimensional environment.

FIGS. 8A-8J is a flowchart illustrating an exemplary method 800 of facilitating depth conflict mitigation for one or more virtual objects in a three-dimensional environment by changing visual properties of the one or more virtual objects in accordance with some embodiments. In some embodiments, the method 800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 800 are, optionally, combined and/or the order of some operations is, optionally, changed.

In some embodiments, method 800 is performed at a computer system (e.g., 101) in communication with a display generation component (e.g., 120) and one or more input devices (e.g., 314). For example, the computer system is or includes a mobile device (e.g., a tablet, a smartphone, a media player, or a wearable device), or a computer. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users. In some embodiments, the one or more input devices include an electronic device or component capable of receiving a user input (e.g., capturing a user input, and/or detecting a user input) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, an eye tracking device, and/or a motion sensor (e.g., a hand tracking device and/or a hand motion sensor). In some embodiments, the computer system is in communication with a hand tracking device (e.g., one or more cameras, depth sensors, proximity sensors, touch sensors (e.g., a touch screen, trackpad). In some embodiments, the hand tracking device is a wearable device, such as a smart glove. In some embodiments, the hand tracking device is a handheld input device, such as a remote control or stylus.

In some embodiments, the computer system displays (802a), via the display generation component, a first virtual object (e.g., virtual object 709a in FIG. 7B) at a first location in a three-dimensional environment (e.g., three-dimensional environment 702), wherein a first portion and a second portion of the first virtual object have first visual properties (e.g., a first visual appearance). For example, the three-dimensional environment is generated, displayed, or otherwise caused to be viewable by the computer system (e.g., an extended reality (XR) environment such as a virtual reality (VR) environment, a mixed reality (MR) environment, or an augmented reality (AR) environment). In some embodiments, the first virtual object is generated by the computer system and/or is or includes content, such as a window of a web browsing application displaying content (e.g., text, images, or video), a window displaying a photograph or video clip, a media player window for controlling playback of content items on the computer system, a contact card in a contacts application displaying contact information (e.g., phone number email address, and/or birthday) and/or a virtual boardgame of a gaming application. In some embodiments, the first virtual object is displayed at a first location in the three-dimensional environment that is in the field of view of a user of the computer system from a current viewpoint of the user of the three-dimensional environment. In some embodiments, the first virtual object contains a plurality of portions, including the first portion and the second portion, which are different (e.g., non-overlapping) portions of the plurality of portions. For example, the first portion of the first virtual object is or includes a top portion (e.g., a top half) of the first virtual object relative to a viewpoint of the user, and the second portion of the first virtual object is or includes a bottom portion (e.g., a bottom half) of the first virtual object relative to the viewpoint of the user. As another example, the first portion of the first virtual object is or includes outer edges of a first side of the first virtual object relative to the viewpoint of the user, and the second portion of the first virtual object is or includes outer edges of a second side, different from the first side, of the first virtual object relative to the viewpoint of the user. In some embodiments, the first portion and the second portion of the first virtual object have first visual properties (e.g., appearance) determined by the content (e.g., representations of pixels of the content) included in the first virtual object. In some embodiments, the first visual properties are determined by a lighting effect, a darkening effect, a transparency effect, a blurring effect, a glowing effect, and/or a saturation effect each having a default value based on the content of the first virtual object. For example, while the computer system displays the first portion and the second portion of the first virtual object with the first visual properties, the first visual properties are automatically (e.g., as a default) determined based on and/or defined by the content of the first virtual object. In some embodiments, characteristics of the first visual properties do not include and/or are different from a size of the first virtual object, a lighting of the first virtual object, shadows associated with the first virtual object (e.g., cast onto the first virtual object by other objects), or other visual characteristics that automatically and/or would otherwise change based on changes in relative placement of the first virtual object in the three-dimensional environment relative to the viewpoint of the user.

In some embodiments, while displaying the first virtual object in the three-dimensional environment, the computer system detects (802b), via the one or more input devices, a first input corresponding to movement of the first virtual object from the first location to a second location, different from the first location, in the three-dimensional environment, such as movement input directed to the virtual object 709a provided by hand 703b as shown in FIG. 7B. For example, the computer system detects an air pinch gesture performed by a hand of the user of the computer system—such as the thumb and index finger of the hand of the user starting more than a threshold distance (e.g., 0.1, 0.2, 0.5, 1, 2, or 5 cm) apart and coming together and touching at the tips—that is detected by the one or more input devices (e.g., a hand tracking device) in communication with the computer system while the attention (e.g., based on gaze) of the user is directed toward the first virtual object, such as gaze 721 in FIG. 7B. In some embodiments, the computer system detects the air pinch gesture directed toward a selection element (e.g., a grabber or handlebar element) associated with the first virtual object that is selectable to initiate movement of the first virtual object in the three-dimensional environment. In some embodiments, after detecting the air pinch gesture, the computer system detects movement of a predefined portion of the user. For example, the computer system detects movement of the hand of the user in space, such as a movement while the hand is holding the pinch hand shape (e.g., the tips of the thumb and index finger remain touching) such as an air drag gesture, such as movement of the hand 703b as shown in FIG. 7B. In some embodiments, the movement of the hand of the user is in a respective direction (e.g., in a vertical direction, a horizontal direction, or a diagonal direction) in space that is toward the second location in the three-dimensional environment. In some embodiments, the computer system detects movement of a head of the user, which moves the viewpoint of the user in the three-dimensional environment. In some embodiments, the computer system detects the first input via a hardware input device (e.g., a controller operable with six degrees of freedom of movement, or a touchpad or mouse) in communication with the computer system. For example, the computer system detects a selection input (e.g., a tap, touch, or click) via the input device provided by one or more fingers of the hand of the user. In some embodiments, after detecting the selection input, the computer system detects movement via the hardware input device, such as movement of the controller in space, movement of a mouse across a surface (e.g., a tabletop), or movement of a finger of the hand of the user across the touchpad.

In some embodiments, in response to detecting the first input, the computer system moves (802c) the first virtual object from the first location to the second location in the three-dimensional environment in accordance with the first input, such as movement of the virtual object 709a in accordance with the movement of the hand 703b as shown in FIG. 7C. For example, the computer system moves the first virtual object from the first location to the second location in the three-dimensional environment in accordance with the movement of the hand of the user and/or the hardware input device.

In some embodiments, in accordance with a determination that the first portion of the first virtual object (e.g., first portion 711 of virtual object 709a in FIG. 7C) occupies a same portion of the three-dimensional environment as a first portion of a second object (e.g., table 722a in FIG. 7C) in the three-dimensional environment (e.g., the first portion of the first virtual object at least partially contacts or intersects with the first portion of the second object at the second location and/or before displaying the first virtual object at the second location), and the second portion of the first virtual object (e.g., second portion 713 of virtual object 709a in FIG. 7C) does not occupy a same portion of the three-dimensional environment as a respective object in the three-dimensional environment (802d), the computer system displays (802e) the first portion of the first virtual object with second visual properties (e.g., a second visual appearance), different from the first visual properties, such as display of the first portion 711 of the virtual object 709a with the second visual properties as shown in FIG. 7C. For example, the second object is a real-world object, such as a table, chair, desk, lamp, sofa, bookcase, or shelf that is in a physical environment surrounding the display generation component and/or the computer system. In some embodiments, the physical environment is visible through a transparent portion of the display generation component (e.g., true or real passthrough). In some embodiments, a representation of the physical environment, including a representation of the second object, is displayed in the three-dimensional environment via the display generation component (e.g., virtual or video passthrough). In some embodiments, the second object is located at a respective location in the physical environment that at least partially corresponds to the second location in the three-dimensional environment. In some embodiments, when the first portion of the first virtual object at least partially contacts or intersects with the first portion of the second object, the first portion of the first virtual object creates a depth conflict with the first portion of the second object. In some embodiments, while the first portion of the first virtual object occupies the same portion of the three-dimensional environment as the first portion of second object, the second portion of the first virtual object (e.g., second portion 713 of virtual object 709a) is not occupying the same portion of the three-dimensional environment as another object in the three-dimensional environment, as similarly shown in FIG. 7C. For example, the second portion of the first virtual object is not at least partially contacting or intersecting with a portion of another virtual object (e.g., generated and/or displayed by the computer system) or another physical object (e.g., located in the physical environment of the display generation component in communication with the computer system) at the second location in the three-dimensional environment.

In some embodiments, in accordance with the determination that the first portion of the first virtual object at least partially contacts or intersects with the first portion of the second object at the second location in the three-dimensional environment, the computer system updates display of the first portion of the first virtual object to have the second visual properties, different from the first visual properties. In some embodiments, as discussed below, the computer system changes values of one or more of a lighting effect, a darkening effect, a transparency effect, a blurring effect, a glowing effect, and/or a saturation effect of the first portion of the first virtual object. For example, the computer system changes the appearance of the first portion of the first virtual object, such that the first portion of the first virtual object is visible (e.g., is not occluded by the first portion of the second object) relative to the viewpoint of the user, as similarly shown in FIG. 7C. In some embodiments, the computer system visually deemphasizes the first portion of the first virtual object relative to the second portion (e.g., the unconflicted portion) of the first virtual object and/or relative to other portions of the three-dimensional environment surrounding the first virtual object. In some embodiments, the computer system displays the first portion of the first virtual object with an animation effect that causes the first portion of the first virtual object to be visible relative to the viewpoint of the user when the first portion of the virtual object contacts or intersects with the first portion of the second object in response to the first input. For example, as described below, the animation effect includes a feathering effect that, when the first portion of the first virtual object is in contact with the first portion of the second object, veils (e.g., occludes or partially occludes) the first portion of the second object by a respective amount (e.g., and/or with a respective speed or immediacy of occlusion and/or respective extension away from the first portion of the first virtual object that has the depth conflict). In some embodiments, characteristics of the second visual properties do not include and/or are different from a size of the first virtual object, a lighting of the first virtual object, shadows associated with the first virtual object (e.g., cast onto the first virtual object by other objects), or other visual characteristics that automatically and/or would otherwise change based on changes in relative placement of the first virtual object in the three-dimensional environment relative to the viewpoint of the user. In some embodiments, the computer system displays the first portion of the first virtual object with the second visual properties while the first portion of the first virtual object remains in contact with the first portion of the second object. For example, if the computer system detects movement of the first virtual object to a third location in the three-dimensional environment that causes the first portion of the first virtual object to no longer occupy the same portion of the three-dimensional environment as the first portion of the second object or portions of other objects, the computer system redisplays the first portion of the first virtual object with the first visual properties. In some embodiments, when the computer system displays the first portion of the first virtual object with the second visual properties in response to detecting the depth conflict between the first portion of the first virtual object and the first portion of the second object, the computer system does not display other portions of the three-dimensional environment (e.g., objects surrounding the first virtual object or portions of the physical environment) with the second visual properties and/or does not modify the visual properties of other portions of the three-dimensional environment, as similarly shown in FIG. 7C.

In some embodiments, the computer system displays (8020 the second portion of the first virtual object with the first visual properties, such as display of the second portion 713 of virtual object 709*a* with the first visual properties as shown in FIG. 7C. For example, in accordance with the determination that the second portion of the first virtual object does not at least partially contact or intersect with a portion of another object at the second location in the three-dimensional environment, the computer system maintains display of the second portion of the first virtual object with the first visual appearance, such as maintaining display of the second portion 713 of the virtual object 709*a* with the first visual appearance because the second portion 713 does not have a depth conflict with the representation of the table 722*a* as shown in FIG. 7C. In some embodiments, the computer system concurrently displays the first portion of the first virtual object with the second visual properties and the second portion of the first virtual object with the first visual properties, as similarly shown in FIG. 7C. Changing an appearance of an object in a three-dimensional environment when the object encounters a depth conflict based on movement of the object in the three-dimensional environment provides feedback that the display of the object is in conflict with a portion of the three-dimensional environment, which facilitates user input for resolving the depth conflict, thereby improving user-device interaction, and/or reduces the prominence of the depth conflict in the three-dimensional environment, which reduces eye strain of the user, thereby avoiding potential physical discomfort for the user caused by the depth conflict.

In some embodiments, the second object is a physical object (e.g., physical table 722*a* in FIG. 7A) in a physical environment of the display generation component (804) (e.g., as similarly described above with reference to step 802). In some embodiments, when the first virtual object encounters the depth conflict with the physical object in the physical environment of the display generation component, the computer system displays the first portion of the first virtual object that has the depth conflict with the physical object with the second visual properties, as described above with reference to step 802. In some embodiments, an amount of the first portion of the first virtual object that is displayed with the second visual properties is based on an amount of the first portion of the first virtual object that contacts and/or intersects with the physical object in the physical environment. For example, the portion of the first portion of the first virtual object that is displayed with the second visual properties is larger than (e.g., 5, 10, 15, 20, 25, 30, 40, 50, or 60% larger than) the portion of the first portion of the first virtual object that is contacting/intersecting with the physical object in the physical environment. In some embodiments, the portion of the first portion of the first virtual object that is displayed with the second visual properties is equal to the portion of the first portion of the first virtual object that is contacting/intersecting with the physical object in the physical environment, as similarly shown in FIG. 7C. In some embodiments, the portion of the first portion of the first virtual object that is displayed with the second visual properties is smaller than (e.g., 5, 10, 15, 20, 25, 30, 40, 50, or 60% smaller than) the portion of the first portion of the first virtual object that is contacting/intersecting with the physical object in the physical environment. Changing an appearance of an object in a three-dimensional environment when the object encounters a depth conflict with a physical object based on movement of the object in the three-dimensional environment provides feedback that the display of the object is in conflict with the physical object, which facilitates user input for resolving the depth conflict, thereby improving user-device interaction, and/or reduces the prominence of the depth conflict in the three-dimensional environment, which reduces eye strain of the user, thereby avoiding potential physical discomfort for the user.

In some embodiments, after moving the first virtual object from the first location to the second location in the three-dimensional environment in accordance with the first input and while the first virtual object is at the second location in the three-dimensional environment (806*a*), in accordance with a determination that the first portion of the first virtual object does not occupy a same portion of the three-dimensional environment as a respective object in the three-dimensional environment, and the second portion of the first virtual object does not occupy the same portion of the three-dimensional environment as a respective object in the three-dimensional environment (806*b*) (e.g., the first virtual object does not encounter a depth conflict with a portion of the three-dimensional environment, such as having no depth conflict with any virtual or physical objects in the three-dimensional environment, as similarly described above with reference to step 802), the computer system displays (806*c*) the first portion and the second portion of the first virtual object with the first visual properties, such as display of the virtual object 709*a* with the first visual properties as shown in FIG. 7L. For example, in accordance with the determination that the first portion and the second portion of the first virtual object do not at least partially contact or intersect with a portion of another object at the second location in the three-dimensional environment, as similarly shown in FIG. 7L, the computer system maintains display of the first portion and the second portion of the first virtual object with the first visual properties. Forgoing changing an appearance of an object in a three-dimensional environment when movement of the object in the three-dimensional environment does not cause the object to encounter a depth conflict in the three-dimensional environment provides feedback that the display of the object is not in conflict with a portion of the three-dimensional environment and/or maintains visibility of the content in the three-dimensional environment, thereby improving user-device interaction.

In some embodiments, the first input includes input provided by a predefined portion of a user of the computer system that is directed to the first virtual object (808), such as input provided by hand 703*b* of the user 726 as shown in FIG. 7B. For example, as similarly described above with reference to step 802, the first input includes an air pinch gesture performed by the hand of the user of the computer system, followed by movement of the hand in space while maintaining the pinch hand shape (e.g., corresponding to an input from the user to move the first virtual object in the three-dimensional environment). In some embodiments, the computer system moves the first virtual object in a respective direction and with a respective magnitude that is based on the movement of the hand of the user in space, such as the movement of the hand 703*b* rightward in space as shown in FIG. 7B. For example, if the computer system detects the hand of the user move in a first direction (e.g., rightward or leftward) in space relative to the three-dimensional environment, the computer system moves the first virtual object in a first respective direction (e.g., rightward or leftward) within the three-dimensional environment based on the first direction. If the computer system detects the hand of the user move in a second direction (e.g., upward or downward), different from the first direction, in space relative to the three-dimensional environment, the computer system moves the first virtual object in a second respective direction (e.g., upward or downward), different from the first respective direction, within the three-dimensional environment based on the second direction. In some embodiments, if the computer system detects the hand of the user move in a third direction (e.g., toward or away from the user) in space relative to the three-dimensional environment, the computer system moves the first virtual object in a third respective direction (e.g., toward or away from the viewpoint of the user) within the three-dimensional environment based on the third direction. In some embodiments, if the computer system detects the hand of the user move in space with a first magnitude (e.g., of distance and/or speed), the computer system moves the first virtual object within the three-dimensional environment with a first respective magnitude based on (e.g., proportional to) the first magnitude. If the computer system detects the hand of the user move in space with a second magnitude, different from the first magnitude, the computer system moves the first virtual object within the three-dimensional environment with a second respective magnitude, different from the first respective magnitude, based on the second magnitude. In some embodiments, the air pinch gesture is performed while the attention (e.g., based on gaze) of the user is directed to the first virtual object in the three-dimensional environment. Changing an appearance of an object in a three-dimensional environment when the object encounters a depth conflict based on movement of the object that is in response to movement of a hand of the user provides feedback that the display of the object is in conflict with a portion of the three-dimensional environment, which facilitates user input for resolving the depth conflict, thereby improving user-device interaction, and/or reduces the prominence of the depth conflict in the three-dimensional environment, which reduces eye strain of the user, thereby avoiding potential physical discomfort for the user.

In some embodiments, the first input includes movement of a viewpoint of a user of the computer system (810), such as movement of the viewpoint of the user 726 caused by movement of hand 705*a* as shown in FIG. 7D. For example, as similarly discussed above with reference to step 802, the computer system detects movement of a head of the user, which moves the viewpoint of the user in the three-dimensional environment. In some embodiments, the movement of the head of the user causes the display generation component to move in the physical environment, such as movement of the display generation component 120 as shown in FIG. 7E, which causes the first virtual object to move in the user's field of view of the three-dimensional environment. For example, because the user's viewpoint changes in the three-dimensional environment, an orientation of the first virtual object shifts/changes in the three-dimensional environment based on the amount and/or direction of the movement of the viewpoint of the user, such as change in orientation of the virtual object 709*a* as shown in FIG. 7E, which optionally causes the first portion of the first virtual object to at least partially contact the first portion of the second object from the user's new viewpoint, where the first portion of the first virtual object was not previously in a depth conflict with the first portion of the second object, and was optionally previously in a depth conflict with a different, smaller or larger portion of the second object, such as the depth conflict between the first portion 711 of the virtual object 709*a* and the representation of the table 722*a* in FIG. 7E. In some embodiments, an amount of and a direction in which the orientation of the first virtual object that the computer system shifts/changes in the three-dimensional environment is based on the movement of the viewpoint of the user. For example, if the computer system detects the head of the user move in a first direction (e.g., clockwise) relative to the three-dimensional environment (which causes the viewpoint to shift in the first direction), the computer system rotates/shifts the first virtual object in a first respective direction (e.g., clockwise) in the three-dimensional environment based on the movement of the viewpoint in the first direction relative to the new viewpoint of the user. If the computer system detects the head of the user move in a second direction (e.g., counterclockwise), different from the first direction, such as the leftward movement of the hand 705*a* in FIG. 7D that causes the display generation component 120 to move counterclockwise as shown in FIG. 7E, the computer system rotates/shifts the first virtual object in a second respective direction (e.g., counterclockwise) in the three-dimensional environment based on the movement of the viewpoint in the second direction relative to the new viewpoint of the user. In some embodiments, if the computer system detects the head of the user move with a first magnitude (e.g., of distance and/or speed), which causes the viewpoint of the user to shift with the first magnitude, the computer system rotates/shifts the first virtual object with a first respective magnitude in the three-dimensional environment based on the first magnitude. If the computer system detects the head of the user move with a second magnitude, different from the first magnitude, the computer system optionally rotates/shifts the first virtual object with a second respective magnitude, different from the first respective magnitude, in the three-dimensional environment based on the second magnitude. In some embodiments, if the computer system detects the movement of the viewpoint of the user while a portion of the first virtual object does not have a depth conflict in the three-dimensional environment, the computer system forgoes changing/shifting the orientation of the first virtual object in the three-dimensional environment. In some embodiments, the first virtual object is viewpoint-locked (e.g., as defined herein). For example, the movement of the viewpoint of the user causes the first virtual object to move within the three-dimensional environment in accordance with the movement of the viewpoint (e.g., in accordance with a direction and/or magnitude of the movement), which optionally causes the first virtual object to encounter a depth conflict in the three-dimensional environment and/or increase a degree of the depth conflict in the three-dimensional environment (e.g., as similarly discussed above). In some embodiments, the first virtual object is world-locked (e.g., as defined herein) within the three-dimensional environment, but rotates (e.g., about a center point through the first virtual object) to remain facing toward the user in response to changes of the user's viewpoint. For example, the movement of the viewpoint of the user causes the first virtual object to rotate (e.g., without movement of position) within the three-dimensional environment in accordance with the movement of the viewpoint, which optionally causes the first virtual object to encounter a depth conflict in the three-dimensional environment and/or increase a degree of the depth conflict in the three-dimensional environment. Changing an appearance of an object in a three-dimensional environment when the object encounters a depth conflict based on movement of the object that is in response to movement of a viewpoint of the user provides feedback that the display of the object is in conflict with a portion of the three-dimensional environment, which facilitates user input for resolving the depth conflict, thereby improving user-device interaction, and/or reduces the prominence of the depth conflict in the three-dimensional environment, which reduces eye strain of the user, thereby avoiding potential physical discomfort for the user.

In some embodiments, the first virtual object is world-locked within the three-dimensional environment (812), such as world-locked virtual object 709a in FIG. 7B (e.g., as defined herein). Changing an appearance of a world-locked object in a three-dimensional environment when the object encounters a depth conflict based on movement of the object in the three-dimensional environment provides feedback that the display of the object is in conflict with a portion of the three-dimensional environment, which facilitates user input for resolving the depth conflict, thereby improving user-device interaction, and/or reduces the prominence of the depth conflict in the three-dimensional environment, which reduces eye strain of the user, thereby avoiding potential physical discomfort for the user.

In some embodiments, changing the first portion of the first virtual object from having the first visual properties to the second visual properties includes changing a visual parameter of the first virtual object in a first direction (814a) (e.g., increasing a transparency, blur, or other visual property, as similarly shown in FIG. 7C and as similarly discussed above in step 802). In some embodiments, while displaying the first portion of the first virtual object with the second visual properties because the first portion of the first virtual object occupies the same portion of the three-dimensional environment as the first portion of the second object in the three-dimensional environment, the computer system detects (814b), via the one or more input devices, an end of the first input, such as a release of the air pinch gesture provided by hand 703c in FIG. 7C. For example, the computer system detects an end of the movement of the user providing the first input, followed by a release of the pinch hand shape (e.g., in which the index finger and thumb of the user are no longer in contact) while the first virtual object is displayed at the second location in the three-dimensional environment.

In some embodiments, in response to detecting the end of the first input (814c), in accordance with a determination that one or more criteria are satisfied, the computer system displays (814d) at least a portion of the first portion of the first virtual object with third visual properties, such as display of the first portion 711 of the virtual object 709a with the third visual properties as shown in FIG. 7D, wherein changing the first portion of the first virtual object from having the second visual properties to the third visual properties includes changing the visual parameter of the first virtual object in a second direction that is opposite to the first direction (e.g., at least partially adjusting (optionally reversing) a change in visual appearance from the first visual properties to the second visual properties, such as by decreasing a transparency, blur, or other visual property). For example, the one or more criteria are satisfied if the computer system determines that a threshold amount of time (e.g., 0.1, 0.5, 0.75, 1, 1.5, 2, 3, 4, 5, 8, 10, or 12 seconds) has elapsed since detecting the end of the first input, as represented by timeline 707 in FIG. 7D. In some embodiments, if the computer system determines that the one or more criteria are satisfied, the computer system adjusts (e.g., reverses) at least a portion of the change in appearance of the first portion of the first virtual object. For example, the computer system displays at least a portion of the first portion of the first virtual object with the first visual properties. In some embodiments, the computer system increases an opacity and/or brightness of at least a portion of the first portion of the first virtual object if the one or more criteria are satisfied, as similarly shown in FIG. 7D. For example, the computer system displays at least the portion of the first portion of the first virtual object with an amount of opacity that is more than the amount of opacity for the second visual properties and that is less than the amount of opacity for the first visual properties. Additionally, the computer system optionally displays at least the portion of the first portion of the first virtual object with an amount of brightness that is less than the amount of brightness for the second visual properties and/or that is equal to the amount of brightness for the first visual properties. Partially adjusting (e.g., reversing) a change of appearance of an object in a three-dimensional environment when one or more criteria are satisfied after detecting an end of input that caused the object to encounter a depth conflict in the three-dimensional environment provides feedback that the display of the object is still in conflict with a portion of the three-dimensional environment, which facilitates user input for resolving the depth conflict, thereby improving user-device interaction.

In some embodiments, the one or more criteria include a criterion that is satisfied when a first threshold amount of time (e.g., 0.1, 0.5, 0.75, 1, 1.5, 2, 3, 4, 5, 8, 10, or 12 seconds) has elapsed since detecting the end of the first input (816) (e.g., as similarly described above with reference to step 814), as represented by timeline 707 in FIGS. 7C-7D. Partially adjusting (e.g., reversing) a change of appearance of an object in a three-dimensional environment when a threshold amount of time has elapsed after detecting an end of input that caused the object to encounter a depth conflict in the three-dimensional environment provides feedback that the display of the object is still in conflict with a portion of the three-dimensional environment, which facilitates user input for resolving the depth conflict, thereby improving user-device interaction.

In some embodiments, displaying the first portion of the first virtual object with the first visual properties includes displaying the first portion of the first virtual object with a first amount of opacity (818*a*), as similarly described with reference to FIG. 7B. For example, the computer system displays the first portion and the second portion of the first virtual object with the first amount of opacity in the three-dimensional environment prior to detecting the first input. In some embodiments, displaying the first portion of the first virtual object with the second visual properties includes displaying the first portion of the first virtual object with a second amount of opacity, different from the first amount of opacity (818*b*), as similarly described with reference to FIG. 7C. For example, the computer system displays the first portion of the first virtual object with the second amount of opacity in the three-dimensional environment when the first portion of the first virtual object occupies a same portion of the three-dimensional environment as the first portion of the second object. In some embodiments, the second amount of opacity is smaller than the first amount of opacity. For example, the first portion of the first virtual object is displayed with a greater amount of translucency than the second portion of the first virtual object (e.g., because the second portion of the first virtual object is not in contact with a respective object in the three-dimensional environment). Changing an opacity of a portion of an object in a three-dimensional environment when the portion of the object encounters a depth conflict based on movement of the object in the three-dimensional environment provides feedback that the display of the object is in conflict with a portion of the three-dimensional environment, which facilitates user input for resolving the depth conflict, thereby improving user-device interaction, and/or reduces the prominence of the depth conflict in the three-dimensional environment, which reduces eye strain of the user, thereby avoiding potential physical discomfort for the user.

In some embodiments, displaying the first portion of the first virtual object with the first visual properties includes displaying the first portion of the first virtual object with a first amount of brightness (820*a*), as similarly described with reference to FIG. 7B. For example, the computer system displays the first portion and the second portion of the first virtual object with the first amount of brightness in the three-dimensional environment prior to detecting the first input. In some embodiments, displaying the first portion of the first virtual object with the second visual properties includes displaying the first portion of the first virtual object with a second amount of brightness, different from the first amount of brightness (820*b*), as similarly described with reference to FIG. 7C. For example, the computer system displays the first portion of the first virtual object with the second amount of brightness in the three-dimensional environment when the first portion of the first virtual object occupies a same portion of the three-dimensional environment as the first portion of the second object. In some embodiments, the second amount of brightness is smaller than the first amount of brightness. For example, the first portion of the first virtual object is displayed with a smaller amount of brightness than the second portion of the first virtual object (e.g., because the second portion of the first virtual object is not in contact with a respective object in the three-dimensional environment). Changing a brightness of a portion of an object in a three-dimensional environment when the portion of the object encounters a depth conflict based on movement of the object in the three-dimensional environment provides feedback that the display of the object is in conflict with a portion of the three-dimensional environment, which facilitates user input for resolving the depth conflict, thereby improving user-device interaction, and/or reduces the prominence of the depth conflict in the three-dimensional environment, which reduces eye strain of the user, thereby avoiding potential physical discomfort for the user.

In some embodiments, displaying the second portion of the first virtual object with the first visual properties includes displaying the second portion of the first virtual object with a first amount of opacity (822*a*), such as opacity of the virtual object 709*a* as shown in FIG. 7L (e.g., an opacity determined based on the content of the first virtual object, as similarly described above with reference to step 802). In some embodiments, while displaying the first virtual object at the second location in the three-dimensional environment (e.g., after detecting the first input), the computer system detects (822*b*), via the one or more input devices, a second input corresponding to movement of the first virtual object relative to a viewpoint of a user of the computer system, such as movement of the hand 703*b* as shown in FIG. 7B (e.g., such as an input that causes movement of the first virtual object away from the second location in the three-dimensional environment, as similarly described above with reference to step 802). In some embodiments, the second input is an input that corresponds to movement of the first virtual object away from the second location in the three-dimensional environment and/or an input that corresponds to movement of the viewpoint of the user.

In some embodiments, while detecting the second input and while moving the first virtual object relative to the viewpoint of the user in accordance with the second input, the computer system reduces (822*c*) an opacity of the second portion of the first virtual object relative to an opacity of the first portion of the first virtual object, such as reducing the opacity of the virtual object 709*a* as shown in FIG. 7B. For example, if the second input includes movement of the hand of the user that corresponds to movement of the first virtual object in the three-dimensional environment relative to the viewpoint of the user (e.g., without including movement of the viewpoint of the user relative to the three-dimensional environment), the computer system optionally reduces an opacity of the second portion of the first virtual object by an amount that is more than an amount by which the opacity of the first portion of the first virtual object is reduced. In some embodiments, if the second input includes movement of the viewpoint of the user, the computer system reduces the opacity of the second portion of the first virtual object without reducing the opacity of the first portion of the first virtual. Changing an opacity of a portion of an object in a three-dimensional environment in response to movement of the object based on whether the object has a depth conflict in the three-dimensional environment provides spatial awareness of portions of the three-dimensional environment that are behind the object during the movement of the object, which facilitates user input for avoiding a depth conflict for the object during the movement, thereby improving user-device interaction.

In some embodiments, while displaying the first virtual object at the second location in the three-dimensional environment and while the first portion of the first virtual object occupies a same portion of the three-dimensional environment as the first portion of the second object in the three-dimensional environment (e.g., the first portion of the first virtual object at least partially contacts or intersects with the first portion of the second object at the second location and/or before displaying the first virtual object at the second location), such as while the first portion 711 of the virtual object 709*a* has the depth conflict with the representation of the table 722*a* in FIG. 7D (and optionally while the second portion of the first virtual object does not occupy a same portion of the three-dimensional environment as a respective object in the three-dimensional environment), the computer system detects (824*a*), via the one or more input devices, a second input corresponding to movement of the first virtual object relative to a viewpoint of a user of the computer system (e.g., such as an input that causes movement of the first virtual object within the three-dimensional environment as similarly described above with reference to step 802). In some embodiments, the second input is an input that corresponds to movement of the first virtual object away from the second location in the three-dimensional environment and/or an input that corresponds to movement of the viewpoint of the user.

In some embodiments, while detecting the second input and while moving the first virtual object relative to the viewpoint of the user in accordance with the second input (824*b*), in accordance with a determination that the movement of the first virtual object relative to the viewpoint of the user corresponds to movement of the first virtual object from the second location to a third location in the three-dimensional environment (824*c*) (and optionally that a third portion of the first virtual object occupies a same portion of the three-dimensional environment as a respective object in the three-dimensional environment (e.g., a physical object in the physical environment surrounding the display generation component)), such as movement of the hand 703*e* as shown in FIG. 7E, the computer system displays (824*d*) the third portion of the first virtual object with third visual properties, different from the first visual properties, such as display of portion 719 of the virtual object 709*a* with visual properties that mitigate the depth conflict between the virtual object 709*a* and the representation of the table 722*a* as shown in FIGS. 7F and 7F1. For example, the second input includes movement of a hand of the user in space with a respective magnitude and in a respective direction, as similarly discussed above with reference to step 802. In some embodiments, the computer system detects the movement of the hand after detecting an air pinch gesture (e.g., in which the index finger and thumb of the hand of the user are in contact) directed toward the first virtual object (e.g., while the attention of the user is directed to the first virtual object). In some embodiments, the computer system detects the movement of the hand of the user after detecting a selection on a hardware input device (e.g., a controller) in communication with the computer system, as similarly described above with reference to step 802. In some embodiments, while detecting the second input that includes the movement of the hand of the user, the computer system changes an appearance of the third portion of the first virtual object if the third portion of the first virtual object has a depth conflict with the respective object in the three-dimensional environment. For example, the third portion of the first virtual object is displayed with the second visual properties that resolves or reduces the depth conflict between the first portion of the first virtual object and the first portion of the second object before the computer system detects the second input, and while moving the first virtual object, the third portion of the first virtual object is displayed with the third visual properties that resolves or reduces the depth conflict between the third portion of the first virtual object and the respective object in the three-dimensional environment, such as display of the first portion 715 of the virtual object 709*a* with the second visual properties and display of the third portion 719 of the virtual object 709*a* with the third visual properties as shown in FIGS. 7F and 7F1. In some embodiments, the third visual properties are similar to (e.g., has one or more characteristics of) the second visual properties described above with reference to step 802.

In some embodiments, in accordance with a determination that the movement of the first virtual object relative to the viewpoint of the user corresponds to movement of the viewpoint of the user of the computer system (824*e*) (and optionally that the third portion of the first virtual object occupies a same portion of the three-dimensional environment as the respective object in the three-dimensional environment), such as movement of the viewpoint of the user 726 caused by movement of the hand 705*a* as shown in FIG. 7D, the computer system displays (8241) the third portion of the first virtual object with fourth visual properties, different from the first visual properties and the third visual properties. For example, as similarly discussed above with reference to step 802, the second input includes movement of a head of the user, which moves the viewpoint of the user in the three-dimensional environment. In some embodiments, the movement of the head of the user causes the display generation component to move in the physical environment, such as movement of the display generation component 120 as shown in FIG. 7E, which causes the first virtual object to move in the user's field of view of the three-dimensional environment, such as changing an orientation at which the virtual object 709*a* is displayed relative to the new viewpoint of the user 726 as shown in FIG. 7E. In some embodiments, while detecting the second input that includes the movement of the head of the user, the computer system changes an appearance of the third portion of the first virtual object if the third portion of the first virtual object has a depth conflict with the respective object in the three-dimensional environment. For example, the third portion of the first virtual object is displayed with the second visual properties that resolve or reduce the depth conflict between the first portion of the first virtual object and the first portion of the second object before the computer system detects the second input, and while the viewpoint of the user is moving, the third portion of the first virtual object is displayed with the fourth visual properties that resolve or reduce the depth conflict between the third portion of the first virtual object and the respective object in the three-dimensional environment, such as display of the first portion 715 of the virtual object 709*a* with the second visual properties and display of the third portion 719 of the virtual object 709*a* with the third visual properties as shown in FIGS. 7F and 7F1 if the movement of the virtual object 709*a* in FIGS. 7F and 7F1 were caused by the movement of the viewpoint. In some embodiments, the fourth visual properties are different from the third visual properties described above. For example, values of the opacity, brightness, coloration, and/or saturation of the third portion of the first virtual object when displayed with the third visual properties are different from those of the third portion of the first virtual object when displayed with the fourth visual properties. In some embodiments, display of third portion of the first virtual object with the fourth visual properties in response to the computer system detecting movement of the viewpoint of the user provides feedback to the user that a depth conflict exists in the three-dimensional environment, which optionally changes as a result of the movement of the viewpoint of the user (e.g., due to tilting and/or parallax of the virtual object based on the movement of the viewpoint, as similarly described above with reference to step 810). Changing an appearance of a portion of an object in a three-dimensional environment when the portion of the object encounters a depth conflict based on the movement of the object in the three-dimensional environment and/or movement of the viewpoint of the user provides feedback that the display of the object is in conflict with a portion of the three-dimensional environment due to the movement of the object and/or the movement of the viewpoint, which facilitates user input for resolving the depth conflict, thereby improving user-device interaction, and/or reduces the prominence of the depth conflict in the three-dimensional environment, which reduces eye strain of the user, thereby avoiding potential physical discomfort for the user.

In some embodiments, displaying the third portion of the first virtual object with the third visual properties includes displaying a boundary between the third portion of the first virtual object and a fourth portion of the first virtual object with a first visual transition, as similarly described with reference to FIG. 7C, wherein the fourth portion of the first virtual object does not occupy a same portion of the three-dimensional environment as a respective object in the three-dimensional environment (826a), such as second portion 713 not occupying the same portion of the three-dimensional environment 702 as the representation of the table 722a as shown in FIG. 7C. For example, while the first virtual object has the depth conflict with the respective object in the three-dimensional environment due to the movement of the first virtual object relative to the viewpoint of the user as described above with reference to step 824, the computer system displays a boundary between the third portion that has the depth conflict and the fourth portion that does not have the depth conflict, such as the boundary between the first portion 711 and the second portion 713 of the virtual object 709a discussed with reference to FIG. 7C. In some embodiments, displaying the boundary between the third portion and the fourth portion of the first virtual object with the first visual transition includes displaying an animation effect of a first type that causes the third portion of the first virtual object to be visible relative to the viewpoint of the user when the third portion of the virtual object contacts or intersects with the respective object in the three-dimensional environment. For example, as similarly described above with reference to step 802, the animation effect of the first type includes a feathering effect that, when the third portion of the first virtual object is in contact with a portion of the respective object, veils (e.g., occludes or partially occludes) the portion of the respective object by a first amount (e.g., and/or with a first speed or immediacy of occlusion and/or first extension away from the third portion of the first virtual object that has the depth conflict), such as the veiling of the portion of the representation of the table 722a with which the virtual object 709a has the depth conflict as shown in FIG. 7C. In some embodiments, displaying the boundary between the third portion of the first virtual object and the fourth portion of the first virtual object with the first visual transition includes displaying the boundary with a first distance/width. For example, when the computer system displays the boundary with the first visual transition, the boundary extends 1, 2, 3, 4, 5, 8, 10, 12, 15, or 20 cm between the third portion and the fourth portion of the first virtual object.

In some embodiments, displaying the third portion of the first virtual object with the fourth visual properties includes displaying the boundary between the third portion of the first virtual object and the fourth portion of the first virtual object with a second visual transition, different from the first visual transition (826b), as similarly described with reference to FIG. 7E. For example, while the first virtual object has the depth conflict with the respective object in the three-dimensional environment due to the movement of the viewpoint of the user (e.g., caused by the movement of the display generation component) as described above with reference to step 824, the computer system displays the boundary between the third portion that has the depth conflict and the fourth portion that does not have the depth conflict, such as the boundary between the first portion 711 and the second portion 713 of the virtual object 709a described with reference to FIG. 7E. In some embodiments, displaying the boundary between the third portion and the fourth portion of the first virtual object with the second visual transition includes displaying an animation effect of a second type, different from the first type described above, that causes the third portion of the first virtual object to be visible relative to the viewpoint of the user when the third portion of the virtual object contacts or intersects with the respective object in the three-dimensional environment. For example, as similarly described above with reference to step 802, the animation effect of the second type includes a feathering effect that, when the third portion of the first virtual object is in contact with a portion of the respective object, veils (e.g., occludes or partially occludes) the portion of the respective object by a second amount (e.g., and/or with a second speed or immediacy of occlusion and/or second extension away from the third portion of the first virtual object that has the depth conflict), different from the first amount described above, such as the veiling of the portion of the representation of the table 722a with which the virtual object 709a has the depth conflict as shown in FIG. 7E. In some embodiments, displaying the boundary between the third portion of the first virtual object and the fourth portion of the first virtual object with the second visual transition includes displaying the boundary with a second distance/width, different from the first distance/width above. For example, when the computer system displays the boundary with the second visual transition, the boundary extends 0.5, 0.75, 1, 2, 3, 4, 5, 8, 10, cm between the third portion and the fourth portion of the first virtual object. Displaying a visual between a first portion of an object in a three-dimensional environment that encounters a depth conflict and a second portion of the object that does not encounter the depth conflict based on the movement of the object in the three-dimensional environment and/or movement of the viewpoint of the user provides feedback that the display of the object is in conflict with a portion of the three-dimensional environment due to the movement of the object and/or the movement of the viewpoint, which facilitates user input for resolving the depth conflict, thereby improving user-device interaction, and/or reduces the prominence of the depth conflict in the three-dimensional environment, which reduces eye strain of the user, thereby avoiding potential physical discomfort for the user.

In some embodiments, displaying the third portion of the first virtual object with the third visual properties includes displaying the third portion of the first virtual object with a first amount of a visual effect (828a), such as the visual effect of the first portion 711 shown in FIG. 7C. For example, while the first virtual object has the depth conflict with the respective object in the three-dimensional environment due to the movement of the first virtual object relative to the viewpoint of the user as described above with reference to step 824, the computer system displays the third portion of the first virtual object that has the depth conflict with the first amount of the visual effect. In some embodiments, displaying the third portion of the first virtual object with the first amount of the visual effect includes displaying the third portion of the first virtual object with first values of opacity, brightness, coloration, and/or saturation that resolve or reduce the depth conflict between the third portion of the first virtual object and the respective object in the three-dimensional environment, such as resolving or reducing the depth conflict between the first portion 711 and the representation of the table 722a as shown in FIG. 7C and as similarly described above with reference to step 802.

In some embodiments, displaying the third portion of the first virtual object with the fourth visual properties includes displaying the third portion of the first virtual object with a second amount, different from the first amount, of the visual effect (828b), such as the visual effect of the first portion 711 of the virtual object 709 in FIG. 7E. For example, while the first virtual object has the depth conflict with the respective object in the three-dimensional environment due to the movement of the viewpoint of the user (e.g., caused by the movement of the display generation component) as described above with reference to step 824, the computer system displays the third portion of the first virtual object that has the depth conflict with the second amount of the visual effect. In some embodiments, displaying the third portion of the first virtual object with the second amount of the visual effect includes displaying the third portion of the first virtual object with second values of the opacity, brightness, coloration, and/or saturation that resolve or reduce the depth conflict between the third portion of the first virtual object and the respective object in the three-dimensional environment, such as resolving or reducing the depth conflict between the first portion 711 and the representation of the table 722a as shown in FIG. 7E and as similarly described above with reference to step 802. In some embodiments, the second amount of the visual effect is less than the first amount of the visual effect. In some embodiments, the second amount of the visual effect is greater than the first amount of the visual effect. Displaying a portion of an object in a three-dimensional environment that encounters a depth conflict with a visual effect based on the movement of the object in the three-dimensional environment and/or movement of the viewpoint of the user provides feedback that the display of the object is in conflict with a portion of the three-dimensional environment due to the movement of the object and/or the movement of the viewpoint, which facilitates user input for resolving the depth conflict, thereby improving user-device interaction, and/or reduces the prominence of the depth conflict in the three-dimensional environment, which reduces eye strain of the user, thereby avoiding potential physical discomfort for the user.

In some embodiments, the three-dimensional environment includes a third object (830a) (e.g., a physical object or a virtual object), such as sofa 724a in FIG. 7A. In some embodiments, in accordance with a determination that the first portion of the first virtual object (e.g., portion 719 of the virtual object 709a in FIGS. 7F and 7F1) occupies a same portion of the three-dimensional environment as the first portion of the second object (e.g., table 722a in FIGS. 7F and 7F1) in the three-dimensional environment, and a third portion of the first virtual object (e.g., portion 715 of the virtual object 709a in FIGS. 7F and 7F1) occupies a same portion of the three-dimensional environment as the third object in the three-dimensional environment (830b), such as the portion 715 of the virtual object 709a encountering a depth conflict with the sofa 724a as shown in FIGS. 7F and 7F1, the computer system displays (830c) the third portion of the first virtual object with third visual properties, different from the first visual properties, in the three-dimensional environment, such as display of the portion 715 of the virtual object 709a with the third visual properties as shown in FIGS. 7F and 7F1. For example, if the computer system determines that the third portion of the first virtual object at least partially contacts a portion of the third object in the three-dimensional environment, the computer system changes an appearance of the third portion of the first virtual object to mitigate the depth conflict between the first virtual object and the third object in the three-dimensional environment. In some embodiments, the computer system concurrently displays the first portion of the first virtual object with the second visual properties and the third portion of the first virtual object with the third visual properties at the second location in the three-dimensional environment, such as concurrently displaying the portion 719 of the virtual object 709a with the second visual properties and the portion 715 of the virtual object 709a with the third visual properties as shown in FIGS. 7F and 7F1. In some embodiments, the third visual properties are different from the second visual properties (e.g., a change in opacity and/or brightness for the third portion of the first virtual object is different from that for the first portion of the first virtual object). Changing an appearance of an object in a three-dimensional environment when the object encounters a depth conflict with multiple objects based on movement of the object in the three-dimensional environment provides feedback that the display of the object is in conflict with portions of the three-dimensional environment, which facilitates user input for resolving the depth conflict, thereby improving user-device interaction, and/or reduces the prominence of the depth conflict in the three-dimensional environment, which reduces eye strain of the user, thereby avoiding potential physical discomfort for the user.

In some embodiments, while displaying the first portion of the first virtual object with the second visual properties because the first portion of the first virtual object occupies the same portion of the three-dimensional environment as the first portion of the second object, and displaying the third portion of the first virtual object with the third visual properties because the third portion of the first virtual object occupies the same portion of the three-dimensional environment as the third object, the computer system detects (832a), via the one or more input devices, a second input corresponding to movement of the first virtual object from the second location to a third location, different from the second location, in the three-dimensional environment, such as movement input directed to the virtual object 709a provided by hand 703f as shown in FIGS. 7F and 7F1. For example, while displaying the first virtual object at the second location in the three-dimensional environment, the computer system detects the second input corresponding to movement of the first virtual object away from the second location. In some embodiments, as similarly described above with reference to step 802, the computer system detects an air pinch gesture directed to the first virtual object (e.g., while the attention of the user is directed to the first virtual object), followed by movement of the hand of the user that provided the air pinch gesture in a respective direction and with a respective magnitude.

In some embodiments, in response to detecting the second input (832b), the computer system moves (832c) the first virtual object from the second location to the third location in the three-dimensional environment in accordance with the second input, such as movement of the virtual object 709a within the three-dimensional environment 702 as similarly shown in FIG. 7C. For example, the computer system displays the first virtual object at the third location in the three-dimensional environment.

In some embodiments, in accordance with a determination that the movement of the first virtual object to the third location in the three-dimensional environment changes the co-occupancy between the first virtual object and the second object, the computer system updates (832d) display of the visual properties of the first portion of the first virtual object in the three-dimensional environment, such as the visual properties of the portion 715 of the virtual object 709a in FIGS. 7F and 7F1. In some embodiments, in accordance with a determination that the movement of the first virtual object to the third location in the three-dimensional environment changes the co-occupancy between the first virtual object and the third object, the computer system updates (832e) display of the visual properties of the third portion of the first virtual object in the three-dimensional environment, such as the visual properties of the portion 715 of the virtual object 709a in FIGS. 7F and 7F1. For example, in response to moving the first virtual object from the second location to the third location in the three-dimensional environment, if the computer system determines that the depth conflict between the first portion of the first virtual object and the second object and the depth conflict between the third portion of the first virtual object and the third object in the three-dimensional environment changes (e.g., increases or decreases), such as changing the depth conflict between the portion 719 of the virtual object 709a and the representation of the table 722a and the portion 715 of the virtual object 709a and the representation of the sofa 724a in the three-dimensional environment 702 in FIGS. 7F and 7F1 if the depth conflicts were to change in response to user input. the computer system changes an appearance of the first portion and the third portion of the first virtual object. If the depth conflict between the first portion of the first virtual object and the second object and the depth conflict between the third portion of the first virtual object and the third object increase due to the movement of the first virtual object, the computer system optionally increases a magnitude of the change in appearance (e.g., values of the brightness, opacity, coloration, and/or saturation) of the first portion and the third portion of the virtual object to mitigate the increased depth conflict between the first virtual object and the second object and between the first virtual object and the third object in the three-dimensional environment. If the depth conflict between the first portion of the first virtual object and the second object and the depth conflict between the third portion of the first virtual object and the third object decrease due to the movement of the first virtual object, the computer system optionally decreases a magnitude of the change in appearance (e.g., values of the brightness, opacity, coloration, and/or saturation) of the first portion and the third portion of the virtual object to mitigate the decreased depth conflict between the first virtual object and the second object and between the first virtual object and the third object in the three-dimensional environment. For example, if the movement of the first virtual object to the third location resolves or reduces the depth conflict in the three-dimensional environment (e.g., such that the first virtual object is no longer contacting the second object and the third object), the computer system displays the first portion and the third portion of the first virtual object with the first visual properties. In some embodiments, if the movement of the first virtual object to the third location in the three-dimensional environment changes (e.g., increases or decreases) the depth conflict between a portion of the first virtual object and one object in the three-dimensional environment but resolves or reduces the depth conflict between the first virtual object and another object in the three-dimensional environment, the computer system separately changes the appearance of the portions of the first virtual object. For example, if the depth conflict between the first portion (or the third portion) of the first virtual object changes (e.g., increases or decreases) due to the movement of the virtual object and the depth conflict between the third portion (or the first portion) of the first virtual object is resolved due to the movement of the first virtual object, the computer system changes the magnitude of the change in appearance (e.g., values of the brightness, opacity, coloration, and/or saturation) of the first portion (or the third portion) of the first virtual object to mitigate the depth conflict and displays the third portion (or the first portion) of the first virtual object with the first visual properties. In some embodiments, the computer system displays a portion of the first virtual object that does not at least partially contact a respective object in the three-dimensional environment with the first visual properties, as similarly described above with reference to step 802. Changing an appearance of an object in a three-dimensional environment when the object encounters a depth conflict with multiple objects based on movement of the object in the three-dimensional environment provides feedback that the display of the object is in conflict or is no longer in conflict with portions of the three-dimensional environment, which facilitates user input for resolving the depth conflict, thereby improving user-device interaction, and/or reduces the prominence of the depth conflict in the three-dimensional environment, which reduces eye strain of the user, thereby avoiding potential physical discomfort for the user.

In some embodiments, while displaying the first portion of the first virtual object with the second visual properties because the first portion of the first virtual object occupies the same portion of the three-dimensional environment as the first portion of the second object in the three-dimensional environment, the computer system detects (834a), via the one or more input devices, a second input corresponding to a request to display a virtual environment in the three-dimensional environment, such as engagement with hardware button 741 of the computer system 101 in FIG. 7J. For example, while displaying the first virtual object at the second location in the three-dimensional environment, the computer system detects the second input. In some embodiments, the second input includes selection of a respective option displayed in the three-dimensional environment that is selectable to cause the computer system to display a virtual environment in the three-dimensional environment. In some embodiments, the second input includes interaction with a hardware input device in communication with the computer system. For example, the computer system detects a selection (e.g., a physical press) and/or scrolling or rotation of a hardware button of the computer system that corresponds to the request to display the virtual environment in the three-dimensional environment. In some embodiments, the second input has one or more characteristics of inputs corresponding to a request to display a virtual environment in the three-dimensional environment described in method 900.

In some embodiments, in response to detecting the second input (834*b*), the computer system displays (834*c*), via the display generation component, the virtual environment within the three-dimensional environment (e.g., the computer system displays an immersive virtual environment that occupies all or portions of the three-dimensional environment (e.g., portions of the three-dimensional environment that include the physical environment)), such as display of virtual environment 728 within three-dimensional environment 702 as shown in FIG. 7I, including, in accordance with a determination that the second location of the first virtual object in the three-dimensional environment is within the virtual environment (834*d*), displaying the first virtual object in the virtual environment (834*e*), such as display of the virtual object 709*a* in the virtual environment 728 as shown in FIG. 7I. In some embodiments, the virtual environment includes a scene (e.g., a beach scene as shown in FIG. 7I) that at least partially veils at least a part of the three-dimensional environment (and/or the physical environment surrounding the display generation component) such that it appears as if the user were located in the scene (e.g., and optionally no longer located in the three-dimensional environment). In some embodiments, the virtual environment is an atmospheric transformation that modifies one or more visual characteristics of the three-dimensional environment such that it appears as if the three-dimensional environment is located at a different time, place, and/or condition (e.g., morning lighting instead of afternoon lighting, sunny instead of overcast, and/or evening instead of morning). In some embodiments, the virtual environment has one or more characteristics of virtual environments in methods 900 and/or 1000. In some embodiments, the first virtual object is displayed within the virtual environment, such that a portion of the virtual environment is displayed in the background of and/or behind the first virtual object relative to a viewpoint of the user in the three-dimensional environment.

In some embodiments, the computer system displays (8340 the first portion of the first virtual object with the first visual properties, such as display of the virtual object 709*a* with the first visual properties as shown in FIG. 7I. In some embodiments, as described in methods 900 and/or 1000, when a portion of the first virtual object at least partially intersects with or contacts a portion of the second object, the portions of the first virtual object and the second object create a depth conflict in the three-dimensional environment. In some embodiments, the virtual environment is displayed in the three-dimensional environment to occlude the second object (e.g., the virtual environment does not include the second object, and is displayed as occupying a portion of the three-dimensional environment that is occupied by the second object), such as the occlusion of the left side wall with which the virtual object 709*a* has the depth conflict in FIG. 7I, and thus resolves or reduces the depth conflict (e.g., the overlap) between the first virtual object and the second object in the three-dimensional environment. In some embodiments, the virtual environment is centered on the first virtual object (e.g., extends equidistantly away from the first virtual object). Removing a change in appearance of an object when displaying a virtual environment that includes the object in the three-dimensional environment that resolves or reduces a depth conflict between the object and a portion of the three-dimensional environment reduces the prominence of the depth conflict, which reduces eye strain of the user, thereby avoiding potential physical discomfort for the user.

In some embodiments, while displaying the first virtual object at the second location in the three-dimensional environment, the three-dimensional environment is displayed with a first visual emphasis relative to the first virtual object (836*a*) (e.g., the three-dimensional environment is displayed with a first amount of lighting/brightness that is determined based on current default settings for the three-dimensional environment, natural lighting of the physical environment surrounding the display generation component, and/or settings for the first virtual object in the three-dimensional environment), such as the visual emphasis of the three-dimensional environment 702 relative to the virtual object 709*a* in FIG. 7L. In some embodiments, while displaying the first portion of the first virtual object with the second visual properties because the first portion of the first virtual object occupies the same portion of the three-dimensional environment as the first portion of the second object in the three-dimensional environment, such as while the virtual object 709*a* has the depth conflict with the representation of the table 722*a* in FIG. 7M, the computer system detects (836*b*), via the one or more input devices, a respective event corresponding to a request to display the three-dimensional environment with a second visual emphasis, different from the first visual emphasis, relative to the first virtual object, such as an input provided by hand 705*a* in FIG. 7M. For example, while the displaying the first portion of the first virtual object with the second visual properties to mitigate the depth conflict between the first virtual object and the second object, the computer system detects a respective event. In some embodiments, as similarly described below with reference to steps 838-840, detecting the respective event includes detecting selection (e.g., provided by the hand 705*a* in FIG. 7M) of a selectable option (e.g., selectable option 732 in FIG. 7M) and/or other input corresponding to a request to activate a focus mode for the first virtual object. In some embodiments, detecting the respective event includes detecting attention (e.g., based on gaze) of the user directed to the first virtual object, such as gaze 721 directed to the virtual object 709*a* in FIG. 7M (e.g., for a threshold amount of time, such as 0.1, 0.5, 1, 1.5, 2, 3, 5, 8, 10, 12 or 15 seconds, as indicated by the timeline 707 in FIG. 7M), as similarly described below with reference to step 840. In some embodiments, as described below, activation of the focus mode causes the computer system to change the lighting/brightness of the three-dimensional environment relative to the first virtual object in the three-dimensional environment. For example, when the focus mode is active, the content of the first virtual object is visually emphasized (e.g., brightened) relative to the portions of the three-dimensional environment surrounding the first virtual object, such that the attention of the user is drawn to the content of the first virtual object and/or the content of the first virtual object is clearly visible and/or legible from the viewpoint of the user.

In some embodiments, in response to detecting the respective event (836*c*), the computer system displays (836*d*), via the display generation component, the three-dimensional environment with the second visual emphasis relative to the first virtual object, such as dimming/darkening the three-dimensional environment 702 relative to the virtual object 709*a* as shown in FIG. 7N. For example, in response to detecting the respective event, the computer system activates the focus mode for the first virtual object, as similarly described with reference to FIG. 7N. In some embodiments, the computer system decreases a value of the lighting/brightness of the three-dimensional environment when the focus mode is activated. For example, the computer system darkens the passthrough of the physical environment surrounding the first virtual object in the three-dimensional environment such that the first virtual object is visually emphasized and displayed with prominence relative to the surrounding portions of the three-dimensional environment, such as relative to the representation of the table 722*a* and the representation of the sofa 724*a* as shown in FIG. 7N. In some embodiments, the computer system displays the three-dimensional environment with the second visual emphasis relative to the first virtual object without decreasing a value of the lighting/brightness of the first virtual object in the three-dimensional environment.

In some embodiments, the computer system displays (836*e*) the first portion of the first virtual object with the first visual properties, such as display of the virtual object 709*a* with the first visual properties as shown in FIG. 7N. For example, the computer system redisplays the first portion of the first virtual object with the first visual properties, such that the first portion and the second portion of the first virtual object are consistent in appearance. In some embodiments, the computer system displays the first portion of the first virtual object with the first visual properties because displaying the three-dimensional environment with the second visual emphasis relative to the first virtual object mitigates the depth conflict between the first virtual object and the second object in the three-dimensional environment. For example, darkening the portions of the three-dimensional environment surrounding the first virtual object relative to the first virtual object includes darkening the second object, including the first portion of the second object that is in contact with the first portion of the first virtual object, such as darkening the representation of the table 722*a* with which the virtual object 709*a* has the depth conflict in the three-dimensional environment 702 as shown in FIG. 7N, such that, from the viewpoint of the user, the first object is no longer visually in contact with the second object in the three-dimensional environment. Accordingly, computer system optionally no longer changes the appearance of the first portion of the first virtual object when the focus mode is activated for the first virtual object in the three-dimensional environment. Changing a visual emphasis of a three-dimensional environment relative to an object in the three-dimensional environment when a focus mode is activated in response to an event reduces the prominence of a depth conflict between the object and a portion of the three-dimensional environment, which reduces eye strain of the user, thereby avoiding potential physical discomfort for the user, and/or increases a legibility of the content of the object when the depth conflict mitigation is no longer needed.

In some embodiments, the respective event includes input selecting a respective option (838), such as selection of the selectable option 732 provided by the hand 705*a* as shown in FIG. 7M. For example, the computer system detects selection of a respective option that is selectable to cause the computer system to activate the focus mode for the first virtual object in the three-dimensional environment. In some embodiments, the computer system detects a gaze and dwell input or an air pinch gesture while the attention (e.g., based on gaze 731 in FIG. 7M) of the user is directed toward the respective option in the three-dimensional environment. In some embodiments, the respective option is displayed within a user interface element (e.g., a window, a toolbar, and/or a menu) in the three-dimensional environment. In some embodiments, the respective option is associated with a hardware button of the computer system, and selection of the respective option corresponds to selection (e.g., a physical press) of the hardware button. Changing a visual emphasis of a three-dimensional environment relative to an object in the three-dimensional environment when a focus mode is activated in response to a selection of a respective option reduces the prominence of a depth conflict between the object and a portion of the three-dimensional environment, which reduces eye strain of the user, thereby avoiding potential physical discomfort for the user.

In some embodiments, the respective event does not include input selecting a respective option (840). For example, the computer system automatically activates the focus mode for the first virtual object in the three-dimensional environment. In some embodiments, the computer system detects the attention (e.g., based on gaze) of the user directed toward the first virtual object in the three-dimensional environment, such as gaze 721 directed to the virtual object 709*a* in FIG. 7M, for a threshold amount of time (e.g., 0.1, 0.5, 1, 1.5, 2, 3, 5, 8, 10, 12 or 15 seconds), as indicated by the timeline 707 in FIG. 7M. In some embodiments, the computer system detects the attention of the user directed toward the first virtual object in the three-dimensional environment for the threshold amount of time without detecting selection of the respective option (e.g., such as the respective option described above with reference to step 838), such as without detecting selection of the selectable option 732 in FIG. 7M. Changing a visual emphasis of a three-dimensional environment relative to an object in the three-dimensional environment when a focus mode is activated in response to detecting attention of the user directed to the object for a threshold amount of time reduces the prominence of a depth conflict between the object and a portion of the three-dimensional environment, which reduces eye strain of the user, thereby avoiding potential physical discomfort for the user, and/or enables the depth conflict between the object and the portion of the three-dimensional environment to be mitigated automatically, thereby improving user-device interaction.

In some embodiments, while displaying the three-dimensional environment with the second visual emphasis relative to the first virtual object after detecting the respective event (e.g., while the focus mode described above with reference to step 836 is active for the first virtual object in the three-dimensional environment), such as while the three-dimensional environment 702 is darkened/dimmed relative to the virtual object 709*a* in FIG. 7N, the computer system detects (842*a*), via the one or more input devices, a second respective event that does not include input selecting a respective option, such as movement of the gaze 721 away from the virtual object 709*a* as described with reference to FIG. 7N. In some embodiments, the computer system detects the attention (e.g., based on gaze) of the user move away from the first virtual object in the three-dimensional environment (e.g., toward a location that is different from the location at which the first virtual object is displayed. In some embodiments, the computer system detects the attention of the user move away from the first virtual object and remain directed away from the first virtual object in the three-dimensional environment for a threshold amount of time (e.g., 0.1, 0.5, 1, 1.5, 2, 3, 5, 8, 10, 12 or 15 seconds).

In some embodiments, in response to detecting the second respective event (842*b*), the computer system displays (842*c*) the three-dimensional environment with the first visual emphasis relative to the first virtual object, such as the visual emphasis of the three-dimensional environment 702 relative to the virtual object 709*a* in FIG. 7M. For example, the computer system deactivates the focus mode for the first virtual object in the three-dimensional environment. In some embodiments, the computer system redisplays the three-dimensional environment with the value of the lighting/brightness that the three-dimensional environment was displayed with prior to detecting the respective event. For example, the passthrough of the physical environment and the portions of the three-dimensional environment surrounding the first virtual object are lightened/brightened relative to the first virtual object, such as the visibility of the representation of the table 722a and the representation of the sofa 724a in the three-dimensional environment 702 in FIG. 7M.

In some embodiments, the computer system displays (842d) the first portion of the first virtual object with the second visual properties, such as display of the portion 735 of the virtual object 709a with the second visual properties as shown in FIG. 7M. For example, because the three-dimensional environment is redisplayed with the first visual emphasis relative to the first virtual object, the first portion of the first virtual object visually appears to occupy the same portion of the three-dimensional environment as the first portion of the second object, such as the portion 735 of the virtual object 709a occupying a same portion of the three-dimensional environment 702 as the representation of the table 722a in FIG. 7M. Accordingly, to mitigate the depth conflict between the first virtual object and the second object, the computer system displays the first portion of the first virtual object with the second visual properties, as similarly described above with reference to step 802. In some embodiments, the computer system maintains display of the second portion of the first virtual object (e.g., portion 733 of the virtual object 709a) with the first visual properties (e.g., because the second portion of the first virtual object does not occupy a same portion of the three-dimensional environment as a respective object in the three-dimensional environment), as similarly described above with reference to step 802. Changing a visual emphasis of a three-dimensional environment relative to an object in the three-dimensional environment when a focus mode is deactivated in response to detecting attention of the user directed away from the object enables the focus mode for the object in the three-dimensional environment to be deactivated automatically, thereby improving user-device interaction.

It should be understood that the particular order in which the operations in method 800 have been described is merely exemplary and is not intended to indicate that the described order is the only order in which the operations could be performed. One of ordinary skill in the art would recognize various ways to reorder the operations described herein.

FIGS. 9A-9K is a flowchart illustrating a method 900 of facilitating depth conflict mitigation for one or more virtual objects in a three-dimensional environment by displaying a virtual environment in accordance with some embodiments. In some embodiments, the method 900 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 900 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 900 are, optionally, combined and/or the order of some operations is, optionally, changed.

In some embodiments, method 900 is performed at a computer system (e.g., 101) in communication with a display generation component (e.g., 120) and one or more input devices (e.g., 314). For example, the computer system is or includes a mobile device (e.g., a tablet, a smartphone, a media player, or a wearable device), or a computer. In some embodiments, the computer system has one or more characteristics of the computer system in methods 800 and/or 1000. In some embodiments, the display generation component has one or more characteristics of the display generation component in methods 800 and/or 1000. In some embodiments, the one or more input devices have one or more characteristics of the one or more input devices in methods 800 and/or 1000.

In some embodiments, the computer system displays (902a), via the display generation component, a first virtual object at a first location in a three-dimensional environment, such as display of virtual object 709a in three-dimensional environment 702 as shown in FIG. 7B, wherein the three-dimensional environment includes at least a portion of a physical environment of the display generation component, and the first location is a location in the three-dimensional environment that corresponds to the at least the portion of the physical environment, such as the physical environment including table 722a and sofa 724a in FIG. 7A. For example, the three-dimensional environment is generated, displayed, or otherwise caused to be viewable by the computer system (e.g., an extended reality (XR) environment such as a virtual reality (VR) environment, a mixed reality (MR) environment, or an augmented reality (AR) environment). In some embodiments, the three-dimensional environment has one or more characteristics of the three-dimensional environment in methods 800 and/or 1000. In some embodiments, the first virtual object is generated by the computer system and/or is or includes content. In some embodiments, the first virtual object has one or more characteristics of the first virtual object in methods 800 and/or 1000. In some embodiments, the physical environment is visible through a transparent portion of the display generation component (e.g., true or real passthrough). In some embodiments, a representation of the physical environment is displayed in the three-dimensional environment via the display generation component (e.g., virtual or video passthrough). In some embodiments, the physical environment has one or more characteristics of the physical environment in methods 800 and/or 1000. In some embodiments, the first location of the first virtual object is located in the portion of the representation of the physical environment that is included in the three-dimensional environment.

In some embodiments, while displaying the first virtual object at the first location in the three-dimensional environment, the computer system detects (902b), via the one or more input devices, a first input corresponding to movement of the first virtual object away from the first location in the three-dimensional environment, such as movement input directed to the virtual object 709a provided by the hand 703b as shown in FIG. 7B. For example, the computer system detects an air pinch gesture performed by a hand of the user of the computer system that is detected by the one or more input devices (e.g., a hand tracking device) in communication with the computer system while the gaze of the user is directed toward the first virtual object. In some embodiments, after detecting the air pinch gesture, the computer system detects movement of the hand of the user while in a pinch hand shape, such as movement of the hand 703*b* in FIG. 7B. In some embodiments, the computer system detects the first input via a hardware input device (e.g., a controller operable with six degrees of freedom of movement, or a touchpad or mouse) in communication with the computer system. In some embodiments, after detecting the selection input, the computer system detects movement via the hardware input device. In some embodiments, the first input has one or more characteristics of the first input in methods 800 and/or 1000.

In some embodiments, in response to detecting the first input (902*c*), the computer system moves (902*d*) the first virtual object from the first location to a second location, different from the first location, in the three-dimensional environment in accordance with the first input, such as movement of the virtual object 709*a* in the three-dimensional environment 702 as shown in FIG. 7G. For example, the computer system moves the first virtual object from the first location to the second location in the three-dimensional environment in accordance with the movement of the hand of the user (e.g., the movement of the hand 703*b* in FIG. 7B) and/or the hardware input device. For example, the computer system detects movement of the hand of the user in space, such as a movement while the hand is holding the pinch hand shape (e.g., the tips of the thumb and index finger remain touching) such as an air drag gesture. In some embodiments, the movement of the hand of the user is in a respective direction (e.g., in a vertical direction, a horizontal direction, or a diagonal direction) in space that is toward the second location in the three-dimensional environment. In some embodiments, the first input has one or more characteristics of inputs described in methods 800 and/or 1000.

In some embodiments, displaying the first virtual object at the second location in the three-dimensional environment includes, in accordance with a determination that the first virtual object has more than a respective degree (e.g., amount (e.g., 5, 8, 10, 12, 15, 20, 30, 40 50, or 60 percent), angle (e.g., 1, 2, 5, 10, 15, 30, 35, 45, 60, 70, or 90 degrees), and/or position (e.g., 0.25, 0.5, 1, 2, 5, 8, 10, or 15 m)) of depth conflict with a respective portion of the physical environment (902*e*), as indicated in the overhead view in FIG. 7O, displaying, via the display generation component, a virtual environment within the three-dimensional environment (902*f*), such as display of virtual environment 728 as shown in FIG. 7P. For example, at least a portion of the first virtual object at least partially contacts or intersects with at least a portion of a second object in the physical environment, such as the table 722*a* in FIG. 7M, as described in more detail with reference to method 800. In some embodiments, the second object is a real-world object, such as a table, chair, desk, lamp, sofa, bookcase, or shelf that is in the physical environment surrounding the display generation component and/or the computer system. In some embodiments, the second object has one or more characteristics of the second object in methods 800 and/or 1000. In some embodiments, the respective degree of the depth conflict is based on the respective portion of the physical environment with which the first virtual object has a depth conflict. For example, if the second object with which the first virtual object has the depth conflict is a table, chair, desk, or bookcase, the respective degree of the depth conflict is 5, 8, 10, 12, 15, 20, 25, 30, or 40 percent of an amount of the second object that is in contact with the first virtual object, as indicated in the overhead view in FIG. 7M. If the second object is a wall or a window, for example, the respective degree of the conflict is optionally 60, 65, 70, 75, 80, 85, or 90 percent of the amount of the second object that is in conflict with the first virtual object. In some embodiments, the respective degree of the depth conflict includes an angle between the first object and the respective portion of the physical environment. For example, the first virtual object (e.g., a side or edge of the first virtual object) intersects a table, chair, desk, bookcase, wall or window at an angle of 1, 2, 5, 10, 15, 30, 35, 45, 60, 70, or 90 degrees. In some embodiments, the respective degree of the depth conflict includes a position in the three-dimensional environment at which the first virtual object contacts the respective portion of the physical environment. For example, the first virtual object contacts a table, chair, desk, bookcase, wall or window that is 0.25, 0.5, 1, 2, 5, 8, 10, or 15 m from the viewpoint of the user of the computer system.

In some embodiments, the virtual environment hides at least a portion of (or, optionally, all of) the respective portion of the physical environment with which the first virtual object has a depth conflict (902*g*), such as the occlusion of the representation of the table 722*a* by the virtual environment 728 as shown in FIG. 7O. For example, if the amount of the second object that is in contact with the first virtual object is greater than the respective degree discussed above, as indicated in the overhead view in FIG. 7O, the computer system displays an immersive virtual environment that occupies all or portions of the three-dimensional environment (e.g., portions of the three-dimensional environment that include the physical environment), as similarly shown in FIG. 7O. In some embodiments, the virtual environment includes a three-dimensional representation of a scene or a setting (e.g., a beach setting in FIG. 7O) that occupies all or a portion of a field of view of the user of the computer system. For example, the virtual environment includes a three-dimensional representation of a beach, a lake, a mountainside, a field, a theater, a conference room, an opera house, or a stadium that occupies the portion of the three-dimensional environment that is in the field of view of the user.

In some embodiments, the second location is at least partially (or, optionally, fully) within the virtual environment (902*h*) (and the second location is not a location in the three-dimensional environment that corresponds to the at least the portion of the physical environment), such as display of the virtual object 709*a* within the virtual environment 728 as shown in FIG. 7O. In some embodiments, the first virtual object is displayed within the virtual environment, such that a portion of the virtual environment is displayed in the background of and/or behind the first virtual object relative to a viewpoint of the user in the three-dimensional environment. In some embodiments, as described in methods 800 and/or 1000, when a portion of the first virtual object at least partially intersects with or contacts a portion of the second object, the portions of the first virtual object and the second object create a depth conflict in the three-dimensional environment. In some embodiments, the virtual environment is displayed in the three-dimensional environment to occlude the second object (e.g., the virtual environment does not include the second object, such as the virtual environment 728 not including the representation of the table 722*a* with which the virtual object 709*a* has the depth conflict as shown in FIG. 7O, and is displayed as occupying a portion of the three-dimensional environment that is occupied by the second object), and thus resolve or reduce the depth conflict (e.g., the overlap) between the first virtual object and the second object in the three-dimensional environment. In some embodiments, the virtual environment is centered on the first virtual object (e.g., extends equidistantly away from the first virtual object).

In some embodiments, in accordance with a determination that the first virtual object has less than the respective degree of depth conflict with the physical environment (902i) (e.g., at least a portion of the first virtual object does not at least partially contact or intersect with at least a portion of another object and/or an amount of the second object that is in contact with the first virtual object is below the respective degree of depth conflict, discussed above), as indicated in the overhead view in FIG. 7C, the computer system forgoes (902j) displaying, via the display generation component, the virtual environment within the three-dimensional environment in response to detecting the first input, such as forgoing display of the virtual environment 728 in the three-dimensional environment 702 despite the virtual object 709a having a depth conflict with the representation of the table 722a as shown in FIG. 7C. For example, the computer system does not display the virtual environment in the three-dimensional environment and the visibility of the second object is optionally maintained via the display generation component. Displaying a virtual environment for resolving a depth conflict in a three-dimensional environment when an object encounters the depth conflict based on movement of the object enables the computer system to automatically resolve or reduce the depth conflict, thereby improving user-device interaction, and/or reduces the prominence of the depth conflict in the three-dimensional environment, which reduces eye strain, thereby avoiding potential physical discomfort for the user.

In some embodiments, the respective portion of the physical environment includes a second object, such as table 722a in FIG. 7A, and the virtual environment does not include the second object (904), as similarly shown in FIG. 7O. For example, as similarly described above with reference to step 902, the second object is a real-world object that is in the physical environment surrounding the display generation component and/or the computer system. In some embodiments, the second object is a second virtual object (e.g., similar to the first virtual object) that is not included in the virtual environment. In some embodiments, if the computer system displays the virtual environment within the three-dimensional environment, as described above with reference to step 902, the virtual environment occludes the second object (e.g., the virtual environment does not include the second object, and is displayed as occupying a portion of the three-dimensional environment that is occupied by the second object), such as the occlusion of the representation of the table 722a by the virtual environment 728 as shown in FIG. 7O. Displaying a virtual environment for resolving a depth conflict with a physical object in a three-dimensional environment when an object encounters the depth conflict based on movement of the object enables the computer system to automatically resolve or reduce the depth conflict, thereby improving user-device interaction, and/or reduces the prominence of the depth conflict in the three-dimensional environment, which reduces eye strain, thereby avoiding potential physical discomfort for the user.

In some embodiments, while detecting the first input and before displaying the virtual environment within the three-dimensional environment (906a), in accordance with a determination that one or more first criteria are satisfied, including a criterion that is satisfied when the first virtual object has at least a second respective degree of depth conflict (e.g., amount (e.g., 1, 2, 3, 4, 5, 8, 10, 12, 15, or percent), angle (e.g., 1, 2, 5, 10, 15, 20, 25, 30, or 45 degrees), and/or position (e.g., 0.25, 0.5, 0.75, 1, 2, 5, 8, or 10 m)), less than the respective degree of depth conflict (e.g., described above with reference to step 902), with the respective portion of the physical environment, the computer system displays (906b), via the display generation component, a visual indication of the virtual environment within the three-dimensional environment (e.g., without displaying at least a portion of the virtual environment within the three-dimensional environment), such as display of visual indication 725 in the three-dimensional environment 702 as shown in FIG. 7G. For example, if the computer system determines that the first virtual object at least partially contacts and/or intersects with the respective portion of the physical environment, such as the left side wall as shown in the overhead view in FIG. 7G, the computer system displays a preview/hint of the virtual environment. In some embodiments, the visual indication indicates that the virtual environment will be displayed within the three-dimensional environment to resolve or reduce the depth conflict between the first virtual object and the respective portion of the physical environment. In some embodiments, the visual indication of the virtual environment is or includes a first portion of the virtual environment that will be displayed within the three-dimensional environment in response to further input (e.g., in response to detecting an end of the first input, as discussed in further detail below with reference to step 922), as similarly shown in FIG. 7G. For example, the visual indication corresponds to a first portion of the virtual environment that will be displayed within a predefined distance (e.g., 0.1, 0.5, 0.75, 1, 2, 3, 4, 5, or 10 m) from the edges of the first virtual object in the three-dimensional environment in response to the further input, such as display of the visual indication 725 around the edges of the virtual object 709a as shown in FIG. 7G. The visual indication optionally does not correspond to a second portion of the virtual environment that will be displayed outside the predefined distance from the edges of the first virtual object in the three-dimensional environment in response to further input. In some embodiments, the first virtual object is displayed within the portion of the virtual environment included in the visual indication. Displaying a hint of a virtual environment for resolving a depth conflict in a three-dimensional environment when an object encounters the depth conflict based on movement of the object facilitates discovery that the computer system will display the virtual environment to resolve or reduce the depth conflict, thereby improving user-device interaction, and/or reduces the prominence of the depth conflict in the three-dimensional environment, which reduces eye strain, thereby avoiding potential physical discomfort for the user.

In some embodiments, the first input includes a first selection input directed toward the first virtual object (908a), such as the selection input directed toward the virtual object 709a provided by the hand 703f as shown in FIGS. 7F and 7F1. For example, as similarly described above with reference to step 902, the first input includes an air pinch gesture (e.g., in which the index finger and thumb of the user are in contact) directed toward the first virtual object in the three-dimensional environment. In some embodiments, the first selection input is detected via a hardware input device (e.g., a controller) in communication with the computer system. For example, as similarly described above with reference to step 902, the first selection input is detected via a button or a touch-sensitive surface of the hardware input device.

In some embodiments, the one or more first criteria include a criterion that is satisfied while the selection input is maintained (908b) (and optionally not satisfied while the selection input is not maintained), as similarly described with reference to FIG. 7H. For example, the computer system displays the visual indication of the virtual environment within the three-dimensional environment if the air pinch gesture is maintained (e.g., if the index finger and the thumb of the user remain in contact) and/or the selection on the hardware input device is maintained after the first virtual object contacts the respective portion of the physical environment, as similarly described above with reference to step 906. In some embodiments, if the computer system determines that the selection input is not maintained when the first virtual object has at least the second respective degree of depth conflict (e.g., described above with reference to step 906) with the respective portion of the physical environment, the computer system forgoes displaying the visual indication of the virtual environment within the three-dimensional environment. For example, the computer system displays the virtual environment within the three-dimensional environment, without displaying the visual indication, as similarly described above with reference to step 902. Displaying a hint of a virtual environment for resolving a depth conflict in a three-dimensional environment when an object encounters the depth conflict based on movement of the object if a selection input providing the movement is maintained facilitates discovery that the computer system will display the virtual environment to resolve or reduce the depth conflict if the movement of the object continues, thereby improving user-device interaction, and/or reduces the prominence of the depth conflict in the three-dimensional environment, which reduces eye strain, thereby avoiding potential physical discomfort for the user.

In some embodiments, before displaying the virtual environment within the three-dimensional environment and while moving the first virtual object from the first location to the second location in the three-dimensional environment in accordance with the first input (910*a*), in accordance with the determination that the one or more first criteria are satisfied, including a criterion that is satisfied when the movement of the first virtual object increases a degree of depth conflict with the respective portion of the physical environment (910*b*), such as increasing the depth conflict between the virtual object 709*a* and the left side wall as shown in FIG. 7H, the computer system maintains (910*c*) display, via the display generation component, of the visual indication of the virtual environment within the three-dimensional environment (e.g., without displaying the virtual environment within the three-dimensional environment), such as maintaining display of the visual indication 725 in the three-dimensional environment 702 as shown in FIG. 7H. For example, while the computer system displays the visual indication of the virtual environment within the three-dimensional environment because the one or more first criteria are satisfied, if the computer system determines that the movement of the first virtual object increases a degree (e.g., the amount, angle, and/or distance) of the depth conflict, the computer system maintains display of the visual indication during the movement. In some embodiments, if the computer system determines that the movement of the first virtual object does not decrease the degree of the depth conflict (e.g., maintains and/or reduces the amount, angle, and/or distance of the depth conflict), the computer system does not maintain display of the visual indication during the movement. For example, the computer system ceases display of the visual indication of the virtual environment within the three-dimensional environment. Maintaining display of a hint of a virtual environment for resolving a depth conflict in a three-dimensional environment when an object encounters the depth conflict based on movement of the object if the movement increases a degree of the depth conflict in the three-dimensional environment facilitates discovery that the computer system will display the virtual environment to resolve or reduce the depth conflict, thereby improving user-device interaction, and/or reduces the prominence of the depth conflict in the three-dimensional environment during the movement, which reduces eye strain, thereby avoiding potential physical discomfort for the user.

In some embodiments, displaying the visual indication of the virtual environment includes (912*a*), in accordance with a determination that a degree of depth conflict is a first degree of depth conflict, displaying the visual indication of the virtual environment with a first magnitude (912*b*), such as the portal size of the visual indication in FIG. 7G. For example, during the movement of the first virtual object within the three-dimensional environment, if the computer system determines that the degree of depth conflict between the first virtual object and the respective portion of the physical environment is a first degree of depth conflict (e.g., at least the second respective degree of depth conflict and less than the first degree of depth conflict, as similarly described above with reference to step 906), the computer system displays the visual indication with the first magnitude (e.g., a first size and/or a first visual prominence (e.g., of brightness and/or opacity)), as similarly shown in FIG. 7G. In some embodiments, when the computer system displays the visual indication with the first magnitude, the visual indication of the virtual environment occupies a first amount (e.g., 1, 2, 5, 10, 12, 15, 20, 25, 30, or 40%) and/or angular distance (e.g., 5, 10, 15, 20, 30, 40, 45, 50, or 60 degrees) of the portion of the three-dimensional environment surrounding the first virtual object that is in the field of view of the user, as indicated in the overhead view in FIG. 7G.

In some embodiments, in accordance with a determination that the degree of depth conflict is a second degree of depth conflict, greater than the first degree of depth conflict, the computer system displays the visual indication of the virtual environment with a second magnitude, greater than the first magnitude (912*c*), such as the portal size of the visual indication 725 as shown in FIG. 7H. For example, if the computer system determines that the degree of depth conflict between the first virtual object and the respective portion of the physical environment increases to the second degree of depth conflict, the computer system increases the magnitude of the visual indication of the virtual environment to the second magnitude (e.g., a second size and/or a second visual prominence), greater than the first magnitude. In some embodiments, the increase in magnitude of the visual indication of the virtual environment is proportional to the increase in depth conflict from the first degree to the second degree. For example, increasing the degree of depth conflict by a first amount, degree, and/or distance causes the computer system to increase the magnitude of the visual indication by a first size and/or visual prominence, as similarly shown in FIG. 7H. In some embodiments, when the computer system displays the visual indication with the second magnitude, the visual indication of the virtual environment occupies a second amount (e.g., 5, 10, 15, 20, 25, 30, 40, 50, 60, or 70%) and/or angular distance (e.g., 10, 15, 20, 30, 40, 45, 50, 60, 75, or 90 degrees) of the portion of the three-dimensional environment surrounding the first virtual object that is in the field of view of the user, as indicated in the overhead view in FIG. 7H. Increasing a magnitude of a hint of a virtual environment in a three-dimensional environment that is displayed when an object encounters a depth conflict based on movement of the object if the movement increases a degree of the depth conflict in the three-dimensional environment facilitates discovery that the computer system will display the virtual environment to resolve or reduce the depth conflict, thereby improving user-device interaction, and/or reduces the prominence of the depth conflict in the three-dimensional environment during the movement, which reduces eye strain, thereby avoiding potential physical discomfort for the user.

In some embodiments, before detecting the first input, the three-dimensional environment is displayed with a first lighting effect having a first value (914a), such as the lighting of the three-dimensional environment 702 relative to the virtual object 709a as shown in FIGS. 7F and 7F1. For example, while displaying the first virtual object at the first location in the three-dimensional environment, the computer system displays the three-dimensional environment with the first lighting effect having the first value (e.g., a first value of brightness, other than a natural lighting of the physical environment surrounding the display generation component). In some embodiments, the first lighting effect is displayed relative to the first virtual object in the three-dimensional environment. For example, the first lighting effect controls the brightness of light surrounding the first virtual object and/or cast onto a surface of the first virtual object in the three-dimensional environment.

In some embodiments, displaying the visual indication of the virtual environment includes displaying the three-dimensional environment with the first lighting effect having a second value, different from the first value (914b), such as dimming/darkening the three-dimensional environment 702 relative to the visual indication 725 as shown in FIG. 7G. For example, when the computer system displays the visual indication of the virtual environment because the one or more first criteria are satisfied, the computer system changes a value of the first lighting effect from the first value to the second value (e.g., a second value of brightness, other than the natural lighting of the physical environment surrounding the display generation component). In some embodiments, the computer system increases or decreases the brightness of the light surrounding the first virtual object and/or cast onto the surface of the first virtual object in the three-dimensional environment. For example, the computer system darkens/dims the portions of the three-dimensional environment surrounding the first virtual object, as similarly shown in FIG. 7G. In some embodiments, display of the portion of the virtual environment included in the visual indication of the virtual environment is independent of the display of the three-dimensional environment with the first lighting effect having the second value. For example, the change in brightness of the light surrounding the first virtual object does not change an appearance of (e.g., a brightness of) the preview of the virtual environment within the three-dimensional environment, as similarly shown in FIG. 7G. Changing a lighting effect of a three-dimensional environment when a hint of a virtual environment is displayed in response to an object encountering a depth conflict based on movement of the in the three-dimensional environment facilitates discovery that the computer system will display the virtual environment to resolve or reduce the depth conflict, thereby improving user-device interaction, and/or reduces the prominence of the depth conflict in the three-dimensional environment during the movement, which reduces eye strain, thereby avoiding potential physical discomfort for the user.

In some embodiments, displaying the visual indication of the virtual environment includes displaying a preview corresponding to the virtual environment within the three-dimensional environment (916) (e.g., as similarly described above with reference to step 906), such as the preview of the virtual environment 728 of FIG. 7I that is included in the visual indication 725 in FIG. 7G. Displaying a preview of a virtual environment for resolving a depth conflict in a three-dimensional environment when an object encounters the depth conflict based on movement of the object facilitates discovery that the computer system will display the virtual environment to resolve or reduce the depth conflict, thereby improving user-device interaction, and/or reduces the prominence of the depth conflict in the three-dimensional environment, which reduces eye strain, thereby avoiding potential physical discomfort for the user.

In some embodiments, in accordance with the determination that the first virtual object has more than the respective degree of depth conflict with the respective portion of the physical environment, displaying the virtual environment includes displaying the virtual environment with a first opacity characteristic having a first value (918a), such as the opacity of the virtual environment 728 in FIG. 7I. For example, when the computer system displays the virtual environment within the three-dimensional environment, the computer system displays the virtual environment with a first value of translucency. In some embodiments, while the virtual environment is displayed within the three-dimensional environment, the portion of the three-dimensional environment (e.g., including the physical environment surrounding the display generation component) surrounding the first virtual object (e.g., and behind the first virtual object) that is consumed by the virtual environment is not visible from the viewpoint of the user of the computer system, as similarly shown in FIG. 7I. For example, the portions of the three-dimensional environment that are not consumed by the virtual environment are (e.g., optionally) visible from the viewpoint of the user.

In some embodiments, displaying the visual indication of the virtual environment includes displaying the preview corresponding to the virtual environment with the first opacity characteristic having a second value, less than the first value (918b), such as the opacity of the preview of the virtual environment included in the visual indication 725 in FIG. 7H. For example, when the computer system displays the virtual environment within the three-dimensional environment, the computer system displays the virtual environment with a second value of translucency, greater than the first value of translucency. In some embodiments, while visual indication of the virtual environment is displayed within the three-dimensional environment, a portion of the three-dimensional environment (e.g., including the physical environment) surrounding the display generation component (e.g., and behind the visual indication) is at least partially visible from the viewpoint of the user of the computer system, as similarly shown in FIG. 7H. Displaying a preview of a virtual environment for resolving a depth conflict in a three-dimensional environment when an object encounters the depth conflict based on movement of the object facilitates discovery that the computer system will display the virtual environment to resolve or reduce the depth conflict, thereby improving user-device interaction, and/or reduces the prominence of the depth conflict in the three-dimensional environment, which reduces eye strain, thereby avoiding potential physical discomfort for the user.

In some embodiments, in accordance with the determination that the first virtual object has more than the respective degree of depth conflict with the respective portion of the physical environment, displaying the virtual environment includes displaying the virtual environment as replacing a first portion of the three-dimensional environment (920a), such as replacement of the three-dimensional environment 702 with the virtual environment 728 as shown in FIG. 7I. For example, as similarly described above with reference to step 902, when the computer system displays the virtual environment within the three-dimensional environment, the virtual environment occupies the portion of an entirety of the three-dimensional environment surrounding the first virtual object that is in the field of view of the user of the computer system, as similarly shown in FIG. 7I. In some embodiments, the computer system displays the virtual environment behind the first virtual object to occlude the respective portion of the physical environment such that the first virtual object no longer has the depth conflict with the respective portion, as similarly described above with reference to step 902.

In some embodiments, displaying the preview corresponding to the virtual environment includes displaying a portion of the virtual environment as replacing a second portion, less than the first portion, of the three-dimensional environment (920b), such as replacement of a portion of the three-dimensional environment 702 with the preview of the virtual environment included in the visual indication 725 as shown in FIG. 7H. For example, when the computer system displays the visual indication of the virtual environment (e.g., before displaying the virtual environment) within the three-dimensional environment, the preview corresponding to the virtual environment extends from the edges of the first virtual object and occupies the second portion of the three-dimensional environment, as similarly shown in FIG. 7H. In some embodiments, the preview corresponding to the virtual environment is centered on the first virtual object in the three-dimensional environment. In some embodiments, the preview corresponding to the virtual environment occludes the second portion of the three-dimensional environment (e.g., including the physical environment surrounding the display generation component) without occluding the portion of the entirety of the three-dimensional environment that is in the field of view of the user of the computer system, as similarly shown in FIG. 7H. Displaying a preview of a virtual environment for resolving a depth conflict in a three-dimensional environment around an object when the object encounters the depth conflict based on movement of the object facilitates discovery that the computer system will display the virtual environment to resolve or reduce the depth conflict, thereby improving user-device interaction, and/or reduces the prominence of the depth conflict in the three-dimensional environment, which reduces eye strain, thereby avoiding potential physical discomfort for the user.

In some embodiments, the first input includes a first selection input directed toward the first virtual object during the movement of the first virtual object (922a) (e.g., as similarly described above with reference to step 902, the first input includes an air pinch gesture (e.g., in which the index finger and thumb of the user are in contact) directed toward the first virtual object in the three-dimensional environment), such as the input directed toward the virtual object 709a provided by the hand 703g in FIG. 7G. In some embodiments, after moving the first virtual object from the first location to the second location and while displaying the visual indication of the virtual environment before displaying the virtual environment within the three-dimensional environment, as similarly shown in FIG. 7H, the computer system detects (922b), via the one or more input devices, an end of the first selection input, such as a release of the air pinch gesture provided by the hand 703h in FIG. 7H. For example, the computer system detects that the index finger and thumb of the user providing the first selection input are no longer in contact. In some embodiments, the computer system detects the hand of the user is in a relaxed/resting state (e.g., in which the hand of the user providing the first selection input is rested below the user's torso and/or at a user's side). In some embodiments, the computer system detects a release of the first selection input via a hardware input device (e.g., a controller) in communication with the computer system. For example, the computer system detects a finger of the user is no longer in contact with a button or touch-sensitive surface of the hardware input device.

In some embodiments, in response to detecting the end of the first selection input (922c), the computer system displays (922d) the virtual environment within the three-dimensional environment (and ceasing display of the visual indication of the three-dimensional environment), such as display of the virtual environment 728 within the three-dimensional environment 702 as shown in FIG. 7I. For example, in response to detecting the end of the first selection input, the computer system displays the virtual environment behind the first virtual object to occlude the respective portion of the physical environment, as similarly shown in FIG. 7I, thereby reducing or resolving the depth conflict between the first virtual object and the respective portion of the physical environment, as similarly described above with reference to step 902. Displaying a virtual environment for resolving a depth conflict in a three-dimensional environment when an object encounters the depth conflict based on movement of the object in response to detecting a release of the input that caused the movement helps avoid unintentional display of the virtual environment within the three-dimensional environment by facilitating user input for resolving the depth conflict, thereby improving user-device interaction, and/or reduces the prominence of the depth conflict in the three-dimensional environment, which reduces eye strain, thereby avoiding potential physical discomfort for the user.

In some embodiments, the virtual environment is a system environment of the computer system (924a) (e.g., the virtual environment is associated with an operating system of the computer system), as similarly described with reference to FIG. 7I, and displaying the virtual environment includes (924a), in accordance with a determination that a first system environment was previously selected for display within the three-dimensional environment by a user of the computer system, displaying the first system environment within the three-dimensional environment (924c), as similarly described with reference to FIG. 7I. For example, prior to display of the three-dimensional environment that includes the first virtual object, the computer system received a selection of the first system environment. In some embodiments, the first system environment is displayed within a library of system environments that are selectable for display in the three-dimensional environment (e.g., when displaying the virtual environment as similarly described above with reference to step 902), as similarly discussed with reference to FIG. 7I. In some embodiments, because the first system environment was previously selected by the user as the system environment, the computer system displays the first system environment within the three-dimensional environment until a new/different system environment is selected for display by the user.

In some embodiments, in accordance with a determination that a second system environment, different from the first system environment, was previously selected for display within the three-dimensional environment by the user of the computer system, the computer system displays the second system environment within the three-dimensional environment (924d), as similarly described with reference to FIG. 7I. For example, prior to display of the three-dimensional environment that includes the first virtual object, the computer system received a selection of the second system environment. In some embodiments, the second system environment is displayed within a library of system environments that are selectable for display in the three-dimensional environment (e.g., when displaying the virtual environment as similarly described above with reference to step 902), as similarly discussed with reference to FIG. 7I. In some embodiments, because the second system environment was previously selected by the user as the system environment, the computer system displays the second system environment within the three-dimensional environment until a new/different system environment is selected for display by the user. In some embodiments, the computer system does not detect selection of a particular system environment (e.g., the first system environment or the second system environment) when the first input is detected. Displaying a system environment for resolving a depth conflict in a three-dimensional environment when an object encounters the depth conflict based on movement of the object enables the computer system to automatically resolve or reduce the depth conflict, thereby improving user-device interaction, and/or reduces the prominence of the depth conflict in the three-dimensional environment, which reduces eye strain, thereby avoiding potential physical discomfort for the user.

In some embodiments, while displaying the virtual environment within the three-dimensional environment because the first virtual object has more than the respective degree of depth conflict with the respective portion of the physical environment, the computer system detects (926a), via the one or more input devices, a second input corresponding to movement of the first virtual object away from the second location in the three-dimensional environment, such as movement input directed to the virtual object 709a provided by the hand 703k as shown in FIG. 7K. For example, while displaying the first virtual object at the second location and within the virtual environment, the computer system detects an air pinch gesture directed toward the first virtual object, as similarly described above with reference to step 902. In some embodiments, the computer system detects the second input via a hardware input device (e.g., a controller) in communication with the computer system, as similarly described above with reference to step 902. In some embodiments, after detecting the air pinch gesture and/or a selection using the hardware input device, the computer system detects movement of the hand of the user in space, as similarly described above with reference to step 902.

In some embodiments, in response to detecting the second input (926b), the computer system moves (926c) the first virtual object from the second location to a third location, different from the second location, in the three-dimensional environment in accordance with the second input, such as movement of the virtual object 709a away from the left side wall in the three-dimensional environment 702 as shown in FIG. 7L. For example, the computer system moves the first virtual object to the third location in the three-dimensional environment based on a magnitude and direction of movement of the hand of the user (e.g., the movement of the hand 703k in FIG. 7K). In some embodiments, the computer system maintains display of the virtual environment within the three-dimensional environment during at least a portion of the movement of the first virtual object to the third location.

In some embodiments, in accordance with a determination that the first virtual object at the third location has less than a second respective degree (e.g., amount (e.g., 5, 8, 10, 12, 15, 20, 30, or 40 percent), angle (e.g., 1, 2, 5, 10, 15, 30, 35, 45, or 60 degrees), and/or position (e.g., 0.25, 0.5, 1, 2, 5, or 8 m)) of depth conflict with the respective portion of the physical environment (e.g., the second object in the physical environment), such as the virtual object 709a no longer having a depth conflict in the three-dimensional environment 702 as shown in FIG. 7L, the computer system ceases (926d) display of the virtual environment within the three-dimensional environment, such as ceasing display of the virtual environment 728 within the three-dimensional environment 702 as shown in FIG. 7L. For example, if the computer system determines that displaying the first virtual object at the third location reduces or resolves the degree of the depth conflict below the second respective degree, the computer system ceases display of the virtual environment within the three-dimensional environment. In some embodiments, the computer system ceases display of the virtual environment because the first virtual object no longer has a depth conflict with another object when the first virtual object is moved to the third location in the three-dimensional environment, as similarly shown in FIG. 7L. In some embodiments, the second virtual object does encounter a degree of depth conflict at the third location, but the degree of depth conflict is less than the second respective degree of depth conflict above. In some such embodiments, the computer system displays a visual indication of the virtual environment (e.g., a preview of the virtual environment) at the third location, as similarly described above with reference to step 906. Ceasing display of a virtual environment for resolving a depth conflict for an object in a three-dimensional environment when movement of the object causes the object to encounter less than a particular degree of depth conflict in the three-dimensional environment enables the computer system to automatically cease display of the virtual environment when resolving the depth conflict is no longer needed, thereby improving user-device interaction.

In some embodiments, in response to detecting the second input (928a), in accordance with a determination that the first virtual object has more than the second respective degree (e.g., amount (e.g., 5, 8, 10, 12, 15, 20, 30, or 40 percent), angle (e.g., 1, 2, 5, 10, 15, 30, 35, 45, or 60 degrees), and/or position (e.g., 0.25, 0.5, 1, 2, 5, or 8 m)) of depth conflict with the respective portion of the physical environment (e.g., depth conflict that is not currently visible from the viewpoint of the user because the virtual environment is displayed within the three-dimensional environment to mitigate and/or remove the depth conflict), such as the representation of the table 722b in the overhead view in FIG. 7P, the computer system maintains (928b) display of the virtual environment within the three-dimensional environment, such as maintaining display of the virtual environment 728 after movement of the virtual object 709a as shown in FIG. 7P, wherein the third location is at least partially within the virtual environment. For example, if the computer system determines that displaying the first virtual object at the third location does not reduce the degree of the depth conflict below the second respective degree and/or increases the degree of the depth conflict further above the second respective degree, as indicated in the overhead view in FIG. 7P, the computer system maintains display of the virtual environment within the three-dimensional environment. In some embodiments, maintaining display of the virtual environment resolves or reduces the depth conflict between the first virtual object and the respective portion of the physical environment when the first virtual object is moved to the third location in the three-dimensional environment, as similarly described above with reference to step 902. In such examples, the second input optionally results in the first virtual object being moved within the virtual environment in accordance with the second input, as similarly shown in FIG. 7P. Maintaining display of a virtual environment for resolving a depth conflict for an object in a three-dimensional environment when movement of the object causes the object to encounter more than a particular degree of depth conflict in the three-dimensional environment enables the computer system to automatically resolve or reduce the depth conflict after the movement, thereby improving user-device interaction, and/or reduces the prominence of the depth conflict in the three-dimensional environment during the movement, which reduces eye strain, thereby avoiding potential physical discomfort for the user.

In some embodiments, the virtual environment is displayed at a first level of immersion in response to detecting the first input (930*a*) (e.g., a level of immersion includes an associated degree to which the virtual environment displayed by the computer system obscures background content (e.g., the three-dimensional environment including the respective portion of the physical environment) around/behind the virtual environment, optionally including the number of items of background content displayed and the visual characteristics (e.g., colors, contrast, and/or opacity) with which the background content is displayed, and/or the angular range of the content displayed via the display generation component (e.g., 60 degrees of content displayed at low immersion, 120 degrees of content displayed at medium immersion, and/or 180 degrees of content displayed at high immersion), and/or the proportion of the field of view displayed via the display generation consumed by the virtual environment (e.g., 33% of the field of view consumed by the virtual environment at low immersion, 66% of the field of view consumed by the virtual environment at medium immersion, and/or 100% of the field of view consumed by the virtual environment at high immersion), such as the level of immersion of the virtual environment 728 within the three-dimensional environment 702 in FIG. 7I. In some embodiments, at a first (e.g., high) level of immersion, the background, virtual and/or real objects are displayed in an obscured manner. For example, a respective virtual environment with a high level of immersion is displayed without concurrently displaying the background content (e.g., in a full screen or fully immersive mode), as similarly shown in FIG. 7I. In some embodiments, at a second (e.g., low) level of immersion, the background, virtual and/or real objects are displayed in an obscured manner (e.g., dimmed, blurred, and/or removed from display). For example, a virtual environment with a low level of immersion is optionally displayed concurrently with the background content, which is optionally displayed with full brightness, color, and/or translucency. As another example, a virtual environment displayed with a medium level of immersion is optionally displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed).

In some embodiments, while displaying the virtual environment at the first level of immersion within the three-dimensional environment because the first virtual object has more than the respective degree of depth conflict with the respective portion of the physical environment, as similarly shown in FIG. 7J, the computer system detects (930*b*), via the one or more input devices, a second input corresponding to a request to change a level of immersion of the virtual environment, such as press of hardware button 741 of the computer system 101 provided by the hand 703*j* as shown in FIG. 7J. In some embodiments, the request to change the level of immersion of the virtual environment includes a manipulation of a rotational element, such as a mechanical dial or a virtual dial, of or in communication with the computer system, as similarly shown in FIG. 7J. In some embodiments, the second input includes a selection of a selectable option displayed in the three-dimensional environment and/or a manipulation of a displayed control element to change the immersion level of the computer system and/or the virtual environment. In some embodiments, the second input includes a predetermined gesture (e.g., an air gesture) recognized as a request to change the immersion level of the computer system and/or the virtual environment.

In some embodiments, in response to detecting the second input (930*c*), the computer system displays (930*d*), via the display generation component, the virtual environment at a second level of immersion, different from the first level of immersion, within the three-dimensional environment in accordance with the second input, such as the level of immersion of the virtual environment 728 in FIG. 7K. For example, the computer system increases or decreases the level of immersion of the computer system and/or the virtual environment. In some embodiments, as similarly described above, an increase in the level of immersion increases the proportion of the field of view visible via the display generation that is consumed by the virtual environment. For example, additional portions of the three-dimensional environment (including the physical environment surrounding the display generation component) in the field of view of the user are obscured (e.g., no longer displayed/visible) when the level of immersion increases for the virtual environment. Additionally, in some embodiments, a decrease in the level of immersion decreases the proportion of the field of view visible via the display generation component that is consumed by the virtual environment. For example, additional portions of the three-dimensional environment (including the physical environment surrounding the display generation component) in the field of view of the user are unobscured (e.g., displayed/visible) when the level of immersion decreases for the virtual environment, as similarly shown in FIG. 7K. In some embodiments, the computer system changes the level of immersion for the virtual environment without altering display of the first virtual object in the three-dimensional environment. For example, because the virtual environment is displayed behind the first virtual object to resolve or reduce the depth conflict between the first virtual object and the respective portion of the physical environment prior to detecting the second input, the level of immersion for the virtual environment optionally changes without moving, obscuring, and/or changing a brightness and/or opacity of the first virtual object. Changing a level of immersion of a virtual environment that is displayed for resolving a depth conflict for an object in a three-dimensional environment in response to user input enables an amount of the virtual environment that is displayed in a field of view of the user to be selectively changed while still reducing the prominence of the depth conflict in the three-dimensional environment, thereby improving user-device interaction.

In some embodiments, the second input includes manipulation of one or more system controls of the computer system (932), such as hardware button 741 in FIG. 7J. For example, as similarly described above with reference to step 930, the second input includes a manipulation of a rotational element, such as a mechanical dial or a virtual dial, of or in communication with the computer system. In some embodiments, the manipulation of the rotational element includes a physical press and/or scroll of the rotational element by a finger of the user. In some embodiments, rotation of the rotational element in a first direction (e.g., a clockwise direction) corresponds to a request to increase the level of immersion of the virtual environment. In some embodiments, rotation of the rotational element in a second direction (e.g., a counterclockwise direction), opposite the first direction, corresponds to a request to decrease the level of immersion of the virtual environment. In some embodiments, a magnitude of the rotation (e.g., an angular rotation) of the rotational element controls an amount by which the computer system changes the level of immersion of the virtual environment. For example, the amount by which the computer system increases or decreases the level of immersion of the virtual environment is based on (e.g., is proportional to) the angular amount that the rotational element is rotated. Changing a level of immersion of a virtual environment that is displayed for resolving a depth conflict for an object in a three-dimensional environment in response to manipulation of one or more system controls enables an amount of the virtual environment that is displayed in a field of view of the user to be selectively changed while still reducing the prominence of the depth conflict in the three-dimensional environment, thereby improving user-device interaction.

In some embodiments, before detecting the first input, a first portion and a second portion of the first virtual object are displayed with first visual properties in the three-dimensional environment (934*a*), such as the visual properties of the virtual object 709*a* as shown in FIG. 7B. In some embodiments, the first virtual object contains a plurality of portions, including the first portion and the second portion, which are different (e.g., non-overlapping) portions of the plurality of portions. In some embodiments, the first portion of the first virtual object and the second portion of the first virtual object have one or more characteristics of the portions of virtual objects described in method 800. In some embodiments, the first portion and the second portion of the first virtual object have a first visual appearance determined by the content (e.g., representations of pixels of the content) included in the first virtual object. In some embodiments, the first visual properties are determined by a lighting effect, a darkening effect, a transparency effect, a blurring effect, a glowing effect, and/or a saturation effect each having a default value based on the content of the first virtual object. In some embodiments, the first visual properties of the first portion and the second portion of the first virtual object have one or more characteristics of the visual properties of portions of objects described in method 800.

In some embodiments, while displaying the virtual environment within the three-dimensional environment (934*b*), in accordance with a determination that the first portion of the first virtual object has more than a second respective degree (e.g., amount (e.g., 5, 8, 10, 12, 15, 20, 30, 40, 50, or 60 percent), angle (e.g., 1, 2, 5, 10, 15, 30, 35, 45, 60, 70, or 90 degrees), and/or position (e.g., 0.25, 0.5, 1, 2, 5, 8, 10, or 15 m)) of depth conflict with a respective portion of the virtual environment (e.g., a second virtual object included in the virtual environment, such as object 738*a* in FIG. 7P), such as the depth conflict between portion 737 of the virtual object 709*a* and second virtual object 738*a* in FIG. 7P, and the second portion of the first virtual object does not have more than the second respective degree of depth conflict as a respective portion of the virtual environment (934*c*), such as the portion of the virtual object 709*a* not having a depth conflict in the three-dimensional environment 702 as shown in FIG. 7P, the computer system displays (934*d*) the first portion of the first virtual object with second visual properties, different from the first visual properties, such as display of the portion 737 of the virtual object 709*a* with the second visual properties as shown in FIG. 7C. For example, while displaying the first virtual object in the virtual environment within the three-dimensional environment, the computer system determines that the first portion of the first virtual object at least partially contact or intersect with the respective portion of the virtual environment (e.g., a portion of a second virtual object in the virtual environment). In some embodiments, the first portion of the first virtual object at least partially contacts or intersects with the respective portion of the virtual environment (e.g., virtual object 738*a* in the virtual environment 728) based on movement of the first virtual object within the three-dimensional environment while the virtual environment is displayed. In some embodiments, if the computer system determines that the first portion of the first virtual object has more than the second respective degree of depth conflict with the respective portion of the virtual environment, the computer system updates display of the first portion of the first virtual object to have the second visual properties, different from the first visual properties. In some embodiments, the computer system changes values of one or more of a lighting effect, a darkening effect, a transparency effect, a blurring effect, a glowing effect, and/or a saturation effect of the first portion of the first virtual object. For example, the computer system changes the appearance of the first portion of the first virtual object, such that the first portion of the first virtual object is visible (e.g., is not occluded by the respective portion of the virtual environment) relative to the viewpoint of the user, and thus resolves or reduces the depth conflict between the first portion of the first virtual object and the respective portion of the virtual environment. In some embodiments, displaying the first portion of the first virtual object with the second visual properties has one or more characteristics of displaying portions of virtual objects with the second visual properties as described in method 800.

In some embodiments, the computer system displays (934*e*) the second portion of the first virtual object with the first visual properties, such as display of the second portion 713 of the virtual object 709*a* with the first visual properties as shown in FIG. 7C. For example, if the computer system determines that the second portion of the first virtual object does not at least partially contact or intersect with a portion of another virtual object in the virtual environment while displaying the first virtual object in the virtual environment, the computer system maintains display of the second portion of the first virtual object with the first visual properties. In some embodiments, the computer system concurrently displays the first portion of the first virtual object with the second visual properties and the second portion of the first virtual object with the first visual properties, as similarly shown in FIG. 7C. Changing an appearance of an object in a three-dimensional environment when the object encounters a depth conflict with a portion of a virtual environment displayed in the three-dimensional environment based on movement of the object in the three-dimensional environment provides feedback that the display of the object is in conflict with a portion of the virtual environment, which facilitates user input for resolving the depth conflict, thereby improving user-device interaction, and/or reduces the prominence of the depth conflict in the three-dimensional environment, which reduces eye strain of the user, thereby avoiding potential physical discomfort for the user In some embodiments, before detecting the first input, a first portion and a second portion of the first virtual object is displayed with first visual properties in the three-dimensional environment (e.g., as similarly described above with reference to step 934), such as the display of the virtual object 709*a* with the first visual properties in FIG. 7J, and the virtual environment is displayed at a first level of immersion within the three-dimensional environment (936*a*) (e.g., as similarly described above with reference to step 930), such as the level of immersion of the virtual environment 728 in FIG. 7J. In some embodiments, while displaying the virtual environment within the three-dimensional environment, the computer system detects (936*b*), via the one or more input devices, a second input corresponding to a request to change a level of immersion of the virtual environment (e.g., increase or decrease the level of immersion of the virtual environment displayed in the field of view of the user, as similarly described above with reference to step 934), such as press of the hardware button 741 of the computer system 101 provided by the hand 703*j* as shown in FIG. 7J.

In some embodiments, in response to detecting the second input (936*c*), the computer system displays (936*d*), via the display generation component, the virtual environment at a second level of immersion, different from the first level of immersion, within the three-dimensional environment, such as display of the virtual environment 728 with a decreased level of immersion within the three-dimensional environment 702 as shown in FIG. 7K. For example, the computer system increases or decreases the level of immersion of the computer system and/or the virtual environment, as similarly described above with reference to step 930. In some embodiments, in accordance with a determination that the first portion of the first virtual object has more than a second respective degree (e.g., amount (e.g., 5, 8, 10, 12, 15, 20, 30, 40, 50, or 60 percent), angle (e.g., 1, 2, 5, 10, 15, 30, 35, 45, 60, 70, or 90 degrees), and/or position (e.g., 0.25, 0.5, 1, 2, 5, 8, 10, or 15 m)) of depth conflict with a second respective portion of the physical environment (e.g., a physical object included in the physical environment), such as portion 727 of the virtual object 709*a* encountering a depth conflict with the left side wall of the three-dimensional environment 702 as shown in FIG. 7K, and the second portion of the first virtual object does not have more than the second respective degree of depth conflict with a portion of the physical environment (936*e*), such as portion 729 of the virtual object 709*a* not having a depth conflict in the three-dimensional environment 702 as shown in FIG. 7K, the computer system displays (9360 the first portion of the first virtual object with second visual properties, different from the first visual properties, such as display of the portion 727 of the virtual object with the second visual properties as shown in FIG. 7K. For example, the computer system decreases the level of immersion of the virtual environment in response to the second input (e.g., such that the virtual environment occupies less of the three-dimensional environment in the field of view of the user), which causes the first portion of the first virtual object to no longer be displayed in the virtual environment and to at least partially contact or intersect with the second respective portion of the physical environment (e.g., a portion of a physical object), such as contact between the portion 727 of the virtual object and the left side wall as shown in FIG. 7K. In some embodiments, if the computer system determines that the first portion of the first virtual object has more than the second respective degree of depth conflict with the second respective portion of the physical environment after changing the level of immersion of the virtual environment, the computer system updates display of the first portion of the first virtual object to have the second visual appearance, different from the first visual appearance, as similarly shown in FIG. 7K. In some embodiments, the computer system changes values of one or more of a lighting effect, a darkening effect, a transparency effect, a blurring effect, a glowing effect, and/or a saturation effect of the first portion of the first virtual object that resolves or reduces the depth conflict between the first portion of the first virtual object and the second respective portion of the physical environment, as similarly described above with reference to step 934.

In some embodiments, the computer system displays (936*g*) the second portion of the first virtual object with the first visual properties, such as display of the portion 729 of the virtual object 709*a* with the first visual properties as shown in FIG. 7K. For example, if the computer system determines that the second portion of the first virtual object does not at least partially contact or intersect with a portion of another object in the three-dimensional environment after changing the level of immersion of the virtual environment, such as the portion 729 not encountering a depth conflict with another object in the three-dimensional environment 702 as shown in FIG. 7K, the computer system maintains display of the second portion of the first virtual object with the first visual properties, as similarly described above with reference to step 934. In some embodiments, in accordance with a determination that the first portion of the first virtual object does not have more than the second respective degree of depth conflict above with the second respective portion of the physical environment and the second portion of the first virtual object does not have more than the second respective degree of depth conflict with a portion of the physical environment, the computer system displays the first portion and the second portion of the first virtual object with the first visual properties. For example, after changing the immersion level of the computer system and/or the virtual environment, the depth conflict remains mitigated in the three-dimensional environment and thus the computer system optionally does not change the visual properties of the first portion and the second portion of the first virtual object. Changing an appearance of an object in a three-dimensional environment when the object encounters a depth conflict based on a change in immersion level of a virtual environment displayed within the three-dimensional environment provides feedback that the display of the object is in conflict with a portion of the three-dimensional environment, which facilitates user input for resolving the depth conflict, thereby improving user-device interaction, and/or reduces the prominence of the depth conflict in the three-dimensional environment, which reduces eye strain of the user, thereby avoiding potential physical discomfort for the user.

In some embodiments, while the virtual environment is not displayed in the three-dimensional environment, the computer system receives (938*a*), via the one or more input devices, a respective input corresponding to a request to display a second virtual object at a respective location in the three-dimensional environment, such as selection input directed to selectable option 704-1 provided by hand 703*a* as shown in FIG. 7A. For example, the three-dimensional environment includes one or more selectable options (e.g., displayed within a toolbar element, an applications window, and/or other object) that are selectable to cause the computer system to display the second virtual object at the respective location in the three-dimensional environment, such as displaying virtual object 709a in the three-dimensional environment 702 as described with reference to FIG. 7A. In some embodiments, the three-dimensional environment includes a user interface object (e.g., user interface object 706a in FIG. 7A) that is selectable to cause the computer system to display the second virtual object at the respective location in the three-dimensional environment. For example, the user interface object corresponds to an application icon that is selectable to display a user interface associated with the application at the respective location, and/or a representation of an image (e.g., a photograph) that is selectable to display the image at the respective location. In some embodiments, the respective location (e.g., indicated in the overhead view in FIG. 7A) is selected automatically by the computer system. For example, the respective location is at or near (e.g., a threshold distance of, such as 0.1, 0.25, 0.5, 1, 2, 3, or 5 m of) a location at which the one or more selectable options and/or the user interface object is displayed in the three-dimensional environment. In some embodiments, the respective location is a predefined location (e.g., a location behind, adjacent to, or in front of a location at which the one or more selectable options and/or the user interface object is displayed) in the three-dimensional environment. In some embodiments, the respective input includes selection of the one or more selectable options and/or the user interface object in the three-dimensional environment. For example, the computer system detects an air pinch gesture, as similarly described above with reference to step 902, directed toward the one or more selectable options and/or the user interface object in the three-dimensional environment. In some embodiments, the computer system detects the respective input via a hardware input device (e.g., a controller) in communication with the computer system (e.g., as similarly described above with reference to step 902).

In some embodiments, in response to receiving the respective input (938b), in accordance with a determination that displaying the second virtual object at the respective location would result in the second virtual object having greater than a second respective degree (e.g., amount (e.g., 5, 8, 10, 12, 15, 20, 30, 40, 50, or 60 percent), angle (e.g., 1, 2, 5, 10, 15, 30, 35, 45, 60, 70, or 90 degrees), and/or position (e.g., 0.25, 0.5, 1, 2, 5, 8, 10, or 15 m)) of depth conflict with a second respective portion of the physical environment (938b) (e.g., a physical object located within the physical environment surrounding the display generation component, as similarly described above with reference to step 902), as similarly described with reference to FIG. 7A, the computer system displays (938c) the virtual environment within the three-dimensional environment, wherein the respective location is at least partially within the virtual environment, such as display of the virtual environment 728 in FIG. 7I. For example, if the computer system determines that the location at which the second virtual object will be displayed in the three-dimensional environment in response to the respective input will cause the second virtual object to have more than the second degree of depth conflict with the second respective portion of the physical environment, as similarly described with reference to FIG. 7A, the computer system displays the virtual environment within the three-dimensional environment. In some embodiments, the computer system determines that the second virtual object will have more than the second degree of depth conflict with the second respective portion based on a size at which the second virtual object will be displayed and/or an angle/ orientation with which the second virtual object will be displayed (e.g., relative to the viewpoint of the user). In some embodiments, displaying the virtual environment prevents the second virtual object from encountering the depth conflict with the second respective portion of the physical environment when the second virtual object is displayed at the respective location in the three-dimensional environment.

In some embodiments, the computer system displays (938d) the second virtual object at the respective location in the three-dimensional environment, such as display of the virtual object 709a within the virtual environment 728 as shown in FIG. 7I. For example, the second virtual object is displayed within the virtual environment, which at least partially occludes the second respective portion of the physical environment relative to the viewpoint of the user, as similarly described above with reference to step 902. Displaying a virtual environment for resolving a depth conflict in a three-dimensional environment when displaying an object will cause the object to encounter the depth conflict in the three-dimensional environment enables the computer system to automatically resolve or reduce the depth conflict when displaying the object, thereby improving user-device interaction, and/or reduces the prominence of the depth conflict that would occur in the three-dimensional environment when the object is displayed, which reduces eye strain, thereby avoiding potential physical discomfort for the user.

In some embodiments, in response to receiving the respective input (940a), in accordance with a determination that displaying the second virtual object at the respective location would not result in the second virtual object having greater than the second respective degree (e.g., amount (e.g., 5, 8, 10, 12, 15, 20, 30, 40, 50, or 60 percent), angle (e.g., 1, 2, 5, 10, 15, 30, 35, 45, 60, 70, or 90 degrees), and/or position (e.g., 0.25, 0.5, 1, 2, 5, 8, 10, or 15 m)) of depth conflict with the second respective portion of the physical environment (940b), as indicated in the overhead view in FIG. 7A, the computer system displays (940c) the second virtual object at the second respective location in the three-dimensional environment, such as display of the virtual object 709a in the three-dimensional environment 702 as shown in FIG. 7B. In some embodiments, the computer system forgoes (940d) displaying the virtual environment within the three-dimensional environment, as similarly shown in FIG. 7B. For example, if the computer system determines that the location at which the second virtual object will be displayed in the three-dimensional environment in response to the respective input will not cause the second virtual object to have more than the second degree of depth conflict with the second respective portion of the physical environment, the computer system forgoes displaying the virtual environment within the three-dimensional environment, as similarly shown in FIG. 7B. In some embodiments, displaying the second virtual object at the respective location does not cause the second virtual object to encounter the depth conflict with the second respective portion of the physical environment. In some embodiments, the second virtual object does encounter a degree of depth conflict, but the degree of depth conflict is less than or equal to the second respective degree of depth conflict above. In some such embodiments, the computer system displays a visual indication (e.g., visual indication 725 in FIG. 7G) of the virtual environment (e.g., a preview of the virtual environment) at the respective location, as similarly described above with reference to step 906. Forgoing displaying a virtual environment for resolving a depth conflict in a three-dimensional environment when displaying an object will not cause the object to encounter the depth conflict in the three-dimensional environment helps prevent unintentional and/or undesirable display of the virtual environment within the three-dimensional environment, thereby improving user-device interaction.

In some embodiments, while displaying the first virtual object at the second location in the three-dimensional environment, the computer system detects (942a), via the one or more input devices, a second input corresponding to movement of the first virtual object away from the second location in the three-dimensional environment, such as movement input directed to the virtual object 709a provided by the hand 703k as shown in FIG. 7K. For example, as similarly described above with reference to step 902, the computer system detects an air pinch gesture (e.g., in which the index finger and thumb of the user make contact) directed toward the first virtual object (e.g., while the attention of the user is directed toward the first virtual object) in the three-dimensional environment. In some embodiments, the computer system detects the second input via a hardware input device (e.g., a controller) in communication with the computer system, as similarly described above with reference to step 902.

In some embodiments, in response to detecting the second input, the computer system moves (942b) the first virtual object away from the second location in the three-dimensional environment (e.g., in accordance with the movement of the hand of the user and/or the hardware input device), such as movement of the virtual object 709a within the three-dimensional environment 702 as shown in FIG. 7M, wherein the second input defines more than a threshold distance (e.g., 0.05, 0.10, 0.25, 0.5, 0.75, 1, 2, 4, 5, 8, or 10 m) of movement of the first virtual object beyond a location at which a depth conflict between the first virtual object and a respective object begins (e.g., beyond the threshold distance of movement into the respective object). For example, the computer system determines that, while moving the first virtual object away from the second location in the three-dimensional environment, the first virtual object encounters a depth conflict with a respective object (e.g., a physical object) in the three-dimensional environment, such as a depth conflict with the representation of the table 722a as shown in FIG. 7M. As discussed below with reference to step 944, the computer system optionally restricts a distance of the movement of the first virtual object into the respective object based on an object type of the respective object. For example, as discussed below, the first virtual object is optionally able to be moved beyond the threshold distance into objects of a first type and is not able to be moved beyond the threshold distance into objects of a second type, different from the first type. Limiting a distance that an object can be moved into another object with which the object has a depth conflict in a three-dimensional environment helps reduce a degree of the depth conflict in the three-dimensional environment, thereby improving user-device interaction, and/or reduces the prominence of the depth conflict in the three-dimensional environment, which reduces eye strain, thereby avoiding potential physical discomfort for the user.

In some embodiments, the moving includes (944a), in accordance with a determination that the respective object is of a first type, such as the table 722a or the sofa 724a in the three-dimensional environment 702 in FIG. 7M, displaying, via the display generation component, the first virtual object at a third location, different from the second location, in the three-dimensional environment in accordance with the second input, wherein the third location corresponds to the movement of the first virtual object more than the threshold distance (e.g., 0.05, 0.10, 0.25, 0.5, 0.75, 1, 2, 4, 5, 8, or 10 m) beyond the location at which the depth conflict between the first virtual object and the respective object begins (944b), such as display of the virtual object 709b beyond the threshold as illustrated in the overhead view in FIG. 7O. For example, as described in method 1000, objects of the first type include movable objects (e.g., movable pieces of furniture within the physical environment), objects that are located within the space in which the user (and the computer system) is present, and/or objects that have empty space around them (e.g., behind them relative to the viewpoint of the user) in the space in which the user is present. In some embodiments, if the computer system detects movement of the first virtual object (e.g., in response to the second input) more than the threshold distance beyond the location at which the depth conflict between the first virtual object and the object of the first type begins, the computer system does not restrict movement of the first virtual object within the three-dimensional environment. For example, the computer system moves the first virtual object to the third location in the three-dimensional environment in accordance with the second input, wherein the third location is more than the threshold distance beyond the location at which the depth conflict began (e.g., in accordance with the second input). Thus, as outlined above, when the first virtual object moves from the second location to the third location in the three-dimensional environment in accordance with the second input, the computer system moves the first virtual object more than the threshold distance into the respective object by a respective magnitude (e.g., of distance and/or speed) and in a respective direction that is based on a magnitude and a direction, respectively, of the movement of the hand of the user providing the second input. In some embodiments, the computer system displays a virtual environment, as similarly described above with reference to step 902, (or a visual indication of the virtual environment, as similarly described above with reference to step 906) within the three-dimensional environment to resolve or reduce the depth conflict between the first virtual object and the object of the first type at the third location, such as display of the virtual environment 728 within the three-dimensional environment 702 as shown in FIG. 7O.

In some embodiments, in accordance with a determination that the respective object is of a second type, different from the first type, such as the left side wall of the physical environment surrounding the display generation component 120 in FIGS. 7F and 7F1, and that the second input includes movement of a first magnitude (e.g., speed and/or distance), the computer system displays the first virtual object at a fourth location, different from the third location, in the three-dimensional environment based on the movement, such as display of the virtual object 709a in the three-dimensional environment 702 as shown in FIG. 7G, wherein the fourth location is within the threshold distance beyond the location at which the depth conflict between the first virtual object and the respective object of the second type begins (944c), as similarly described with reference to FIG. 7H. For example, the computer system determines that, while moving the first virtual object away from the second location in the three-dimensional environment, the first virtual object encounters a depth conflict with a respective object (e.g., a physical object) of a second type. For example, as described in method 1000, objects of the second type optionally include stationary, non-movable objects (e.g., walls, columns, windows, and/or cabinets within the physical environment), objects that define an outer boundary of the space (e.g., the volume of the physical environment)

in which the user (and the computer system) is present, and/or objects that do not have empty space behind them (e.g., relative to the viewpoint of the user) in the space in which the user is present. As similarly described above with reference to step 902, the second input optionally includes movement of the hand of the user (and/or movement of a hardware controller) with a first respective magnitude (e.g., of speed and/or distance) in space. In some embodiments, the magnitude of the movement of the first virtual object is based on (e.g., proportional to) the first respective magnitude of the movement of the hand of the user. In some embodiments, the fourth location at which the first virtual object is displayed is based on the first magnitude of the movement of the first virtual object. For example, the computer system moves the first virtual object to the fourth location in the three-dimensional environment that is within the threshold distance beyond the location at which the depth conflict between the first virtual object and the respective object begins based on the first respective magnitude of the movement of the second input. In some embodiments, the fourth location corresponds to movement of the first virtual object the threshold distance beyond the location at which the depth conflict between the first virtual object and the respective object begins.

In some embodiments, in accordance with a determination that the respective object is of the second type (e.g., as described above) and that the second input includes movement of a second magnitude (e.g., of speed and/or distance), greater than the first magnitude, such as movement of the virtual object 709a as shown in FIG. 7H, the computer system displays the first virtual object at the fourth location in the three-dimensional environment based on the movement (944d), as similarly described with reference to FIG. 7H. As similarly described above, the second input optionally includes movement of the hand of the user (and/or movement of a hardware controller) with a second respective magnitude (e.g., of speed and/or distance), greater than the first respective magnitude, in space. In some embodiments, the second magnitude of the movement of the first virtual object is based on (e.g., proportional to) the second respective magnitude of the movement of the hand of the user, until the movement causes the first virtual object to move to the threshold distance beyond the location at which the depth conflict between the first virtual object and the respective object of the second type began. For example, the computer system imposes a limit on a distance the first virtual object can be moved into the object in the three-dimensional environment farther than the fourth location, as similarly described with reference to FIG. 7H. In some embodiments, the computer system forgoes moving the first virtual object to a location in the three-dimensional environment that is more than the threshold distance beyond the location at which the depth conflict begins. The computer system instead optionally displays the first virtual object at the fourth location in the three-dimensional environment, which is equal to (or within) the threshold distance from location at which the depth conflict began. Accordingly, as outlined above, when the first virtual object moves from the second location to the third location in the three-dimensional environment in accordance with the second input, the computer system moves the first virtual object into the respective object by a respective magnitude (e.g., of distance and/or speed) and in a respective direction that is based on a magnitude and a direction, respectively, of the movement of the hand of the user providing the second input until the first virtual object is moved the threshold distance into the respective object, at which point the computer system no longer moves the first virtual object by the respective magnitude and in the respective direction (e.g., the computer system ceases movement of the first virtual object). In some embodiments, the computer system displays a virtual environment, as similarly described above with reference to step 902, (or a visual indication of the three-dimensional environment, as similarly described above with reference to step 906) within the three-dimensional environment to resolve or reduce the depth conflict between the first virtual object and the object of the second type at the fourth location, such as display of the virtual environment 728 within the three-dimensional environment 702 as shown in FIG. 7I. Limiting a distance that an object can be moved into another object with which the object has a depth conflict in a three-dimensional environment helps reduce a degree of the depth conflict in the three-dimensional environment, thereby improving user-device interaction, and/or reduces the prominence of the depth conflict in the three-dimensional environment, which reduces eye strain, thereby avoiding potential physical discomfort for the user.

It should be understood that the particular order in which the operations in method 900 have been described is merely exemplary and is not intended to indicate that the described order is the only order in which the operations could be performed. One of ordinary skill in the art would recognize various ways to reorder the operations described herein.

FIGS. 10A-10F is a flowchart illustrating a method 1000 of facilitating variable depth conflict mitigation for one or more virtual objects in a three-dimensional environment in accordance with some embodiments. In some embodiments, the method 1000 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 1000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1000 are, optionally, combined and/or the order of some operations is, optionally, changed.

In some embodiments, method 1000 is performed at a computer system (e.g., 101) in communication with a display generation component (e.g., 120) and one or more input devices (e.g., 314). For example, the computer system is or includes a mobile device (e.g., a tablet, a smartphone, a media player, or a wearable device), or a computer. In some embodiments, the computer system has one or more characteristics of the computer system in methods 800 and/or 900. In some embodiments, the display generation component has one or more characteristics of the display generation component in methods 800 and/or 900. In some embodiments, the one or more input devices have one or more characteristics of the one or more input devices in methods 800 and/or 900.

In some embodiments, the computer system displays (1002a), via the display generation component, a first virtual object at a first location in a three-dimensional environment, such as display of virtual object 709a in three-dimensional environment 702 as shown in FIG. 7B. For example, the three-dimensional environment is generated, displayed, or otherwise caused to be viewable by the computer system (e.g., an extended reality (XR) environment such as a virtual reality (VR) environment, a mixed reality (MR) environment, or an augmented reality (AR) environment). In some embodiments, the three-dimensional environment has one or more characteristics of the three-dimensional environment in methods 800 and/or 900. In some embodiments, the first virtual object is generated by the computer system and/or is or includes content. In some embodiments, the first virtual object has one or more characteristics of the first virtual object in methods 800 and/or 900.

In some embodiments, while displaying the first virtual object at the first location in the three-dimensional environment, the computer system detects (1002b), via the one or more input devices, a first input corresponding to movement of the first virtual object away from the first location in the three-dimensional environment, such as movement input directed to the virtual object 709a provided by the hand 703b. For example, the computer system detects an air pinch gesture performed by a hand of the user of the computer system that is detected by the one or more input devices (e.g., a hand tracking device) in communication with the computer system while the gaze of the user is directed toward the first virtual object. In some embodiments, after detecting the air pinch gesture, the computer system detects movement of the hand of the user in a pinch hand shape. In some embodiments, the computer system detects the first input via a hardware input device (e.g., a controller operable with six degrees of freedom of movement, or a touchpad or mouse) in communication with the computer system. In some embodiments, after detecting a selection input, the computer system detects movement via the hardware input device. In some embodiments, the first input has one or more characteristics of the first input in methods 800 and/or 900.

In some embodiments, in response to detecting the first input, the computer system moves (1002c) the first virtual object from the first location to a second location, different from the first location, in the three-dimensional environment in accordance with the first input, such as movement of the virtual object 709a within the three-dimensional environment 702 as shown in FIG. 7C. For example, the computer system moves the first virtual object from the first location to the second location in the three-dimensional environment in accordance with the movement of the hand of the user and/or the hardware input device. In some embodiments, the first input has one or more characteristics of the inputs described in methods 800 and/or 900.

In some embodiments, in accordance with a determination that the first virtual object has a first degree of depth conflict with a respective portion of the three-dimensional environment (e.g., at least a portion of the first virtual object at least partially contacts or intersects with at least a portion of a second object in a physical environment of the display generation component at the second location and/or before the first virtual object is displayed at the second location), such as the depth conflict between the virtual object 709a and representation of the table 722a as shown in FIG. 7C, the computer system displays (1002d) the first virtual object with a first visual effect that mitigates the depth conflict between the first virtual object and the respective portion of the three-dimensional environment, such as changing visual properties of a first portion of the virtual object 709a that has the depth conflict with the representation of the table 722a as shown in FIG. 7C. In some embodiments, the second object has one or more characteristics of the second object in methods 800 and/or 900. In some embodiments, the degree of the depth conflict between the first virtual object and the respective portion of the three-dimensional environment has one or more characteristics of the degree of the depth conflict in method 900. In some embodiments, the depth conflict between the first virtual object and the respective portion of the three-dimensional environment (e.g., the second object) corresponds to the first degree of depth conflict when a co-occupancy between a first portion of the first virtual object and a first portion of the second object is less than a first magnitude threshold (e.g., a first amount threshold), as described in more detail below. In some embodiments, the depth conflict corresponds to the first degree of depth conflict when the co-occupancy between the first portion of the first virtual object and the first portion of the second object is less than a first distance threshold (e.g., within the three-dimensional environment relative to the viewpoint of the user), as indicated in the overhead view in FIG. 7C and as described in more detail below. In some embodiments, the depth conflict corresponds to the first degree of depth conflict when the second location of the second object in the three-dimensional environment is less than a first predefined distance (e.g., 0.25, 0.5, 0.75, 1, 2, 3, 5, 10, 15, or 20 m) from the viewpoint of the user, as described below. In some embodiments, the depth conflict corresponds to the first degree of depth conflict when the second object is a first type of physical object (e.g., a table, chair, desk, sofa, and/or lamp) in the physical environment, as described below. In some embodiments, in accordance with the determination that the first virtual object has the first degree of depth conflict with the respective portion of the three-dimensional environment, the computer system changes an appearance of the first virtual object in the three-dimensional environment, such as the change in appearance of the first portion 711 of the virtual object 709a as shown in FIG. 7C. For example, the computer system changes values of one or more of a lighting effect, a darkening effect, a transparency effect, a blurring effect, a glowing effect, and/or a saturation effect of the first portion of the first virtual object. For example, the computer system changes the appearance of the first portion of the first virtual object, such that the first portion of the first virtual object is visible (e.g., is not occluded by the first portion of the second object) relative to the viewpoint of the user. In some embodiments, the computer system displays the first portion of the first virtual object with an animation effect that causes the first portion of the first virtual object to be visible relative to the viewpoint of the user when the first portion of the virtual object contacts or intersects with the first portion of the second object in response to the first input. In some embodiments, the change in appearance of the first portion of the first virtual object has one or more characteristics of the change in appearance of the first virtual object in method 800. In some embodiments, the computer system displays the first virtual object with the first visual effect without changing a visual appearance of other portions of the three-dimensional environment and/or other portions of the first virtual object in response to determining that the depth conflict corresponds to the first degree of depth conflict. In some embodiments, in accordance with the determination that the depth conflict corresponds to the first degree of depth conflict, the computer system does not display a virtual environment with the first object, as described in more detail below.

In some embodiments, in accordance with a determination that the first virtual object has a second degree of depth conflict with a respective portion of the three-dimensional environment, such as the depth conflict between the virtual object 709b and the representation of the table 722b as shown in the overhead view in FIG. 7O, the computer system displays (1002e) the first virtual object with a second visual effect that mitigates the depth conflict between the first virtual object and the respective portion of the three-dimensional environment, such as display of virtual environment 728 within the three-dimensional environment 702 as shown in FIG. 7O. In some embodiments, the second degree of depth conflict is different from the first degree of depth conflict (1002f). For example, the depth conflict between the first virtual object and the respective portion of the three-dimensional environment (e.g., the second object) corresponds to (e.g., is equal to or exceeds) the second degree of depth conflict when the co-occupancy between the first portion of the first virtual object and the first portion of the second object exceeds (or is equal to) the first magnitude threshold (e.g., the first amount threshold), as indicated in the overhead view in FIG. 7O and as described in more detail below. In some embodiments, the depth conflict corresponds to the second degree of depth conflict when the co-occupancy between the first portion of the first virtual object and the first portion of the second object exceeds (or is equal to) the first distance threshold (e.g., within the three-dimensional environment relative to the viewpoint of the user), as described in more detail below. In some embodiments, the depth conflict corresponds to the second degree of depth conflict when the second location of the second object in the three-dimensional environment is greater than (or equal to) the first predefined distance (e.g., 0.25, 0.5, 0.75, 1, 2, 3, 5, 10, 15, or 20 m), from the viewpoint of the user, as described below. In some embodiments, the depth conflict corresponds to the second degree of depth conflict when the second object is a second type of physical object (e.g., a wall, a cabinet, a window, and/or a screen), different from the first type, in the physical environment, as described below.

In some embodiments, the second visual effect is a different type of visual effect from the first visual effect (1002g). In some embodiments, in accordance with the determination that the depth conflict corresponds to the second degree of depth conflict, the computer system displays one or more virtual elements with the first virtual object in the three-dimensional environment. For example, the computer system displays a virtual environment that occupies all or portions of the three-dimensional environment and the physical environment, as similarly shown in FIG. 7O. In some embodiments, the virtual environment includes a three-dimensional representation of a scene or a setting (e.g., a beach setting in FIG. 7O) that occupies all or a portion of a field of view of the user of the computer system. In some embodiments, the first virtual object is displayed within the virtual environment, such that a portion of the virtual environment is displayed in the background of/surrounding the first virtual object relative to the viewpoint of the user, such as display of virtual object 709a within the virtual environment 728 as shown in FIG. 7O. In some embodiments, as described in methods 800 and/or 900, when a portion of the first virtual object at least partially intersects with or contacts a portion of the second object, the portions of the first virtual object and the second object create a depth conflict in the three-dimensional environment. In some embodiments, the virtual environment is displayed in the three-dimensional environment to occlude the second object (e.g., the virtual environment does not include the second object), as similarly shown in FIG. 7O, and thus resolve or reduce the depth conflict (e.g., the overlap) between the first virtual object and the second object in the three-dimensional environment. In some embodiments, the virtual environment has one or more characteristics of the virtual environment in method 900. In some embodiments, the computer system displays the first virtual object with the second visual effect without changing a visual appearance of other portions of the three-dimensional environment in response to determining that the depth conflict corresponds to the second degree of depth conflict, as similarly shown in FIG. 7C. Changing an appearance of an object in a three-dimensional environment when the object encounters a depth conflict based on movement of the object in the three-dimensional environment provides feedback that the display of the object is in conflict with a portion of the three-dimensional environment, which facilitates user input for resolving the depth conflict, thereby improving user-device interaction, and/or reduces the prominence of the depth conflict in the three-dimensional environment, which reduces eye strain of the user, thereby avoiding potential physical discomfort for the user.

In some embodiments, the first visual effect that mitigates the depth conflict between the first virtual object and the respective portion of the three-dimensional environment applies more strongly to a first portion of the first virtual object that has the depth conflict with the respective portion of the three-dimensional environment than to a second portion of the first virtual object that does not have the depth conflict with the respective portion of the three-dimensional environment (1004a), such as changing the visual properties of first portion 711 of the virtual object 709a that has the depth conflict without changing the visual properties of second portion 713 of the virtual object 709a as shown in FIG. 7C. For example, the first portion of the first virtual object is displayed with first visual properties to resolve or reduce the depth conflict between the first portion of the first virtual object and the respective portion of the three-dimensional environment. In some embodiments, the computer system changes values of opacity, brightness, coloration, and/or saturation of the first portion of the first virtual object to occlude the respective portion of the three-dimensional environment that is in contact with the first portion of the first virtual object. In some embodiments, displaying the first portion of the first virtual object with the first visual properties to resolve or reduce the depth conflict has one or more characteristics of changing the appearance of a portion of a virtual object to resolve or reduce a depth conflict as described in method 800. In some embodiments, the second portion of the first virtual object is displayed with second visual properties in the three-dimensional environment because the second portion of the first virtual object does not have a depth conflict with another object in the three-dimensional environment, such as displaying the second portion 713 of the virtual object 709a with the second visual properties because the second portion 713 does not have a depth conflict in the three-dimensional environment 702. In some embodiments the first virtual object is displayed with the second visual properties before the first input is detected, as similarly shown in FIG. 7B. For example, the first portion of the first virtual object and the second portion of the first virtual object are displayed with the second visual properties in the three-dimensional environment. In some embodiments, displaying the second portion of the first virtual object with the second visual properties includes displaying the second portion with values of opacity, brightness, coloration, and/or saturation that are based on the content (e.g., images, video, user interfaces, and/or selectable options) displayed in the first virtual object. It should be understood that, in some embodiments, the first visual properties and the second visual properties are not different due to the first portion of the first virtual object having content that is different from content included in the second portion of the first virtual object. For example, the first portion of the first virtual object and the second portion of the first virtual object contains different portions of the same content, and the difference between the first visual properties and the second visual properties is due to difference in values of opacity, brightness, coloration, and/or saturation of the content included in the first portion of the first virtual object (e.g., for resolving the depth conflict, as discussed above). In some embodiments, displaying the first portion of the first virtual object with the second visual properties has one or more characteristics of maintaining display of the appearance of a portion of a virtual object that does not have a depth conflict as described in method 800.

In some embodiments, the second visual effect that mitigates the depth conflict between the first virtual object and the respective portion of the three-dimensional environment applies equally to the first portion of the first virtual object that has the depth conflict with the respective portion of the three-dimensional environment and to the second portion of the first virtual object that does not have the depth conflict with the respective portion of the three-dimensional environment (1004b), such as maintaining display of the visual properties of the virtual object 709a when the virtual environment 728 is displayed within the three-dimensional environment 702 as shown in FIG. 7O. For example, the computer system displays the first portion and the second portion with third visual properties despite only the first portion of the first virtual object having the depth conflict with the respective portion of the three-dimensional environment. In some embodiments, as described in method 900, the computer system displays a virtual environment within the three-dimensional environment that resolves or reduces the depth conflict between the first virtual object and the respective portion of the three-dimensional environment. For example, the virtual environment is displayed behind the first virtual object to occlude the respective portion of the three-dimensional environment, as similarly shown in FIG. 7O. In some embodiments, displaying the first portion and the second portion of the first virtual object with the third visual properties includes displaying the first portion and the second portion of the first virtual object with values of opacity, brightness, coloration and/or saturation that are based on the content displayed in the first virtual object, as similarly described above. For example, the third visual properties are the same or similar to the visual properties of the first virtual object in the three-dimensional environment before the first input is detected. Displaying portions of an object in a three-dimensional environment with different visual properties or same visual properties when the object encounters a depth conflict based on a degree of the depth conflict in the three-dimensional environment provides feedback that the display of the object is in conflict with a portion of the three-dimensional environment, which facilitates user input for resolving the depth conflict, thereby improving user-device interaction, and/or reduces the prominence of the depth conflict in the three-dimensional environment, which reduces eye strain of the user, thereby avoiding potential physical discomfort for the user.

In some embodiments, displaying the first virtual object with the second visual effect that mitigates the depth conflict between the first virtual object and the respective portion of the three-dimensional environment includes concurrently displaying, via the display generation component, one or more virtual elements with the first virtual object within the three-dimensional environment, such as display of the virtual environment 728 with the virtual object 709a within the three-dimensional environment 702 as shown in FIG. 7O, wherein the one or more virtual elements were not displayed before displaying the first virtual object with the second visual effect (1006a), as similarly shown in FIG. 7L. For example, as similarly described above with reference to step 1002, concurrently displaying the one or more virtual elements with the first virtual object in the three-dimensional environment includes displaying a virtual environment within the three-dimensional environment that is not displayed before the first input is detected.

In some embodiments, displaying the first virtual object with the first visual effect that mitigates the depth conflict between the first virtual environment and the respective portion of the three-dimensional environment does not include concurrently displaying the one or more virtual elements with the first virtual object within the three-dimensional environment (1006b), such as forgoing display of the virtual environment 728 in the three-dimensional environment 702 when the first portion 711 of the virtual object 709a is displayed with the first visual properties as shown in FIG. 7C. For example, as similarly described above with reference to step 1002, displaying the first virtual object with the first visual effect includes changing an appearance of a portion of the first virtual object that has the depth conflict with the respective portion of the three-dimensional environment, as similarly shown in FIG. 7C, and thus does not include displaying the one or more virtual elements in addition to the first virtual object within the three-dimensional environment. It should be understood that, in some embodiments, the three-dimensional environment includes additional virtual elements (e.g., a second virtual object), separate from the first virtual object, and displaying the first virtual object with the first visual effect does not include displaying additional virtual elements in the three-dimensional environment other than those that were already included in the three-dimensional environment when the first input is detected. Displaying one or more additional virtual elements with an object in a three-dimensional environment when the object encounters a depth conflict based on a degree of the depth conflict in the three-dimensional environment provides feedback that the display of the object is in conflict with a portion of the three-dimensional environment, which facilitates user input for resolving the depth conflict, thereby improving user-device interaction, and/or reduces the prominence of depth conflict in the three-dimensional environment, which reduces eye strain of the user, thereby avoiding potential physical discomfort for the user.

In some embodiments, the three-dimensional environment is visible from a first viewpoint of a user of the computer system, and the first virtual object at least partially overlays the one or more virtual elements in the three-dimensional environment from the first viewpoint of the user when the one or more virtual elements are concurrently displayed with the first virtual object (1008), such as display of the virtual environment 728 behind the virtual object 709a in the three-dimensional environment 728 as shown in FIG. 7O. For example, the computer system displays the one or more virtual elements (e.g., the virtual environment) behind the first virtual object in the three-dimensional environment from the first viewpoint of the user of the computer system. In some embodiments, the first viewpoint of the user corresponds to the viewpoint of the user before, during, and/or after the movement of the object (e.g., in response to detecting the first input). In some embodiments, as similarly described above with reference to step 1002, the computer system displays the virtual environment behind the first virtual object to occlude the respective portion of the three-dimensional environment with which the first virtual object has the depth conflict, as similarly shown in FIG. 7O, and thus to resolve or reduce the depth conflict in the three-dimensional environment from the first viewpoint of the user. In some embodiments, the virtual environment occupies/consumes at least a portion of the three-dimensional environment behind and surrounding the first virtual object in the field of view of the user from the first viewpoint, as indicated in the overhead view in FIG. 7O and as similarly described in method 900. Displaying one or more additional virtual elements behind an object in a three-dimensional environment when the object encounters a depth conflict based on a degree of the depth conflict in the three-dimensional environment provides feedback that the display of the object is in conflict with a portion of the three-dimensional environment, which facilitates user input for resolving the depth conflict, thereby improving user-device interaction, and/or reduces the prominence of the depth conflict in the three-dimensional environment, which reduces eye strain of the user, thereby avoiding potential physical discomfort for the user.

In some embodiments, after moving the first virtual object from the first location to the second location in the three-dimensional environment in accordance with the first input, the computer system detects (1010*a*), via the one or more input devices, a second input corresponding to movement of the first virtual object away from the second location in the three-dimensional environment, such as movement input directed to the virtual object 709*a* provided by the hand 703*l* in FIG. 7L. For example, as similarly described above with reference to step 1002, the computer system detects an air pinch gesture directed to the first virtual object in the three-dimensional environment, followed by movement of the hand of the user providing the air pinch gesture in space. In some embodiments, the computer system detects the hand move with a respective magnitude and in a respective direction. In some embodiments, as similarly described above with reference to step 1002, detecting the second input includes detecting a selection via a hardware input device (e.g., a controller) in communication with the computer system followed by movement (e.g., movement of the hardware input device and/or movement of a finger of the user on a touch-sensitive surface of the hardware input device or movement of a button (e.g., a joystick)).

In some embodiments, while detecting the second input (1010*b*), the computer system moves (1010*c*) the first virtual object from the second location to a third location, different from the third location, in the three-dimensional environment in accordance with the second input (e.g., in accordance with the respective magnitude and the respective direction of the movement of the hand of the user), such as movement of the virtual object 709*a* within the three-dimensional environment 702 as shown in FIG. 7M. In some embodiments, in accordance with a determination that (the first virtual object has at least the first degree of depth conflict with a second respective portion of the three-dimensional environment and) the first virtual object is displayed with the first visual effect when the second input is detected, the computer system adjusts (1010*d*) the first visual effect in a first manner in accordance with the movement of the first virtual object away from the second location in the three-dimensional environment, such as changing the visual properties of portion 735 of the virtual object 709*a* that has the depth conflict in the three-dimensional environment 702 as shown in FIG. 7M. For example, while displaying the first virtual object with the first visual effect, when the computer system moves the first virtual object to the third location in the three-dimensional environment in accordance with the second input, the computer system controls the first visual effect based on changes to the degree of the depth conflict in the three-dimensional environment. In some embodiments, if the movement of the first virtual object to the third location in the three-dimensional environment decreases the degree of the depth conflict between the first virtual object and the respective portion of the three-dimensional environment, the computer system decreases the portion of the first virtual object that is displayed with the first visual effect. For example, the computer system displays the first virtual object with less of the first visual effect (e.g., because a smaller portion of the first virtual object is contacting the respective portion of the three-dimensional environment), and/or ceases display of the first virtual object with the first visual effect (e.g., because the first virtual object is no longer contacting the respective portion of the three-dimensional environment), as similarly shown in FIG. 7L. In some embodiments, if the movement of the first virtual object to the third location in the three-dimensional environment increases the degree of the depth conflict between the first virtual object and the respective portion of the three-dimensional environment, the computer system increases the portion of the first virtual object that is displayed with the first visual effect. For example, the computer system displays the first virtual object with more of the first visual effect in the three-dimensional environment (e.g., because a larger portion of the first virtual object is contacting the respective portion of the three-dimensional environment).

In some embodiments, in accordance with a determination that (the first virtual object has at least the second degree of depth conflict with the second respective portion of the three-dimensional environment and) the first virtual object is displayed with the second visual effect (e.g., virtual environment 728 in FIG. 7O) when the second input is detected, the computer system adjusts (1010*e*) the second visual effect in a second manner, different from the first manner, in accordance with the movement of the first virtual object away from the second location in the three-dimensional environment, such as maintaining display of the virtual environment 728 within the three-dimensional environment 702 as shown in FIG. 7P. For example, while displaying the first virtual object with the second visual effect, when the computer system moves the first virtual object to the third location in the three-dimensional environment in accordance with the second input, the computer system controls the second visual effect based on changes to the degree of the depth conflict in the three-dimensional environment. In some embodiments, if the movement of the first virtual object to the third location in the three-dimensional environment decreases the degree of the depth conflict (e.g., but while also maintaining at least some degree of depth conflict) between the first virtual object and the respective portion of the three-dimensional environment, the computer system maintains display of the first virtual object with the second visual effect. For example, the computer system maintains display of the virtual environment within the three-dimensional environment, wherein the third location is at least partially within the virtual environment, such as maintaining display of the virtual environment 728 behind the virtual object 709*a* as shown in FIG. 7P. In some embodiments, if the movement of the first virtual object to the third location causes the first virtual object to no longer have a depth conflict with a portion of the three-dimensional environment, the computer system ceases display of the virtual environment within the three-dimensional environment. In some embodiments, if the movement of the first virtual object to the third location in the three-dimensional environment increases the degree of the depth conflict between the first virtual object and the respective portion of the three-dimensional environment, the computer system maintains display of the first virtual object with the second visual effect. For example, as similarly described above, the computer system maintains display of the virtual environment within the three-dimensional environment, wherein the third location is at least partially within the virtual environment. Changing a visual effect displayed with an object in a three-dimensional environment when the object encounters a depth conflict based on a degree of the depth conflict in the three-dimensional environment provides feedback that the display of the object is in conflict with a portion of the three-dimensional environment, which facilitates user input for resolving the depth conflict, thereby improving user-device interaction, and/or reduces the prominence of the depth conflict in the three-dimensional environment, which reduces eye strain of the user, thereby avoiding potential physical discomfort for the user.

In some embodiments, after moving the first virtual object from the first location to the second location in the three-dimensional environment in accordance with the first input, the computer system detects (1012a), via the one or more input devices, a second input that includes movement of a viewpoint of a user of the computer system relative to the three-dimensional environment, such as movement of the viewpoint of the user 726 caused by movement of hand 705a as shown in FIG. 7D. For example, as similarly described above with reference to step 1002, the computer system detects movement of a head of the user of the computer system relative to the three-dimensional environment. In some embodiments, movement of the head of the user causes the display generation component to move, thus moving the viewpoint of the user relative to the three-dimensional environment.

In some embodiments, while detecting the second input (1012b), in accordance with a determination that the first virtual object has at least the first degree of depth conflict with the respective portion of the three-dimensional environment (and the first virtual object is displayed with the first visual effect when the second input is detected), the computer system adjusts (1012c) the first visual effect in a first manner in accordance with the movement of the viewpoint of the user relative to the three-dimensional environment, such as adjusting the visual properties of the first portion 711 of the virtual object 709a that has the depth conflict with the representation of the table 722a as shown in FIG. 7E. For example, while displaying the first virtual object with the first visual effect, when the viewpoint of the user moves relative to the three-dimensional environment (e.g., and thus the first virtual object), the computer system adjusts the first visual effect based on changes to the degree of the depth conflict in the three-dimensional environment from the new viewpoint. In some embodiments, when the computer system detects the movement of the viewpoint of the user while the first virtual object is displayed with the first visual effect, the degree of the depth conflict between the first virtual object and the respective portion of the three-dimensional environment changes due to a parallax effect relative to the new viewpoint of the user, such as the change of the orientation of the virtual object 709a from the new viewpoint of the user 726 as shown in FIG. 7E. In some embodiments, if the movement of the viewpoint of the user relative to the three-dimensional environment decreases the degree of the depth conflict between the first virtual object and the respective portion of the three-dimensional environment, the computer system decreases the portion of the first virtual object that is displayed with the first visual effect. For example, the computer system displays the first virtual object with less of the first visual effect (e.g., because a smaller portion of the first virtual object is contacting the respective portion of the three-dimensional environment from the new viewpoint of the user), and/or ceases display of the first virtual object with the first visual effect (e.g., because the first virtual object is no longer contacting the respective portion of the three-dimensional environment from the new viewpoint of the user). In some embodiments, if the movement of the viewpoint of the user relative to the three-dimensional environment increases the degree of the depth conflict between the first virtual object and the respective portion of the three-dimensional environment from the new viewpoint of the user, the computer system increases the portion of the first virtual object that is displayed with the first visual effect. For example, the computer system displays the first virtual object with more of the first visual effect in the three-dimensional environment (e.g., because a larger portion of the first virtual object is contacting the respective portion of the three-dimensional environment) relative to the new viewpoint of the user. In some embodiments, the computer system changes one or more characteristics of the first visual effect due to the movement of the viewpoint of the user, as similarly shown in FIG. 7E. For example, as described in method 800, the computer system changes values of opacity and/or brightness of the portion of the first virtual object that is in contact with the respective portion of the three-dimensional environment based on the movement of the viewpoint of the user.

In some embodiments, in accordance with a determination that (the first virtual object has at least the second degree of depth conflict with the respective portion of the three-dimensional environment and) the first virtual object is displayed with the second visual effect (e.g., virtual environment 728 in FIG. 7I) when the second input is detected, the computer system adjusts (1012d) the second visual effect in a second manner, different from the first manner, in accordance with the movement of the viewpoint of the user relative to the three-dimensional environment, such as maintaining display of the virtual environment 728 within the three-dimensional environment 702 as shown in FIG. 7J. For example, while displaying the first virtual object with the second visual effect, when the viewpoint of the user moves relative to the three-dimensional environment in accordance with the second input, the computer system adjusts the second visual effect based on changes to the degree of the depth conflict in the three-dimensional environment from the new viewpoint of the user. In some embodiments, when the computer system detects the movement of the viewpoint of the user while the first virtual object is displayed with the first visual effect, the degree of the depth conflict between the first virtual object and the respective portion of the three-dimensional environment changes due to a change/shift in orientation of the first virtual object in the three-dimensional environment relative to the new viewpoint of the user. In some embodiments, if the movement of the viewpoint of the user relative to the three-dimensional environment decreases the degree of the depth conflict (e.g., but while also maintaining at least some degree of depth conflict) between the first virtual object and the respective portion of the three-dimensional environment from the new viewpoint of the user, the computer system maintains display of the first virtual object with the second visual effect. For example, the computer system maintains display of the virtual environment within the three-dimensional environment, such that the virtual environment remains displayed behind the first virtual object (e.g., and continues occluding the respective portion of the three-dimensional environment) from the new viewpoint of the user, as similarly shown in FIG. 7J. In some embodiments, if the movement of the viewpoint of the user relative to the three-dimensional environment causes the first virtual object to no longer have a depth conflict with a portion of the three-dimensional environment, the computer system ceases display of the virtual environment within the three-dimensional environment from the new viewpoint of the user. In some embodiments, if the movement of the viewpoint of the user relative to the three-dimensional environment increases the degree of the depth conflict between the first virtual object and the respective portion of the three-dimensional environment from the new viewpoint of the user, the computer system maintains display of the first virtual object with the second visual effect. For example, as similarly described above, the computer system maintains display of the virtual environment within the three-dimensional environment, such that the virtual environment remains displayed behind the first virtual object from the new viewpoint of the user. Changing a visual effect displayed with an object in a three-dimensional environment when the object encounters a depth conflict based on movement of the viewpoint of the user relative to the three-dimensional environment provides feedback that the display of the object is in conflict with a portion of the three-dimensional environment, which facilitates user input for resolving the depth conflict, thereby improving user-device interaction, and/or reduces the prominence of the depth conflict in the three-dimensional environment, which reduces eye strain of the user, thereby avoiding potential physical discomfort for the user.

In some embodiments, the first virtual object is a virtual window (1014) (e.g., a window of an application or of an operating system of the computer system), as described with reference to the virtual object 709a in FIG. 7B. For example, the virtual window is or includes content, such as a user interface of a web browsing application displaying content (e.g., text, images, or video), a user interface of a content browsing application displaying a photograph or video clip, a media player user interface for controlling playback of content items on the computer system, a contact card in a contacts application user interface displaying contact information (e.g., phone number email address, and/or birthday) and/or a virtual boardgame of a gaming application. Changing an appearance of a user interface in a three-dimensional environment when the user interface encounters a depth conflict based on movement of the user interface in the three-dimensional environment provides feedback that the display of the user interface is in conflict with a portion of the three-dimensional environment, which facilitates user input for resolving the depth conflict, thereby improving user-device interaction, and/or reduces the prominence of the depth conflict in the three-dimensional environment, which reduces eye strain of the user, thereby avoiding potential physical discomfort for the user.

In some embodiments, the determination that the first virtual object has the first degree of depth conflict with the respective portion of the three-dimensional environment is in accordance with a determination that less than a threshold amount (e.g., 5, 10, 15, 20, 30, 40, 50, 75, 80, or 90 percent) of the first virtual object has the depth conflict with the respective portion of the three-dimensional environment (1016a), such as less than the threshold amount of the virtual object 709b indicated in the overhead view in FIG. 7C. For example, if less than the threshold amount of the first virtual object (e.g., of surface area, area, and/or volume of the first virtual object) has the depth conflict with the respective portion of the three-dimensional environment, the computer system displays the first virtual object with the first visual effect, as similarly shown in FIG. 7C and as similarly described above with reference to step 1002. In some embodiments, the determination that the first virtual object has the second degree of depth conflict is in accordance with a determination that at least the threshold amount (e.g., 5, 10, 15, 20, 30, 40, 50, 75, 80, or 90 percent) of the first virtual object has the depth conflict with the respective portion of the three-dimensional environment (1016b), such as more than the threshold amount of the virtual object 709b indicated in the overhead view in FIG. 7O. For example, if at least the threshold amount of the first virtual object (e.g., of surface area, area, and/or volume of the first virtual object) has the depth conflict with the respective portion of the three-dimensional environment, the computer system displays the first virtual object with the second visual effect (e.g., displays the virtual environment within the three-dimensional environment, as similarly shown in FIG. 7O), as similarly described above with reference to step 1002. Changing visual properties of an object in a three-dimensional environment when the object encounters a depth conflict based on an amount of the object that has the depth conflict enables the computer system to automatically resolve or reduce the depth conflict, thereby improving user-device interaction, and/or reduces the prominence of the depth conflict in the three-dimensional environment, which reduces eye strain of the user, thereby avoiding potential physical discomfort for the user.

In some embodiments, the determination that the first virtual object has the first degree of depth conflict with the respective portion of the three-dimensional environment is in accordance with a determination that the first virtual object has been moved less than a threshold distance (e.g., 0.05, 0.10, 0.25, 0.5, 0.75, 1, 2, 4, 5, 8, or 10 m) beyond a location at which the depth conflict between the first virtual object and the respective portion of the three-dimensional environment began (1018a) (e.g., while maintaining and/or increasing the depth conflict), as similarly described with reference to FIG. 7C. For example, if the first virtual object is moved less than the threshold distance beyond a first boundary of the respective portion of the three-dimensional environment, the computer system displays the first virtual object with the first visual effect, as similarly described above with reference to step 1002. In some embodiments, the first boundary of the respective portion of the three-dimensional environment is a first edge of the respective portion of the three-dimensional environment with which the depth conflict initially occurs, such as a first edge/surface of a table, chair, wall, or sofa that the first virtual object contacts and/or intersects with in the three-dimensional environment, such as an edge of the representation of the table 722a in FIG. 7C, in accordance with the first input in step 1002 above. For example, if the first virtual object is moved less than the threshold distance into the table, chair, wall, or sofa with which the first virtual object has the depth conflict, the computer system changes the appearance of the portion of the first virtual object that has the depth conflict to resolve or reduce the depth conflict in the three-dimensional environment.

In some embodiments, the determination that the first virtual object has the second degree of depth conflict with the respective portion of the three-dimensional environment is in accordance with a determination that the first virtual object has been moved more than the threshold distance (e.g., 0.05, 0.10, 0.25, 0.50, 0.75, 1, 2, 4, 5, 8, or 10 m) beyond the location at which the depth conflict between the first virtual object and the respective portion of the three-dimensional environment began (1018*b*) (e.g., while maintaining and/or increasing the depth conflict), as similarly described with reference to FIG. 7O. For example, if the first virtual object is moved more than the threshold distance beyond the first boundary of the respective portion of the three-dimensional environment at which the depth conflict initially occurs, the computer system displays the first virtual object with the second visual effect (e.g., displays the virtual environment within the three-dimensional environment), as similarly described above with reference to step 1002. In some embodiments, if the first virtual object is moved more than the threshold distance into the table, chair, wall, or sofa with which the first virtual object has the depth conflict, such as the representation of the table 722*b* in the overhead view in FIG. 7O, the computer system displays the virtual environment within the three-dimensional environment (e.g., behind the virtual object relative to the viewpoint of the user) to resolve or reduce the depth conflict in the three-dimensional environment. Changing an appearance of an object in a three-dimensional environment when the object encounters a depth conflict based on a distance the object has been moved since encountering the depth conflict enables the computer system to automatically resolve or reduce the depth conflict, thereby improving user-device interaction, and/or reduces the prominence of the depth conflict in the three-dimensional environment, which reduces eye strain of the user, thereby avoiding potential physical discomfort for the user.

In some embodiments, displaying the first virtual object with the first visual effect that mitigates the depth conflict between the first virtual object and the respective portion of the three-dimensional environment is further in accordance with a determination that the second location of the first virtual object is a first distance (e.g., 0.1, 0.25, 0.5, 0.75, 1, 1.5, 2, 3, 5, 8, 10, or 12 m) from a viewpoint of a user of the computer system (1020*a*), as similarly described with reference to FIG. 7C. For example, the computer system displays the first virtual object with the first visual effect that resolves or reduces the depth conflict with the respective portion of the three-dimensional environment if the depth conflict is the first distance from the viewpoint of the user.

In some embodiments, displaying the first virtual object with the second visual effect that mitigates the depth conflict between the first virtual object and the respective portion of the three-dimensional environment is further in accordance with a determination that the second location of the first virtual object is a second distance (e.g., 0.25, 0.5, 1, 2, 5, 10, 12, 15, 20, 25, or 30 m), different from the first distance, from the viewpoint of the user (1020*b*), as similarly described with reference to FIG. 7M. For example, the computer system displays the first virtual object with the second visual effect that resolves or reduces the depth conflict with the respective portion of the three-dimensional environment if the depth conflict is the second distance from the viewpoint of the user. In some embodiments, the second distance is greater than the first distance above. In some embodiments, the second distance is less than the first distance above. Changing an appearance of an object in a three-dimensional environment when the object encounters a depth conflict based on a distance of the depth conflict from a viewpoint of the user enables the computer system to automatically resolve or reduce the depth conflict, thereby improving user-device interaction, and/or reduces the prominence of the depth conflict in the three-dimensional environment, which reduces eye strain of the user, thereby avoiding potential physical discomfort for the user In some embodiments, displaying the first virtual object with the first visual effect that mitigates the depth conflict between the first virtual object and the respective portion of the three-dimensional environment is in accordance with a determination that the respective portion of the three-dimensional environment includes a physical object of a first type (1022*a*), such as the table 722*a* or the sofa 722*b* as described with reference to FIG. 7C. For example, the computer system displays the first virtual object with the first visual effect that resolves or reduces the depth conflict if the first virtual object has the depth conflict with a physical object of a first type. In some embodiments, as similarly described above with reference to step 1002, the three-dimensional environment includes a physical environment that surrounds the display generation component (and/or the computer system). In some embodiments, the physical object of the first type is located in the physical environment. In some embodiments, physical objects of the first type include movable physical objects (e.g., pieces of furniture and similar physical objects that would commonly be found in a room in which the user is located). In some embodiments, physical objects of the first type include objects that are located within the space (e.g., the volume of the physical environment) in which the user (and the computer system) is located (e.g., are not objects that define an outer boundary of the space and/or volume in which the user is located). In some embodiments, physical objects of the first type include objects that have empty space around them (e.g., behind them relative to the viewpoint of the user) in the space in which the user is present. For example, the first type of physical objects includes tables, chairs, desks, lamps, desktop computers, shelves, bookcases, counters, and the like. In some embodiments, the computer system changes the appearance of the portion of the first virtual object that contacts the physical object of the first type, as similarly described above with reference to step 1002. In some embodiments, the computer system displays the first virtual object with the first visual effect irrespective of whether the first virtual object has the first degree of depth conflict with the respective portion of the three-dimensional environment, as similarly described with reference to FIG. 7C. For example, if the computer system determines that the virtual object has the second degree of depth conflict with the respective portion of the three-dimensional environment, but the respective portion includes a physical object of the first type, as discussed above, the computer system displays the first virtual object with the first visual effect, rather than with the second visual effect as discussed previously above with reference to step 1002.

In some embodiments, displaying the first virtual object with the second visual effect that mitigates the depth conflict between the first virtual object and the respective portion of the three-dimensional environment is in accordance with a determination that the respective portion of the three-dimensional environment includes a physical object of a second type, different from the first type (1022*b*), such as the physical walls, floor, and/or ceiling of the physical environment surrounding the display generation component 120 as described with reference to FIG. 7I. For example, the computer system displays the first virtual object with the second visual effect that resolves or reduces the depth conflict if the first virtual object has the depth conflict with a physical object of a second type. In some embodiments, the physical object of the second type is located in the physical environment surrounding the display generation component. In some embodiments, physical objects of the second type include stationary, non-movable physical objects (e.g., that include extended surfaces that would commonly be found in a room in which the user is located). In some embodiments, physical objects of the second type include objects that define the space (e.g., the volume of the physical environment) in which the user (and the computer system) is located (e.g., are objects that define the outer boundary of the space and/or volume in which the user is located). In some embodiments, physical objects of the second type include objects that do not have empty space behind them (e.g., relative to the viewpoint of the user) in the space in which the user is present. For example, the second type of physical objects includes walls of a room in which the display generation component is located, ceilings, floor/carpet surfaces, windows, cabinets, and the like. In some embodiments, the computer system displays a virtual environment behind the first virtual object to occlude the physical object of the second type, as similarly described above with reference to step 1002. In some embodiments, the computer system displays the first virtual object with the second visual effect irrespective of whether the first virtual object has the second degree of depth conflict with the respective portion of the three-dimensional environment, as similarly described with reference to FIG. 7I. For example, if the computer system determines that the virtual object has the first degree of depth conflict with the respective portion of the three-dimensional environment, but the respective portion includes a physical object of the second type, as discussed above, the computer system displays the first virtual object with the second visual effect, rather than with the first visual effect as discussed previously above with reference to step 1002. In some embodiments, the respective degree of depth conflict evaluated by the computer system to determine whether to display the first virtual object with the first visual effect is relative to the type of object with which the first virtual object has the depth conflict. For example, the second degree of depth conflict (e.g., described previously with reference to step 1002) required to cause display of the second visual effect is smaller when the first virtual object has a depth conflict with a floor surface (e.g., the second type of object) than when the first virtual object has a depth conflict with a table (e.g., the first type of object). Changing an appearance of an object in a three-dimensional environment when the object encounters a depth conflict with a physical object based on a type of the physical enables the computer system to automatically resolve or reduce the depth conflict, thereby improving user-device interaction, and/or reduces the prominence of the depth conflict in the three-dimensional environment, which reduces eye strain of the user, thereby avoiding potential physical discomfort for the user.

It should be understood that the particular order in which the operations in method 1000 have been described is merely exemplary and is not intended to indicate that the described order is the only order in which the operations could be performed. One of ordinary skill in the art would recognize various ways to reorder the operations described herein.

In some embodiments, aspects/operations of methods 800, 900 and/or 1000 may be interchanged, substituted, and/or added between these methods. For example, various object manipulation techniques of methods 800, 900, and/or 1000 are optionally interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries

| may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can be generated by inferring preferences based on non-personal information data or a bare minimum amount of personal information, such as the content being requested by the device associated with a user, other non-personal information available to the service, or publicly available information.

The invention claimed is:

1. A method comprising:
   at a computer system in communication with a display generation component and one or more input devices:
   displaying, via the display generation component, a first virtual object at a first location in a three-dimensional environment, wherein a first portion and a second portion of the first virtual object include content that is displayed with first visual properties;
   while displaying the first virtual object in the three-dimensional environment, detecting, via the one or more input devices, a first input corresponding to movement of the first virtual object from the first location to a second location, different from the first location, in the three-dimensional environment;
   in response to detecting the first input, moving the first virtual object from the first location to the second location in the three-dimensional environment in accordance with the first input; and in accordance with a determination that the first portion of the first virtual object occupies a same portion of the three-dimensional environment as a first portion of a second object in the three-dimensional environment, and the second portion of the first virtual object does not occupy a same portion of the three-dimensional environment as a respective object in the three-dimensional environment:
   displaying the content in the first portion of the first virtual object with second visual properties, different from the first visual properties; and
   displaying the content in the second portion of the first virtual object with the first visual properties.

2. The method of claim 1, wherein the second object is a physical object in a physical environment of the display generation component.

3. The method of claim 1, further comprising:
   after moving the first virtual object from the first location to the second location in the three-dimensional environment in accordance with the first input and while the first virtual object is at the second location in the three-dimensional environment:
   in accordance with a determination that the first portion of the first virtual object does not occupy a same portion of the three-dimensional environment as a respective object in the three-dimensional environment, and the second portion of the first virtual object does not occupy the same portion of the three-dimensional environment as a respective object in the three-dimensional environment:
   displaying the content in the first portion and the second portion of the first virtual object with the first visual properties.

4. The method of claim 1, wherein the first input includes input provided by a predefined portion of a user of the computer system that is directed to the first virtual object.

5. The method of claim 1, wherein the first input includes movement of a viewpoint of a user of the computer system.

6. The method of claim 1, wherein the first virtual object is world-locked within the three-dimensional environment.

7. The method of claim 1, wherein:
   changing the content in the first portion of the first virtual object from having the first visual properties to the second visual properties includes changing a visual parameter of the first virtual object in a first direction; and
   the method further comprises:
   while displaying the content in the first portion of the first virtual object with the second visual properties because the first portion of the first virtual object occupies the same portion of the three-dimensional environment as the first portion of the second object in the three-dimensional environment, detecting, via the one or more input devices, an end of the first input; and
   in response to detecting the end of the first input:
   in accordance with a determination that one or more criteria are satisfied, displaying at least a portion of the content in the first portion of the first virtual object with third visual properties, wherein changing the content in the first portion of the first virtual object from having the second visual properties to the third visual properties includes changing the visual parameter of the first virtual object in a second direction that is opposite to the first direction.

8. The method of claim 7, wherein the one or more criteria include a criterion that is satisfied when a first threshold amount of time has elapsed since detecting the end of the first input.

9. The method of claim 1, wherein:

displaying the content in the first portion of the first virtual object with the first visual properties includes displaying the content in the first portion of the first virtual object with a first amount of opacity; and displaying the content in the first portion of the first virtual object with the second visual properties includes displaying the content in the first portion of the first virtual object with a second amount of opacity, different from the first amount of opacity.

10. The method of claim 1, wherein:

displaying the content in the first portion of the first virtual object with the first visual properties includes displaying the content in the first portion of the first virtual object with a first amount of brightness; and displaying the content in the first portion of the first virtual object with the second visual properties includes displaying the content in the first portion of the first virtual object with a second amount of brightness, different from the first amount of brightness.

11. The method of claim 1, wherein displaying the content in the second portion of the first virtual object with the first visual properties includes displaying the content in the second portion of the first virtual object with a first amount of opacity, the method further comprising:

while displaying the first virtual object at the second location in the three-dimensional environment, detecting, via the one or more input devices, a second input corresponding to movement of the first virtual object relative to a viewpoint of a user of the computer system; and while detecting the second input and while moving the first virtual object relative to the viewpoint of the user in accordance with the second input, reducing an opacity of the content in the second portion of the first virtual object relative to an opacity of the content in the first portion of the first virtual object.

12. The method of claim 1, the method further comprising:

while displaying the first virtual object at the second location in the three-dimensional environment and while the first portion of the first virtual object occupies a same portion of the three-dimensional environment as the first portion of the second object in the three-dimensional environment, detecting, via the one or more input devices, a second input corresponding to movement of the first virtual object relative to a viewpoint of a user of the computer system; and while detecting the second input and while moving the first virtual object relative to the viewpoint of the user in accordance with the second input:

in accordance with a determination that the movement of the first virtual object relative to the viewpoint of the user corresponds to movement of the first virtual object from the second location to a third location in the three-dimensional environment:

displaying content in a third portion of the first virtual object with third visual properties, different from the first visual properties; and in accordance with a determination that the movement of the first virtual object relative to the viewpoint of the user corresponds to movement of the viewpoint of the user of the computer system:

displaying the content in the third portion of the first virtual object with fourth visual properties, different from the first visual properties and the third visual properties.

13. The method of claim 12, wherein:

displaying the content in the third portion of the first virtual object with the third visual properties includes displaying a boundary between the third portion of the first virtual object and a fourth portion of the first virtual object with a first visual transition, wherein the fourth portion of the first virtual object does not occupy a same portion of the three-dimensional environment as a respective object in the three-dimensional environment; and displaying the content in the third portion of the first virtual object with the fourth visual properties includes displaying the boundary between the third portion of the first virtual object and the fourth portion of the first virtual object with a second visual transition, different from the first visual transition.

14. The method of claim 12, wherein:

displaying the content in the third portion of the first virtual object with the third visual properties includes displaying the third portion of the first virtual object with a first amount of a visual effect; and displaying the content in the third portion of the first virtual object with the fourth visual properties includes displaying the third portion of the first virtual object with a second amount, different from the first amount, of the visual effect.

15. The method of claim 1, wherein the three-dimensional environment includes a third object, the method further comprising:

in accordance with a determination that the first portion of the first virtual object occupies a same portion of the three-dimensional environment as the first portion of the second object in the three-dimensional environment, and a third portion of the first virtual object occupies a same portion of the three-dimensional environment as the third object in the three-dimensional environment:

displaying content in the third portion of the first virtual object with third visual properties, different from the first visual properties, in the three-dimensional environment.

16. The method of claim 15, further comprising:

while displaying the content in the first portion of the first virtual object with the second visual properties because the first portion of the first virtual object occupies the same portion of the three-dimensional environment as the first portion of the second object, and displaying the content in the third portion of the first virtual object with the third visual properties because the third portion of the first virtual object occupies the same portion of the three-dimensional environment as the third object, detecting, via the one or more input devices, a second input corresponding to movement of the first virtual object from the second location to a third location, different from the second location, in the three-dimensional environment; and in response to detecting the second input:

moving the first virtual object from the second location to the third location in the three-dimensional environment in accordance with the second input; and in accordance with a determination that the movement of the first virtual object to the third location in the three-dimensional environment changes a co-occupancy between the first virtual object and the second object, updating display of the second visual properties of the content in the first portion of the first virtual object in the three-dimensional environment; and in accordance with a determination that the movement of the first virtual object to the third location in the three-dimensional environment changes the co-occupancy between the first virtual object and the third object, updating display of the third visual properties of the content in the third portion of the first virtual object in the three-dimensional environment.

17. The method of claim 1, further comprising:

while displaying the content in the first portion of the first virtual object with the second visual properties because the first portion of the first virtual object occupies the same portion of the three-dimensional environment as the first portion of the second object in the three-dimensional environment, detecting, via the one or more input devices, a second input corresponding to a request to display a virtual environment in the three-dimensional environment; and in response to detecting the second input:
displaying, via the display generation component, the virtual environment within the three-dimensional environment, including:
in accordance with a determination that the second location of the first virtual object in the three-dimensional environment is within the virtual environment:
displaying the first virtual object in the virtual environment, and
displaying the content in the first portion of the first virtual object with the first visual properties.

18. The method of claim 1, wherein while displaying the first virtual object at the second location in the three-dimensional environment, the three-dimensional environment is displayed with a first visual emphasis relative to the first virtual object, the method further comprising:

while displaying the content in the first portion of the first virtual object with the second visual properties because the first portion of the first virtual object occupies the same portion of the three-dimensional environment as the first portion of the second object in the three-dimensional environment, detecting, via the one or more input devices, a respective event corresponding to a request to display the three-dimensional environment with a second visual emphasis, different from the first visual emphasis, relative to the first virtual object; and in response to detecting the respective event:
displaying, via the display generation component, the three-dimensional environment with the second visual emphasis relative to the first virtual object; and
displaying the content in the first portion of the first virtual object with the first visual properties.

19. The method of claim 18, wherein the respective event includes input selecting a respective option.

20. The method of claim 18, wherein the respective event does not include input selecting a respective option.

21. The method of claim 18, further comprising:

while displaying the three-dimensional environment with the second visual emphasis relative to the first virtual object after detecting the respective event, detecting, via the one or more input devices, a second respective event that does not include input selecting a respective option; and in response to detecting the second respective event:
displaying the three-dimensional environment with the first visual emphasis relative to the first virtual object; and
displaying the content in the first portion of the first virtual object with the second visual properties.

22. The method of claim 1, wherein the first visual properties include a first degree of visual prominence of the content and the second visual properties includes a second degree of visual prominence of the content that is lower than the first degree of visual prominence of the content.

23. The method of claim 1, wherein the first visual properties include a first opacity of the content and the second visual properties includes a second opacity of the content, less than the first opacity of the content.

24. A computer system that is in communication with a display generation component and one or more input devices, the computer system comprising:
one or more processors;
memory; and
one or more programs, wherein the one or more programs are stored in the memory and configured to be executed by the one or more processors, the one or more programs including instructions for:
displaying, via the display generation component, a first virtual object at a first location in a three-dimensional environment, wherein a first portion and a second portion of the first virtual object include content that is displayed with first visual properties;
while displaying the first virtual object in the three-dimensional environment, detecting, via the one or more input devices, a first input corresponding to movement of the first virtual object from the first location to a second location, different from the first location, in the three-dimensional environment;
in response to detecting the first input, moving the first virtual object from the first location to the second location in the three-dimensional environment in accordance with the first input; and
in accordance with a determination that the first portion of the first virtual object occupies a same portion of the three-dimensional environment as a first portion of a second object in the three-dimensional environment, and the second portion of the first virtual object does not occupy a same portion of the three-dimensional environment as a respective object in the three-dimensional environment:
displaying the content in the first portion of the first virtual object with second visual properties, different from the first visual properties; and
displaying the content in the second portion of the first virtual object with the first visual properties.

25. A non-transitory computer readable storage medium storing one or more programs, the one or more programs comprising instructions, which when executed by one or more processors of a computer system that is in communication with a display generation component and one or more input devices, cause the computer system to perform a method comprising:
displaying, via the display generation component, a first virtual object at a first location in a three-dimensional environment, wherein a first portion and a second portion of the first virtual object include content that is displayed with first visual properties;

while displaying the first virtual object in the three-dimensional environment, detecting, via the one or more input devices, a first input corresponding to movement of the first virtual object from the first location to a second location, different from the first location, in the three-dimensional environment;

in response to detecting the first input, moving the first virtual object from the first location to the second location in the three-dimensional environment in accordance with the first input; and in accordance with a determination that the first portion of the first virtual object occupies a same portion of the three-dimensional environment as a first portion of a second object in the three-dimensional environment, and the second portion of the first virtual object does not occupy a same portion of the three-dimensional environment as a respective object in the three-dimensional environment:

displaying the content in the first portion of the first virtual object with second visual properties, different from the first visual properties; and displaying the content in the second portion of the first virtual object with the first visual properties.

26. The computer system of claim 22, wherein the second object is a physical object in a physical environment of the display generation component.

27. The computer system of claim 22, wherein the one or more programs include further instructions for:

after moving the first virtual object from the first location to the second location in the three-dimensional environment in accordance with the first input and while the first virtual object is at the second location in the three-dimensional environment:

in accordance with a determination that the first portion of the first virtual object does not occupy a same portion of the three-dimensional environment as a respective object in the three-dimensional environment, and the second portion of the first virtual object does not occupy the same portion of the three-dimensional environment as a respective object in the three-dimensional environment:

displaying the content in the first portion and the second portion of the first virtual object with the first visual properties.

28. The computer system of claim 22, wherein the first input includes input provided by a predefined portion of a user of the computer system that is directed to the first virtual object.

29. The computer system of claim 22, wherein the first input includes movement of a viewpoint of a user of the computer system.

30. The computer system of claim 22, wherein the first virtual object is world-locked within the three-dimensional environment.

31. The computer system of claim 22, wherein:

changing the content in the first portion of the first virtual object from having the first visual properties to the second visual properties includes changing a visual parameter of the first virtual object in a first direction; and the one or more programs include further instructions for:

while displaying the content in the first portion of the first virtual object with the second visual properties because the first portion of the first virtual object occupies the same portion of the three-dimensional environment as the first portion of the second object in the three-dimensional environment, detecting, via the one or more input devices, an end of the first input; and in response to detecting the end of the first input:

in accordance with a determination that one or more criteria are satisfied, displaying at least a portion of the content in the first portion of the first virtual object with third visual properties, wherein changing the content in the first portion of the first virtual object from having the second visual properties to the third visual properties includes changing the visual parameter of the first virtual object in a second direction that is opposite to the first direction.

32. The computer system of claim 31, wherein the one or more criteria include a criterion that is satisfied when a first threshold amount of time has elapsed since detecting the end of the first input.

33. The computer system of claim 22, wherein:

displaying the content in the first portion of the first virtual object with the first visual properties includes displaying the content in the first portion of the first virtual object with a first amount of opacity; and displaying the content in the first portion of the first virtual object with the second visual properties includes displaying the content in the first portion of the first virtual object with a second amount of opacity, different from the first amount of opacity.

34. The computer system of claim 22, wherein:

displaying the content in the first portion of the first virtual object with the first visual properties includes displaying the content in the first portion of the first virtual object with a first amount of brightness; and displaying the content in the first portion of the first virtual object with the second visual properties includes displaying the content in the first portion of the first virtual object with a second amount of brightness, different from the first amount of brightness.

35. The computer system of claim 22, wherein displaying the content in the second portion of the first virtual object with the first visual properties includes displaying the content in the second portion of the first virtual object with a first amount of opacity, the one or more programs include further instructions for:

while displaying the first virtual object at the second location in the three-dimensional environment, detecting, via the one or more input devices, a second input corresponding to movement of the first virtual object relative to a viewpoint of a user of the computer system; and while detecting the second input and while moving the first virtual object relative to the viewpoint of the user in accordance with the second input, reducing an opacity of the content in the second portion of the first virtual object relative to an opacity of the content in the first portion of the first virtual object.

36. The computer system of claim 22, wherein the one or more programs include further instructions for:

while displaying the first virtual object at the second location in the three-dimensional environment and while the first portion of the first virtual object occupies a same portion of the three-dimensional environment as the first portion of the second object in the three-dimensional environment, detecting, via the one or more input devices, a second input corresponding to movement of the first virtual object relative to a viewpoint of a user of the computer system; and while detecting the second input and while moving the first virtual object relative to the viewpoint of the user in accordance with the second input:

in accordance with a determination that the movement of the first virtual object relative to the viewpoint of the user corresponds to movement of the first virtual object from the second location to a third location in the three-dimensional environment:

displaying content in a third portion of the first virtual object with third visual properties, different from the first visual properties; and in accordance with a determination that the movement of the first virtual object relative to the viewpoint of the user corresponds to movement of the viewpoint of the user of the computer system:

displaying the content in the third portion of the first virtual object with fourth visual properties, different from the first visual properties and the third visual properties.

37. The computer system of claim 36, wherein:

displaying the content in the third portion of the first virtual object with the third visual properties includes displaying a boundary between the third portion of the first virtual object and a fourth portion of the first virtual object with a first visual transition, wherein the fourth portion of the first virtual object does not occupy a same portion of the three-dimensional environment as a respective object in the three-dimensional environment; and displaying the content in the third portion of the first virtual object with the fourth visual properties includes displaying the boundary between the third portion of the first virtual object and the fourth portion of the first virtual object with a second visual transition, different from the first visual transition.

38. The computer system of claim 36, wherein:

displaying the content in the third portion of the first virtual object with the third visual properties includes displaying the third portion of the first virtual object with a first amount of a visual effect; and displaying the content in the third portion of the first virtual object with the fourth visual properties includes displaying the third portion of the first virtual object with a second amount, different from the first amount, of the visual effect.

39. The computer system of claim 22, wherein the three-dimensional environment includes a third object, the one or more programs include further instructions for:

in accordance with a determination that the first portion of the first virtual object occupies a same portion of the three-dimensional environment as the first portion of the second object in the three-dimensional environment, and a third portion of the first virtual object occupies a same portion of the three-dimensional environment as the third object in the three-dimensional environment:

displaying content in the third portion of the first virtual object with third visual properties, different from the first visual properties, in the three-dimensional environment.

40. The computer system of claim 39, wherein the one or more programs include further instructions for:

while displaying the content in the first portion of the first virtual object with the second visual properties because the first portion of the first virtual object occupies the same portion of the three-dimensional environment as the first portion of the second object, and displaying the content in the third portion of the first virtual object with the third visual properties because the third portion of the first virtual object occupies the same portion of the three-dimensional environment as the third object, detecting, via the one or more input devices, a second input corresponding to movement of the first virtual object from the second location to a third location, different from the second location, in the three-dimensional environment; and in response to detecting the second input:

moving the first virtual object from the second location to the third location in the three-dimensional environment in accordance with the second input; and in accordance with a determination that the movement of the first virtual object to the third location in the three-dimensional environment changes a co-occupancy between the first virtual object and the second object, updating display of the second visual properties of the content in the first portion of the first virtual object in the three-dimensional environment; and in accordance with a determination that the movement of the first virtual object to the third location in the three-dimensional environment changes the co-occupancy between the first virtual object and the third object, updating display of the third visual properties of the content in the third portion of the first virtual object in the three-dimensional environment.

41. The computer system of claim 22, wherein the one or more programs include further instructions for:

while displaying the content in the first portion of the first virtual object with the second visual properties because the first portion of the first virtual object occupies the same portion of the three-dimensional environment as the first portion of the second object in the three-dimensional environment, detecting, via the one or more input devices, a second input corresponding to a request to display a virtual environment in the three-dimensional environment; and in response to detecting the second input:

displaying, via the display generation component, the virtual environment within the three-dimensional environment, including:

in accordance with a determination that the second location of the first virtual object in the three-dimensional environment is within the virtual environment:

displaying the first virtual object in the virtual environment, and displaying the content in the first portion of the first virtual object with the first visual properties.

42. The computer system of claim 22, wherein while displaying the first virtual object at the second location in the three-dimensional environment, the three-dimensional environment is displayed with a first visual emphasis relative to the first virtual object, the one or more programs include further instructions for:

while displaying the content in the first portion of the first virtual object with the second visual properties because the first portion of the first virtual object occupies the same portion of the three-dimensional environment as the first portion of the second object in the three-dimensional environment, detecting, via the one or more input devices, a respective event corresponding to a request to display the three-dimensional environment with a second visual emphasis, different from the first visual emphasis, relative to the first virtual object; and in response to detecting the respective event:

displaying, via the display generation component, the three-dimensional environment with the second visual emphasis relative to the first virtual object; and displaying the content in the first portion of the first virtual object with the first visual properties.

43. The computer system of claim 42, wherein the respective event includes input selecting a respective option.

44. The computer system of claim 42, wherein the respective event does not include input selecting a respective option.

45. The computer system of claim 42, wherein the one or more programs include further instructions for:

while displaying the three-dimensional environment with the second visual emphasis relative to the first virtual object after detecting the respective event, detecting, via the one or more input devices, a second respective event that does not include input selecting a respective option; and in response to detecting the second respective event:

displaying the three-dimensional environment with the first visual emphasis relative to the first virtual object; and displaying the content in the first portion of the first virtual object with the second visual properties.

46. The computer system of claim 22, wherein the first visual properties include a first degree of visual prominence of the content and the second visual properties includes a second degree of visual prominence of the content that is lower than the first degree of visual prominence of the content.

47. The computer system of claim 22, wherein the first visual properties include a first opacity of the content and the second visual properties includes a second opacity of the content, less than the first opacity of the content.

48. The non-transitory computer readable storage medium of claim 23, wherein the second object is a physical object in a physical environment of the display generation component.

49. The non-transitory computer readable storage medium of claim 23, wherein the one or more programs include further instructions for:

after moving the first virtual object from the first location to the second location in the three-dimensional environment in accordance with the first input and while the first virtual object is at the second location in the three-dimensional environment:

in accordance with a determination that the first portion of the first virtual object does not occupy a same portion of the three-dimensional environment as a respective object in the three-dimensional environment, and the second portion of the first virtual object does not occupy the same portion of the three-dimensional environment as a respective object in the three-dimensional environment:

displaying the content in the first portion and the second portion of the first virtual object with the first visual properties.

50. The non-transitory computer readable storage medium of claim 23, wherein the first input includes input provided by a predefined portion of a user of the computer system that is directed to the first virtual object.

51. The non-transitory computer readable storage medium of claim 23, wherein the first input includes movement of a viewpoint of a user of the computer system.

52. The non-transitory computer readable storage medium of claim 23, wherein the first virtual object is world-locked within the three-dimensional environment.

53. The non-transitory computer readable storage medium of claim 23, wherein:

changing the content in the first portion of the first virtual object from having the first visual properties to the second visual properties includes changing a visual parameter of the first virtual object in a first direction; and the one or more programs include further instructions for:

while displaying the content in the first portion of the first virtual object with the second visual properties because the first portion of the first virtual object occupies the same portion of the three-dimensional environment as the first portion of the second object in the three-dimensional environment, detecting, via the one or more input devices, an end of the first input; and in response to detecting the end of the first input:

in accordance with a determination that one or more criteria are satisfied, displaying at least a portion of the content in the first portion of the first virtual object with third visual properties, wherein changing the content in the first portion of the first virtual object from having the second visual properties to the third visual properties includes changing the visual parameter of the first virtual object in a second direction that is opposite to the first direction.

54. The non-transitory computer readable storage medium of claim 53, wherein the one or more criteria include a criterion that is satisfied when a first threshold amount of time has elapsed since detecting the end of the first input.

55. The non-transitory computer readable storage medium of claim 23, wherein:

displaying the content in the first portion of the first virtual object with the first visual properties includes displaying the content in the first portion of the first virtual object with a first amount of opacity; and displaying the content in the first portion of the first virtual object with the second visual properties includes displaying the content in the first portion of the first virtual object with a second amount of opacity, different from the first amount of opacity.

56. The non-transitory computer readable storage medium of claim 23, wherein:

displaying the content in the first portion of the first virtual object with the first visual properties includes displaying the content in the first portion of the first virtual object with a first amount of brightness; and displaying the content in the first portion of the first virtual object with the second visual properties includes displaying the content in the first portion of the first virtual object with a second amount of brightness, different from the first amount of brightness.

57. The non-transitory computer readable storage medium of claim 23, wherein displaying the content in the second portion of the first virtual object with the first visual properties includes displaying the content in the second portion of the first virtual object with a first amount of opacity, the one or more programs include further instructions for:

while displaying the first virtual object at the second location in the three-dimensional environment, detecting, via the one or more input devices, a second input corresponding to movement of the first virtual object relative to a viewpoint of a user of the computer system; and while detecting the second input and while moving the first virtual object relative to the viewpoint of the user in accordance with the second input, reducing an opacity of the content in the second portion of the first virtual object relative to an opacity of the content in the first portion of the first virtual object.

58. The non-transitory computer readable storage medium of claim 23, wherein the one or more programs include further instructions for:

while displaying the first virtual object at the second location in the three-dimensional environment and while the first portion of the first virtual object occupies a same portion of the three-dimensional environment as the first portion of the second object in the three-dimensional environment, detecting, via the one or more input devices, a second input corresponding to movement of the first virtual object relative to a viewpoint of a user of the computer system; and while detecting the second input and while moving the first virtual object relative to the viewpoint of the user in accordance with the second input:

in accordance with a determination that the movement of the first virtual object relative to the viewpoint of the user corresponds to movement of the first virtual object from the second location to a third location in the three-dimensional environment:

displaying content in a third portion of the first virtual object with third visual properties, different from the first visual properties; and in accordance with a determination that the movement of the first virtual object relative to the viewpoint of the user corresponds to movement of the viewpoint of the user of the computer system:

displaying the content in the third portion of the first virtual object with fourth visual properties, different from the first visual properties and the third visual properties.

59. The non-transitory computer readable storage medium of claim 58, wherein:

displaying the content in the third portion of the first virtual object with the third visual properties includes displaying a boundary between the third portion of the first virtual object and a fourth portion of the first virtual object with a first visual transition, wherein the fourth portion of the first virtual object does not occupy a same portion of the three-dimensional environment as a respective object in the three-dimensional environment; and displaying the content in the third portion of the first virtual object with the fourth visual properties includes displaying the boundary between the third portion of the first virtual object and the fourth portion of the first virtual object with a second visual transition, different from the first visual transition.

60. The non-transitory computer readable storage medium of claim 58, wherein:

displaying the content in the third portion of the first virtual object with the third visual properties includes displaying the third portion of the first virtual object with a first amount of a visual effect; and displaying the content in the third portion of the first virtual object with the fourth visual properties includes displaying the third portion of the first virtual object with a second amount, different from the first amount, of the visual effect.

61. The non-transitory computer readable storage medium of claim 23, wherein the three-dimensional environment includes a third object, the one or more programs include further instructions for:

in accordance with a determination that the first portion of the first virtual object occupies a same portion of the three-dimensional environment as the first portion of the second object in the three-dimensional environment, and a third portion of the first virtual object occupies a same portion of the three-dimensional environment as the third object in the three-dimensional environment:

displaying content in the third portion of the first virtual object with third visual properties, different from the first visual properties, in the three-dimensional environment.

62. The non-transitory computer readable storage medium of claim 61, wherein the one or more programs include further instructions for:

while displaying the content in the first portion of the first virtual object with the second visual properties because the first portion of the first virtual object occupies the same portion of the three-dimensional environment as the first portion of the second object, and displaying the content in the third portion of the first virtual object with the third visual properties because the third portion of the first virtual object occupies the same portion of the three-dimensional environment as the third object, detecting, via the one or more input devices, a second input corresponding to movement of the first virtual object from the second location to a third location, different from the second location, in the three-dimensional environment; and in response to detecting the second input:

moving the first virtual object from the second location to the third location in the three-dimensional environment in accordance with the second input; and in accordance with a determination that the movement of the first virtual object to the third location in the three-dimensional environment changes a co-occupancy between the first virtual object and the second object, updating display of the second visual properties of the content in the first portion of the first virtual object in the three-dimensional environment; and in accordance with a determination that the movement of the first virtual object to the third location in the three-dimensional environment changes the co-occupancy between the first virtual object and the third object, updating display of the third visual properties of the content in the third portion of the first virtual object in the three-dimensional environment.

63. The non-transitory computer readable storage medium of claim 23, wherein the one or more programs include further instructions for:

while displaying the content in the first portion of the first virtual object with the second visual properties because the first portion of the first virtual object occupies the same portion of the three-dimensional environment as the first portion of the second object in the three-dimensional environment, detecting, via the one or more input devices, a second input corresponding to a request to display a virtual environment in the three-dimensional environment; and in response to detecting the second input:

displaying, via the display generation component, the virtual environment within the three-dimensional environment, including:

in accordance with a determination that the second location of the first virtual object in the three-dimensional environment is within the virtual environment:

displaying the first virtual object in the virtual environment, and displaying the content in the first portion of the first virtual object with the first visual properties.

64. The non-transitory computer readable storage medium of claim 23, wherein while displaying the first virtual object at the second location in the three-dimensional environment, the three-dimensional environment is displayed with a first visual emphasis relative to the first virtual object, the one or more programs include further instructions for:

while displaying the content in the first portion of the first virtual object with the second visual properties because the first portion of the first virtual object occupies the same portion of the three-dimensional environment as the first portion of the second object in the three-dimensional environment, detecting, via the one or more input devices, a respective event corresponding to a request to display the three-dimensional environment with a second visual emphasis, different from the first visual emphasis, relative to the first virtual object; and in response to detecting the respective event:

displaying, via the display generation component, the three-dimensional environment with the second visual emphasis relative to the first virtual object; and displaying the content in the first portion of the first virtual object with the first visual properties.

65. The non-transitory computer readable storage medium of claim 64, wherein the respective event includes input selecting a respective option.

66. The non-transitory computer readable storage medium of claim 64, wherein the respective event does not include input selecting a respective option.

67. The non-transitory computer readable storage medium of claim 64, wherein the one or more programs include further instructions for:

while displaying the three-dimensional environment with the second visual emphasis relative to the first virtual object after detecting the respective event, detecting, via the one or more input devices, a second respective event that does not include input selecting a respective option; and in response to detecting the second respective event:

displaying the three-dimensional environment with the first visual emphasis relative to the first virtual object; and displaying the content in the first portion of the first virtual object with the second visual properties.

68. The non-transitory computer readable storage medium of claim 23, wherein the first visual properties include a first degree of visual prominence of the content and the second visual properties includes a second degree of visual prominence of the content that is lower than the first degree of visual prominence of the content.

69. The non-transitory computer readable storage medium of claim 23, wherein the first visual properties include a first opacity of the content and the second visual properties includes a second opacity of the content, less than the first opacity of the content.

* * * * *